US006959282B2

(12) United States Patent
Kakihara et al.

(10) Patent No.: US 6,959,282 B2
(45) Date of Patent: Oct. 25, 2005

(54) CHARGING DEVICE FOR TRANSFERRING INFORMATION RELATING TO THE COLLECTION OF A TOLL ON A MOVING BODY

(75) Inventors: Masaki Kakihara, Yokohama (JP); Yasuyuki Furuta, Aichi (JP); Haruhiko Terada, Obu (JP); Yasuyuki Aoki, Nagoya (JP)

(73) Assignees: Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 350 days.

(21) Appl. No.: 09/819,827

(22) Filed: Mar. 29, 2001

(65) Prior Publication Data

US 2003/0189498 A1 Oct. 9, 2003

(30) Foreign Application Priority Data

| Oct. 9, 1998 | (JP) | ............................................ | 10-288301 |
| Oct. 9, 1998 | (JP) | ............................................ | 10-288302 |
| Oct. 15, 1998 | (JP) | ............................................ | 10-294307 |
| Nov. 30, 1998 | (JP) | ............................................ | 10-339216 |
| Nov. 30, 1998 | (JP) | ............................................ | 10-339217 |
| Nov. 30, 1998 | (JP) | ............................................ | 10-339218 |
| Nov. 30, 1998 | (JP) | ............................................ | 10-339219 |
| Nov. 30, 1998 | (JP) | ............................................ | 10-339220 |
| Jun. 15, 1999 | (JP) | ............................................ | 11-168340 |
| Oct. 8, 1999 | (JP) | .................................. | PCT/JP99/05580 |

(51) Int. Cl.⁷ ............................................... G06F 17/60

(52) U.S. Cl. .......................................... 705/13; 705/417

(58) Field of Search ................... 705/13, 417; 340/928, 340/932.2, 993; 701/213–217; 342/357.08, 357.12, 357.13

(56) References Cited

U.S. PATENT DOCUMENTS

| 5,563,608 | A | | 10/1996 | Tachita et al. |
| 5,581,249 | A | * | 12/1996 | Yoshida ....................... 340/928 |
| 5,675,494 | A | * | 10/1997 | Sakurai et al. .............. 705/417 |
| 5,694,322 | A | * | 12/1997 | Westerlage et al. ......... 705/417 |
| 5,708,972 | A | * | 1/1998 | Matsumoto ................. 455/517 |
| 5,717,389 | A | * | 2/1998 | Mertens et al. ............. 340/928 |
| 5,721,678 | A | * | 2/1998 | Widl .......................... 705/417 |
| 5,745,868 | A | | 4/1998 | Geier |
| 5,864,306 | A | * | 1/1999 | Dwyer et al. ............... 340/928 |
| 6,002,981 | A | | 12/1999 | Kreft |
| 6,081,718 | A | * | 6/2000 | Ando et al. ................. 455/447 |
| 6,246,932 | B1 | | 6/2001 | Kageyama et al. |
| 6,252,523 | B1 | * | 6/2001 | Mostrom .................... 340/928 |
| 6,437,706 | B2 | * | 8/2002 | Sato et al. .................. 340/928 |

FOREIGN PATENT DOCUMENTS

| JP | 1-137400 | 5/1989 |
| JP | 2-298813 | 12/1990 |
| JP | 6-231390 | 8/1994 |
| JP | 7-253330 | 10/1995 |
| JP | 8-138193 | 5/1996 |

(Continued)

OTHER PUBLICATIONS

Josifovska, Svetlana, "Pay As You Drive," Electronics Weekly, vol. 1733, No. 13, Aug. 9, 1995.*
U.S. Appl. No. 09/984,071, filed Oct. 26, 2001, Furuta.

*Primary Examiner*—Susanna Meinecke-Diaz
(74) *Attorney, Agent, or Firm*—Pillsbury Winthrop LLP

(57) ABSTRACT

A toll collection arrangement based on the position and travel of a vehicle. A charging area is defined with a buffer area surrounding it. Charges are made when a vehicle enters the charging area for the first time from the buffer area. Later excursions from the charging area into the buffer area and returns from the buffer area to the charging area are not double charged. Vehicle position information can be GPS based.

11 Claims, 87 Drawing Sheets

FOREIGN PATENT DOCUMENTS

| | | |
|---|---|---|
| JP | 8-261780 | 10/1996 |
| JP | 9-101161 | 4/1997 |
| JP | 09-212794 | 8/1997 |
| JP | 9-269236 | 10/1997 |
| JP | 9319904 | 12/1997 |
| JP | 10-063903 | 3/1998 |
| JP | 10-103988 | 4/1998 |
| JP | 11-3445 | 1/1999 |
| JP | 11-142175 | 5/1999 |
| JP | 11-183185 | 7/1999 |
| JP | 411185073 A * | 7/1999 ........... G07B/15/00 |
| JP | 11-257975 | 9/1999 |
| JP | 11-258981 | 9/1999 |
| JP | 2000-293722 A * | 10/2000 ........... G07B/15/00 |
| WO | WO 97/04421 | 2/1997 |
| WO | WO 94/27256 A1 * | 11/1997 ........... G07B/15/00 |

\* cited by examiner

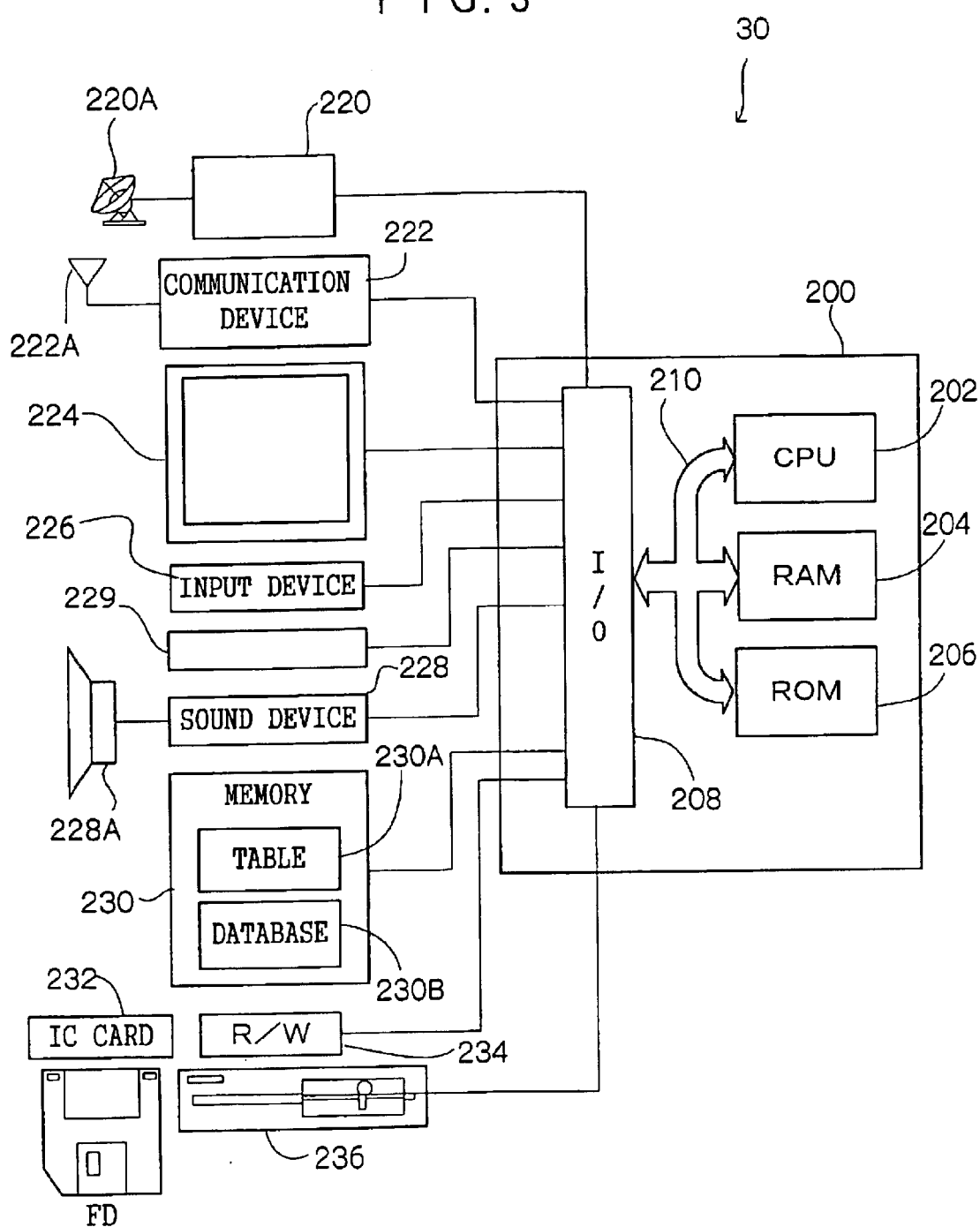
F I G. 3

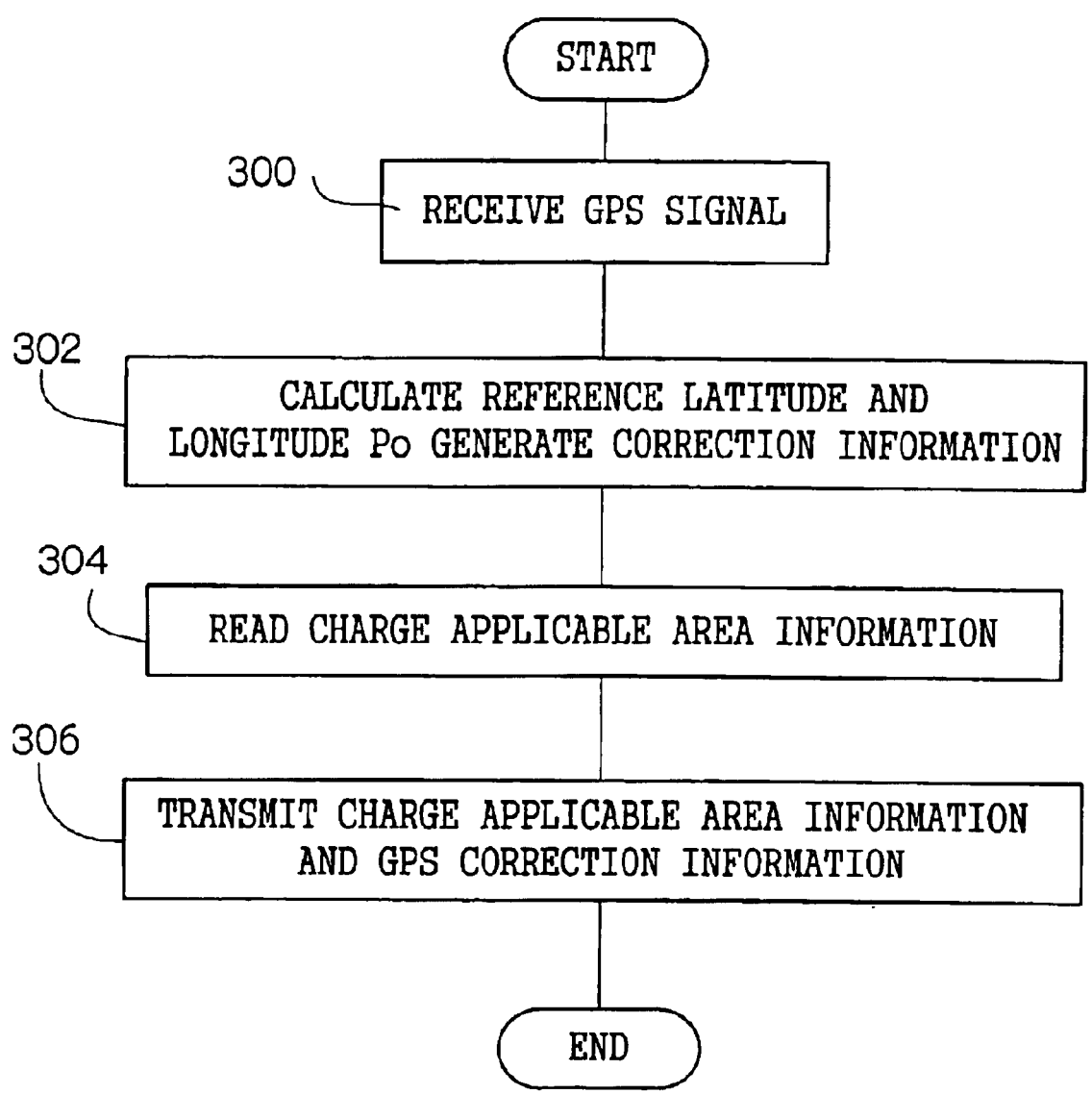

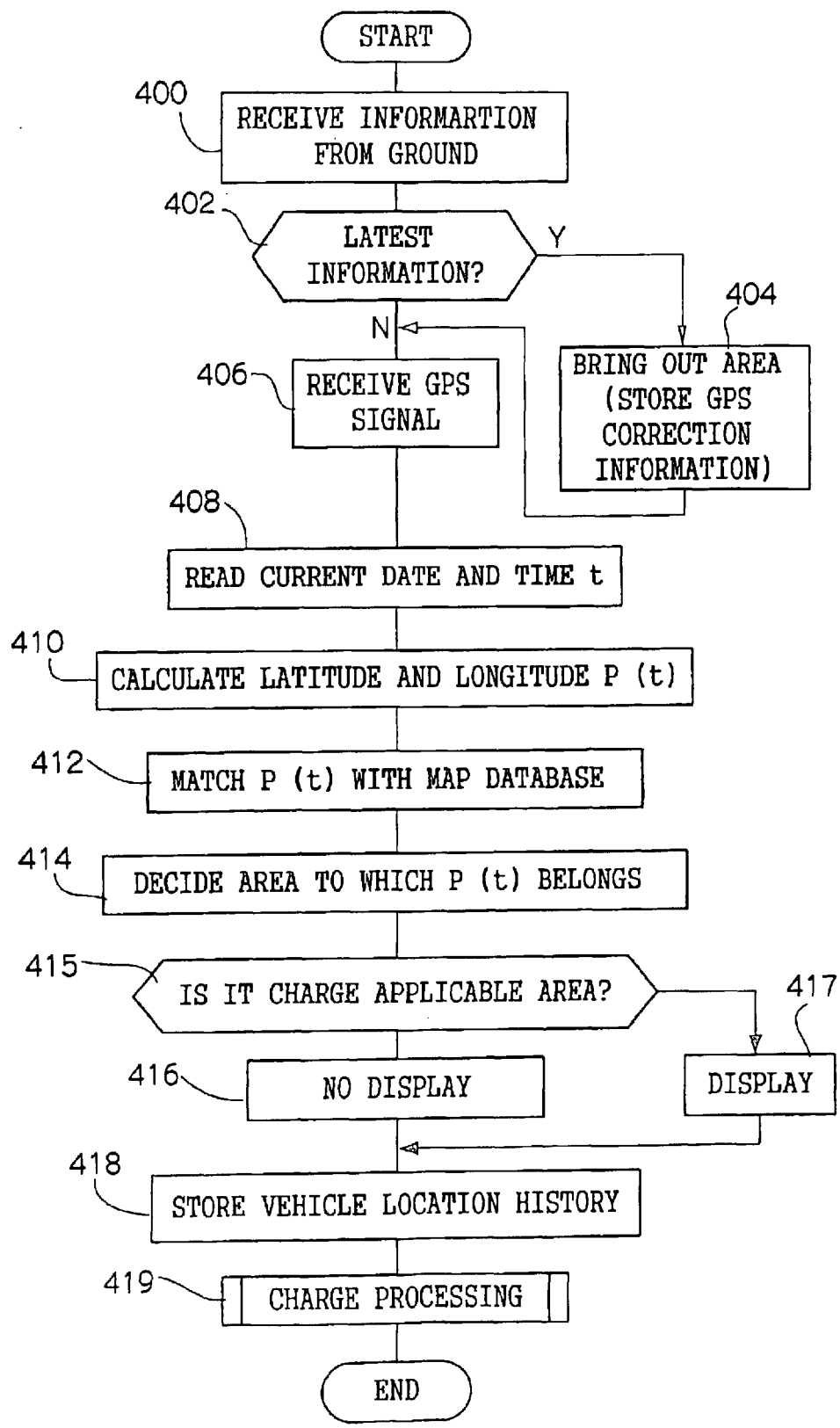

F I G. 1 1 A

F I G. 1 1 B

F I G. 1 1 C

F I G. 1 1 D

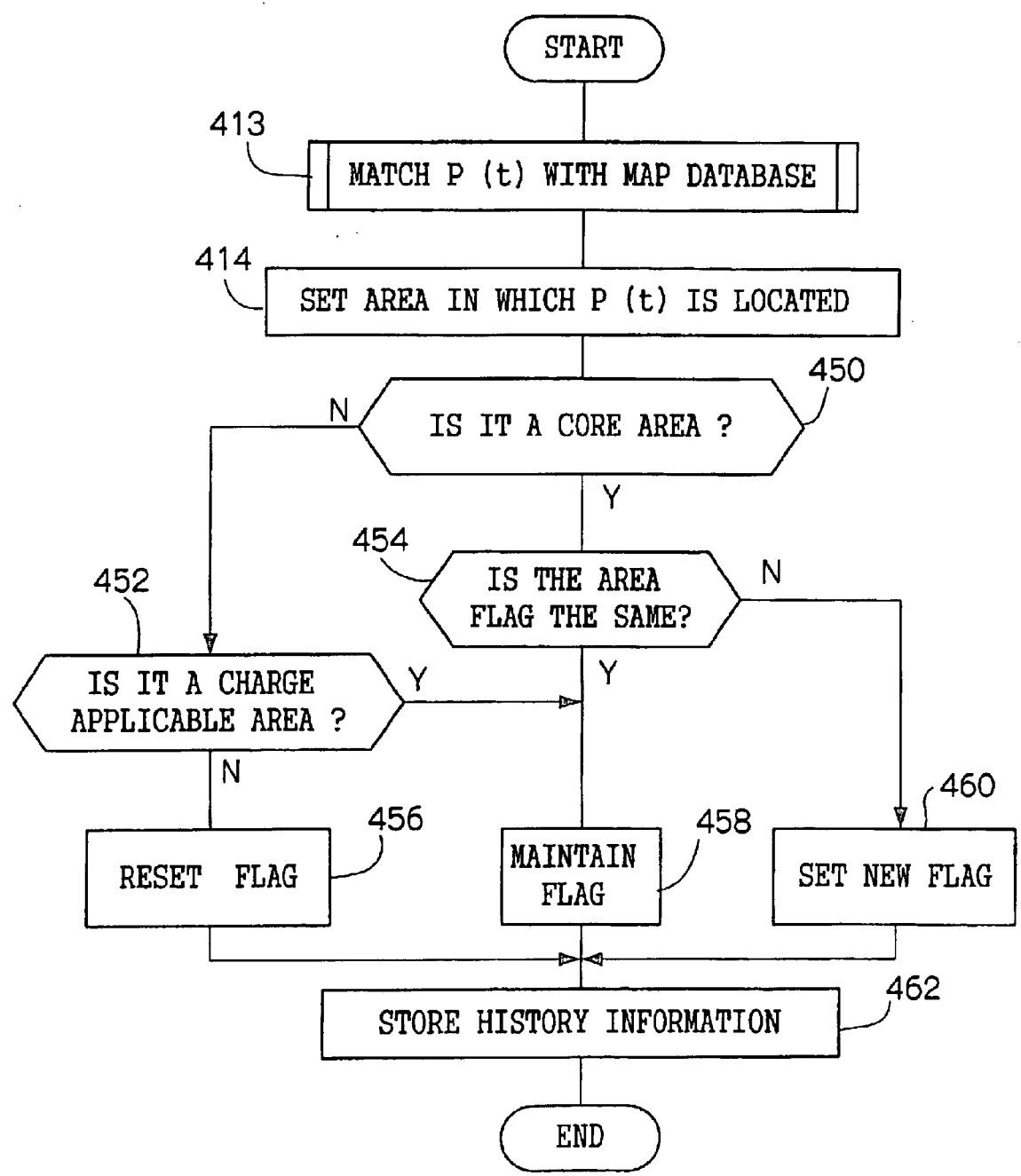

F I G. 33 A
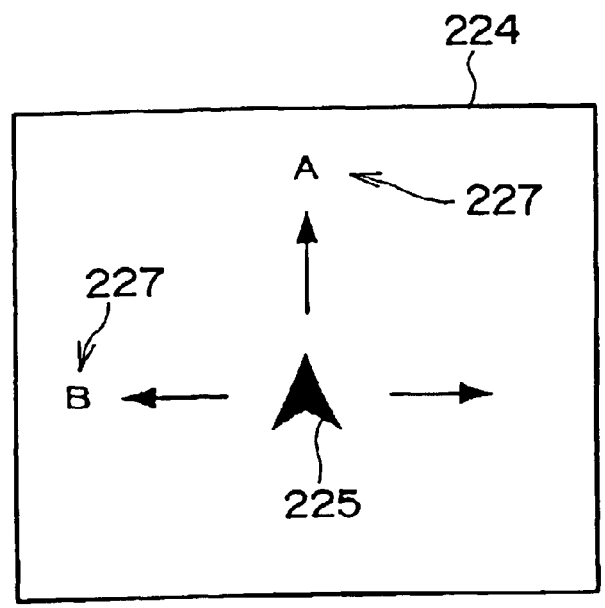
F I G. 33 B
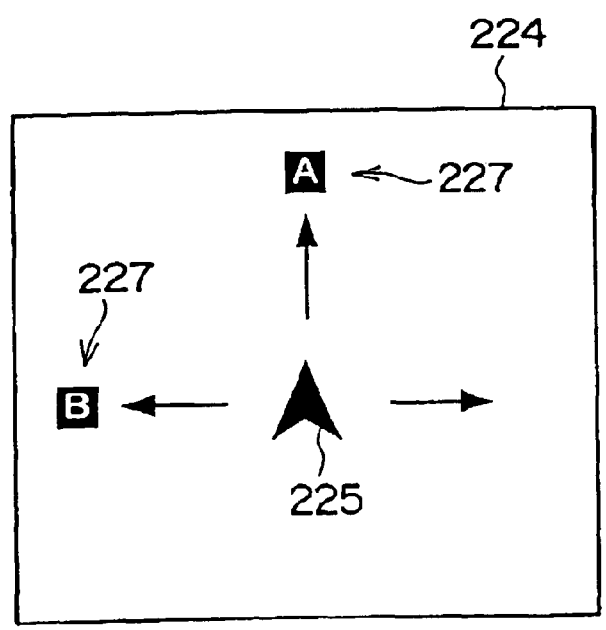

F I G. 3 4
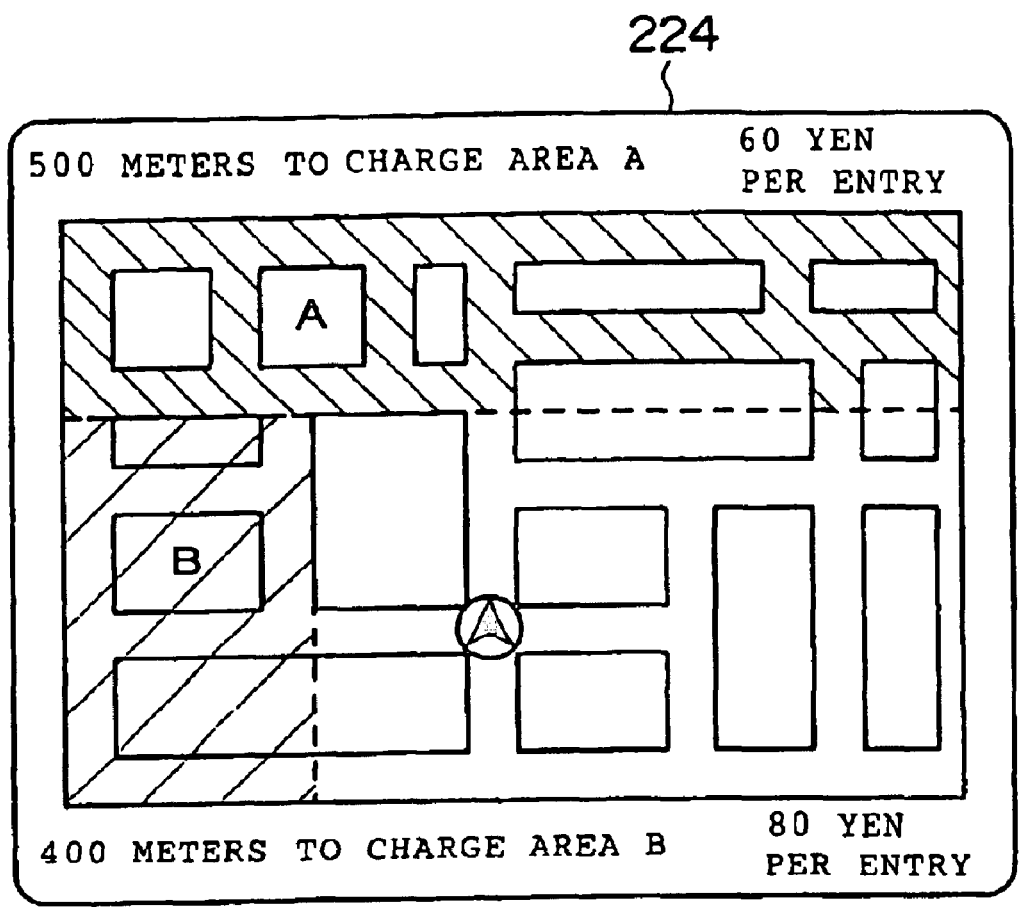

F I G. 4 1 A
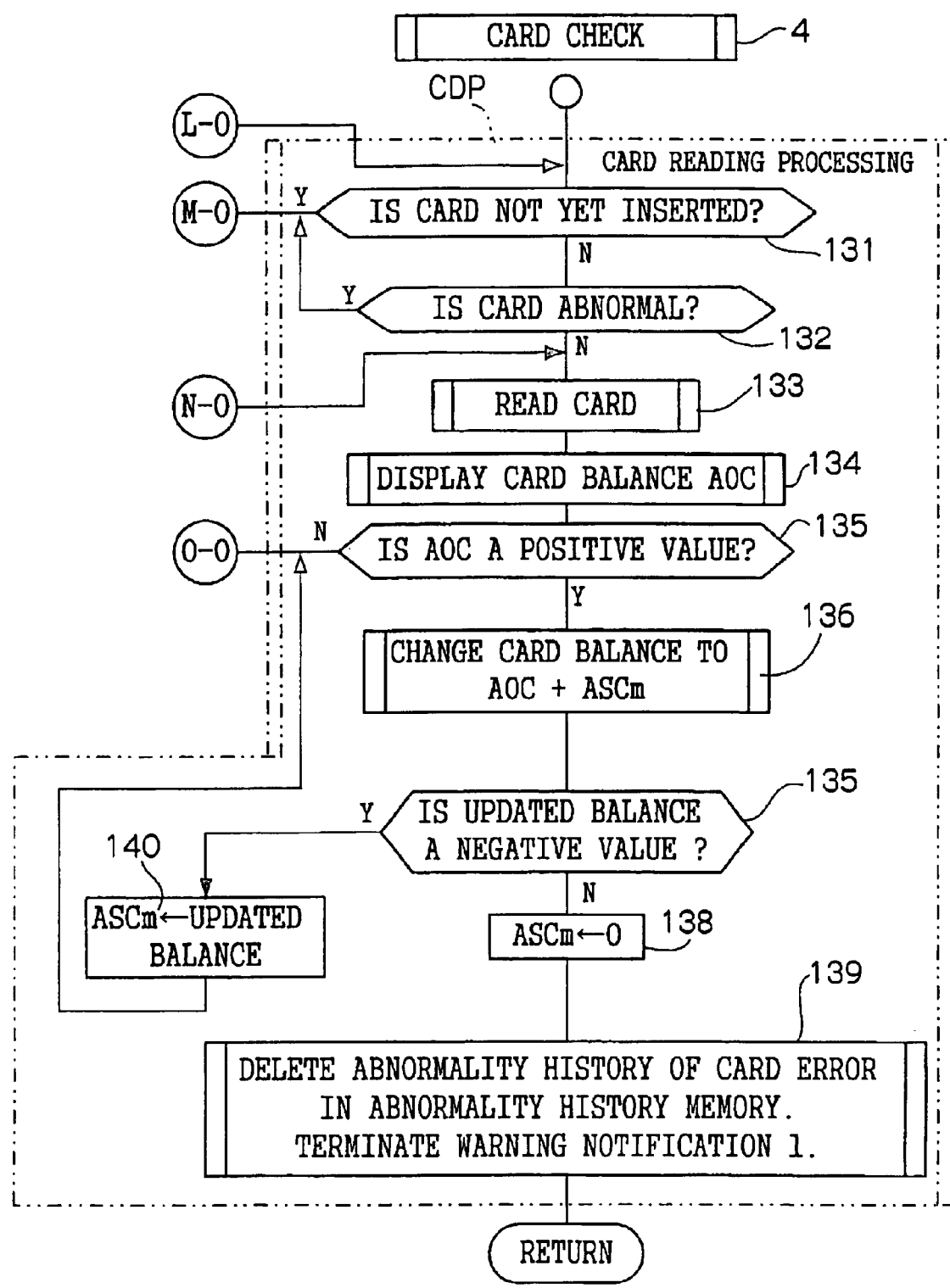

F I G. 4 6
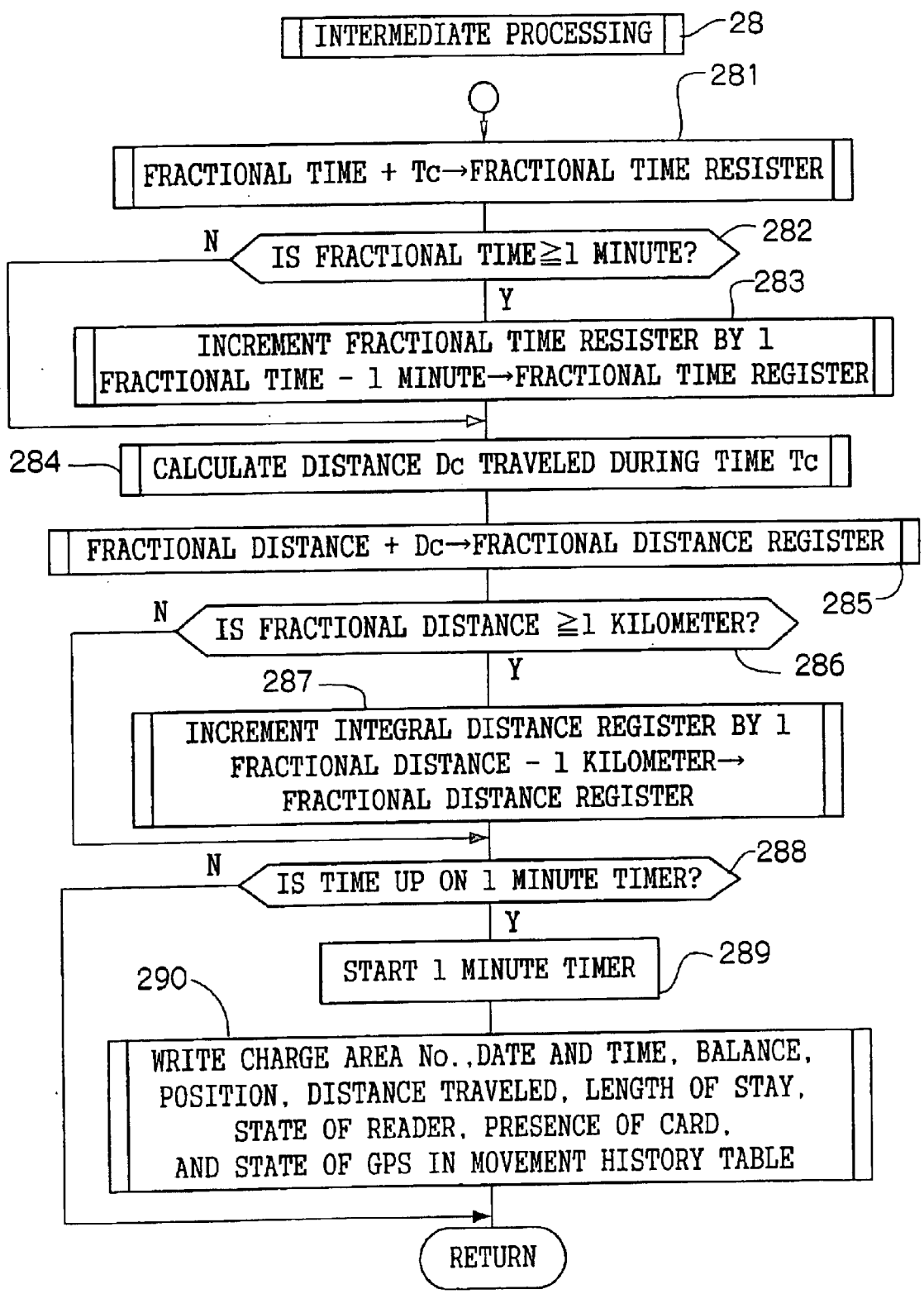

F I G. 4 7
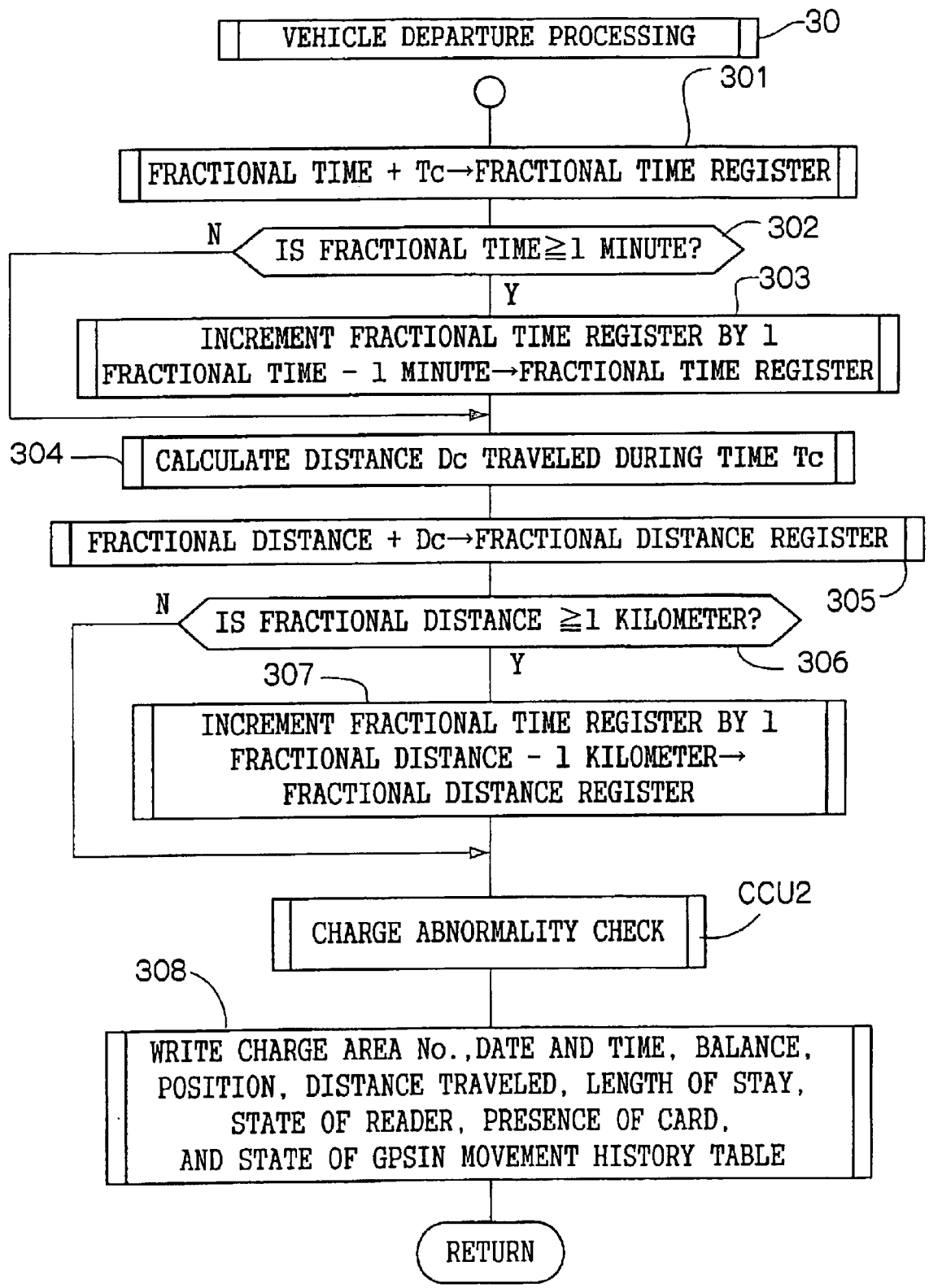

F I G. 5 8 B
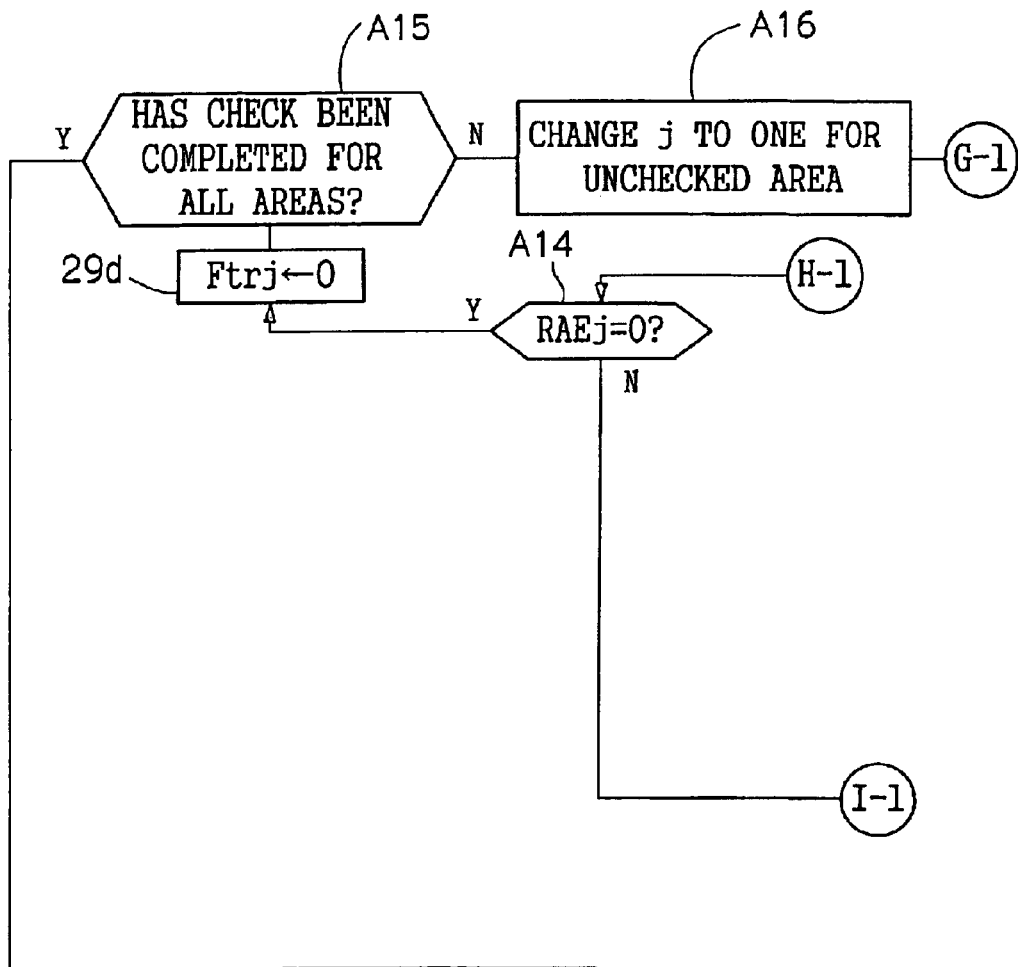
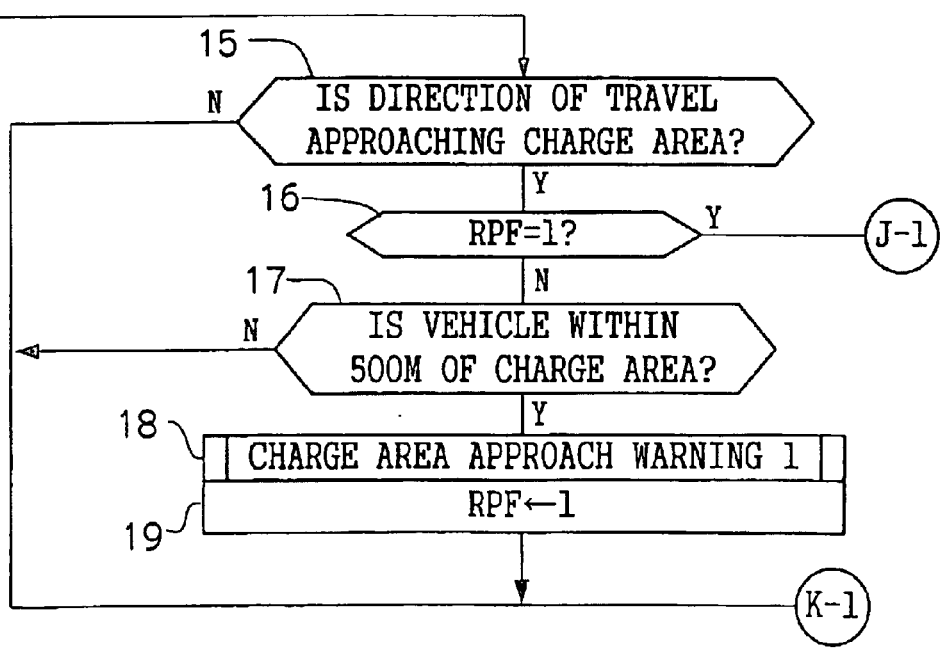

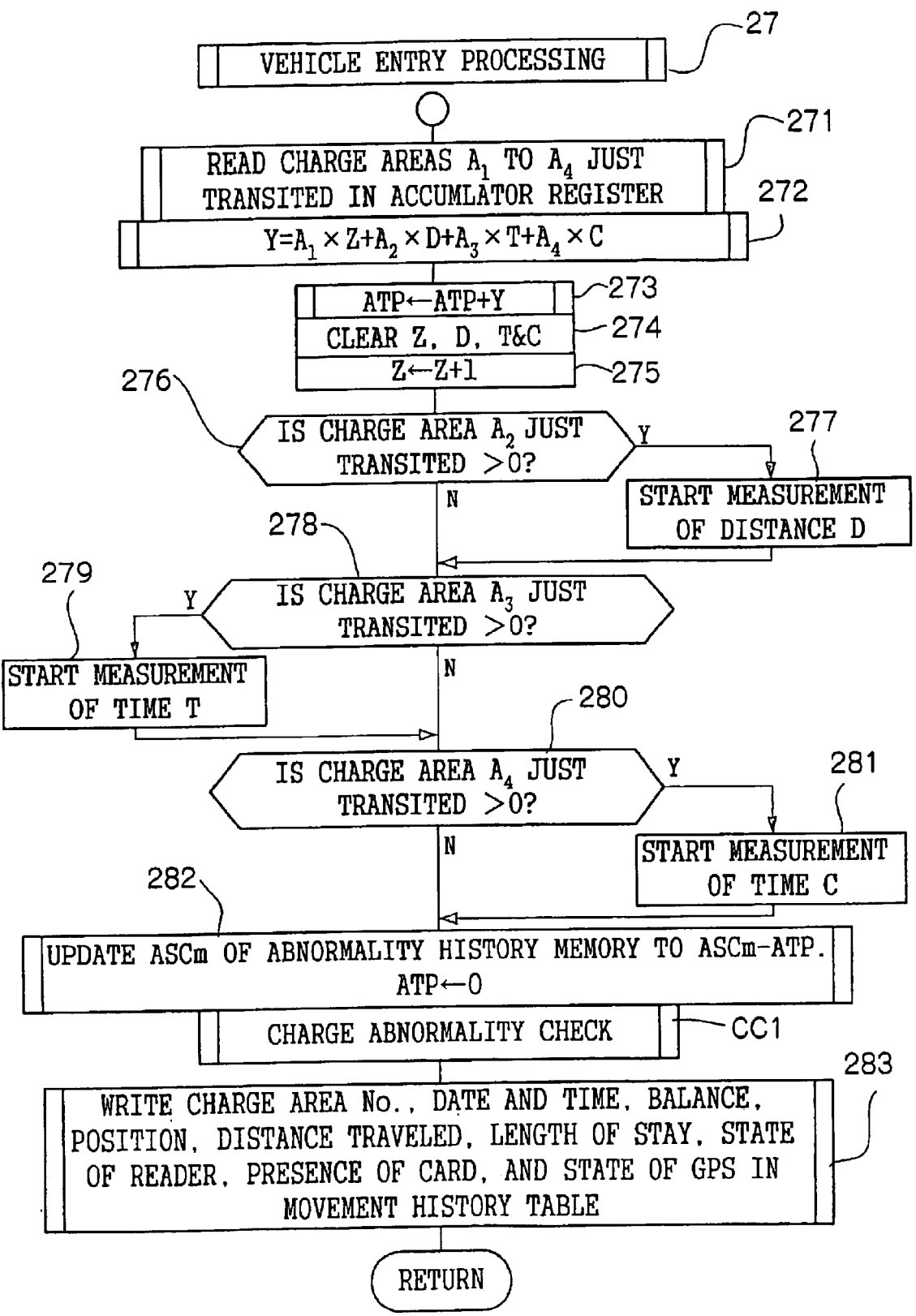

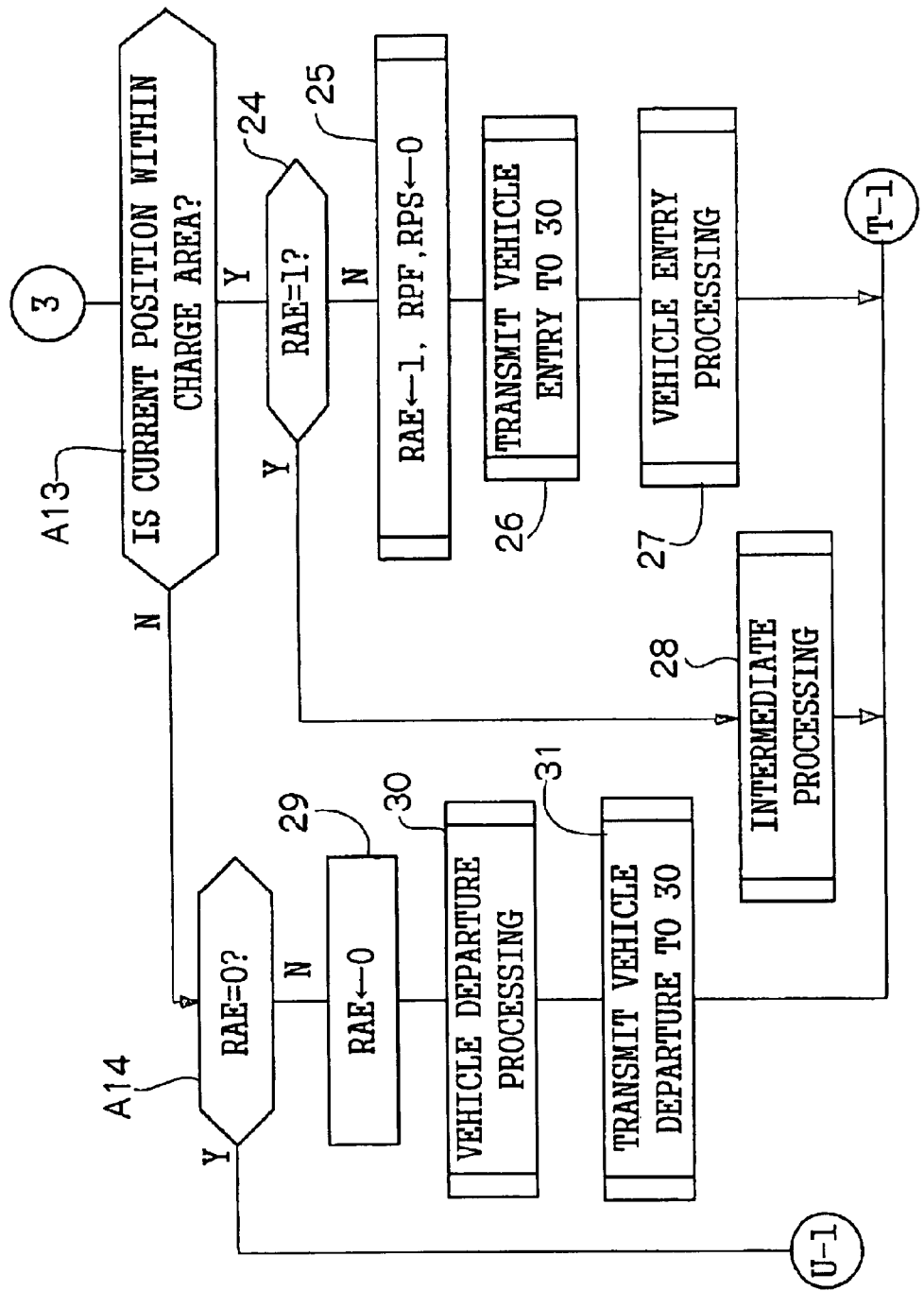

F I G. 6 7
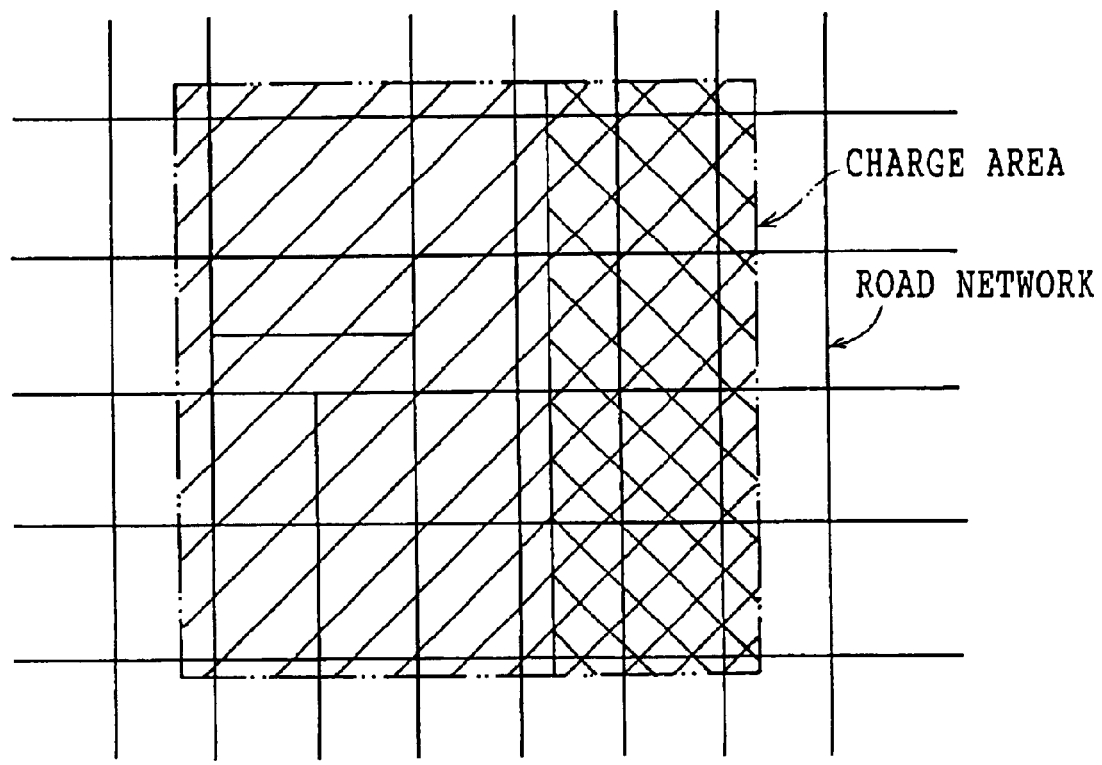

CHARGING DEVICE FOR TRANSFERRING INFORMATION RELATING TO THE COLLECTION OF A TOLL ON A MOVING BODY

RELATED APPLICATION

This application is a continuation of PCT/JP99/05580, filed Oct. 8, 1999, the contents of which are herein incorporated by reference.

BACKGROUND OF THE INVENTION

1. Field of the Invention

The inventions relate to a charging device. Specifically, the inventions relate to a charging device, and particularly, to a charging device for transferring information relating to the collection of a toll on a moving body traveling within a charge applicable area and the like and for implementing charge processing for the user of the moving body, and to a charging device that is mounted in a vehicle and that performs data processing for the payment of a toll arising from the use of a charge area at a point when predetermined conditions are met when a vehicle is driving through the charge area.

2. Description of the Related Art

A moving body such as vehicle that travels on a toll paying installation (such as a toll road) is charged in accordance with the type of the vehicle as well as the distance traveled on the toll road. In order to automatically collect the toll at an entry gate or exit gate of the toll road, a road-vehicle intercommunication system for performing wireless information transfer between an in-vehicle device and an on-road device is used. In this system, a communication device having an antenna for sending and receiving electrical waves (i.e. the on-road device) is provided on the road as an interrogator for seeking information on the relevant vehicle. In addition, a communication device having an antenna (i.e. the in-vehicle device) is provided in the vehicle as a responder for responding to the sought information.

Technology is proposed in, for example, Japanese Patent Application Laid-Open (JP-A) No. 10-63903, in which a toll is collected from a vehicle based on the entry to the toll road (which is a specific territory), the exit from the toll road, and the route between the two.

However, when this type of road-vehicle intercommunication system is used to transfer information, it is necessary to install an on-road device at the entries and exits of the charge applicable area, such as the entry gates and exit gates of a toll road. If the area for which a toll is to be charged, such as a toll road, is-one-dimensional, the installation is easy, however, if the charge applicable area is set as a area or the like covering a wide range, it is necessary to install on-road devices at all of the entries and exits resulting in the cost increasing in accordance with the number of entry and exit locations.

In view of the above circumstances, the first object of the present invention is to provide a charge device having a simple structure that is capable of implementing charge processing for a user of a moving body.

Currently, tollbooths are provided along the route of a toll road and vehicles are made to sop there so that the charging operation can be performed. In this type of charging method, a large amount of labor and time are wasted in the toll collection and traffic becomes extremely congested around the tollbooths. Therefore, a system has been proposed in which devices for determining the passage of a vehicle (hereinafter referred to as vehicle passage detectors) are installed on a plurality of routes and the charge is levied by determining which route of the plurality of routes a vehicle has traveled over. An example of this method is disclosed in Japanese Patent Application Laid-Open (JP-A) No. 9-212794. In this system, there are few branching routes and entry and exit points (i.e. interchanges). Therefore, in a toll road network in which the distances between interchanges is comparatively long, there only needs to be a small number of vehicle passage detectors installed enabling the system to be set up easily.

Moreover, because a prepaid card capable of having the balance thereof updated is used, when the vehicle exits the toll road, information indicating the route traveled by the vehicle is transmitted to an antenna terminal, the antenna terminal calculates the toll for the route traveled and transmits this to the vehicle, and the vehicle then deducts this toll from the prepaid card, thereby doing away with the need for the vehicle to be stopped in order for the toll to be paid. However, in a toll road network in which there is a large number of branch ing routes and entry and exit points (i.e. interchanges) as well as a large number of short distances between interchanges, but in which the total distance of the road network as a whole is large, there needs to be a large number of vehicle passage detectors installed resulting in the setting up and maintenance costs thereof be coming enormously expensive.

It is also possible to consider charges or traffic regulations in a specific area as a means of easing traffic congestion, reducing atmospheric pollution, reducing noise, obtaining regional revenue, or the like. In contrast to a charge area in which the highway network is a continuous distribution of narrow arteries, the charge area for a specific area such as that described above is an isolated area covering a large surface area. In this case, there is a high probability that the road network within the area will be complex, and the establishment of tollbooths for stopping a vehicle to collect charges is not feasible. Instead, the employing of an automatic charge processing system that uses prepaid cards is desirable.

The charging for a specific area is performed by first installing in a vehicle a GPS position finder and/or a gyro navigation position finder by means of which it can be confirmed whether or not the vehicle is in the specific area, and deducting a charge amount determined by the controlling authority from the balance on a prepaid card for each passage of the vehicle through the specific area, or for the total distance traveled within the specific area, or for the length of time the vehicle was inside the specific area. The balance of the prepaid card is then updated as the new balance. However, when the vehicle is traveling in the area around the outer edge of the specific area, there is a high probability that, due to errors in the positional measurement by the position finder, errors may occur in the detection such as the vehicle being recognized as being outside (or inside) the specific area when, in fact, the vehicle is actually inside (or outside) the specific area. As a result, it may be considered that the result of this is that the recognition (or supposition) of the vehicle driver and the automatic charge processing (i.e. the rewriting of the card balance) based on the positional recognition by the position finder are greatly at variance with each other.

In particular, in a pay per entry charging system in which payment of an amount set by a controlling authority is made for each single entry into the specific area (i.e. a single entry followed by an exit), the result is that there is a great deal of unevenness in the amount paid. For example, as is shown in FIG. 55A, if a single passage is made in a straight line through charge area 1, because the road is close to the outer edge of charge area 1, the entry into and exit from charge area 1 as detected by the position finder could quite conceivably be an erratic repetition of entries and exits as is shown by the two dot dash line. Because of this erratic movement, it might be automatically recognized that there were three entries, for example, when there was actually only a single passage, and the charge becoming multiplied by three.

In actual fact, when the system is one where a charge is made per entry which causes this type of charge processing result, the charge amount is low when the route taken passes through the middle of the charge area and skyrockets when the route passes near the outer edge of the charge area. Therefore, a possible outcome might be that the volume of traffic passing through the central portion of the charge area will be increased, while the volume of traffic near the outer edges of the charge area will be reduced. However, on the contrary, if the hope is to lessen the volume of traffic passing through the central portion of the charge area and increase the volume of traffic near the outer edges of the charge area, the result is the opposite to the one hoped for.

Moreover, as is shown in the aforementioned FIG. 55A, if the distance between neighboring charge areas is short, then not only is it automatically recognized that three entries have been made into charge area 1, but it is automatically recognized that two entries have been made into charge area 2. For example, as is shown in FIG. 55B, by making the distance between neighboring charge areas wider, it is possible to avoid erroneously detecting that an entry has been made into a neighboring charge area when no such entry has actually been made. However, it is not possible to avoid erroneously detecting that charge area 1 has been entered three times.

The second object of the present invention is to provide a charging device capable of regulating charging frequency for the passage of a vehicle near the outer edge of a charge area. The third object of the present invention is to stabilize this charging frequency.

SUMMARY
(First Invention and Second Invention)

In order to achieve the above objectives, the first aspect of the first invention is a charging device comprising: detecting means for detecting position information of a moving body; deciding means for determining a charge applicable area in predetermined map information and for determining a buffer area at a boundary between the charge applicable area and an area other than the charge applicable area, and matching the map information with the position information, and deciding an entry state indicating whether or not the moving body has at least entered into one of the charge applicable area or the buffer area; and generating means for generating charging information for the moving body based on a result of a decision by the deciding means.

The second aspect is the charging device according to the first aspect, wherein the generating means is provided with storage means in which toll data that is determined in advance and corresponds to the entry state is stored in advance, and the charge information is generated using toll data of the storage means.

The third aspect is the charging device according to the first or second aspect, wherein the charge applicable area is formed from at least a toll area and a non-toll area, and the buffer area is set between the toll area and the non-toll area.

The fourth aspect is the charging device according to any of the first to third aspects, wherein the charge applicable area is formed from at least a plurality of toll areas, and the buffer area is set between adjacent toll areas.

The fifth aspect is the charging device according to the fourth aspect, wherein the plurality of toll areas contain toll areas that have different toll systems.

The sixth aspect is the charging device according to the fifth aspect, wherein the buffer area is provided for each plurality of toll areas.

The seventh aspect is the charging device according to any of the first to sixth aspects, wherein a toll for the buffer area is set based on a toll of one of adjacent areas.

The eighth aspect is the charging device according to any of the fourth to seventh aspects, wherein a toll for the buffer area is set based on a toll of an area selected from a plurality of areas surrounding the buffer area.

The ninth aspect is the charging device according to any of the first to eighth aspects, wherein, when a history of the entry state is one in which the moving body moves from the charge applicable area to the buffer area and then back to the same charge applicable area again, generating of charge information relating to an entry into the charge applicable area is prohibited in the generating means.

The tenth aspect is the charging device according to any of the first to ninth aspects, wherein the generating means generates charge information relating to tolls determined based on a distance traveled in the charge applicable area.

The eleventh aspect is the charging device according to any of the first to ninth aspects, wherein the generating means is provided with storage means for storing a distance traveled in the charge applicable area when the distance traveled bridges a boundary between adjacent areas, and charge information is generated based on the stored distance traveled.

The first aspect of the second invention is a charging device, comprising: host moving body position detecting means for detecting a position of a host moving body; storage means for storing data for charging relating to predetermined map information, charge applicable areas set in the map information, buffer areas set at boundaries between the charge applicable areas and areas other than the charge applicable areas, and the charge applicable areas; determining means for matching the map information with the position, and for determining whether or not the moving body has at least entered one of the charge applicable area and the buffer area; and charge processing means for performing charge processing for a host moving body relating to the charge applicable area based on a result of a determination by the determining means.

The first aspect of the second invention is the charging device according to the first aspect, wherein the charge processing means performs charge processing using an IC card on which balance information is stored.

In the first aspect of the first invention, detecting means detects position information concerning a moving body such as a vehicle or the like. A navigation system for mounting in a vehicle serving as the moving body which enables the display of a map for aiding traveling and providing instructions on a route to a destination can be used as this detecting means. As is commonly known, this navigation system can use a GPS system to easily detect the position of the moving body in which it is mounted (i.e. the host moving body), for example, a position determined by latitude and longitude. It is also possible to provide in the moving body a sending means such as a sender unit or the like for sending a signal that contains identifying data for identifying the moving body, and receiving on the ground the sent signal so that the position information is detected on the ground.

It should be noted that the detection of the position of the moving body includes a measure of error in the detection. When there is an error in the detection, the true position of the moving body is a position within a specific range relative to the detected position, the extent of which range is determined in advance in accordance with the detection error. Accordingly, the possibility that the moving body is within a specific distance, determined in accordance with the detection error, from the detected position is included in the position information.

Therefore, a charge applicable area is determined in predetermined map information and a buffer area is set at a boundary between the charge applicable area and an area other than the charge applicable area. The size of this buffer area is preferably set at a size that corresponds to the detection error. It is possible to further provide map information storage means and store the map information, the charge applicable areas, and the buffer areas in this map information storage means.

The deciding means, firstly, matches the position information detected by the detecting means with the predetermined map information. Namely, because it is possible to specify the position of the moving body from the position information, this position, for example, a position set as a latitude and longitude, is able to be matched with a vehicle on predetermined map information such as a map of a predetermined area from among maps of Japan or maps of the Tokyo area. Based on the result of this matching, the deciding means decides whether or not the moving body has at least entered either one of the charge applicable area and the buffer area. The charge applicable areas and the buffer areas are set on the map information. Accordingly, by determining whether or not the position of the moving body that has been matched with the map information is inside a charge applicable area or a buffer area, it can be determined whether or not the moving body has at least entered a charge applicable area. Namely, when there is an error in the detection, it is possible to use the position of the moving body based on the position information to match a specific area in which it is possible that the moving body exists with the map information. Accordingly, when the moving body is located in a buffer area, the moving body is not necessarily located in a charge applicable area. On the other hand, when the moving body goes beyond the buffer area and is located within the charge applicable area, then the specific area determined using the detection error, namely, the true position of the moving body is located at least within the charge applicable area. As a result, the deciding means sets as the entry state this indication of whether or not the moving body has at least entered into the charge applicable area.

The generating means generates charge information for a moving body based on the result of the deciding by the deciding means. For example, the toll that should be collected from a moving body within the charge applicable area is determined in advance. Accordingly, because a predetermined toll should be charged when a moving body enters into the charge applicable area, the toll that should be charged on the moving body that has entered into the charge applicable area is generated as charge information.

In this way, in the charge processing device of the present invention, because buffer areas are provided at the boundaries of charge applicable areas, and the position of a moving body detected by detection means is matched with map information, and an entry state indicating whether or not the moving body has entered a charge applicable area is set, and charging information for the moving body is created based on this entry state, then even if there are detection errors in the detection of the position of the moving body, it is possible to accurately decide that the moving body is present within a charge applicable area, and it is possible to perform charge processing for the user of a moving body using a simple structure simply by generating charge information for a moving body in accordance with the entry state thereof, without having to install on-road devices in all the entry and exit locations such as entry and exit gates.

In some cases, the driver is unaware that the area in which the moving body is currently traveling is a charge applicable area or that the moving body is approaching and about to enter a charge applicable area. Therefore, in the charge processing device, by further providing a notification means for giving advance information, when the moving body is approaching a charge applicable area, namely, has entered a buffer area, expressing that the moving body is approaching a charge applicable area or has entered a charge applicable area based on the above position information, it is possible to notify the driver when the moving body has entered a charge applicable area or is approaching and is about to enter a charge applicable area, thereby making it easy for the driver to decide on a course of action relating to their entry into a charge applicable area or the like.

Note that, it is common for the amount of the toll to be collected from a moving body located inside a charge applicable area to be set in advance. Therefore, as in the second aspect, the generating means is provided with a storage means for storing in advance toll data set in advance to correspond with the entry state. Consequently, charging information can be easily created using the toll data in the storage means. This toll data may be set in a plurality of levels for the type of vehicle, the travel time, and the like and these may be stored as charge tables.

Non-toll areas such as public areas and the like may be contained inside the charge applicable area. Namely, the charge applicable area may comprise both areas where tolls are levied and areas where no toll is levied. Therefore, in the third aspect, a charge applicable area is formed from at least toll areas and non-toll areas and buffer areas are set between toll areas and non-toil areas. By using this format, even if the charge applicable area has a mixture of toll areas and non-toll areas together, it is possible to decide with certainty that a moving body is within a charge applicable area in which a toll is levied and there is no unnecessary toll collection.

Moreover, when the charge applicable area is formed from a plurality of toll areas, the toll may differ depending on which of the toll areas the position of the moving body was located in. Therefore, as in the fourth aspect, when the charge applicable area is formed from at least a plurality of toll areas, buffer areas are set between adjacent toll areas. By using this structure, even if the charge applicable area comprises a plurality of toll areas, it is possible to decide with certainty that a moving body is within a charge applicable area in which the relevant toll is levied and there is no irregularity in the toll collection.

In a charge applicable area comprising a plurality of toll areas, as in the fifth aspect, it is possible to provide toll areas in a toll system that uses a plurality of different toll areas. In this case, because it is possible to decide with certainty that a moving body is definitely inside a charge applicable area which is a toll area, toll collection using the correct toll system can be reliably performed.

The buffer areas are set at the boundaries between charge applicable areas and areas other than charge applicable areas. In some cases, the toll is set for the charge applicable area, and it is also possible to set a toll for the buffer area provided at the boundary thereof. However, there may not be only one charge applicable area attached to a buffer area. Therefore, as in the seventh aspect, it is possible to set the toll for a buffer area based on the toll of one of the adjacent areas. Namely, although a buffer area is set at a boundary, there are areas existing on both sides separated by that boundary, therefore, by setting the toll for the buffer area based on the toll of one of the adjacent areas, a toll that is appropriate for the buffer area can be set.

There are also cases in which a plurality of toll areas exist around a buffer zone. Therefore, as in the eighth aspect, it is possible to determine a toll for a buffer area based on tolls of areas selected from the plurality of areas surrounding the buffer area. If this format is employed, a toll can be set that is appropriate for the buffer area.

It should be noted that, in some cases, the moving body comes and goes between a charge applicable area and a buffer area. For example, the moving body may be traveling in the vicinity of the boundary between a charge applicable area and a boundary area. Therefore, as in the ninth aspect, when a history of the entry state is one in which the moving body is shown as moving from the charge applicable area to the buffer area and then back to the same charge applicable area again, generating of charge information relating to an entry into the charge applicable area is prohibited in the generating means. If this method is employed, there is no generating of charge information for an entry into the same charge area and unnecessary toll collection can be avoided.

As in the tenth aspect, it is possible for the generating means to generate charge information relating to tolls determined based on a distance traveled in the charge applicable area as a category for toll collection other than a vehicle entry. Namely, a charge can be made in accordance with the distance traveled within a charge applicable area.

In this case, as in the eleventh aspect, the generating means is provided with storage means for storing a distance traveled in the charge applicable area when the distance traveled bridges a boundary between adjacent areas, and charge information is generated based on the stored distance traveled. By using this method, there is no need to collect the toll continuously and the toll may be collected at the point when the moving body finishes traveling inside the charge applicable area.

In the charging device according to the first aspect of the second invention, the position of a host moving body is detected by host moving body position detecting means. As a result, the position of the host moving body can be specified by the moving body. An example of this host moving body position detecting means is the aforementioned navigation system. In the storage means are stored predetermined map information, charge, applicable areas set in the map information, buffer areas set at boundaries between the charge applicable areas and areas other than the charge applicable areas, and charge data relating to the charge applicable areas. The determining means matches the stored map information with the detected position, and determines whether or not the moving body has at least entered one of the charge applicable area and the buffer area. The charge processing means performs charge processing for a host moving body relating to the charge applicable area based on a result of a determination by the determining means.

As in the second aspect, the charge processing means is able to perform charge processing using an IC card on which balance information is stored.

As has been described above, according to the present invention, because buffer areas are provided at the boundaries of charge applicable areas, and charging information for the vehicle is created based on the position of a moving body detected by detection means and map information, then even if there are detection errors in the detection of the position of the vehicle, it is possible to accurately decide that the vehicle is present within a charge applicable area, and it is possible to generate charge information for a moving body in accordance with the entry state thereof and perform charge processing for the user of a moving body using a simple structure, without having to install on-road devices in all the entry and exit locations such as entry and exit gates.

(Third Invention)

In order to achieve the above described objectives, the first aspect of the third invention is a charging device, comprising: detecting means for detecting position information concerning the moving body; adding means for determining a buffer area in which a moving body may be expected to move to from a detected position based on position information concerning the detected moving body, and adding the buffer area to the position information; deciding means for deciding charge applicable areas in predetermined map information, for matching the position information to the map information, and for deciding an entry state indicating whether or not the moving body has at least entered the charge applicable area based on the charge applicable areas and the buffer areas; and generating means for generating charge information for the moving body based on a result of a decision by the deciding means.

The second aspect is the charging device according to the first aspect, wherein the generating means is provided with storage means in which toll data that is determined in advance and corresponds to the entry state is stored in advance, and the charge information is generated using toll data of the storage means.

The third aspect is the charging device according to the first or second aspects, wherein the detecting means detects position information concerning a moving body based on satellite data from a position finding satellite.

The fourth aspect is the charging device according to any one of the first to third aspects, wherein the adding means sets the size of a buffer area based on a detection error by the detecting means.

The fifth aspect is the charging device according to any of the first to fourth aspects, wherein the detecting means includes estimating means for estimating position information concerning a moving body based on at least one of a direction in which the moving body is traveling and a distance traveled by the moving body.

The seventh aspect is the charging device according to the fifth aspect, wherein the adding means sets the size of a buffer area based on at least one of a direction in which the moving body is traveling and a distance traveled by the moving body used in the estimating means.

The seventh aspect is the charging device according to any one of the first to sixth aspects, wherein the generating means generates charge information relating to tolls determined based on a distance traveled in the charge applicable area.

In the charging device according to the first aspect of the third invention, detecting means detects position information concerning a moving body such as a vehicle or the like. A navigation system for mounting in a vehicle which enables the display of a map for aiding traveling and providing instructions on a route to a destination can be used as this detecting means. As is commonly known, this navigation system can use a GPS system to easily detect the position of the host moving body, for example, a position determined by latitude and longitude. For example, as in the third aspect, it is also possible for the detecting means to detect position information concerning a moving body based on satellite data from a position finding satellite. Moreover, it is also possible to provide in the moving body a sending means such as a sender unit or the like for sending a signal that contains identifying data for identifying the host moving body, and receiving on the ground the sent signal so that the position information is detected on the ground.

It should be noted that the detection of the position of the moving body includes a measure of error in the detection. When there is an error in the detection, the true position of the moving body is a position within a specific range relative to the detected position, the extent of which range is determined in advance in accordance with the detection error. Accordingly, there is a high likelihood that the position of the moving body as determined by the position information is within a specific distance, determined in accordance with the detection error. Therefore, the adding means determines a buffer area in which a moving body may be expected to move to from a detected position based on position information concerning the detected moving body. Namely, the buffer area is an area set as a range of positions specified by the position information and in which there is a high likelihood that the moving body will be located. This is added to the position information. As in the fourth embodiment, the size of this buffer area is preferably set on the basis of the detection error, for example, at a size that corresponds to the detection error.

The deciding means, firstly, matches the position information detected by the detecting means with the predetermined map information. Namely, because it is possible to specify the position of the moving body from the position information at the point when it is detected, this position, for example, a position set as a latitude and longitude, is able to be matched with a moving body on predetermined map information such as a map of a predetermined area from among maps of Japan or maps of the Tokyo area. Because the buffer areas are added to this position information, the buffer areas can be matched with the map information. The deciding means then decides an entry state indicating whether or not the moving body has at least entered the charge applicable area. The charge applicable areas are set on the map information. Accordingly, by determining whether or not the buffer area that contains the position of the moving body that has been matched with the map information is inside a charge applicable area, it can be determined whether or not the moving body has at least entered a charge applicable area. For example, when the buffer area is completely contained inside the charge applicable area, it can be stated that the moving body is inside the charge applicable area even when the detection error is taken into account. Moreover, if a portion of the buffer area is contained inside the charge applicable area, the possibility is there that the moving body is not located inside the charge applicable area. Because of this, the deciding means decides an entry state indicating whether or not the moving body has at least entered the charge applicable area.

The generating means generates charge information for a moving body based on the result of the deciding by the deciding means. For example, the toll that should be collected from a moving body within the charge applicable area is determined in advance. Accordingly, because a predetermined toll should be charged when a moving body enters into the charge applicable area, the toll that should be charged on the moving body that has entered into the charge applicable area is generated as charge information.

In this way, in the charge processing device of the present invention, because buffer areas are added to the position information of a moving body, and the position of a moving body and the buffer zones are matched with map information, and an entry state indicating whether or not the moving body has entered a charge applicable area is set, and charging information for the moving body is created based on this entry state, then even if there are detection errors in the detection of the position of the moving body, it is possible to accurately decide that the moving body is present within a charge applicable area, and it is possible to perform charge processing for the user of a moving body using a simple structure simply by generating charge information for a moving body in accordance with the entry state thereof, without having to install on-road devices in all the entry and exit locations such as entry and exit gates.

In some cases, the driver is unaware that the area in which the moving body is currently traveling is a charge applicable area or that the moving body is approaching and about to enter a charge applicable area. Therefore, in the charge processing device, by further providing a notification means for giving advance information, when the moving body is approaching a charge applicable area, namely, when the buffer zone is approaching a charge applicable area or a portion thereof is contained within the charge applicable area, expressing that the moving body is approaching a charge applicable area or has entered a charge applicable area based on the above position information, it is possible to notify the driver when the moving body has entered a charge applicable area or is approaching and is about to enter a charge applicable area, thereby making it easy for the driver to decide on a course of action relating to their entry into a charge applicable area or the like.

Note that, it is common for the amount of the toll to be collected from a moving body located inside a charge applicable area to be set in advance. Therefore, as in the second aspect, the generating means is provided with a storage means for storing in advance toll data set in advance to correspond with the entry state. Consequently, charging information can be easily created using the toll data in the storage means. This toll data may be set in a plurality of levels for the type of vehicle, the travel time, and the like and these may be stored as charge tables.

If a moving body such as a vehicle, travels through a tunnel or a region where radio waves are obstructed, the detecting means is unable to detect position information. Therefore, as in the fifth aspect, by including in the detecting means estimating means for estimating position information concerning a moving body based on at least one of a direction in which the moving body is traveling and a distance traveled by the moving body, it is possible for the detecting means to specify its own position from the distance traveled or direction of travel of the moving body or from a combination of these.

In this case, because the buffer area is set at the same size as when the position information was able to be detected by the detecting means, in some cases, the setting of the entry state into the charge applicable area may be irregular. Namely, the estimation of its position by the detecting means using the direction of travel or the distance traveled by the moving body or using a combination of these may contain errors as compared to the actual position and it may be erroneously determined that the moving body has entered the charge applicable area using the position found by estimation. Therefore, as in the sixth aspect, if the adding means sets the size of a buffer area based on at least one of a direction in which the moving body is traveling and a distance traveled by the moving body used in the estimating means, for example, at a size larger than the size previously set, it is possible to improve the reliability with which the entry state into the charge applicable area is decided.

It should be noted that, in some cases, the moving body comes and goes between a charge applicable area and a buffer area. For example, the moving body may be traveling in the vicinity of the boundary between a charge applicable area and a boundary area. Therefore, when the entry state is stored in a time series as history and this shows the moving body as moving from the charge applicable area to the buffer area and then back to the same charge applicable area again, generating of charge information relating to an entry into the charge applicable area is prohibited in the generating means. If this method is employed, there is no generating of charge information for an entry into the same charge area and unnecessary toll collection can be avoided.

Moreover, as another category for toll collection other than a vehicle entry, as in the seventh aspect, the generating means generates charge information relating to tolls determined based on a distance traveled in the charge applicable area. Namely, charging can be performed in accordance with the distance traveled inside a charge applicable area. In this case, the generating means is further provided with storage means for storing a distance traveled in the charge applicable area when the distance traveled bridges a boundary between adjacent areas, and charge information is generated based on the stored distance traveled. By using this method, there is no need to collect the toll continuously and the toll may be collected at the point when the moving body finishes traveling inside the charge applicable area.

Note that it is also possible for the charge processing means to perform charge processing using an IC card on which balance information is stored.

As has been described above, according to the present invention, because buffer areas are determined and allocated from a detection of its own position by the detecting means, and charging information for the vehicle is created based on the position of a moving body as well as buffer areas and map information, then even if there are detection errors in the detection of the position of the vehicle, it is possible to accurately decide that the vehicle is present within a charge applicable area, and it is possible to generate charge information for a moving body in accordance with the entry state thereof and correctly perform charge processing for the user of a moving body using a simple structure, without having to install on-road devices in all the entry and exit locations such as entry and exit gates.

(Fourth Invention)

In the above system (Japanese Patent Application Laid Open No. 10-37714), when the traffic conditions in a charge applicable area that has been set once change due to the date, or the time of day, or due to various environmental factors, then areas which no longer need to be charged for appear and new areas appear that now do have to be charged for. Moreover, sometimes a necessity also arises for the charge amount to be changed in accordance with price variations or changes in the traffic conditions.

However, in the above system, when charge information such as the charge applicable area and the charge amount is changed, it is necessary to rewrite the charge information recorded on the IC card in each in-vehicle device. This updating of all of the charge information at one go is very troublesome.

Therefore, in view of the above, the fourth invention whose aim is to provide a charging device for use in a vehicle capable of easily updating charge information is provided.

Namely, the first aspect of the fourth invention is a charging device, comprising: detecting means for detecting a current position of a moving body; receiving means for receiving charge information including at least one of charge area data and charge data that corresponds to the charge area; storage means for storing the charge information; updating means for updating charge information stored in the storage means based on the charge information received by the receiving means; and charge processing means for performing charge processing for the moving body based on the current position of the moving body detected by the detecting means and on the charge information stored in the storage means.

The second aspect of the fourth invention is the charge device according to the first aspect, wherein the charge information is delivered from a center by FM multiplex communication.

The third aspect of the fourth invention is the charge device according to the first or second aspect, wherein the charge device includes deciding means for comparing the charge information stored in the storage means with the charge information received by the receiving means and deciding whether or not to update the charge information stored in the storage means.

In the charging device of the first aspect, the detecting means detects the current position of the moving body. A navigation system for mounting in a vehicle which enables the display of a map for aiding traveling and providing instructions on a route to a destination can be used as this detecting means. As is commonly known, this navigation system can use a GPS system to easily detect the position of the host moving body, for example, a position determined by latitude and longitude.

The receiving means receives from the outside charge information including at least one of charge area data and charge data that corresponds to the charge area; storage means for storing the charge information. Note that, as in the second aspect, the charge information may be delivered from a center by FM multiplex communication. The charge data is data of the charge amount corresponding to the charge area. This data changes in accordance with the traffic conditions and also changes in accordance with the date, the time of day, or a combination of these.

The updating means updates charge information stored in the storage means on the basis of the charge information received by the receiving means. It is possible, for example, for the updating of the charge information stored in the storage means to always be updated to the information received by the receiving means. Alternatively, as in the third aspect, it is also possible for the charge device to include deciding means for comparing the charge information stored in the storage means with the charge information received by the receiving means and deciding whether or not to update the charge information stored in the storage means. The updating is thus performed in accordance with the decision of the deciding means. The comparison of the charge information stored in the storage means and the charge information received by the receiving means may, for example, be performed by including in the charge information for comparing the age of information such as the version or date and time of transmission or the like, and by comparing the information for comparing the age that is included in the charge information received by the receiving means with the information for comparing the age that is included in the charge information stored in the storage means. It is also possible for the charge information itself to be compared and a determination made as to whether or not there is a difference therein and the information updated if there is a difference. Furthermore, it is also possible to include in the charge information the effective date and time which shows from when the charge information becomes valid (i.e. effective) and comparing the current date and time with the effective date and time included in the charge information received by the receiving means and updating the charge information if the effective date and time has already arrived.

The charge processing means performs charge processing for the moving body on the basis of the current position of the moving body detected by the detecting means and the charge information stored in the storage means.

In this way, because charge information is received by the receiving means and charge processing is performed based on this received charge information, there is no need for the receiving side to read and update charge information from a storage medium. Moreover, it is possible to update all the charge information at one go.

As described above, in the fourth invention, because the charge information stored in the storage means is updated by the updating means on the basis of charge information received by the receiving means and then charge processing is performed by the charge processing means, the effect is achieved that there is no need to read and update charge information from a storage medium or the like and it is possible to easily update all the charge information at one go.

(Fifth Invention)

In the above described road-vehicle intercommunication system, transfer of information is performed by installing on-road devices at the entries and exits to charge applicable areas such as the exit gates and entry gates to toll roads, however, when the charge applicable area is set as a zone or the like covering a wide range where the entry and exit points cannot be specified, it is necessary to install on-road devices at all of the foreseeable entry and exit locations. In order to solve this problem, the present applicants have proposed a system in which the overall system structure is simplified by detecting the position of the vehicle at the vehicle side and transmitting it to a general center, and performing the charge processing for the charge applicable area at the general center side (Japanese Patent Application No. 10-37711).

However, in the above system, it is difficult for the driver of the vehicle to know where a charge applicable area is located, which makes it difficult for the driver to select the most suitable route cost-wise.

Therefore, in view of the above, the fifth invention whose aim is to enable a driver to easily determine whether to enter or to avoid a charge applicable area when selecting a route is provided.

Namely, the first aspect of the fifth invention is a charge area display device for use in a moving body, comprising: detecting means for detecting a current position of a moving body; storage means for storing information relating to a charge area; determining means for determining whether or not a charge area is included in a predetermined area that contains the current position of the moving body detected by the detecting means; notification means for making a notification that a charge area is located within the predetermined area when it is determined by the determining means that the charge area is contained within the predetermined area that includes the current position of the moving body; and charge processing means for performing charge processing for the moving body based on the current position of the moving body and information relating to the charge area stored in the storage means.

In the charge area device for use in a moving body according to the first aspect, the detecting means detects the current position of the moving body. A navigation system for mounting in a vehicle which enables the display of a map for aiding traveling and providing instructions on a route to a destination can be used as this detecting means. As is commonly known, this navigation system can use a GPS system to easily detect the position of the host moving body, for example, a position determined by latitude and longitude.

Information relating to the charge area is stored in the storage means. It is possible to include data specifying the charge area and data on the charge amounts determined in accordance with the charge area in this information relating to the charge area.

The determining means determines whether or not a charge area is included in a predetermined area that contains the current position of the moving body detected by the detecting means. This determination can be performed, for example, by measuring the distances to a charge applicable area in both the direction in which the vehicle is advancing and in a transverse direction substantially orthogonal to the direction in which the vehicle is advancing, and then determining whether or not these measured distances are within a predetermined distance. Note that the directions that are measured are not limited to the direction in which the vehicle is advancing and the transverse direction thereto. Alternatively, a determination may be made as to whether or not charge areas are contained within a range of 45 degrees on both sides centered on each direction.

If it is determined by the determining means that a charge area is included in a predetermined area that contains the current position of the moving body, the notification means gives a notification that a charge area is located within the predetermined area. Each time a notification is made, for example, it may be displayed on a display screen or may be announced aurally. Therefore, because it is possible to easily confirm that a moving body is approaching a charge area before the moving body enters the charge area, whether to enter or avoid the charge area can be easily decided. Namely, a notification is made that a charge area is located within a predetermined area when it is determined by the determining means that a charge area is contained within a predetermined area that includes the current position of a moving body, therefore, because it is possible to easily confirm that a moving body is approaching a charge area before the moving body enters the charge area, whether to enter or avoid the charge area can be easily decided.

The second aspect of the fifth invention is the charge area display device for use in a moving body according to the first aspect, wherein the notification means makes a notification of the direction that the charge area is located using the current position as a reference.

According to the second aspect, because the notification means makes a notification of the direction that the charge area is located using the current position of the moving body as a reference, the direction in which the charge area is located can be easily confirmed and the determining of the direction of travel is simplified.

The third aspect of the fifth invention is the charge area display device for use in a moving body according to the first or second aspect, wherein the notification means gives a notification by displaying the charge area in superposition on a map image of the vicinity of the current position of the moving body.

According to the third aspect, the notification displays the charge area in superposition on a map image of the vicinity of the current position of the moving body. For example, the color and brightness of the road of the charge area may be changed in the display, or a meshing pattern may be displayed over the entire charge area. As a result, it is easy for the driver to obtain an idea of how far it is to the charge area and it is easy to confirm the range of the charge area. Note that the color, brightness, and halftone pattern may be altered in accordance with the remaining distance or with the amount of the charge.

The fourth aspect is the charge area display device for use in a moving body according to the first to third aspects, wherein the notification means gives a further notification of the charge amount that corresponds to the charge area.

According to the fourth aspect, because the notification means gives a further notification of the charge amount that corresponds to the charge area, selecting a cheaper route is simplified.

(Sixth Invention)

(1) The sixth invention is a charging device comprising: storage means (CRD) for storing credit information (i.e. a balance); reading and writing means (5) for reading credit information from the storage means (CRD) and for writing credit information (CRD) in the storage means; area inside or outside detecting means (20 to 26; 2) for detecting whether its own position is inside or outside a charge area (i.e. the area j); information handling means (2) for generating the state information (i.e. RAEj=1) when the area inside or outside detecting means (20 to 26; 2) detects that its own position is inside the charge area when there is no state information (i.e. RAEj=0) indicating that its own position is inside the charge area, and thereafter if the detection of whether the position is inside or outside the charge area changes from inside the charge area to outside the charge area, then the information handling means begins to measure how much time has passed, and if the detection of whether the position is inside or outside the charge area changes from outside the charge area to inside the charge area, then the information handling means makes the measurement of how much time has passed invalid and holds the state information (RAEj=1) continuously, and if a value for the measurement of how much time has passed exceeds a set value (TRj), then the information handling means (2) deletes the state information; and charge processing means (2) for updating credit information (the balance) in the storage means via the reading and writing means in accordance with a toll charged for the charge area while the state information was being held.

As a result of this, state information is generated (RAEj=1) when a vehicle enters a charge area and, thereafter, if there is a change from inside the charge area to outside the charge area (i.e. a departure change) in accordance with the inside and outside detection by the area inside or outside detecting means (20 to 26; 2), and then there is no entry change from the outside of the charge area to the inside of the charge area within a set time (TRj), the vehicle is taken as having departed the charge area and the state information (RAEj=1) is deleted.

If this set time (TRj) is set at 24 hours, for example, then even if the vehicle makes repeated entries and exits into the charge area within that 24 hours, only one transit charge toll is levied. If the set time (TRj) is set at a time longer than the length of time between a departure change and an entry change when the vehicle is traveling within the charge area and close to the outer boundary of the charge area, then one transit is only recognized as one transit regardless of whether the vehicle is traveling near the outer boundary of the charge area or in the center of the charge area. If the set time (TRj) is set at a time longer than the length of time between a departure change and an entry change when the vehicle is traveling within the charge area and close to the outer boundary of the charge area, then there is a high likelihood that travel close to the outer boundary of the charge area will be recognized as a plurality of transits through the charge area and the number of acknowledged charge transits increases. If the set time (TRj) is set to 0, for example, then for each entry and each exit detection in accordance with the inside and outside detection by the area inside or outside detecting means (20 to 26; 2), one transit charge toll payment is required and the number of acknowledged charge transits is at the maximum.

Accordingly, it is possible to regulate the frequency at which a charge is levied on what is actually one single transit through a charge area near the outer boundary of that charge area using the set time (TRj) (i.e. to regulate the number of acknowledged transits). If it is desired that the volume of traffic be concentrated in the center of a charge area, the set time (TRj) can be shortened, while, if it is desired that the volume of traffic be uniform over the entire charge area, then the set time (TRj) can be lengthened.

(Seventh Invention)

(2) The seventh invention is a charging device comprising: storage means (CRD) for storing credit information (i.e. a balance); reading and writing means (5) for reading credit information (the balance) from the storage means (CRD) and for writing credit information (balance) in the storage means (CRD); information handling means (2) for generating the state information (i.e. that RAEj=1) when the area inside or outside detecting means (20 to 26; 2) detects that its own position is inside the charge area when there is no state information indicating that its own position is inside the charge area (i.e. when RAEj=0), and for beginning to measure how much time has passed and holding the state information (i.e. that RAEj=1) continuously, and thereafter, if a value for the measurement of how much time has passed exceeds a set value (STR), then the information handling means (20 to 26; 2) deletes the state information (i.e. that RAEj=1) when the area inside or outside detecting means (20 to 26; 2) detects that the position is outside the charge area; and charge processing means (2) for updating credit information in the storage means (CRD) via the reading and writing means (5) in accordance with a toll charged for the charge area while the state information (i.e. that RAEj=1) was being held.

As a result of this, state information is generated (RAEj=1) and the measurement of how much time passes is started when a vehicle enters a charge area and, thereafter, after the lapsed time exceeds the set value (STR), if the vehicle is detected outside the charge area by the area inside or outside detecting means (20 to 26; 2), the state information (RAEj=1) is deleted.

If this set value (STR) is set at 24 hours, for example, then even if the vehicle makes repeated entries and exits into the charge area within that 24 hours, only one transit charge toll is levied. If the set value (STR) is set at a time slightly longer than the length of time required to make one return trip through the charge area or to make one circuit around the charge area, then one transit is only recognized as one transit regardless of whether the vehicle is traveling near the outer boundary of the charge area or in the center of the charge area. If the set value (STR) is set at a time longer than the length of time required to make one return trip through the charge area or to make one circuit around the charge area, then there is a high likelihood that travel close to the outer boundary of the charge area will be recognized as a plurality of transits through the charge area and the number of acknowledged charge transits increases. If the set value (STR) is set to 0, for example, then for each entry and each exit detection in accordance with the inside and outside detection by the area inside or outside detecting means (20 to 26; 2), one transit charge toll payment is required and the number of acknowledged charge transits is at the maximum.

Accordingly, it is possible to regulate the frequency at which a charge is levied on what is actually one single transit through a charge area near the outer boundary of that charge area using the set value (STR) (i.e. to regulate the number of acknowledged transits). If it is desired that the volume of traffic be concentrated in the center of a charge area, the set value (STR) can be shortened, while, if it is desired that the volume of traffic be uniform over the entire charge area, then the set value (STR) can be lengthened.

(Eighth Invention)

(3) The eighth invention is a charging device comprising: storage means (CRD) for storing credit information (i.e. the balance); reading and writing means (5) for reading credit information (balance) from the storage means (CRD) and for writing credit information in the storage means (CRD); area inside or outside detecting means (20 to 26; 2) for detecting whether its own position is inside or outside a charge area; information handling means (2) for generating and holding the state information (i.e. that $RAEj=1$) when the area inside or outside detecting means (20 to 26; 2) detects that its own position is inside the charge area when there is no state information indicating that its own position is inside the charge area (i.e. when $RAEj=0$), and thereafter, if a period formed by a calendar unit greater than a day unit (a date) has passed, then the information handling means (20 to 26; 2) deletes the state information (i.e. that $RAEj=1$) when the area inside or outside detecting means detects that the position is outside the charge area; and charge processing means (2) for updating credit information (balance) in the storage means (CRD) via the reading and writing means (5) in accordance with a toll charged for the charge area while the state information (i.e. that $RAEj=1$) was being held.

For example, if the period of the calendar units is set at 1 day, then when the vehicle first passes through the charge area on a particular date, state information (i.e. that $RAEj=1$) is generated. When the date changes to the next day, and the vehicle is out of the charge area, the state information that was generated on the particular date (i.e. $RAEj=1$) is deleted. Accordingly, even if the vehicle makes repeated entries and exits into the charge area on that particular date, only one transit charge toll is levied. If the period of the calendar units is set to weekly or monthly, then only one transit charge toll is still charged until the week or month changes.

(4) The eighth invention is a charging device, wherein the area inside or outside detecting means (20 to 16; 2) detects whether a position is inside or outside each of a plurality of charge areas (i.e. the charge areas j, j=1, 2, . . . ); the information handling means (2) generates state information (i.e. that $RAEj=1$) for each charge area address; and the charge processing means (2) updates credit information (i.e. the balance) in the storage means (CRD) via the reading and writing means (5) in accordance with a toll charged for each charge area (charge area j) while the respective state information (i.e. that $RAEj=1$) was being held.

For example, if the vehicle travels as is shown in FIG. 55A, then charges for all of the charge areas 1 to 4 are paid. If charge area 3 and the charge for charge area are thought unnecessary, then the space outside the areas between areas 1 and 2 and between areas 3 and 4 only needs to be widened.

(5) The eighth invention is a charging device, wherein the information handling means (2) holds the state information (i.e. that $RAEj=1$) in memory for holding information even while an ignition key switch (IGsw) is off.

When the vehicle stops (ignition key switch off: engine stopped) inside the charge area and then commences to travel again (ignition key switch on: engine operating), the state information ($RAEj=1$) is not deleted, therefore there is no second payment.

(6) The eighth invention is a charging device further comprising: notification means (2, 4B5, 10, SP) for urging that the storage means (CRD) be replaced when the updated value is a negative value; credit information processing means (2, 5) for updating, when there is a replacement, the credit information in the storage means after the replacement by the same amount as the negative value; and means (2, 4/2) for notifying the outside of the vehicle, when the storage means (CRD) has not been replaced, of an abnormality when set conditions are met.

(7) The eighth invention is a charging device, wherein a set condition is the repeating of the notification urging replacement a set two times or more.

(8) The eighth invention is a charging device, wherein a set condition is the passing of the set time (Tw).

(9) The eighth invention is a charging device, wherein a set condition is the traveling of the set distance (Lk).

According to the above (6) to (9), if the credit information (balance) of the storage means (CRD) is a negative value, the notification means (2, 4B5, 10, SP) gives a notification urging that the storage means CRD be replaced. If the user (i.e. the driver) does not replace the storage means (CRD) at this time, then when the notification urging the replacement has been repeated a set number of times (2), abnormality notification means (2, 4/2) notifies the outside of the vehicle that there is an abnormality. Alternatively, if the set time (Tw) passes without the storage means (CRD) being replaced, the abnormality notification means (2, 4/2) notifies the outside of the vehicle that there is an abnormality. Alternatively, if the set distance (Lk) is reached without the storage means (CRD) being replaced, the abnormality notification means (2, 4/2) notifies the outside of the vehicle that there is an abnormality.

This abnormality notification means that there has been a charging illegality or a charging violation and a person with controlling authority can on the basis of this notification, for example, stop the vehicle and require that the charge processing be completed.

For example, in the embodiments described below, this abnormality notification is generated when, after the credit information (i.e. the balance thereof) has turned into a negative value, if there is no replacement after a replacement demand (involving repeating the notification that a replacement is required three times at predetermined time intervals—this is the first replacement demand), and thereafter, if there is still no replacement after a further replacement demand (the second replacement demand) that is made if the balance of the storage means when accessed in order to perform charge processing or to prepare for charge processing is still negative. Moreover, if the balance is still negative when the set time Tw has passed after the first replacement demand, as well as if the set distance Lk has been reached after the first replacement demand, then the abnormality notification is made to the outside of the vehicle. If the user replaces the card between the start time of the first replacement demand and the end time of the second replacement demand as well as within the set time Tw and inside the set distance Lk, then the abnormality notification is not made to the outside of the vehicle.

(10) The eighth invention is a charging device, wherein the credit information processing means (2) registers the minus value in memory (abnormality history memory) when the storage means (CRD) has not been replaced in spite of the updated value turning into a negative value. When the balance of the storage means (CRD) becomes negative as a result of the charge processing and the payment thereof is not made, the demand for the payment (the negative value) is saved in memory. The demand for payment to be made is not deleted even if the storage means (CRD) is taken out.

(11) The eighth invention is a charging device, wherein, when the storage means (CRD) is replaced, the credit information processing means (2) updates the credit information to information in which the negative value in the memory has been paid. As a result, the demand for payment (i.e. the negative value) relating to the storage means (CRD) is paid by the storage means (CRD) that has just been inserted enabling payment of the previous amount due to be achieved with certainty.

(12) The eighth invention is a charging device, wherein, if the storage means (CRD) is not replaced in spite of the updated value being a negative value, the credit information processing means (2) registers the abnormality information in the abnormality history memory together with information concerning the point in time when the abnormality was generated. As a result, because information concerning the point in time (date and time) when the abnormality was generated is registered together with the charge avoidance in the abnormality history memory (2), it is possible to later pursue and confirm the charge avoidance.

(13) The eighth invention is a charging device, wherein the abnormality notification means (2, 4/2) includes a display means (4/2) for displaying an charging abnormality in the vehicle towards the outside of the vehicle. A person with controlling authority can visually confirm vehicles with this abnormality display and stop the vehicle on the road and require that the charge processing be completed.

(14) The eighth invention is a charging device, further comprising: abnormality information reading means (2) for outputting data of the abnormality history memory in accordance with a specific input; and abnormality data erasing means (2) for erasing data representing an abnormality in the abnormality history memory in response to an erasure instruction with the condition that the abnormality information reading means (2) has output data.

A charging controller (i.e. an employee of the charging system operating body or a member of the police forces with responsibility for the system) who has stopped a vehicle whose display means (2, W4/2, W4/3) is displaying an abnormality gives a specific input to the abnormality information reading means and is thus able to output data of the abnormality history memory. In the embodiments described below, this output data is displayed on the display in a vehicle and is also printed out on the printer of a data collector held by the charge controller. It is also registered on the storage means inside the data collector.

The charge controller displays this printout and obtains an agreement on the contents of the printed data and is thus able to seek payment for the unpaid amount. When the unpaid amount is received the driver of the vehicle purchases a new storage means (CRD) with a sufficient balance, the charge controller gives an erasure instruction (i.e. an instruction to clear) to the abnormality data erasing means (2). Because the data is output first, the abnormality data erasing means (2) erases data representing an abnormality in the abnormality history memory (2) in accordance with the erasure instruction. As a result, the illegality information for which payment has been received is erased from the memory.

Because the data erasure of the abnormality history memory (2) is performed on the preconditions that the erasure instruction (instruction to clear) is input and data is output in response to a specific input, if only the charge controller is able to make the specific input, then the reliability of the protection of the abnormality (illegality) information in the abnormality history memory (2) is high.

(Ninth Invention)

(15) The first aspect of the-ninth invention is a charging device comprising: storage means (CRD) for storing credit information (i.e. the card balance); reading and writing means (5) for reading credit information from the storage means (CRD) and for writing credit information in the storage means (CRD); area inside or outside detecting means (20 to 26; 2) for detecting whether its own position is inside or outside a charge area; information handling means (2) for generating j state information (i.e. that RAEj=1) when the area inside or outside detecting means (20 to 26; 2) detects that a position is inside the charge area j when there is no j state information indicating that the position is inside the charge area j (i.e. when RAEj=0), and deleting (k) state information showing the position is inside other charge areas (k), and when the area inside or outside detecting means (20 to 26; 2) detects that a position is inside another charge area (k) when there is no (k) state information-indicating that the position is inside another charge area (k), the information handling means generates charge information for other charge area (k) addresses and deletes the j state information; and charge processing means (2) for updating credit information (balance) in the storage means (CRD) via the reading and writing means (5) in accordance with a toll charged for each charge area (i, k) while the respective state information was being held.

According to this aspect, when a vehicle enters a particular charge area j, the state information at another charge area (k) address showing that the vehicle until that time was in the other charge area (k) is erased and state information (RAEj=1) showing that the vehicle is now in the charge area j is created. Accordingly, as is shown in FIG. 55B, for example, when a vehicle is traveling through charge area 1 and charge area 2, then as it is traveling through charge area 1, even if the detection by the area inside or outside detecting means (20 to 26; 2) swings between in, and out, and in etc. area 1, the state information (RAEj=1) showing that the vehicle is in charge area j is held continuously. Therefore, when there is actually just one transit through charge area 1, there are no changes in the state information showing several entries and exits (i.e. where RAEj=0 and then RAEj=1 repeatedly). The same applies when transiting charge area 4.

(16) The second aspect of the ninth invention is a charging device, wherein the information handling means (2) generates j state information (i.e. that RAEj=1) when the area inside or outside detecting means (20 to 26; 2) detects that a position is inside the charge area j when there is no j state information (i.e. when RAEj=0) indicating that the position is inside the charge area j, and thereafter if the detection of whether the position is inside or outside the charge area j changes from inside the charge area j to outside the charge area j, then the information handling means begins to measure how much time has passed, and if the detection of whether the position is inside or outside the charge area j changes from outside the charge area j to inside the charge area j, then the information handling means makes the measurement of how much time has passed invalid and holds the j state information (i.e. that RAEj=1) continuously, and if a value for the measurement of how much time has passed exceeds a set value (TRj) and if the area inside or outside detecting means detects that the position is inside another charge area, then the information handling means erases the j state information and generates state information for the other charge area address.

In the above first aspect, when the space between adjacent charge areas is narrow, as is shown in FIG. 55A, there are times when, for example, a vehicle is traveling through charge area 1 but is erroneously detected by the area inside or outside detecting means as being in charge area 2. In such cases, because the state information showing that the vehicle is in charge area 1 is deleted and state information showing that the vehicle is in charge area 2 is created, changes in the state information are generated saying that the vehicle has passed a number of times through both charge area 1 and charge area 2 when the vehicle has made a single transit through charge area 1. In the second aspect, if the area inside or outside detecting means erroneously detects that the vehicle has left charge area 1 and then, within a set time (TRj), correctly detects that the vehicle is inside charge area 1, the information handling means (2) keeps retaining the state information showing that the vehicle is located in charge area 1. Therefore, even if the determination by the area inside or outside detecting means as to whether the vehicle is inside or outside an area swings between inside area 1 and inside area 2 within the set time (TRj), there is no changing of the state information. Moreover, if the vehicle travels the route shown in FIG. 55B, and even if the vehicle travels the route shown in FIG. 55A, there is no change in the state information (i.e. that RAEj=1 or 0) showing that the vehicle has entered and exited charge areas 1 and 2 a number of times, when there is only one actual transit through charge area 1.

(17) The third aspect of the ninth invention is a charge, wherein the information handling means (2) holds the state information (i.e. that RAEj=1) in memory for holding information even while the ignition key switch (IGsw) is off. When the vehicle stops (ignition key switch off: engine stopped) inside the charge area and then commences to travel again (ignition key switch on: engine operating), the state information (RAEj=1) is not deleted; therefore there is no second payment.

(18) The fourth aspect of the ninth invention is a charging device further comprising: notification means (2, 4B5, 10, SP) for urging that the storage means (CRD) be replaced when the updated value is a negative value; credit information processing means (2, 5) for updating, when there is a replacement, the credit information in the storage means after the replacement by the same amount as the negative value; and means (2, 4/2) for notifying the outside of the vehicle, when the storage means (CRD) has not been replaced, of an abnormality when set conditions are met.

(19) The fifth aspect of the ninth invention is a charging device, wherein a set condition is the repeating of the notification urging replacement a set two times or more.

(20) The sixth aspect of the ninth invention is a charging device, wherein a set condition is the passing of the set time (Tw).

(21) The seventh aspect of the ninth invention is a charging device, wherein a set condition is the traveling of the set distance (Lk).

According to the above fourth to seventh aspects, if the credit information (balance) of the storage means (CRD) is a negative value, the notification means (2, 4B5, 10, SP) gives a notification urging that the storage means CRD be replaced. If the user (i.e. the driver) does not replace the storage means (CRD) at this time, then when the notification urging the replacement has been repeated a set number of times (2), abnormality notification means (2, 4/2) notifies the outside of the vehicle that there is an abnormality. Alternatively, if the set time (Tw) passes without the storage means (CRD) being replaced, the abnormality notification means (2, 4/2) notifies the outside of the vehicle that there is an abnormality. Alternatively, if the set distance (Lk) is reached without the storage means (CRD) being replaced, the abnormality notification means (2, 4/2) notifies the outside of the vehicle that there is an abnormality.

This abnormality notification means that there has been a charging illegality or a charging violation and a person with controlling authority can on the basis of this notification, for example, stop the vehicle and require that the charge processing be completed.

For example, in the embodiments described below, this abnormality notification is generated when, after the credit information (i.e. the balance thereof) has turned into a negative value, if there is no replacement after a replacement demand (involving repeating the notification that a replacement is required three times at predetermined time intervals—this is the first replacement demand), and thereafter, if there is still no replacement after a further replacement demand (the second replacement demand) that is made if the balance of the storage means when accessed in order to perform charge processing or to prepare for charge processing is still negative. Moreover, if the balance is still negative when the set time Tw has passed after the first replacement demand, as well as if the set distance Lk has been reached after the first replacement demand, then the abnormality notification is made to the outside of the vehicle. If the user replaces the card between the start time of the first replacement demand and the end time of the second replacement demand as well as within the set time Tw and inside the set distance Lk, then the abnormality notification is not made to the outside of the vehicle.

(22) The eighth aspect of the ninth invention is a charging device, wherein the credit information processing means (2) registers the minus value in memory (abnormality history memory) when the storage means (CRD) has not been replaced in spite of the updated value turning into a negative value. When the balance of the storage means (CRD) becomes negative as a result of the charge processing and the payment thereof is not made, the demand for the payment (the negative value) is saved in memory. The demand for payment to be made is not deleted even if the storage means (CRD) is taken out.

(23) The ninth aspect of the ninth invention is a charging device, wherein, when the storage means (CRD) is replaced, the credit information processing means (2) updates the credit information to information in which the negative value in the memory has been paid. As a result, the demand for payment (i.e. the negative value) relating to the storage means (CRD) is paid by the storage means (CRD) that has just been inserted enabling payment of the previous amount due to be achieved with certainty.

(24) The tenth aspect of the ninth invention is a charging device, wherein, if the storage means (CRD) is not replaced in spite of the updated value being a negative value, the credit information processing means (2) registers the abnormality information in the abnormality history memory together with information concerning the point in time when the abnormality was generated. As a result, because information concerning the point in time (date and time) when the abnormality was generated is registered together with the charge avoidance in the abnormality history memory (2), it is possible to later pursue and confirm the charge avoidance.

(25) The eleventh aspect of the ninth invention is a charging device, wherein the abnormality notification means (2, 4/2)

includes a display means (4/2) for displaying an charging abnormality in the vehicle towards the outside of the vehicle. A person with controlling authority can visually confirm vehicles with this abnormality display and stop the vehicle on the road and require that the charge processing be completed.

(26) The twelfth aspect of the ninth invention is a charging device, further comprising: abnormality information reading means (2) for outputting data of the abnormality history memory in accordance with a specific input; and abnormality data erasing means (2) for erasing data representing an abnormality in the abnormality history memory in response to an erasure instruction with the condition that the abnormality information reading means (2) has output data. In this case, a charging controller (i.e. an employee of the charging system operating body or a member of the police forces with responsibility for the system) who has stopped a vehicle whose display means (2, W4/2, W4/3) is displaying an abnormality gives a specific input to the abnormality information reading means and is thus able to output data of the abnormality history memory. In the embodiments described below, this output data is displayed on the display in a vehicle and is also printed out on the printer of a data collector held by the charge controller. It is also registered on the storage means inside the data collector.

The charge controller displays this printout and obtains an agreement on the contents of the printed data and is thus able to seek payment for the unpaid amount. When the unpaid amount is received the driver of the vehicle purchases a new storage means (CRD) with a sufficient balance, the charge controller gives an erasure instruction (i.e. an instruction to clear) to the abnormality data erasing means (2). Because the data is output first, the abnormality data erasing means (2) erases data representing an abnormality in the abnormality history memory (2) in accordance with the erasure instruction. As a result, the illegality information for which payment has been received is erased from the memory.

Because the data erasure of the abnormality history memory (2) is performed on the preconditions that the erasure instruction (instruction to clear) is input and data is output in response to a specific input, if only the charge controller is able to make the specific input, then the reliability of the protection of the abnormality (illegality) information in the abnormality history memory (2) is high.
(Tenth Invention)

According to the above described charge processing, it is possible to perform charge processing to achieve various objectives. This can be achieved by establishing various charge categories, for example, entry into an area, distance traveled within an area, travel time within an area, and time spent in congested traffic). For example, if an area in which the level of traffic congestion needs to be reduced is set as a charge area, and by measuring the length of time spent in this area when traffic is congested (for example, is traveling at less than 20 Km/h) and charging a toll based on time units for this length of time, then by increasing the cost of driving through such a congested area, drivers can be made to want themselves to avoid congested areas.

Conventionally, when a vehicle enters a charge area, by referring to charge tables for that charge area, and by determining what type of charging categories apply in that charge area, for example, if the charge area is one based on vehicle entry into the area, then payment processing (data processing to deduct the toll from a card) is performed to levy the toll each time a vehicle enters the area. If the area is one where tolls are based on distance traveled (or length of stay), then measuring of the distance traveled (or length of stay) within the area is started, and when predetermined conditions are met (for example, when the vehicle departs from the charge area), then the toll due is calculated by multiplying the distance traveled (or the length of stay) by the distance unit cost and payment processing is performed. If charge processing is to be performed based on how much time a vehicle spends in an area in congested traffic, measuring of the length of time that passes with the vehicle speed below a set value (for example, 20 km/h) is performed (i.e. the cumulative total of the length of time spent intermittently at 20 km/h or less), and payment processing of a charge amount proportional to the measured value is performed when the vehicle leaves the charge area.

It should be noted that it is also possible where necessary for a series of charge areas with various charge categories to be set or for the charge categories to be changed either regularly or when necessary. In particular, when attempting to carefully fine tune the flow of traffic or collect tolls, it is possible to divide a charge area into a plurality of small area and give a different charge category to each one. The conventional providing of a data processing algorithm in a charge device for each charging system in which each time a single charge area is entered, charge categories (charging systems) for that area are determined, processing corresponding to that is commenced, and a toll is calculated and payment made at a timing corresponding to the charging category is problematic. However, if a charge device is provided with a processing algorithm which only performs a specific item from among various charging categories (for example, area entry, distance traveled in that area, travel time in that area, and time spent in congested traffic), then this device is unable to respond to future alterations to the charge system or charge area settings for other charge areas.

Therefore, the tenth invention whose aim is to provide a charge device having a high level of adaptability to the charge processing performed in various types of charging systems and which has easy data processing for performing charge processing is provided.

(27) The first aspect of the tenth invention is a charging device comprising: storage means (CRD) for storing credit information (i.e. the card balance); reading and writing means (5) for reading credit information from the storage means (CRD) and for writing credit information in the storage means (CRD); area inside or outside detecting means (20 to 26; 2) for detecting whether its own position is inside or outside a charge area; and charge processing means (2) charge processing means (2) for calculating the toll (Y) for transit through a charge area and updating credit information (balance) in the storage means (CRD) by that amount via the reading and writing means (5) in accordance with a toll charged for a charge area (j, k), wherein there is further provided unit price memory means (2) for holding charge unit prices ($A_1, A_2, A_3, A_4$) for each charge category (i.e. area entry, distance traveled in that area, travel time in that area, and time spent in congested traffic) of a plurality of charge areas (charge areas 1 to 4); and charge variable measuring means (2) for measuring values of each charge category in order to obtain actual values (i.e. the number of entries Z, the distance traveled D, the travel time T, and the time spent in congested traffic C) of each charge category in each charge area, and wherein the charge processing means (2) calculates the transit toll (Y) for a charge area using the sum of the products ($Y = A_1 \times Z + A_2 \times D + A_3 \times T + A_4 \times C$) of the charge unit prices ($A_1, A_2, A_3, A_4$) of the charge areas and the values (Z, D, T, C) measured in each charge area.

As a result, for example, as is shown in Table 12, it is possible to set all the charge unit prices ($A_1, A_2, A_3, A_4$) of all the charging categories of the various charging systems at all the charge area addresses (i.e. for the charge areas 1 to 4), and to set the charging characteristics (charging system) of each charge area by selectively setting the charge unit price ($A_1$, $A_2$, $A_3$, $A_4$) of each category.

For example, for the charge area No. 1 in Table 12, the pay per entry charge unit price $A_1$ is ¥70 per entry; the distance traveled charge unit price $A_2$ is ¥50 per kilometer; the travel time charge unit price $A_3$ is 0; and the congested travel time charge unit price $A_4$ is also 0. Therefore, charge area No. 1 has a system where charges are based on number of entries into the area and distance traveled within the area. Charge area 2 has a system where charges are based on number of entries into the area and congested travel time. Charge area 3 has a system where charges are based only on distance traveled within the area. Charge area 4 has a system where charges are based on number of entries into the area and travel time within the area. By changing the values of $A_1$, $A_2$, $A_3$, $A_4$, the charge system of an area is also changed. When a new charge area is being set up, each of the values $A_1$, $A_2$, $A_3$, $A_4$ can be set so that the intended charge system is achieved.

Whichever system is chosen, according to the present invention, the unit price memory means (2) holds charge unit prices ($A_1$, $A_2$, $A_3$, $A_4$) for each charge category of addresses of each charge area, and the charge variable measuring means (2) measures the actual values of each charge category (i.e. the number of entries Z, the distance traveled D, the travel time T, and the time spent in congested traffic C) in each charge area, and the charge processing means (2) calculates the transit toll (Y) for each charge area using the sum of the products ($Y=A_1 \times Z+A_2 \times D+A_3 \times T+A_4 \times C$) of the charge unit prices ($A_1$, $A_2$, $A_3$, $A_4$) of the charge areas and the values (Z, D, T, C) measured in each charge area. Each if the charge system is changed, because the transit toll calculation processing is the same, there is a high degree of adaptability in the charge processing of each type of charge processing system and the data processing for the charge processing does not have to be complicated. Because increasing the number of charge areas or alterations to the charge systems of the charge areas or alterations corresponding to adjustments to the charge systems of the charge areas only need to be made to the saved data of the unit price memory means (2) only, increasing or altering the charge areas is simple. For example, in a charge device, if charge tables such as those shown in Table 2, for example, are obtained via communication with a control station and then saved in memory, complicated tasks such as altering obtained hardware or reinstalling programs are unnecessary.

(28) The second aspect of the tenth invention is a charge device, wherein the charge unit prices ($A_1$, $A_2$, $A_3$, $A_4$) include zero, which indicates that there is no charge (Table 2), and the charge variable measuring means (2) measures at least the values of the charge categories in order to obtain actual values of charge unit prices that are not zero (276 to 281 of FIG. 8)

(29) The third aspect of the tenth invention is a charge device, wherein the charge unit prices include a per entry charge toll $A_1$ for each entry into a charge area, a distance charge toll $A_2$ for distance traveled inside a charge area, and a time charge toll $A_3$ for travel time inside a charge area; and the charge variable measuring means (2) measures the number of entries into an area Z, the distance traveled within an area D, and the amount of time spent in an area T; and the charge processing means (2) calculates the transit toll (Y) for each charge area by applying the charge unit prices $A_1$, $A_2$, $A_3$ of the charge areas for calculating transit tolls and the number of entries Z, the distance traveled D, and the travel time T measured by the charge variable measuring means (2) to a sum of products calculation calculated using the sum of the products of each charge unit price and each variable ($Y=A_1 \times Z+A_2 \times D+A_3 \times T$) . . . (1).

(30) The fourth aspect of the tenth invention is a charge device, wherein the charge unit prices include a per entry charge toll $A_1$ for each entry into a charge area, a distance charge toll $A_2$ for distance traveled inside a charge area, and a time charge toll $A_4$ for congested travel time inside a charge area; and the charge variable measuring means (2) measures the number of entries into an area Z, the distance traveled within an area D, and the amount of time in congested traffic spent in an area C; and the charge processing means (2) calculates the transit toll (Y) for each charge area by applying the charge unit prices $A_1$, $A_2$, $A_4$ of the charge areas for calculating transit tolls and the number of entries Z, the distance traveled D, and the congested travel time C measured by the charge variable measuring means (2) to a sum of products calculation calculated using the sum of the products of each charge unit price and each variable ($Y=A_1 \times Z+A_2 \times D+A_4 \times C$) . . . (2).

(31) The fifth aspect of the tenth invention is a charge device, wherein the charge unit prices include a per entry charge toll $A_1$ for each entry into a charge area, a distance charge toll $A_2$ for distance traveled inside a charge area, a time charge toll $A_3$ for travel time inside a charge area, and a time charge toll $A_4$ for congested travel time inside a charge area; and the charge variable measuring means (2) measures the number of entries into an area Z, the distance traveled within an area D, the amount of time spent in an area T, and the amount of time in congested traffic spent in an area C; and the charge processing means (2) calculates the transit toll (Y) for each charge area by applying the charge unit prices $A_1$, $A_2$, $A_3$, $A_4$ of the charge areas for calculating transit tolls and the number of entries Z, the distance traveled D, the travel time T, and the congested travel time C measured by the charge variable measuring means (2) to a sum of products calculation calculated using the sum of the products of each charge unit price and each variable ($Y=A_1 \times Z+A_2 \times D+A_3 \times T+A_4 \times C$) . . . (3).

(Eleventh Invention)

In a charge processing system in a vehicle that uses a prepaid card in a vehicle to update and store on a card the remaining balance when a charge amount is deducted from the balance on the card, sometimes the card balance is changed into a negative value (i.e. into an unpaid amount), namely, the card balance is not sufficient to enable payment to be made by the charge processing. In order to counter this, it is desirable if the user is notified of the card balance insufficiency, and that it be urged that the card be replaced. Moreover, it is desirable that, when the card is replaced, the balance thereof is updated to a value from which the previous insufficient amount has been deducted. Furthermore, it is preferable that, if the card is left as it is with the balance as a negative value, that a notification of a charging abnormality is made to the outside of the vehicle by a charging abnormality display and/or by wireless communication to a center station, thereby simplifying exposure of the negative value in order to enforce payment thereof.

Moreover, if the balance of the prepaid card is insufficient, then if a new card is used even though there is a balance remaining on the old card, then the balance on the old card is wasted. However, if the card is used with the balance thereof being too small, then the balance becomes a negative value while it is being used. For example, it is of course possible for a user to anticipate this by carrying a new card and replacing the old card with the new card when a notification is made that the balance of the old card is negative, however, as soon as the value becomes negative, warning of an illegality is given such as a charge abnormality display being made to the outside of the vehicle and/or a charge abnormality notification being given to the center station by wireless communication. Therefore, when the old card is replaced with the new card, warning of an illegality has already been given and the user is made to feel extremely uncomfortable.

Accordingly, when the balance changes into a negative value, a notification is given to that effect and then replacement of the card is awaited for a predetermined length of time. Naturally, it is possible for the violation warning to be held back for the wait time, and, because there may be cases in which the card cannot be rapidly replaced while the vehicle is moving, a reasonable charge abnormality warning is desirable.

Therefore, the eleventh invention is proposed which has as the first aim thereof the providing of sufficient time for the card replacement to be completed, and in addition, the aims of reliably performing charge collection, simplifying the exposing by a charge controller of vehicles that are unable to pay a charge, and simplifying the collection by a controller of unprocessed charges.

(32) The first aspect of the eleventh invention is a charge device, comprising: storage means (CRD) for storing (1) credit information (i.e. a balance); reading and writing means (5) for reading credit information from the storage means (CRD) and for writing credit information (CRD) in the storage means; charge processing means (2) for updating credit information in the storage means (CRD) via the reading and writing means (5) in accordance with a toll charged; notification means (2, 4B5, 10, SP) for urging that the storage means (CRD) be replaced when the updated value is a negative value; credit information processing means (2, 5) for updating, when there is a replacement, the credit information in the storage means after the replacement by the same amount as the negative value; abnormality notification means (2, 4f2) notifies the outside of the vehicle that there is an abnormality; and means (2, 4f2) for notifying the outside of the vehicle of an abnormality, when the storage means (CRD) has not been replaced and when at least one of: a notification urging a replacement has been repeated a set two times or more (2), a set time (Tw) has passed, and a set distance (Lk) has been reached has occurred.

According to this, if the credit information (balance) of the storage means (CRD) turns into a negative value, the notification means (2, 4B5, 10, SP) gives a notification urging that the storage means CRD be replaced. If the user (i.e. the driver) does not replace the storage means (CRD) at this time, then when the notification urging the replacement has been repeated a set number of times (2), abnormality notification means (2, 4f2) notifies the outside of the vehicle that there is an abnormality. Alternatively, if the set time (Tw) passes without the storage means (CRD) being replaced, the abnormality notification means (2, 4f2) notifies the outside of the vehicle that there is an abnormality. Alternatively, if the set distance (Lk) is reached without the storage means (CRD) being replaced, the abnormality notification means (2, 4f2) notifies the outside of the vehicle that there is an abnormality.

This abnormality notification means that there has been a charging illegality or a charging violation and a person with controlling authority can on the basis of this notification, for example, stop the vehicle and require that the charge processing be completed.

For example, in the embodiments described below, this abnormality notification is generated when, after the credit information (i.e. the balance thereof) has turned into a negative value, if there is no replacement after a replacement demand (involving repeating the notification that a replacement is required three times at predetermined time intervals—this is the first replacement demand), and thereafter, if there is still no replacement after a further replacement demand (the second replacement demand) that is made if the balance of the storage means when accessed in order to perform charge processing or to prepare for charge processing is still negative. Moreover, if the balance is still negative when the set time Tw has passed after the first replacement demand, as well as if the set distance Lk has been reached after the first replacement demand, then the abnormality notification is made to the outside of the vehicle. If the user replaces the card between the start time of the first replacement demand and the end time of the second replacement demand as well as within the set time Tw and inside the set distance Lk, then the abnormality notification is not made to the outside of the vehicle.

(33) The second aspect of the eleventh invention is a charging device, wherein the credit information processing means (2) registers the minus value in memory (abnormality history memory) when the storage means (CRD) has not been replaced in spite of the updated value turning into a negative value. When the balance of the storage means (CRD) becomes negative as a result of the charge processing and the payment thereof is not made, the demand for the payment (the negative value) is saved in memory. The demand for payment to be made is not deleted even if the storage means (CRD) is taken out.

(34) The third aspect of the eleventh invention is a charging device, wherein, when the storage means (CRD) is replaced, the credit information processing means (2) updates the credit information to information in which the negative value in the memory has been paid. As a result, the demand for payment (i.e. the negative value) relating to the storage means (CRD) is paid by the storage means (CRD) that has just been inserted enabling payment of the previous amount due to be achieved with certainty.

(35) The fourth aspect of the eleventh invention is a charging device, wherein, if the storage means (CRD) is not replaced in spite of the updated value being a negative value, the credit information processing means (2) registers the abnormality information in the abnormality history memory together with information concerning the point in time when the abnormality was generated. As a result, because information concerning the point in time (date and time) when the abnormality was generated is registered together with the charge avoidance in the abnormality history memory (2), it is possible to later pursue and confirm the charge avoidance.

(36) The fifth aspect of the eleventh invention is a charging device, wherein the abnormality notification means (2, 4f2) includes a display means (4f2) for displaying an charging abnormality in the vehicle towards the outside of the vehicle. A person with controlling authority can visually confirm vehicles with this abnormality display and stop the vehicle on the road and require that the charge processing be completed.

(37) The sixth aspect of the eleventh invention is a charging device, further comprising: abnormality information reading means (2) for outputting data of the abnormality history memory in accordance with a specific input; and abnormality data erasing means (2) for erasing data representing an abnormality in the abnormality history memory in response to an erasure instruction with the condition that the abnormality information reading means (2) has output data.

A charging controller (i.e. an employee of the charging system operating body or a member of the police forces with responsibility for the system) who has stopped a vehicle whose display means (2, W4/2, W4/3) is displaying an abnormality gives a specific input to the abnormality information reading means and is thus able to output data of the abnormality history memory. In the embodiments described below, this output data is displayed on the display in a vehicle and is also printed out on the printer of a data collector held by the charge controller. It is also registered on the storage means inside the data collector.

The charge controller displays this printout and obtains an agreement on the contents of the printed data and is thus able to seek payment for the unpaid amount. When the unpaid amount is received and the driver of the vehicle purchases a new storage means (CRD) with a sufficient balance, the charge controller gives an erasure instruction (i.e. an instruction to clear) to the abnormality data erasing means (2). Because the data is output first, the abnormality data erasing means (2) erases data representing an abnormality in the abnormality history memory (2) in accordance with the erasure instruction. As a result, the illegality information for which payment has been received is erased from the memory.

Because the data erasure of the abnormality history memory (2) is performed on the preconditions that the erasure instruction (instruction to clear) is input and data is output in response to a specific input, if only the charge controller is able to make the specific input, then the reliability of the protection of the abnormality (illegality) information in the abnormality history memory (2) is high.
(Twelfth to Sixteenth Inventions)

In a charge processing system in a vehicle that uses a prepaid card in a vehicle to update and store on a card the remaining balance when a charge amount is deducted from the balance on the card, devices (i.e. hardware) for organizing information necessary for charge processing and programs (i.e. software) are necessary. It is possible that, due to breakdowns in these or else due to imperfect operation caused by a user tinkering with the hardware or software so as to avoid paying a charge, the charge processing might not be completed in the vehicle. Measures against this happening are therefore desirable.

For example, in order to ascertain the ground position of a vehicle, a GPS position finder is mounted in the vehicle and, based on the ground position of the vehicle, if charge processing to calculate the amount of the charge and update the card balance to a value from which that charge amount has been deducted is performed at the point when the vehicle enters a charge area or when a vehicle departs from a charge area or when a vehicle is in a charge area corresponding to each time the vehicle makes one transit through the area or corresponding to the distance traveled by the vehicle within the area or corresponding to the length of time spent by the vehicle in the area, then, for example, if the GPS antenna is intentionally shielded so that it is unable to receive radio signals from a GPS satellite, then the charge processing is not performed because it is not recognized that the vehicle has entered into the charge area.

Further, if a card is not loaded in the card reader, or if the card reader is broken, reading and writing access to the card is not possible. Therefore, charge processing cannot be carried out. If an altered or forged card is used, the toll payment to the legitimate charger is not carried out. If the balance of the card stays in the negative without the payment thereof being performed, then the toll payment is also not carried out.

If, instead of the GPS position finder, or as an aid to the GPS position finder, an angular velocity sensor and a movement distance calculating device are provided, and the ground position is ascertained by gyroscopic navigation in which the ground position information is updated by ascertaining the direction in which the vehicle is traveling by calculating the amount of change in the travel direction of the vehicle from the angular velocity detected by the angular velocity sensor, and at the same time, calculating the distance traveled by counting speed pulses one of which is generated each time a wheel of the vehicle rotates a predetermined minute angle or calculating the distance traveled by calculating the vehicle speed based on the speed pulses and then integrating the vehicle speed, then if either the vehicle speed pulse signal generator or a signal line thereof is broken, the vehicle ground position becomes unclear and the charge processing cannot be performed.

Moreover, if the charge processing is based on the distance traveled within a charge area, then if the distance traveled by the vehicle is found from the integral value of the vehicle speed pulses or the integral value of the vehicle speed calculated on the basis of the vehicle speed pulses, if the vehicle speed pulses are cut off before they reach the counting device, then the charge processing cannot be carried out.

For these reasons the twelfth to sixteenth inventions are provided with the aims of automatically supervising the inability of a charging device mounted in a vehicle to perform charge processing, simplifying the exposing by a charge controller of vehicles that are unable to perform charge processing, and the simplifying of the collection by a controller of unpaid tolls.

(39) The twelfth invention is a charge device, comprising: storage means (CRD) for storing credit information (i.e. the card balance); reading and writing means (5) for reading credit information from the storage means (CRD) and for writing credit information in the storage means (CRD); vehicle entry detecting means (20 to 26; 2) for detecting an entry of a vehicle into a charge area; charge processing means (2) for updating credit information in the storage means (CRD) via the reading and writing means (5) in accordance with a toll charged in response to a transit through the charge area; means for detecting at least one abnormality in each of the above means that causes a problem in the charge processing of the charge processing means (2); abnormality information registering means (2) for registering in abnormality history memory (2) an abnormality detected by the abnormality detecting means together with information (i.e. the date and time) on the point in time when it was generated; and display means (2, W4/2, W4/3) for displaying to the outside of a vehicle the fact that data indicating an abnormality is present in the abnormality history memory.

According to this invention, an abnormality that causes a problem in the charge processing is registered in the abnormality history memory together with information (i.e. the date and time) on the point in time when it was generated, and the abnormality in the charge processing is displayed to the outside of the vehicle by the display means (2, W42, W4/3). The charge controller is able to distinguish vehicles on the road having a charging abnormality by the presence or otherwise of this display enabling the controller to easily expose vehicles unable to pay the charge. The charge controller can then stop vehicles with this display and require payment of the charge as well as requiring that measures to enable normal charge processing to be carried out be performed.

(39) The thirteenth invention is a charge device, comprising: GPS position finding means (ANTg, 20 to 22) for detecting a ground position of a vehicle; storage means (CRD) for storing credit information (i.e. the card balance); reading and writing means (5) for reading credit information from the storage means (CRD) and for writing credit information in the storage means (CRD); vehicle entry detecting means (20 to 26; 2) for detecting an entry of a vehicle into a charge area based on a ground position detected by the GPS position finding means (ANTg, 20 to 22); charge processing means (2) for updating credit information in the storage means (CRD) via the reading and writing means (5) in accordance with a toll charged in response to a transit through the charge area; means (2) for detecting at least one abnormality in each of the above means that causes a problem in the charge processing of the charge processing means (2); and abnormality information registering means (2) for registering in abnormality history memory (2) data indicating an abnormality together with information (i.e. the date and time) on the point in time when it was generated when a distance traveled by a vehicle while the GPS position finding means (ANTg, 20 to 22) is continuously unable to detect a ground position reaches a set value (speed×time TVa) or more.

For example, if the GPS antenna (ANTg) is shielded, if the distance the vehicle travels with the antenna in that state reaches a set value (speed×time Tva), a GPS abnormality is registered in the abnormality history memory (2). Here, the term "antenna shielding" means, for example, a state in which the reception level from all GPS satellites able to be normally received by a GPS receiver at a location open to the sky is 0 (i.e. absolutely no reception is possible). If this continuously shielded state continues for a set distance or more after the shielding first started, then it is considered that the GPS position finding has been intentionally disabled and a GPS abnormality is registered in the abnormality history memory.

The value set for the distance traveled is determined by the travel distance over which the GPS radio waves are continuously cut off due to the maximum length and the like of natural or man made obstacles such as tunnels, mountains, blocks of buildings and the like existing in that region. In the embodiments described below, the set value is determined as a predetermined time value TVa obtained by dividing a set travel distance value (e.g. 50 m) by the traveling speed of the vehicle which is obtained by a speed calculation using the vehicle speed pulses, and a GPS abnormality is registered in the abnormality history memory (2) when the GPS measurement is continuously impossible for TVa or longer. When the vehicle is stopped, the measuring of how much time is passing also stops.

(40) The fourteenth invention is a charge device, comprising: storage means (CRD) for storing credit information (i.e. the card balance); reading and writing means (5) for reading credit information from the storage means (CRD) and for writing credit information in the storage means (CRD); vehicle entry detecting means (20 to 26; 2) for detecting an entry of a vehicle into a charge area; charge processing means (2) for updating in accordance with a toll charged credit information in the storage means (CRD) via the reading and writing means (5) in response to a transit through the charge area; means (2) for detecting an abnormality in the above storage means (CRD) or the reading and writing means (5) that causes a problem in the charge processing of the charge processing means (2); and means (2) for generating a warning (warning notification 1) when the abnormality detecting means (2) detects an abnormality either until the abnormality disappears or until the power that enables the vehicle to run is turned off (i.e. until IGsw is off).

For example, when the reading or writing of data in the storage means (CRD) is not possible because no storage means (CRD) has been loaded in the reading and writing means (5) or because the reading and writing means (5) is broken, and at the same time, the credit information (i.e. the balance) is a negative value (i.e. insufficient for payment), then the warning generating means (2) generates a warning (warning notification 1). Because this warning is continued until the storage means (CRD) can be read and written to correctly and the charge processing can be carried out (i.e. the balance is positive), or until the car is parked, the driver cannot simply persevere and put up with the noise. Therefore, there is a high likelihood that the driver will take action to make the correct charge processing (with a positive balance) using the correct storage means (CRD) possible. Namely, the warning notification is highly effective in urging correct charge processing.

(41) The above charge device (3) further provided with abnormality information registering means (2) for registering in the abnormality history memory an abnormality detected by the abnormality detecting means together with information on the point in time (i.e. the date and time) when it was generated.

According to this aspect, because abnormalities relating to the storage means (CRD) problems in the charge processing are registered in the abnormality history memory (2) together with information on the point in time (i.e. the date and time) when they were generated, it is thereafter possible to confirm the abnormality history and pursue unpaid tolls.

(42) The fifteenth invention is a charge device, comprising: GPS position finding means (ANTg, 20 to 22) for detecting a ground position of a vehicle; storage means (CRD) for storing credit information (i.e. the card balance); reading and writing means (5) for reading credit information from the storage means (CRD) and for writing credit information in the storage means (CRD); vehicle entry detecting means (2) for detecting an entry of a vehicle into a charge area based on a ground position detected by the GPS position finding means (ANTg, 20 to 22); charge processing means (2) for updating credit information in the storage means (CRD) via the reading and writing means (5) in accordance with a toll charged in response to a transit through the charge area; and abnormality information registering means (2) for registering in abnormality history memory (2) data indicating an abnormality together with information (i.e. the date and time) on the point in time when it was generated when the frequency of the generation of vehicle speed pulses is abnormally lower than the frequency of generation corresponding to the speed of the vehicle as calculated by the GPS position finding means (ANTg, 20 to 22).

When the charging is based on distance, the vehicle speed pulses are used for calculating the distance traveled. Moreover, they are also used calculating distance and direction of travel in combination with direction detection by gyro when position finding by GPS position finding means (ANTg, 20 to 22) is not possible, such as in a tunnel or the like. When a user is illegally attempting to reconstruct or convert a vehicle speed pulse generator or the signal lines connected thereto so that the signal pulses disappear or so that the frequency at which they are generated is reduced, the distance charge amount is 0 or only a very miniscule amount. As a countermeasure to this, it was observed that, if both the GPS position finding means (ANTg, 20 to 22) and the vehicle speed pulses are normal, then the vehicle traveling speed as calculated by the GPS position finding means (ANTg, 20 to 22) in accordance with GPS measurement and the vehicle traveling speed as calculated by measurement of the cycle or number of vehicle speed pulses generated during a predetermined time are substantially the same.

If the GPS position finding means (ANTg, 20 to 22) is normal and there is an abnormality in the vehicle speed pulses so as to avoid a charge or to reduce a charge, then the frequency at which the vehicle speed pulses are generated is abnormally lower than the frequency at which they would be generated if they corresponded to the vehicle speed as calculated by the GPS position finding means (ANTg, 20 to 22). At this time, the abnormality information registering means (2) registers the data indicating this abnormality together with information concerning the point in time (time of day) when the abnormality was generated in the abnormality history memory (2). As a result, it is thereafter possible to confirm the history of the vehicle speed pulses abnormality and pursue unpaid tolls.

(43) The sixteenth invention is a charge device, comprising: position finding means (20, 25) that include angular velocity detecting means (25) for detecting a ground position of a vehicle; storage means (CRD) for storing credit information (i.e. the card balance); reading and writing means (5) for reading credit information from the storage means (CRD) and for writing credit information in the storage means (CRD); vehicle entry detecting means (2) for detecting an entry of a vehicle into a charge area based on a ground position detected by the position finding means (20, 25); charge processing means (2) for updating credit information in the storage means (CRD) via the reading and writing means (5) in accordance with a toll charged in response to a transit through the charge area; and abnormality information registering means (2) for registering, in abnormality history memory (2) data indicating an abnormality together with information (i.e. the date and time) concerning the point in time when it was generated, when the frequency of the generation of vehicle speed pulses is abnormally low at a time when the angular velocity detected by the angular velocity detecting means (25) is equal to or more than a set value.

When the speed at which the vehicle is traveling is low, it is possible that the speed of the vehicle as calculated by position measurement using the GPS position finding means (ANTg, 20 to 22) is inaccurate, and it is also possible, in the above aspect (5), that the vehicle speed pulse abnormality detection is inaccurate. Therefore, in embodiment (6), vehicle speed pulse abnormalities are determined using angular speed detection means (25). If the vehicle turns (i.e. if the vehicle turns left or right at an intersection or changes the line of driving), then the vehicle is moving and the angular velocity detecting means (25) detects a sizeable angular velocity. If the frequency at which the vehicle speed pulses is generated at this time is abnormally low, then the abnormality information registering means (2) registers data indicating the vehicle speed pulse abnormality together with information (i.e. the date and time) concerning the point in time when it was generated in abnormality history memory (2). As a result, it is thereafter easy to confirm the history of the vehicle speed pulses abnormality and track the state of abnormality.

(44) The charge device according to any of the above (39), (41), (42), or (43), further comprises display means (2, W4/2, W4/3) for displaying to the outside of a vehicle the fact that data indicating an abnormality is present in the abnormality history memory (2).

An abnormality in the charge processing is displayed to the outside of the vehicle by the display means (2, W4/2, W4/3). The charge controller is thus able to distinguish vehicles on the road having a charging abnormality by the presence or otherwise of this display enabling the controller to easily expose vehicles unable to pay the charge. The charge controller can then stop vehicles with this display and require payment of the charge as well as requiring that measures to enable normal charge processing to be carried out be performed.

(44) The charge device according to any of the above (38), (40), or (44), further comprises: abnormality information reading means (2) for outputting data of the abnormality history memory (2) in accordance with a specific input; and abnormality data deleting means (2) for deleting data indicating an abnormality in the abnormality history memory (2) in response to a delete instruction (i.e. an instruction to clear) on the precondition that the abnormality information reading means (2) has output data.

A charging controller (i.e. an employee of the charging system operating body or a member of the police forces with responsibility for the system) who has stopped a vehicle whose display means (2, W4/2, W4/3) is displaying an abnormality gives a specific input to the abnormality information reading means and is thus able to output data of the abnormality history memory. In the embodiments described below, this output data is displayed on the display in a vehicle and is also printed out on the printer of a data collector held by the charge controller. It is also registered on the storage means inside the data collector.

The charge controller displays this printout and obtains an agreement on the contents of the printed data (i.e. that there has been a breakdown or an illegal action) and is thus able to seek payment for the unpaid amount or demand the repair of the charge processing system. When an agreement about this is reached with the driver, the unpaid amount is received, and the driver of the vehicle purchases a new storage means (CRD) with a sufficient balance, the charge controller gives an erasure instruction (i.e. an instruction to clear) to the abnormality data erasing means (2). Because the data is output first, the abnormality data erasing means (2) erases data representing an abnormality in the abnormality history memory (2) in accordance with the erasure instruction. As a result, the illegality information for which payment has been received is erased from the memory.

Because the data erasure of the abnormality history memory (2) is performed on the preconditions that the erasure instruction (instruction to clear) is input and data is output in response to a specific input, if only the charge controller is able to make the specific input, then the reliability of the protection of the abnormality (illegality) information in the abnormality history memory (2) is high.

BRIEF DESCRIPTION OF THE DRAWINGS

FIG. 3 is a block diagram showing the schematic structure of an in-vehicle device in the automatic charging system of the first embodiment.

FIG. 5 is a flow chart showing the flow of information transmission processing executed in the general center of the first embodiment.

FIG. 6 is a flow chart showing the flow of processing to fix a charge applicable area executed in the in-vehicle device of the first embodiment.

FIG. 16 is a flow chart showing the flow of processing of the third embodiment.

FIGS. 33A and 33B show examples of the display when a vehicle is approaching a charge applicable area.

FIG. 34 shows an example of the display when a vehicle is approaching a charge applicable area.

FIGS. 41A and 41B are flow charts showing the content of the "card check" 4 shown in FIGS. 39A and 39B.

FIG. 46 is a flow chart showing the content of the "intermediate processing" 28 shown in FIGS. 40A and 40B.

FIG. 47 is a flow chart showing the content of the "vehicle exit processing" 30 shown in FIGS. 40A and 40B.

FIGS. 58A and 58B are flow charts showing a portion of the charge control operation of the charge control ECU 2 in the thirteenth embodiment.

FIG. 60 is a flow chart showing the content of the "vehicle entry processing" 27 shown in FIGS. 59A and 59B.

FIGS. 63A and 63B are flow charts showing the remaining portions of the charge control operation of the charge control ECU 2 of the fifteenth embodiment.

FIG. 67 is a plan view showing charge areas set in a road network.

DETAILED DESCRIPTION

An example of an embodiment of the present invention will now be described in detail with reference made to the drawings.

(First Embodiment)

In the first embodiment, the present invention is applied to an automatic charging system for performing charge processing automatically for a vehicle that has entered (i.e. driven into) a toll facility (i.e. an area where a charge is applied—referred to below as a charge applicable area) using road—vehicle intercommunication carried out between an in-vehicle device and an on-road device. Note that the automatic charging system used in the present embodiment is a system for settling a toll or the like through communication between an in-vehicle device mounted in a vehicle and an on-road device installed on the road.

Figure 1:
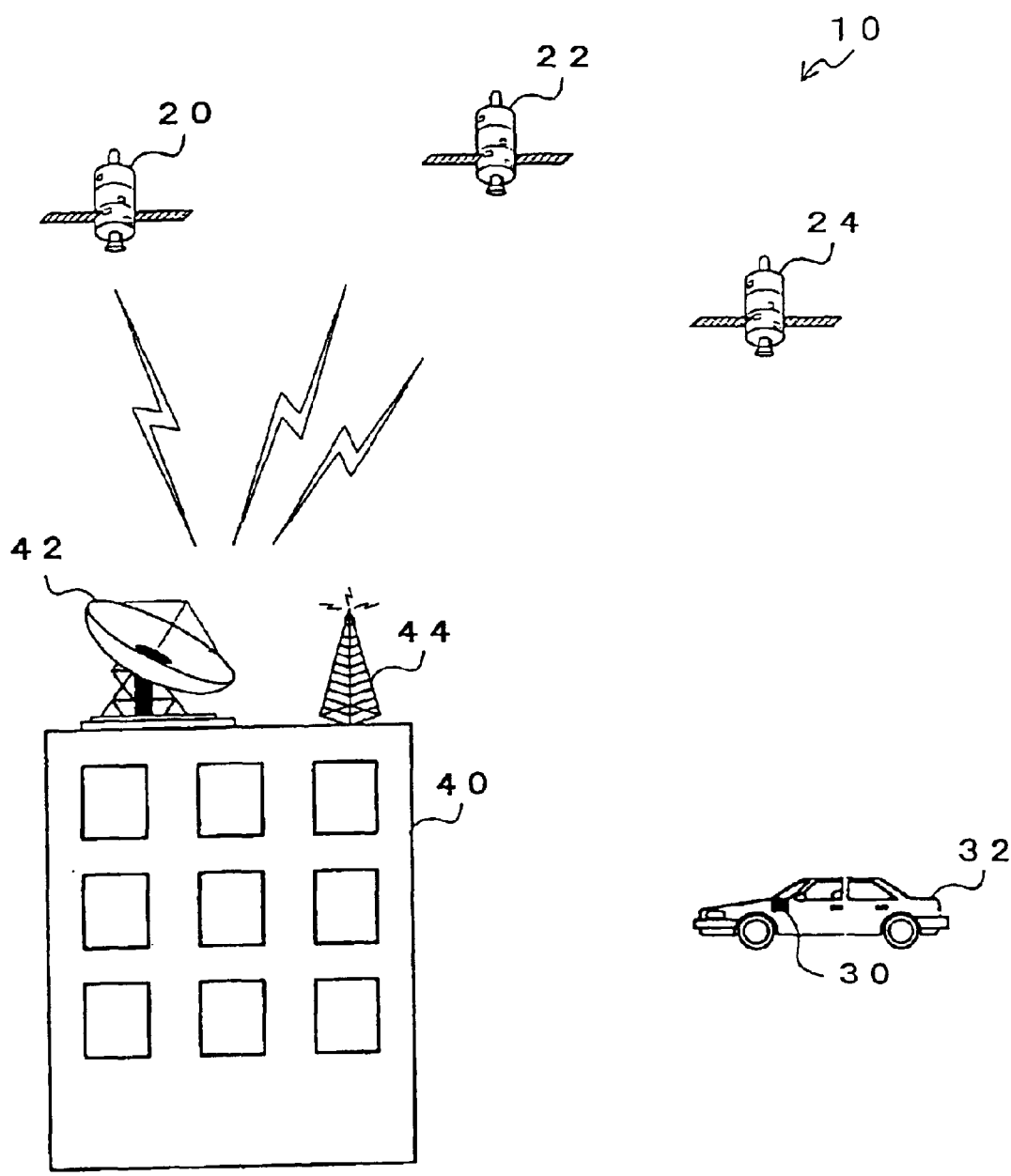
FIG. 1 is a block diagram showing the conceptual structure of an automatic charging system according to an embodiment of the present invention.

FIG. 1 shows the concept of the structure of an automatic charging system 10 of the present embodiment. The automatic charging system 10 of the present embodiment comprises: an in-vehicle device 30 mounted in a vehicle 32 and provided with a GPS antenna for receiving signals from GPS satellites 20, 22, and 24, and a ground wave antenna for ground wave communication (described below in detail); and a general center 40 serving as an on-road device that is fixed on the ground and is provided with a GPS antenna 42 for receiving GPS signals from the GPS satellites 20, 22, and 24. The general center 40 also has a ground wave antenna 44 for ground wave communication.

The in-vehicle device 30 pinpoints the position of the vehicle 32 in which it is mounted (i.e. the host vehicle) using GPS signals from the GPS satellites 20, 22, and 24, and transmits this via ground wave communication to the general center. The general center 40 performs the charge processing (calculations) for the charge applicable area based on the received position of the vehicle 32, and transmits the result thereof to the in-vehicle device 30. The in-vehicle device 30 performs toll collection based on the received result of the charge processing. Note that it is also possible for the toll collection to be performed at the general center, and only the result of the toll collection transmitted.

Figure 2:
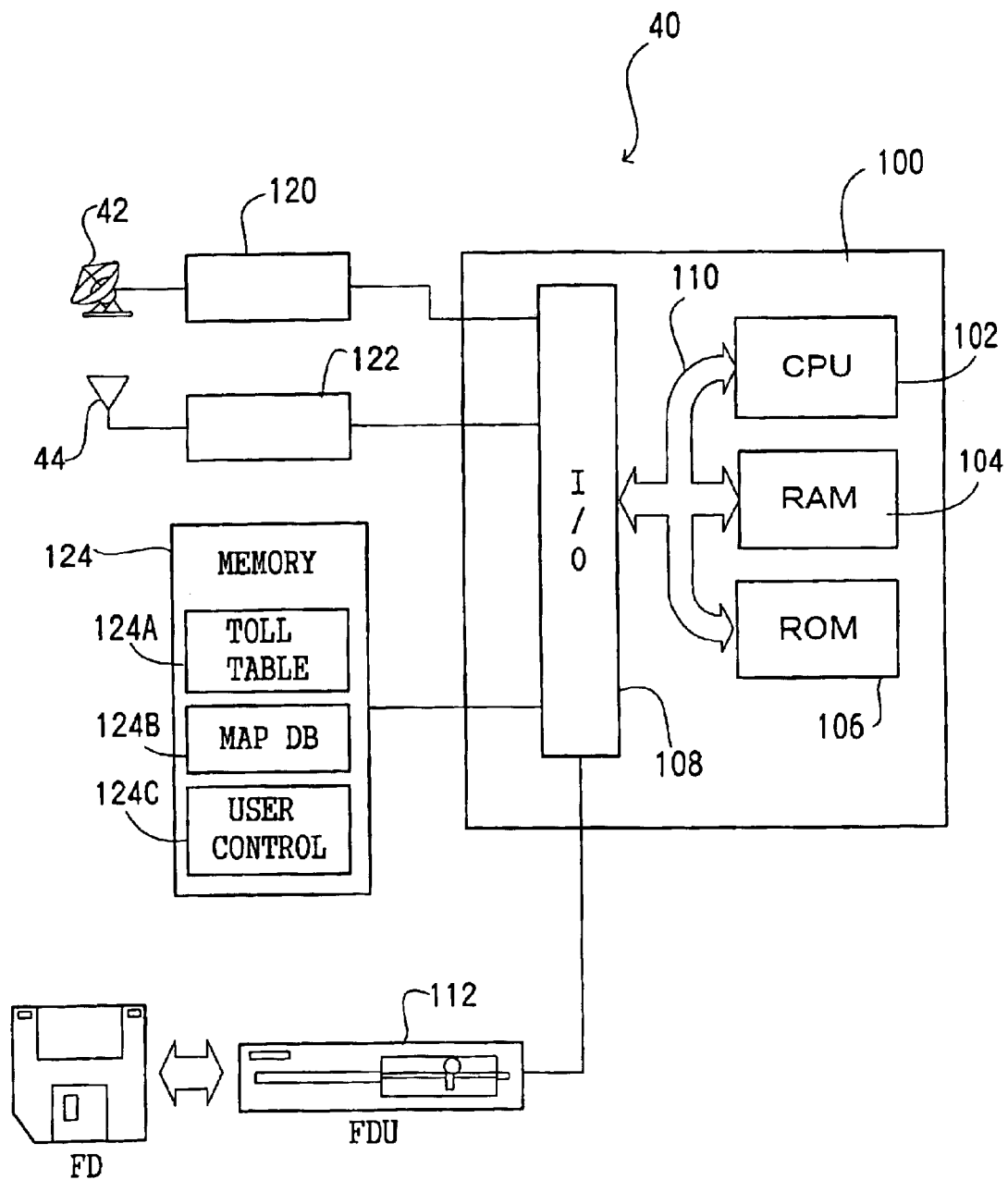
FIG. 2 is a block diagram showing the schematic structure of a general center established on the ground side in the automatic charging system of the first embodiment.

As is shown in FIG. 2, the general center 40 established on the ground has a center control device 100. The center control device 100 is structured from a microcomputer comprising a CPU 102, RAM 104, ROM 106, and an input/output port (I/O) 108. Each of these is connected together by a bus 110 so that commands and data can be transferred between each. Note that a processing routine that is described below is stored in the ROM 106.

A GPS communication device 120 having a GPS antenna 42 is connected to the input/output port 108, as is a ground wave communication device 122 having a ground wave antenna 44. The GPS communication device 120 is intended to pinpoint its own position, namely, the position of the general center 40 using the GPS signals from the GPS satellites 20, 22, and 24. The ground wave communication device 122 is intended to exchange signals or to provide information by communicating with the in-vehicle device 30 mounted in the vehicle, and employs a wireless communication device. Note that an example of this wireless communication device is an FM broadcast or an FM character broadcast, a known wave communication, and telephone circuit communication such as in a moving body communication device.

Memory 124 is also connected to the input/output port 108. This memory 124 includes a toll table 124A in which toll information representing tolls of the charge applicable area is stored, a map database 124B in which map information for determining the charge applicable area is stored, and a user control database 124C which is connectable to the general center and in which individual information of the user to be controlled is stored.

Note that, a floppy disk unit (FDU) 112 into which a floppy disk (referred to below as FD) can be inserted as a recording medium and also removed is connected to the center control device 100. Note also that the processing routine described below is able to be written to or read from an FD using the FDU 112. Accordingly, it is also possible to record in advance the processing routine described below on an FD without storing it inside the center control device 100, and to execute the processing program recorded on the FD via the FDU 112. Alternatively, it is also possible to connect an (unillustrated) large volume storage device such as a hard disk to the center control device 100, and to store (install) a processing program recorded on the FD on the (unillustrated) large volume storage device and then execute the processing program. There are also disks such as optical disks such as CD-ROMs and the like, and magneto optic disks such as MD, MO and the like, and DVD that are used as the recording medium, and if these are used, a CD-ROM device, an MD device, an MO device, a DVD device or the like may be used instead of or in conjunction with the above FDU.

Next, the in-vehicle device 30 will be described. The in-vehicle device 30 used in the present embodiment is one in which the present invention has been applied to a navigation system for route assistance information using images and sound to a driver. The in-vehicle device 30 including a navigation system is mounted on the instrument panel of the vehicle 32 in order to exchange signals with the on-road device.

As is shown in FIG. 3, the in-vehicle device 30 including a navigation system of the present embodiment is provided with a device main body 200 formed from a microcomputer comprising a CPU 202, RAM 204, ROM 206, and an input/output (I/O) port 208 each of which is connected together by a bus 210 such that commands and data can be transferred between each. Note that the RAM 204 is backup RAM so that, even if the power supply thereto is cut, the contents of the information stored therein are backed up (stored). A floppy disk unit 236 (FD device) into which a floppy disk (FD) can be inserted and also removed is connected to the input/output port 208. Note that the processing routine described below and various image data are stored in the ROM 206.

This various data and the processing routine described below are able to be written to or read from an FD using the FD device 236. Accordingly, it is also possible to record in advance the processing routine described below on an FD without storing it ROM 206, and to execute the processing program recorded on the floppy disk FD via the FD device 236. Alternatively, it is also possible to connect an (unillustrated) large volume storage device such as a hard disk to the control main body 200, and to store (install) a processing program recorded on the floppy disk FD on the (unillustrated) large volume storage device and then execute the processing program. There are also optical disks such as CD-ROMs and the like, and magneto optic disks such as MD, MO and the like as a recording medium, and if these are used, a CD-ROM device, an MD device, an MO device or the like may be used instead of or in conjunction with the above FD device 236.

Note that the in-vehicle device 30 including a navigation system of the present embodiment can be connected via an input/output port to an unillustrated local area network for vehicles.

A GPS device 220 for mounting on a vehicle and having a GPS antenna 220A mounted on the vehicle is connected to the input/output port 208, as is a ground wave communication device 222 having a ground wave antenna 222A. The GPS device 220 for mounting on a vehicle is intended to pinpoint the position of its host vehicle 32 using GPS signals from the GPS satellites 20, 22, and 24. The ground wave communication device 222 is intended to exchange signals or to provide information by communicating with the ground, and employs a wireless communication device. Note that an example of this wireless communication device is an FM broadcast or an FM character broadcast, a known wave communication, and telephone circuit communication such as in a moving body communication device. Accordingly, a communication device for a moving body such as a portable telephone or a car phone or the like may be used as the ground wave communication device 222, so that wireless communication (conversation via a telephone circuit) can be made possible via the in-vehicle device 30 between the vehicle and a telephone device outside the vehicle.

Memory 230 is also connected to the input/output port 208. This memory 230 includes a toll table 230A in which toll information representing tolls of the charge applicable area is stored, and a map database 230B in which map information for providing route information as images to assist the driver is stored.

Also connected to the above input/output port 208 are a display device 224 for providing route assistance information images to the driver, a speaker device comprising a sound device 228 provided with a speaker 228A for providing sound information to the driver, and an input device 226 such as a keyboard or switch device. The display device 224 can display map information. The sound device 228 converts either a digital or analog sound signal output from the device main body 12 into a drive signal for the speaker 228A.

Note that the data and the like to be stored in the above memory 230 may also be stored on a storage medium such as the floppy disk FD using the floppy disk device 236 or on a hard disk device.

In addition to these, an IC card read/write device 234 capable of receiving an IC card on which toll balance information and the like is stored is provided for the input/output port 208. In the in-vehicle device 30, an ID code comprising a vehicle number and the like as well as fixed data such as information on the vehicle model and the like is stored in advance in the RAM 204 and ROM 206. The in-vehicle device 30 refers to the toll balance information on the IC card 232 loaded into the IC card read/write device 234, and writes toll balance information on the IC card 232. Note that the IC card may comprise a prepaid card or a credit card. A display device 229 is connected to the input/output 208. This display device 229 gives notification to the inside and the outside of the vehicle that the vehicle has entered a area, or about the state of the charge processing, or the like.

Figure 4:
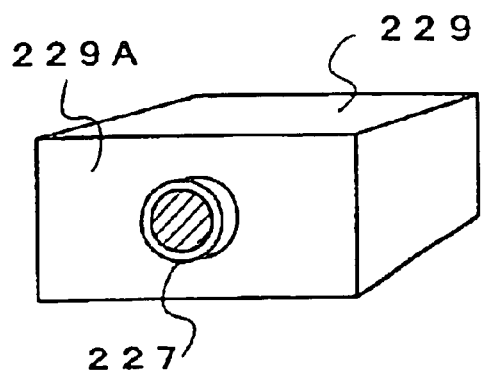
FIGS. 4A through 4C are perspective views showing the schematic structure of a display device.
Figure 4:
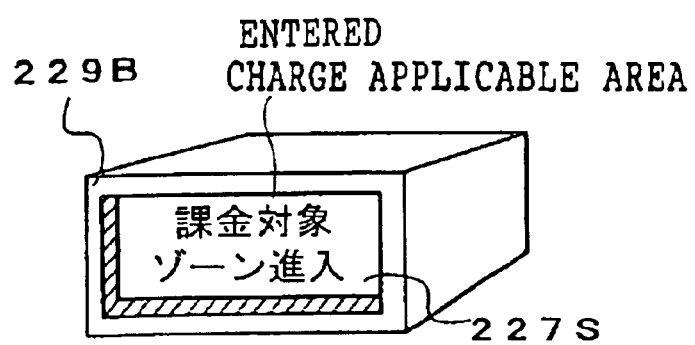
Figure 4:
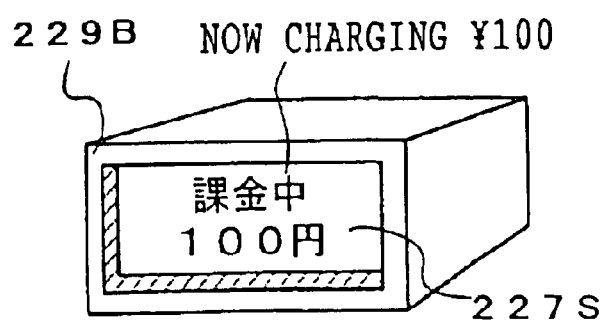

As is shown in FIG. 4A, an observation lamp 227 is provided in the front surface portion 229A of the display device 229. The display device 229 can be installed on a vehicle dashboard such that light from the observation lamp 227 is emitted to the outside of the vehicle. This enables easy confirmation from outside the vehicle that the observation lamp 227 is flashing.

As is shown in FIG. 4B, a display panel 227S is installed in the rear surface portion 229B of the display device 229 thus providing a structure in which it is an easy matter for the occupant of the vehicle to confirm state of the area in which the vehicle is currently in and the current state of the charge processing. In this case, it is possible to display the following on the display panel 227S as the current state, namely, that the vehicle is approaching a charge applicable area, a standard charge amount for the charge applicable area, the current amount of the charge processing (see FIG. 4C), the fact that charge processing has begun, the fact that charge processing has ended, that charge processing cannot be performed (i.e. that a violation has been committed), and the like.

Note that the mounting position (attachment position) of the in-vehicle device 30 is not limited to being on the vehicle instrument panel as described above, and it is sufficient if it is in a position where it is able to exchange signals with the ground using the antenna. For example, it may be mounted inside the vehicle in the rear seat or the like. Moreover, the in-vehicle device 30 may be formed with separate structures comprising an in-vehicle device main body and an antenna. If the in-vehicle device is structured in this way with a separate in-vehicle device main body and antenna, it is possible to install the antenna only on the instrument panel or at a position towards the rear seat or the like, as described above, and the mounting position information is taken as information recording the position where the antenna has been mounted.

Moreover, when the ignition is on, power is supplied at all times from the vehicle battery to the in-vehicle device. It is also possible to enable the in-vehicle device to acquire date and time information such as the year, month, date, as well as the current time from an unillustrated clock built into the vehicle 32.

Note that, in the above description, toll tables are stored in memory in both the in-vehicle device 30 and the general center 40, however, it is also possible for the toll tables to be stored in the device that performs the calculation of the toll to be charged or to be stored in another device when toll information is obtained by communication, or for the toll tables to be stored in the memory of one of the in-vehicle device 30 and the general center 40.

The operation of the present embodiment will now be described.

Firstly, the operation of the ground side, namely, of the general center 40 will be described in detail. In the present embodiment, the general center 40 transmits information for charge processing to the in-vehicle device 30 mounted on a vehicle 32.

As is shown in FIG. 5, in step 300, the general center 40 receives GPS signals from GPS satellites 20, 22, and 24. In the next step 302, the general center 40 determines its own reference position (a reference latitude and longitude Po), and generates GPS correction information. When the size of any error in the GPS signals from the GPS satellites 20, 22, and 24 is large, the GPS correction information is used to correct the error. Because the general center 40 is fixed in place, the GPS correction information is able to pinpoint any variation in the GPS signals of the GPS satellites 20, 22, and 24.

In the next step 304, information of a predetermined charge applicable area is read, and the GPS correction information is transmitted together with the charge applicable area information in the next step 306. This transmission can be performed by FM broadcast or by a telephone circuit.

Note that, in the present embodiment a description is given of when GPS correction information is generated, however, as is described below, because the charge applicable area is formed from a core area and a buffer area (which is set in accordance with the errors in the GPS signals), it is not absolutely necessary for the GPS correction information to be generated and it is possible for only the charge applicable area information to be transmitted.

Here, when GPS is used, it is found that the GPS has a position recognition error (i.e. a detection error) of a predetermined amount (for example, of a maximum of 100 meters). Therefore, in the present embodiment, the charge applicable area is formed from a core area which becomes substantially the area where the charge is applied and a buffer area which corresponds to the position recognition error when GPS is used.

Figure 8:
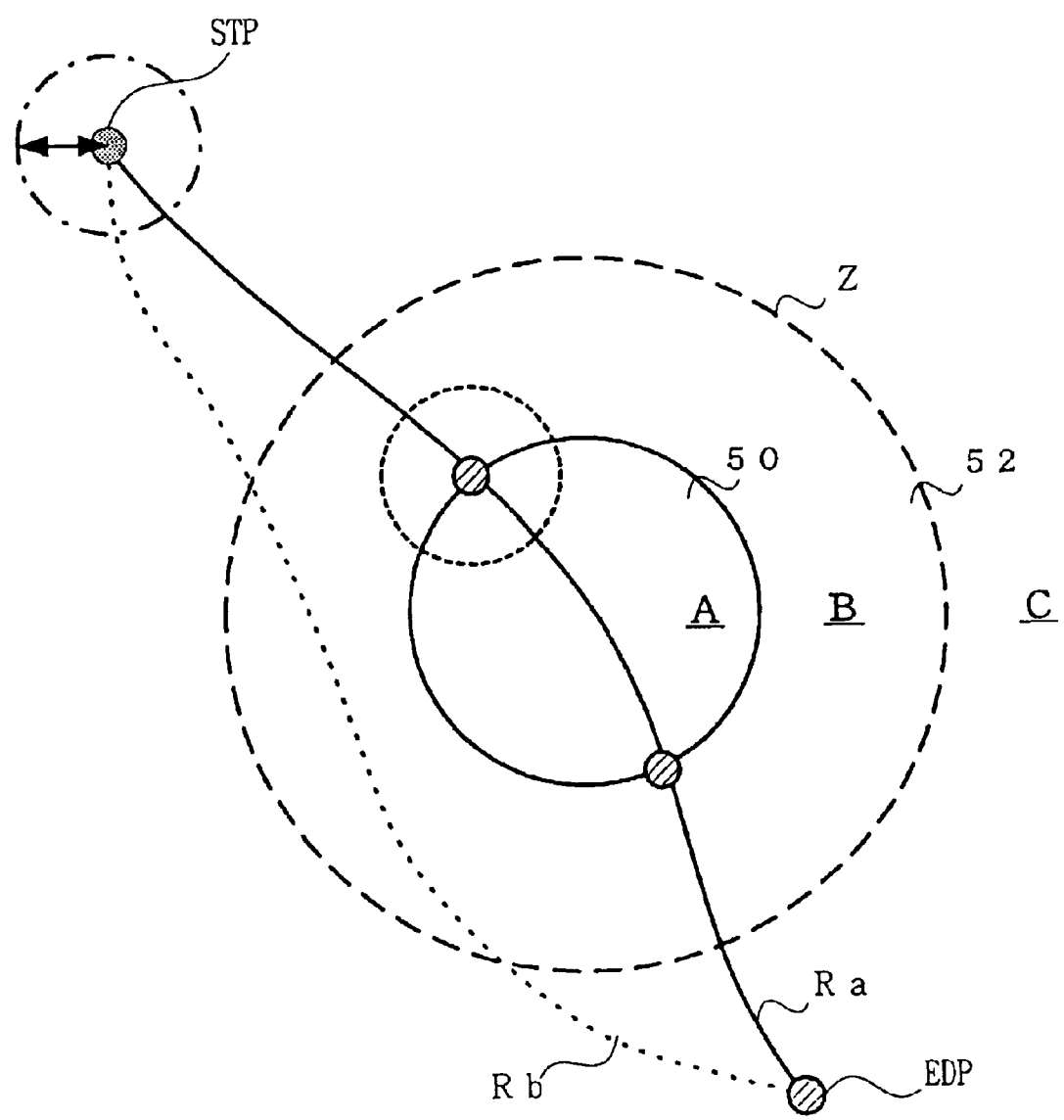
FIG. 8 is an image diagram showing a charge applicable area.

Thus, the charge applicable area information is determined in a charge applicable area Z that comprises a core area and a buffer area. As is shown in FIG. 8, as an example of this type of charge applicable area Z, which is formed from a core area 50 which is the circular shaped area A in the center portion and the buffer area 52 which is the donut shaped area B substantially concentric with the core area 50 and adjacent to the outer periphery thereof, the ground side around the charge applicable area Z is one that is divided into three areas comprising the core area 50, the buffer area 52, and the non-applicable area C which is outside the core area 50 and the buffer area 52. Each of these areas can be specified by its latitude and longitude as well as by its shape.

Figure 9:
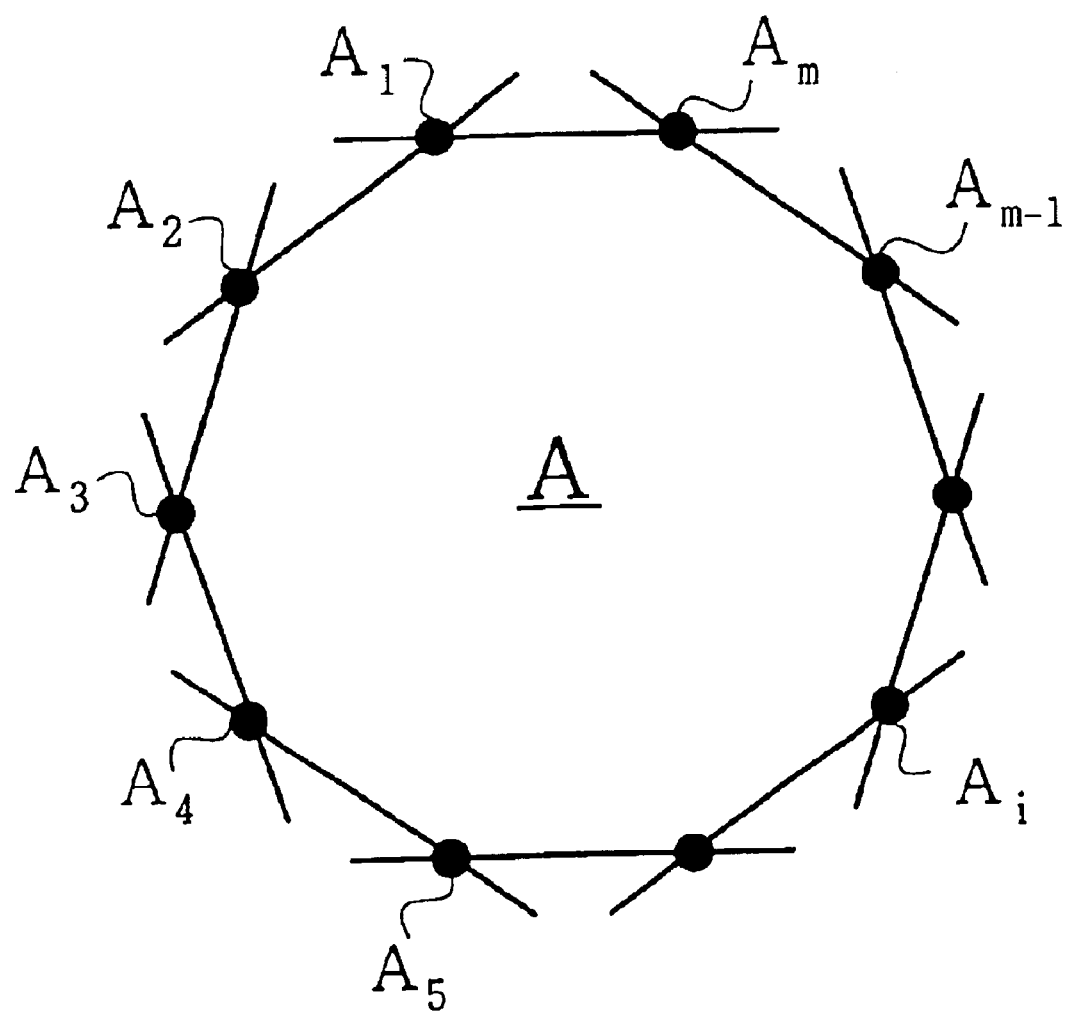
FIG. 9 is an explanatory view for explaining an example for determining a charge applicable area.

As is shown in FIG. 9, the area A can be fixed by forming a closed space by setting a plurality of positions on the boundaries of the area A with the area B, and setting a direct line passing through adjacent point positions. Specifically, if an optional position on a boundary line of the area A with the area B is defined as $A_i$ ($a_{Xi}$, $a_{Yi}$), then a direct line passing through the points $A_i$ and $A_{i+1}$ can be expressed using the following formula (1):

$$(y-a_{Yi})/(x-a_{Xi})=(a_{Yi+1}-a_{Yi})/(a_{Xi+1}-a_{Xi}) \quad (1)$$

Accordingly, it is sufficient if the area A fulfills the following conditions $$(y-a_{Yi})/(x-a_{Xi})-(a_{Yi+1}-a_{Yi})/(a_{Xi+1}-a_{Xi})<0$$

wherein, i=1~(m−1)

m: a number representing a point of the last position on the boundary line.

In the present embodiment, the charge amount is set for (the core area 50 of) the charge applicable area. In this fixing of the charge amount, the calculation conditions for determining the charge amount (i.e. the charge calculation conditions) are set. The conditions given below are used for these charge calculation conditions.

(1) A area charge charged at the time of entry into the area (This charge amount increases as the number of entries into the charge applicable area increases).

(2) A distance charge charged in accordance with the distance traveled within the area (This charge amount increases as the distance traveled within the area increases).

(3) A time charge charged in accordance with the length of time the vehicle traveled within the area (This charge amount increases as the length of time the vehicle remains within the charge applicable area increases).

Note that other charge calculation conditions may include a congestion charge the amount of which varies in accordance with the level of congestion within the area and a speed charge the amount of which varies in accordance with the speed at which the vehicle travels inside the area (the average vehicle speed may also be used).

It is possible to specify the area and specify the toll for the charge applicable area by including tables based on the above charge calculation conditions in the charge applicable area information.

Note that, in the description below, the charge applicable area Z is taken as a single area, however, the charge applicable area information may also be set for a charge applicable area formed from a plurality of areas. In this case, the charge amount may be changed for each area. For example, it is possible for the charge to be increased the closer to the city center, or for the initial charge amount to be altered for a predetermined area.

The operation of the in-vehicle device 30 will now be described.

As is shown in FIG. 6, the following interrupt processing is performed at predetermined times (for example, every 1 minute) in the in-vehicle device 30 mounted in a vehicle. In step 400, information is received from the ground side, namely, from the general center 40. As was described above, the information from the general center 40 is charge applicable area information and GPS correction information, and in step 402, a determination is made as to whether or not the received information is the most recent information. If the received information is the most recent information, the determination in step 402 is affirmative and, in the next step 404, the charge applicable area is brought out and the GPS correction data is stored.

If, however, the received information is not the most recent information, the determination in step 402 is negative and, in the next step 406, GPS signals from the GPS satellites 20, 22, and 24 are received. In the next step 408, the current date and time (year, month, date, time) are read and, in step 410, the in-vehicle device's own position, namely, the position of the host vehicle 32 (latitude and longitude P (t)) is determined. Note that the when determining the latitude and longitude P (t), the stored GPS correction information can be used. Alternatively, in step 406, it is also possible to detect and read the traveling state of the vehicle such as the distance traveled or speed of the vehicle.

In the next step 412, the determined latitude and longitude P (t) is matched with a map database stored in advance and, in the next step 414, the area to which the latitude and longitude P (t) belongs is decided. Namely, whether P (t) belongs to the buffer area 52 (area B), the core area 50 (area A), or the area outside these (area C) is decided.

In the next step 415, a determination is made as to whether or not the area decided in step 414 is contained in the charge applicable area Z, namely, whether or not it is the buffer area 52 (area B) or the core area 50 (area A). If the determination in step 415 is affirmative, then the vehicle has either entered the charge applicable area Z or is continuing to travel inside the area Z. Therefore, in the next step 417, the current state is displayed on the display panel 227S (see FIG. 4B). If, however, the determination in step 415 is negative, then the vehicle has either left the charge applicable area Z or is continuing to travel outside the charge applicable area Z. Therefore, in the next step 416, if the current state was being displayed on the display panel 227S, this is cleared.

In the next step 418, the above information, namely, the latitude and longitude p (t), the time (t), and the area are stored as vehicle location history. In the next step 419, the charge processing is executed as described below. An example of a vehicle location history list is shown in Table 1 below.

TABLE 1

| Time t | | | | Latitude and Longitude P (t) | | | |
|---|---|---|---|---|---|---|---|
| Year | Month | Date | Time | Longitude | Latitude | Area | Charge |
| 1998 | 10 | 03 | 15:12 | 135-30-35 | 35-20-13 | C | |
| 1998 | 10 | 03 | 15:13 | 135-30-55 | 35-19-50 | B | |
| 1998 | 10 | 03 | 15:14 | 135-31-15 | 35-19-45 | A | * |
| — | — | — | — | — | — | — | — |

Note that the "charge" column in the above table is an identifier representing whether or not the charge processing described below has been performed. The [*] symbol indicates that the charge processing has been performed.

In this way, the area in which the vehicle 32 was present every predetermined time is stored together with the date and time as history.

A description is given here of the aforementioned area determination.

Figure 10:
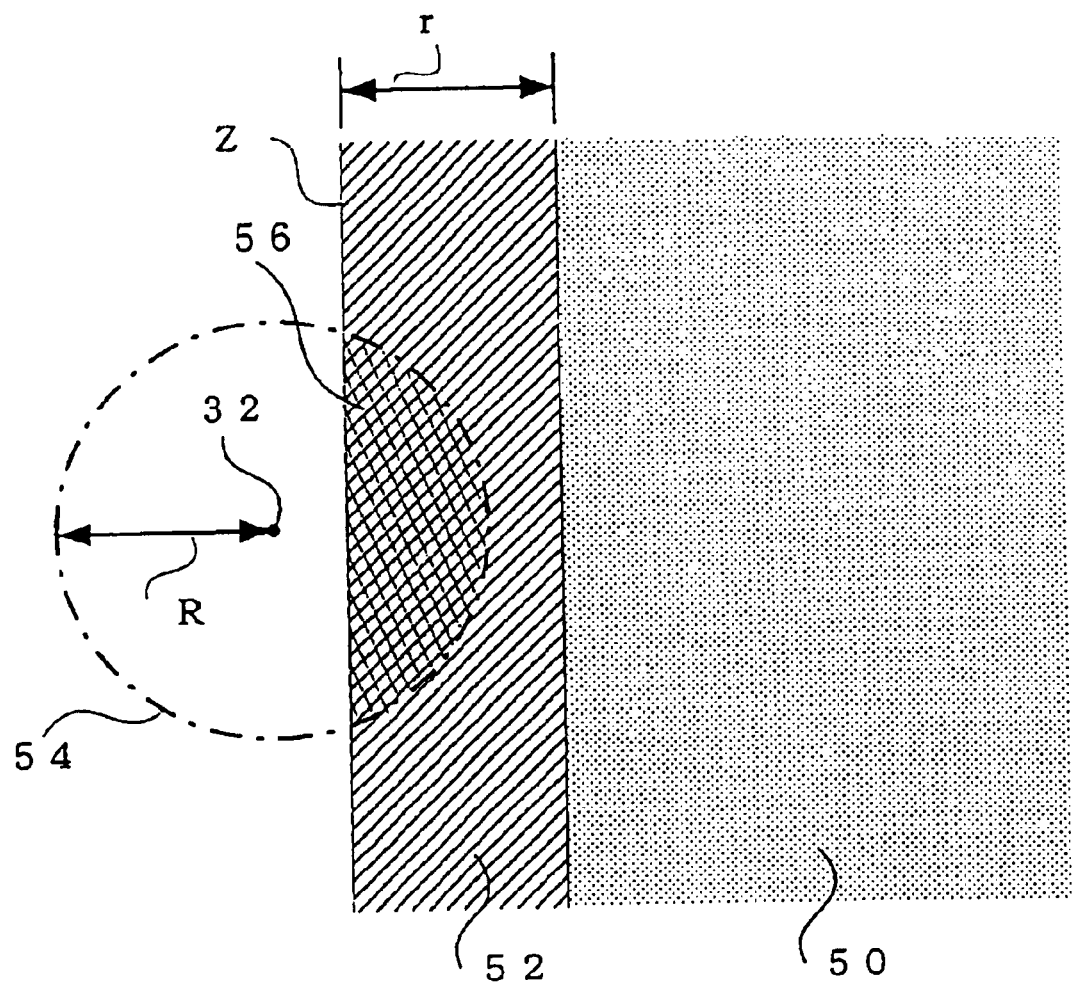
FIG. 10 is an explanatory view for explaining a detection error of the first embodiment.

The charge applicable area is a area in which a charge may be applied to a vehicle that has entered into that area. A charge may not be applied to any vehicle when it is outside that area. As mentioned above, when GPS is used, it is understood that there will be a position recognition error of a predetermined amount. Therefore, as is shown in FIG. 10, for example, when a vehicle 32 is actually positioned outside the charge applicable area Z, the current position thereof as detected by the OPS is an optional point within a recognized position existence probability circle 54 th at has the position recognition error distance R as the radius thereof. Accordingly, if it is detected at a position within the area of overlap 56 (the area indicated by the cross net pattern in FIG. 10) between the recognized position existence probability circle 54 and the charge applicable area Z, a charge is levied regardless of the fact that the vehicle has not actually entered into the charge applicable area. Namely, the overlap area 56 be comes the erroneous charge area.

Therefore, in the present embodiment, the charge applicable area is formed from a core area 50 and a buffer area 52 that has a width r which is longer than the position recognition error distance R (R<r). As a result of this, when the vehicle is actually outside the charge applicable area, the recognized position existence probability circle 54 at the position detected by the GPS still overlaps with the buffer area 52, however, it do es not go as far as the c ore area 50. Accordingly, when the vehicle is recognized as being within the buffer area 52, because it is possible that the vehicle is not within the charge applicable area, authorization to place the vehicle within the charge applicable area is denied.

Figure 11:
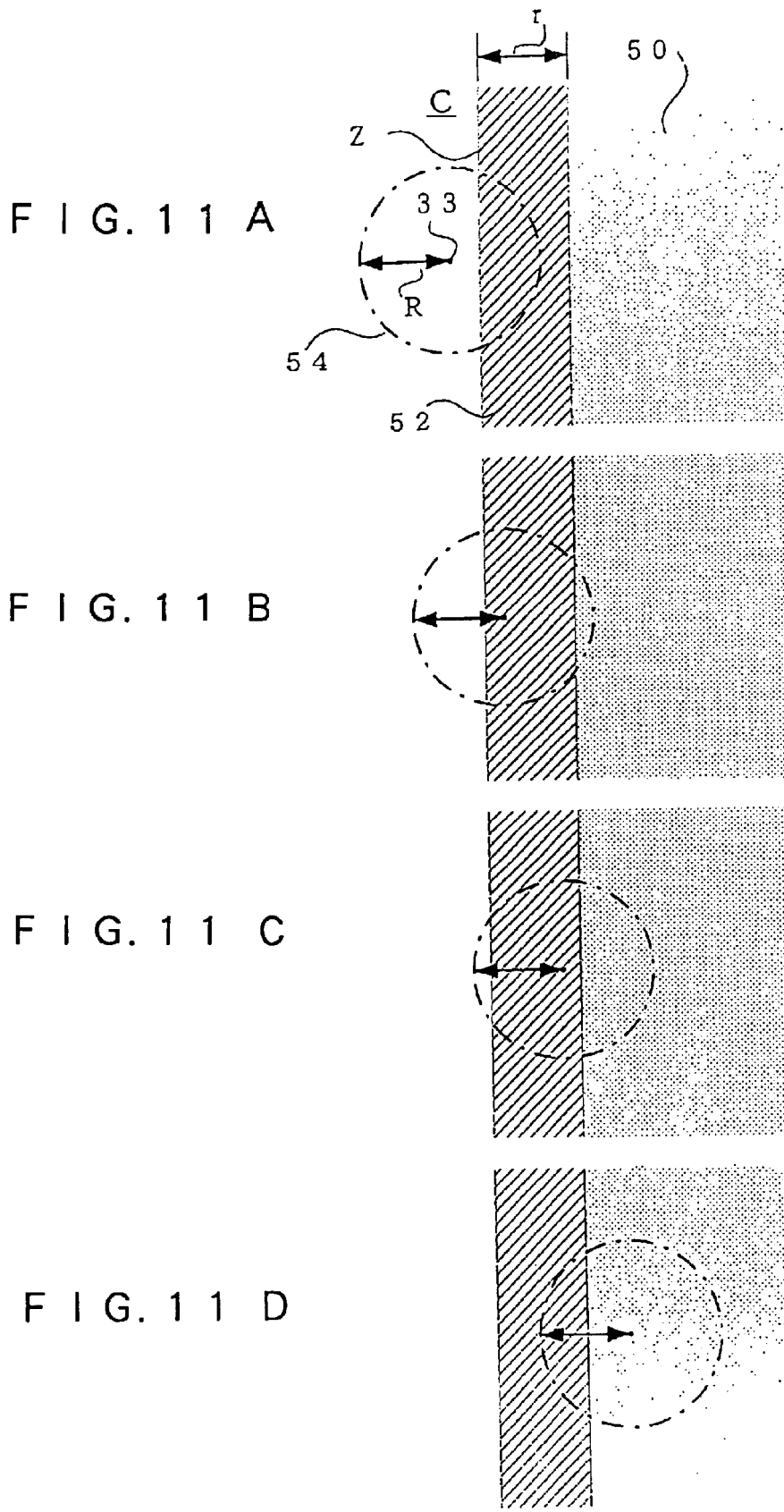
FIGS. 11A through 11D are explanatory views for explaining the area determination around a buffer area of the first embodiment.

Specifically, as is shown in FIG. 11A, if the position 33 of the vehicle detected by the GPS is outside the charge applicable area Z (i.e. in area C), because it is possible that, although the actual position of the vehicle is an arbitrary point within the recognized position existence probability circle 54, the vehicle is not in fact inside the charge applicable area, the determination of whether or not the vehicle is within the charge applicable area is negative. As is shown in FIG. 11B, even when the detected vehicle position 33 is within the buffer area 52 and is moving in a direction towards the charge applicable area Z, there is still a possibility that the vehicle is not present within the charge applicable area. Moreover, as is shown in FIG. 11C, even when the detected vehicle position 33 is within the buffer area 52 directly beside the core area 50, because there is still a possibility that the vehicle is not present within the charge applicable area, the determination of whether or not the vehicle is within the charge applicable area is negative. As is shown in FIG. 11D, when the detected vehicle position 33 has moved within the core area 50, because the entire recognized position existence probability circle 54 is completely inside the charge applicable area Z, it is determined that the vehicle is now within the charge applicable area.

Accordingly, if a charge is levied only when the detected vehicle position 33 is detected inside the core area 50, there is no charge levied when the vehicle has not actually entered into the charge applicable area. Namely, there is no acknowledgement that a vehicle that is outside the charge applicable area is inside the charge applicable area. By using this setup, when a vehicle is moving in a direction approaching the core area 50, it is possible to acknowledge with certainty that only a vehicle that has been detected inside the core area 50 is present inside the charge applicable area.

Next, the charge processing in the in-vehicle device 30 (i.e. the processing of step 419 in FIG. 6) will be described. The charge processing is executed at predetermined times, for example. These predetermined times when the processing may be performed include every hour, a predetermined day of every week, a predetermined date and time of every month, or a predetermined year, month, date, and time. Note that the execution of this charge processing may also be performed in response to an instruction from the general center 40. In the present embodiment, the timings of the performing of the charge processing are described as a condition.

Figure 7:
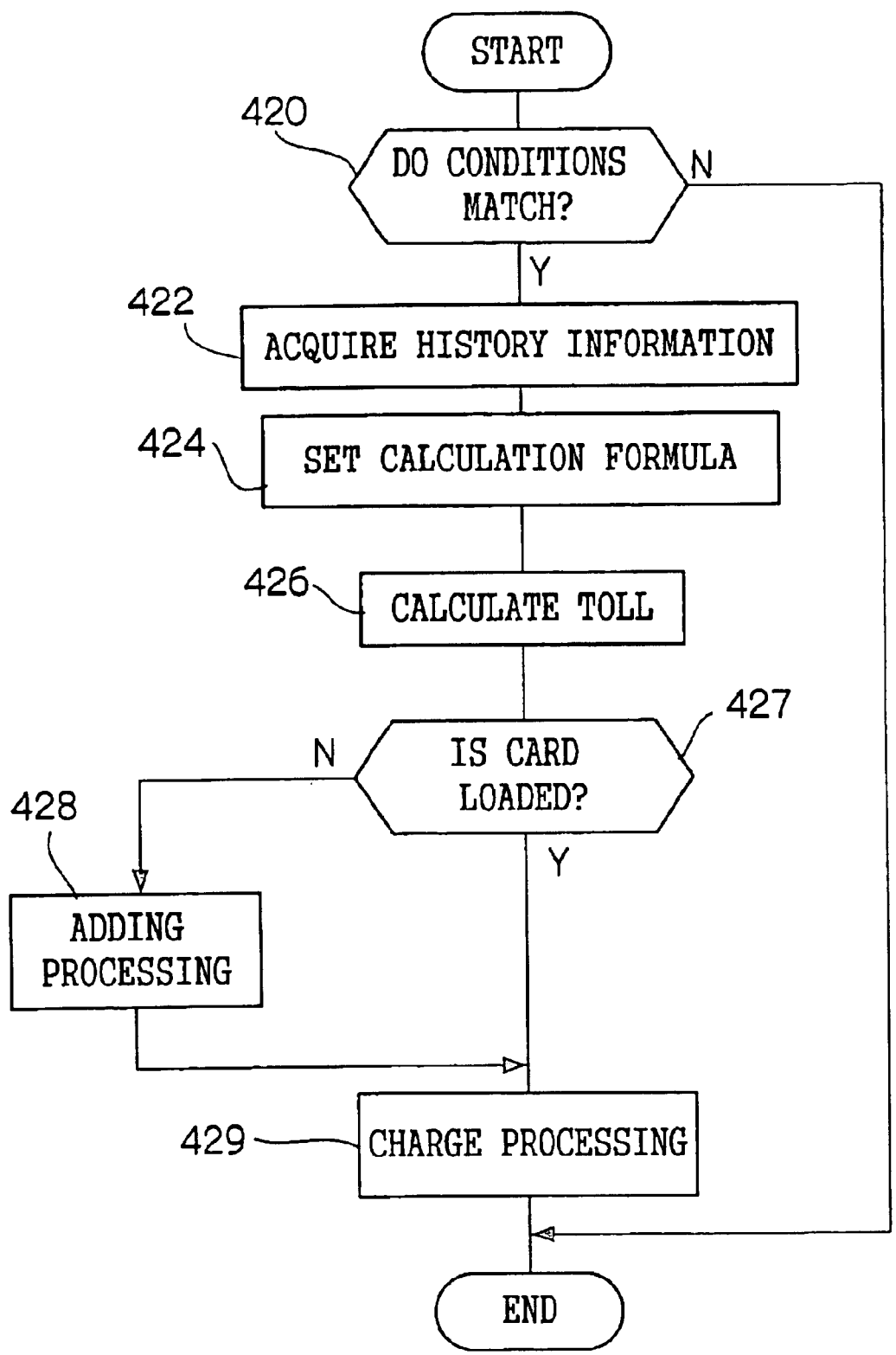
FIG. 7 is a flow chart showing the flow of charge processing executed in the in-vehicle device of the first embodiment.

As is shown in FIG. 7, in step 420, by making a determination as to whether or not it is the above predetermined time or whether or not an instruction has been given by the general center 40, it is possible to determine whether or not the conditions are matched. If the conditions do not match, the determination in step 420 is negative, and the routine is ended.

If, however, the conditions do match, the determination in step 420 is affirmative and, in step 422, the history information is acquired. This history information is the vehicle location history list (Table 1) stored in step 416 in FIG. 6. In the next step 424, a calculation formula (charge calculation formula) is set. The charge calculation formula is determined by the above calculation conditions. These calculation conditions are conditions for determining a charge amount (charge calculation conditions) and may be made up of the number of entries into a area, the length of time in a area, or the like. The charge calculation formula is determined by the calculation conditions. In Formula (2) below, a charge calculation formula is shown as a general formula for areas.

$$(\text{charge amount}) = f(N_A, N_B, N_C, t) \quad (2)$$

wherein, $N_A$, $N_B$, $N_C$: the evaluation of the areas A–C (i.e. the number of entries and length of stay for each area determined by the charge calculation conditions)

In the next step 426, the charge is calculated using the calculation formula set above and the history information. When the charge calculation is ended, the routine proceeds to step 427 where a determination is made as to whether or not an IC card 232, on which toll balance information and the like is stored, is loaded in a card read/write device 234. When there is no IC card 232 loaded in the IC card read/write device 234, the charge processing cannot be accomplished, therefore, the determination in step 427 is negative. The routine then proceeds to step 428 where the toll calculated above is stored in memory. Because it is possible that previous unpaid tolls are included therein, the storing of the toll is a cumulative processing. If, however, an IC card 232 is loaded in the IC card read/write device 234, the card processing can be accomplished. Therefore, the determination in step 427 is affirmative and the charge processing is carried out in step 429. This charge processing is a processing to subtract the above determined charge from the balance of the IC card 232.

For example, when the only calculation condition is the number of entries into a area (¥100 per entry) and the history information is for the route from the start point STP to the end point EDP, as shown in FIG. 8, the charge amount is found as shown below for the two routes Ra and Rb.

Ra charge amount=100×1+0×1+0×1=¥100
Rb charge amount=100×0+1×0+1×0=¥0

Thus, selecting a route that avoids the central portion gives a cheaper charge amount. Namely, there is no charge levied even if the vehicle passes through the buffer area 52.

As has been described above, in the present embodiment, the position of a host vehicle is specified using GPS signals and when the vehicle has entered into a charge applicable area, this fact is notified to the vehicle occupants. Moreover, the charge applicable area is formed from a buffer area that is based on the amount of error in the GPS and a core area which serves as the area in which a charge is actually levied. As a result, even if the vehicle position recognition error is at the maximum error amount in the direction approaching the charge applicable area, a vehicle which is positioned outside the charge applicable area is never determined to be within the charge applicable area where a charge is levied. Therefore, there is no beginning of wrongful charge processing due to GPS position recognition error.

(Second Embodiment)

Next, the second embodiment will be described. Note that, because the present embodiment has substantially the same structure as the above described embodiment, the same descriptive symbols are given to the same portions and a detailed description thereof is omitted. In the present embodiment, a plurality of core areas are provided inside the charge applicable area.

As mentioned above, it is possible to prevent a charge from being levied in error on a vehicle positioned outside the charge applicable area by charging a toll only on vehicles present in the core area. However, it is not possible to collect a toll for the buffer area. Therefore, in the present embodiment, it is possible to both prevent a charge from being levied in error on a vehicle positioned outside the charge applicable area and to collect a toll in a predetermined buffer area within the charge applicable area.

Figure 12:
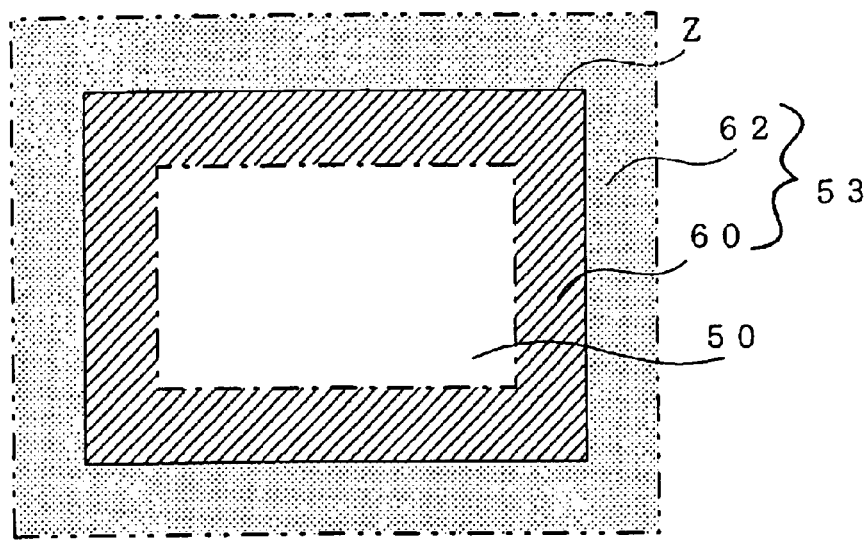
FIG. 12 is a line drawing showing the basic structure of a charge applicable area of the second embodiment.

As is shown in FIG. 12, in the present embodiment, basically, the charge applicable area Z is formed from a core area 50 and an inner buffer area 60. An outer buffer area 62 is provided at the outer periphery of the charge applicable area Z. Namely, a buffer area 53 is provided comprising the inner buffer area 60 and the outer buffer area 62 with the outer border of the charge applicable area Z set as the boundary between the two. As described in the above embodiment, the inner buffer area 60 and the outer buffer area 62 have the width r (wherein the position recognition error distance R<r) determined in accordance with the error in the GPS signals.

Figure 13:
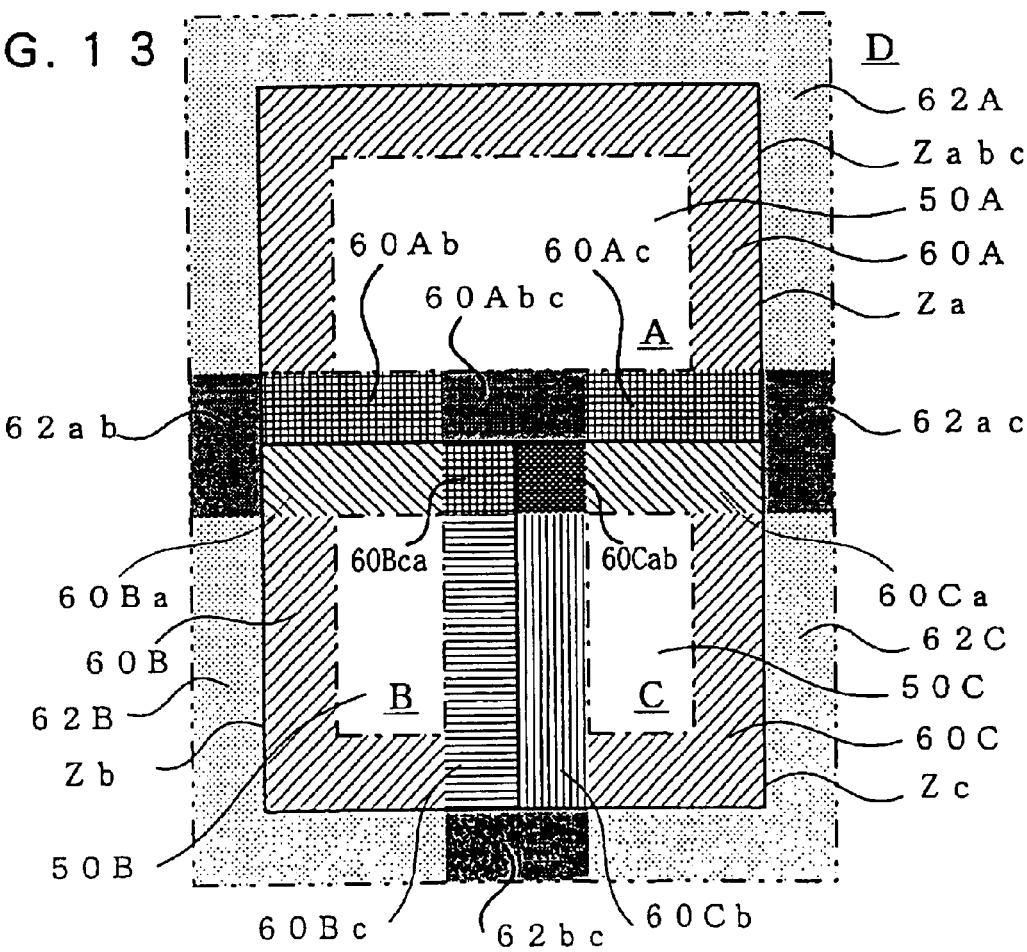
FIG. 13 is a line drawing showing a charge applicable area of the second embodiment.

As is shown in FIG. 13, in the present embodiment, a charge applicable area Zabc is formed based on the basic structure shown in FIG. 12 by placing the charge applicable area Za, the charge applicable area Zb, and the charge applicable area Zc adjacent to each other. The charge applicable area Za is formed from the three elements of the outer buffer area 62A, the inner buffer area 60A, and the core area 50A forming the area A. The charge applicable area Zb is formed from the outer buffer area 62B, the inner buffer area 60B, and the core area 50B forming the area B. The charge applicable area Zc is formed from the outer buffer area 62C, the inner buffer area 60C, and the core area 50C forming the area C.

By placing the charge applicable areas Za to Zc in adjacent positions, a portion of the inner buffer area 60A of the charge applicable area Za includes the overlap buffer area 60Ab that overlaps with the outer buffer area of the charge applicable area Zb, the overlap buffer area 60Ac that overlaps with the outer buffer area of the charge applicable area Zc, and the overlap buffer area 60Abc that overlaps with the outer buffer areas of the charge applicable area Zb and the charge applicable area Zc. Moreover, a portion of the outer buffer area 62A of the charge applicable area Za includes the overlap buffer area 62ab that overlaps with the outer buffer area of the charge applicable area Zb, and the overlap buffer area 62ac that overlaps with the outer buffer area of the charge applicable area Zc Moreover, a portion of the inner buffer area 60B of the charge applicable area Zb includes the overlap buffer area 60Ba that overlaps with the outer buffer area of the charge applicable area Za, the overlap buffer area 60Bc that overlaps with the outer buffer area of the charge applicable area Zc, and the overlap buffer area 60Bac that overlaps with the outer buffer areas of the charge applicable area Za and the charge applicable area Zc. In the same way, a portion of the inner buffer area 60C of the charge applicable area Zc includes the overlap buffer area 60Ca that overlaps with the outer buffer area of the charge applicable area Za, the overlap buffer area 60Cb that overlaps with the outer buffer area of the charge applicable area Zb, and the overlap buffer area 60Cab that overlaps with the outer buffer areas of the charge applicable area Za and the charge applicable area Zb. A portion of the outer buffer area 62B of the charge applicable area Zb includes the overlap buffer area 62bc that overlaps with the outer buffer area of the charge applicable area Zc.

Next, the charge amounts for the charge applicable areas of the present embodiment will be described. In the present embodiment, the charge amounts shown in Table 2 are determined for each charge applicable area.

TABLE 2

| Format | Area | | |
|---|---|---|---|
| | A | B | C |
| Area Charge (Pay Per Entry) | ¥100 | ¥150 | ¥200 |
| Distance Charge (Per 500 meters) | ¥50 | ¥75 | ¥100 |
| Time Charge (Per Minute) | ¥40 | ¥60 | ¥80 |

Next, the operation of the present embodiment will be described.

Firstly, the operation of the general center 40 will be described in detail. The general center 40 transmits information for charge processing to the in-vehicle device 30 mounted on a vehicle 32. Note that, in the present embodiment, when the charge applicable area information determined in advance in the above embodiment is read (step 304 in FIG. 5), and the GPS correction information is transmitted together with this charge applicable area information (step 306 in FIG. 5), the charge applicable area information shown in FIG. 2 is used in addition to this. The rest of this embodiment is the same as in the above embodiment and a detailed description thereof is omitted.

The operation of the in-vehicle device 30 will now be described.

Figure 14:
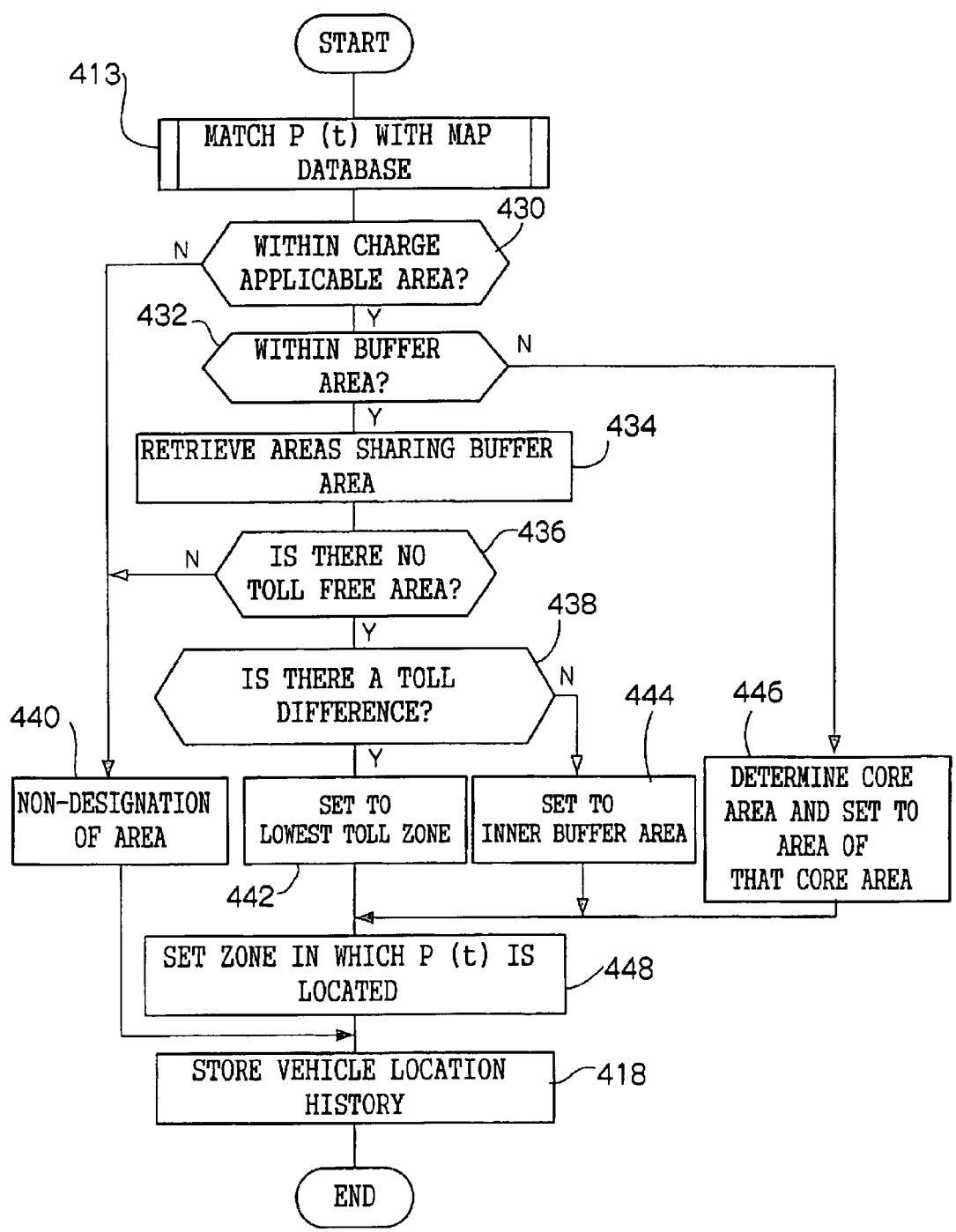
FIG. 14 is a flow chart showing the flow of processing of the second embodiment.

As is shown in FIG. 14, in step 413, the processing of steps 400 to 412 shown in FIG. 6 are executed. When the current latitude and longitude P (t) is matched with the map database, the area in which the vehicle is located is determined in the following way. Firstly, in step 430, a determination is made as to whether or not the current latitude and longitude P (t) is contained in the charge applicable area Zabc. If the determination in step 430 is negative, no area designation is required and, in step 440, area designation processing is prohibited. The routine then moves to step 418. If, however, the determination in step 430 is affirmative, the routine proceeds to step 432 and a determination is made as to whether or not the latitude and longitude P (t) is contained in one of the buffer areas. Namely, a determination is made as to whether or not the latitude and longitude P (t) is contained in any of the inner buffer areas 60A, 60B, or 60C. If the determination in step 432 is negative, the latitude and longitude P (t) is determined to be located within a core area. Therefore, the routine advances to step 446 where the relevant core area is set as the area in which the latitude and longitude P (t) is located. The routine then moves to step 448 where the area in which the latitude and longitude P (t) is located is fixed.

If the determination in step 432 is affirmative, because it is determined that the buffer area contains an overlap area, in the next step 434, the areas overlapping the relevant buffer area, namely, the common areas are retrieved. In the next step 436, a determination is made as to whether or not a toll free area is contained in the areas that were obtained as a result of the retrieval in step 434. This is because no charges are applied in buffer areas for toll free areas. If a toll free area does exist, the determination in step 436 is negative and the routine moves to step 440 where the area designation is not performed.

If there is no toll free area and the determination in step 436 is affirmative, in the next step 438, a determination is made as to whether or not a plurality of areas was retrieved in step 434 and if there is a difference in the tolls of each of the plurality of areas. If only one area was retrieved in step 434 or if there is no difference in the tolls, the determination in step 438 is negative and, in the next step 444, either the single area or the inner buffer area from out of the plurality of areas resulting from the retrieval is set as the area in which the latitude and longitude P (t) is located. The routine then proceeds to step 448.

If, however, the determination in step 438 is affirmative, the routine proceeds to step 442 where the area with the lowest toll from out of the plurality of areas is set as the area in which the latitude and longitude P (t) is located, and the routine then proceeds to step 448.

When the area determining is completed or if no area is designated, then in the same way as in the above embodiment, the latitude and longitude P (t), the date and time t thereof, and the area are stored as vehicle location history and charge processing is performed (steps 418 and 419 of FIG. 6). Note that, if no area is designated, either an empty column or a area determined beforehand as not being subject to the levying of a charge may be stored. If this processing is performed for Table 2, the area set as the charge applicable area Za comprises the core area 50A and the overlap buffer areas 60A, 60Ab, 60Abc, 60Ac, 60Ba, 60Bca, 60Cab, and 60Ca. The area set as the charge applicable area Zb comprises the core area 50B, the inner buffer area 60B that does not include an overlap buffer area, and the overlap buffer areas 60Bc and 60Cb. The area set as the charge applicable area Zc comprises the core area 50C and the inner buffer area 60C that does not include an overlap buffer area.

In the manner described above, the areas as well as the areas in which the vehicle 32 was located at each predetermined time are stored as history together with the date and time, and charge processing is performed for charge applicable areas.

Thus, in the present embodiment, an outer buffer area and an inner buffer area that have the outer border of the charge applicable area as the boundary between the two are set as the buffer area, and a determination is made as to which of these buffer areas contains the detected position. As a result, errors in the charge processing for a vehicle located outside the charge applicable area can be avoided and toll collection inside a buffer area becomes possible. Moreover, the charge applicable area with the lowest toll from among the charge applicable areas belonging to the determined buffer area is set as the relevant area enabling the charge applicable area that gives precedence to the benefit of the user to be designated. It is also possible to give precedence to the benefit of the user when toll free areas are included as these are given precedence.

Note that, in the above embodiment, it is preferable that both visual and aural notification is made to user when the vehicle enters a charge applicable area, when a vehicle is approaching a charge applicable area, when a vehicle enters a area in which a parking toll is levied, and when a vehicle is approaching a area in which a parking toll is levied. By giving notification in this way, no charge can be processed without the user's knowledge. It is also preferable that the estimated charge amount or actual charge amount is notified to the user at approximately the same time as the charge processing.

Note also that, in the above embodiment, a description has been given for when a toll is determined based on history information, however, it is also possible to perform successive charge processings without using history information.

(Third Embodiment)

The third embodiment of the present invention will now be described.

In the above embodiment, a charge applicable area is formed from a core area and a buffer area, and processing to make no charge is carried out for a vehicle that is outside the charge applicable area. However, in some cases, a vehicle may be moving around in the boundary area between a core area and a buffer area or be moving around in the boundary area between adjacent charge applicable areas. In this case, there are times when the assumption is that the vehicle has entered a charge applicable area several times creating overlapping charging, in spite of the vehicle only traveling within the charge applicable area.

In the present embodiment, entries into the same charge applicable area can be reliably detected and overlapping charges can be prevented. Note that, because the structure of the present embodiment is substantially the same as that of the above embodiment, the same portions are given the same descriptive symbols and a detailed description thereof is omitted.

Figure 15:
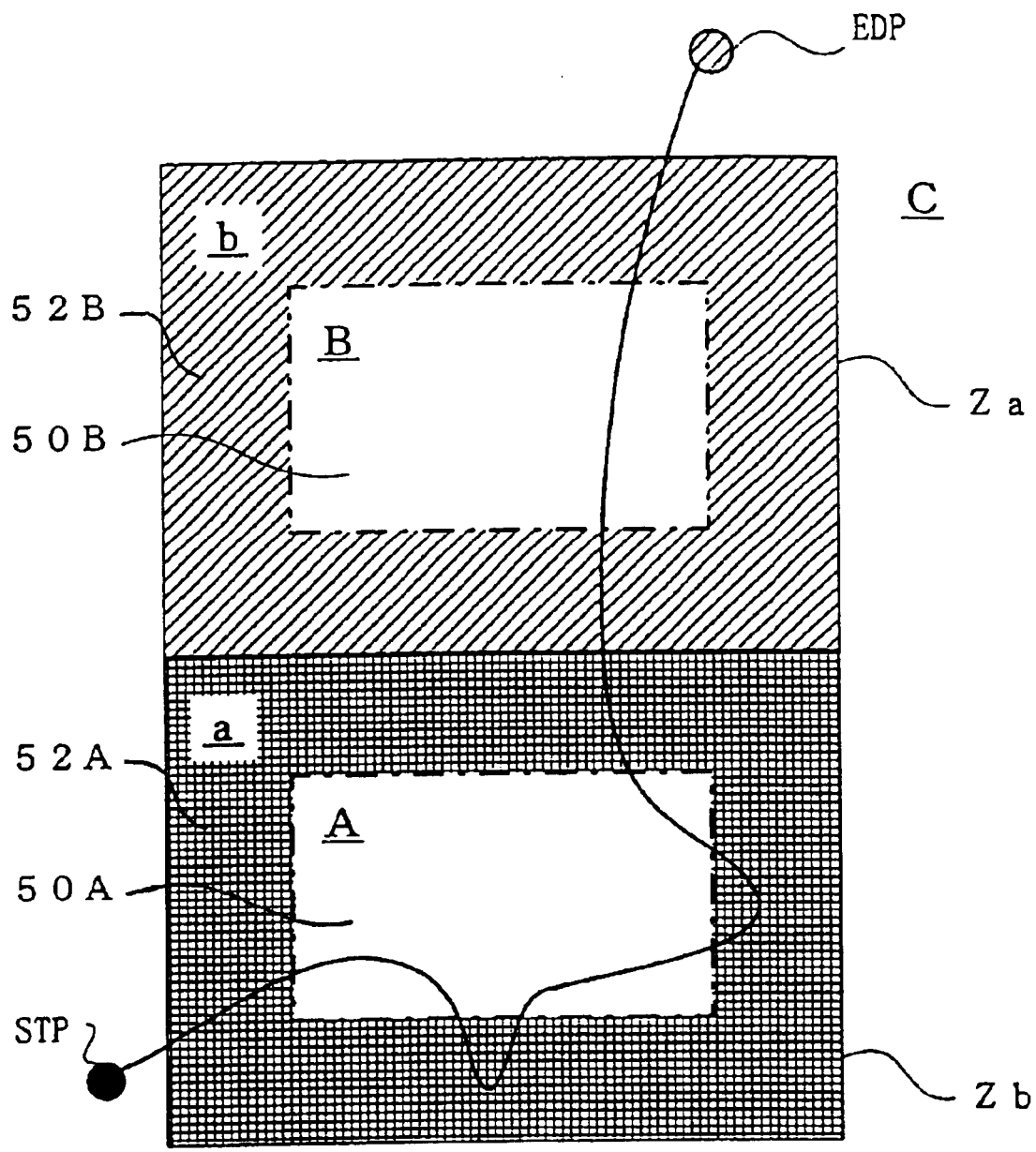
FIG. 15 is a line drawing showing the path traveled by a vehicle through the charge applicable area of the third embodiment.

As is shown in FIG. 15, the charge applicable areas of the present embodiment are formed by the charge applicable area Za comprising the core area 50A which is the area A and the buffer area 52A which is the area a, and the charge applicable area Zb comprising the core area 50B which is the area B and the buffer area 52B which is the area b. As was described for the above embodiments, the width r of each of the buffer areas 52A and 52B is set in accordance with the error in the GPS signals (wherein the position recognition error distance R<r).

Moreover, in the present embodiment, as is shown in Table 3, information to which flags have been added is stored as the vehicle location history information. These flags represent the charge applicable area in which the vehicle is located and the value representing that area is set when the vehicle first enters the core area of the charge applicable area. This value is maintained until the vehicle moves into the core area of the next charge applicable area.

TABLE 3

| Time t | | | | Latitude and Longitude P (t) | | | | |
| --- | --- | --- | --- | --- | --- | --- | --- | --- |
| Year | Month | Date | Time | Longitude | Latitude | Area | Flag | Charge |
| — | — | — | — | — | — | — | — | — |
| 1998 | 10 | 03 | 15:12 | 135-30-15 | 35-20-00 | C | D | |
| 1998 | 10 | 03 | 15:14 | 135-30-25 | 35-19-50 | a | D | * |
| 1998 | 10 | 03 | 15:16 | 135-30-35 | 35-19-40 | A | A | |
| 1998 | 10 | 03 | 15:18 | 135-30-45 | 35-19-50 | a | A | |
| 1998 | 10 | 03 | 15:20 | 135-30-55 | 35-19-40 | A | A | |
| 1998 | 10 | 03 | 15:22 | 135-31-15 | 35-19-40 | a | A | |
| 1998 | 10 | 03 | 15:24 | 135-30-55 | 35-19-30 | A | A | |
| 1998 | 10 | 03 | 15:26 | 135-30-55 | 35-19-20 | a | A | |
| 1998 | 10 | 03 | 15:28 | 135-30-55 | 35-19-10 | b | A | |
| 1998 | 10 | 03 | 15:30 | 135-30-55 | 35-19-00 | B | B | * |
| 1998 | 10 | 03 | 15:32 | 135-30-55 | 35-18-50 | b | B | |
| 1998 | 10 | 03 | 15:34 | 135-30-55 | 35-18-40 | C | B | |
| — | — | — | — | — | — | — | — | — |

The operation of the in-vehicle device 30 will now be described. Note that, because the processing on the ground side is the same as that of the above embodiments, a detailed description thereof is omitted. In addition, the area determination processing from out of the processings performed by the in-vehicle device 30 is the same as in the above embodiments, and only those portions thereof that are different, namely, the setting of the flags shown in Table 3 and the storing of the information with the addition of the flag in the processing to store the vehicle location history are described in detail.

As is shown in FIG. 16, in steps 413 and 414, the current latitude and longitude P (t) is matched with the map database. When the area in which the latitude and longitude P (t) is located has been determined, the flag is set in the following manner. Firstly, in step 450, a determination is made as to whether or not the latitude and longitude P (t) is contained within the core area of the charge applicable area. If the determination in step 450 is negative, the latitude and longitude P (t) is either in the buffer area or outside the charge applicable area, therefore, a further determination is made in the next step 452 as to whether or not the latitude and longitude P (t) is inside the charge applicable area. If the determination in step 452 is negative, because there is no need for a flag to be set for the charge processing, the flag F is reset in step 456 and the routine moves to step 462. In step 462, history information including the flag is stored. If, however, the determination in step 452 is affirmative, the latitude and longitude P (t) is within the buffer area, therefore, the routine moves to step 458 where the flag is maintained. The routine then moves to step 462.

if the determination in the above step 450 is affirmative, the routine moves to step 454 where a determination is made as to whether or not the charge applicable area represented by the currently set flag F is the same area as the charge applicable area that contains the area set in the above step 414. If the determination in step 454 is affirmative, then it is determined that the vehicle has already entered and has remained in the core area and, in the next step 458, the flag is maintained. The routine then moves to step 462. If, however, the determination in step 454 is negative, then it is determined that the vehicle has entered the current core area by traveling from a different core area. Accordingly, in step 460, the flag F representing the charge applicable area that contains the area set in the above step 414 is set to a new flag and, in the next step 462, the history information including the flag is stored and the current routine is ended.

Next, the charge processing in the in-vehicle device 30 (step 419 shown in FIG. 6) will be described. The charge processing is performed at predetermined times. The processing may be performed at predetermined times such as every hour, a predetermined day of every week, a predetermined date and time of every month, or a predetermined year, month, date, and time. Note that the execution of this charge processing may also be performed when a vehicle enters into or exits from a core area or may be performed in response to an instruction from the general center 40.

Note that, because the charge processing of the present embodiment is substantially the same as the charge processing of FIG. 7, the following description refers to the processing in FIG. 7. Firstly, at a predetermined date and time, when there has been a crossing of a boundary, or when an instruction is given from the general center 40 (step 420 in FIG. 7), the history information is acquired (step 422). This history information is the vehicle location history list (Table 3) that includes the flag F stored in step 462 in FIG. 16. In the next step 424, the calculation formula (charge calculation formula) is set.

The charge calculation formula is determined by the above calculation conditions. In the present embodiment, a description is given of when the number of entries into a area is used as the calculation condition, namely, as the charge calculation condition. The charge calculation formula is set using this calculation condition (a charge based on the number of entries into each area). This charge calculation formula is the same as the above formula (2). An example of the calculation of the evaluation values is given below.

$N_A$, $N_B$ are taken as evaluation values for the areas A and B, and

Evaluation value $N_A = \{(1$ in core area A, 0 in others$)\times(1$ in previous flag A, 0 in others$)\}$ Evaluation value $N_B = \{(1$ in core area B, 0 in others$)\times(1$ in previous flag B, 0 in others$)\}$.

Namely, when the flag F representing the charge applicable area is the same, the number of entries is converted to 1 regardless of how many entries have been made into the core area. In other words, the number of groups containing the core area A and comprising a record of continuous flags A equates to the number of entries into the charge applicable area Za on which a charge can be levied. In the same way, the number of groups containing the core area B and comprising a record of continuous flags B equates to the number of entries into the charge applicable area Zb on which a charge can be levied.

If the unit price charged according to the number of entries (for example, ¥100 per entry) is added to this evaluation value, the toll is determined.

Accordingly, the toll is calculated (step 426) using the history information and the set calculation formula and, when no IC card 232 is loaded in the IC card read/write device 234, the calculated toll is stored in memory in the adding process (i.e. step 428 after a negative determination has been made in step 427). If, however, an IC card 232 is loaded in the card read/write device 234, charge processing is performed to subtract the charge amount from the balance on the card 232 (i.e. step 428 after a positive determination has been made in step 427).

For example, as is shown in FIG. 15, if the history information is for the route from the start point STP to the end point EDP, then even if several entries are made into the core area 50A, there is only one entry into the charge applicable area Za, therefore, the charge amount is calculated for one entry into the charge applicable area Za and one entry into the charge applicable area Zb.

Thus, in the present embodiment, because a flag representing the relevant charge applicable area is maintained in a set state when a vehicle is traveling through that charge applicable area, when a vehicle is traveling through the charge applicable area, even if there is really a plurality of entries into the core area that are to be charged, it is possible to levy a charge for only one entry. Therefore, there is no overlapping of charges in the same charge applicable area.

Note that, in the present embodiment, a description is given of when a toll is determined on the basis of history information, however, the present embodiment can also be easily applied when charge processing is performed at the point of entry. In this case, while the vehicle is present within the charge applicable area, the relevant flag representing that charge applicable area is maintained and a charge only needs to be levied when no flag representing the relevant charge applicable area has been set.

(Fourth Embodiment)

The fourth embodiment will now be described. In the above embodiments, processing to apply a charge is performed for the charge applicable areas, however, when a state in which a complete toll unit is not reached, the toll is discarded. Therefore, in the present embodiment, the toll is integrated when the state where a unit is not reached is maintained and held over until the next time in a continuous manner. Note that, because the present embodiment is substantially the same as the above embodiments, the same descriptive symbols are given to the same portions and a detailed description thereof is omitted. Moreover, in the present embodiment, the integration memory Xi (where i=A, B, C: corresponding to the area) for the distance traveled, and the integration memory Ti (where i=A, B, C: corresponding to the area) for the time are provided as the integration memory. These integration memories may be formed from separate memories or may be formed using memory variables.

In the present embodiment, a description is given using the charge applicable areas shown in FIG. 13. Moreover, in the present embodiment, a description is given using the toll system shown in the following Table 4 for the vehicle location history information.

TABLE 4

| Format | Area | | |
|---|---|---|---|
|  | A | B | C |
| Distance Charge (Per 500 meters) | ¥50 | ¥50 | ¥50 |
| Time Charge (Per Minute) | ¥40 | ¥40 | ¥40 |

Next, the operation of the present embodiment will be described.

Firstly, the operation of the general center 40 will be described in detail. The general center 40 transmits information for charge processing to the in-vehicle device 30 mounted on a vehicle 32. Note that, in the present embodiment, when the charge applicable area information determined in advance in the above embodiments is read (step 304 in FIG. 5), and the GPS correction information is transmitted together with this charge applicable area information (step 306 in FIG. 5), the charge applicable area information is used in addition to the charge applicable area information shown in FIG. 4. The rest of the structure is the same as in the above embodiments and a detailed description thereof is omitted.

The operation of the in-vehicle device 30 will now be described.

Figure 17A:
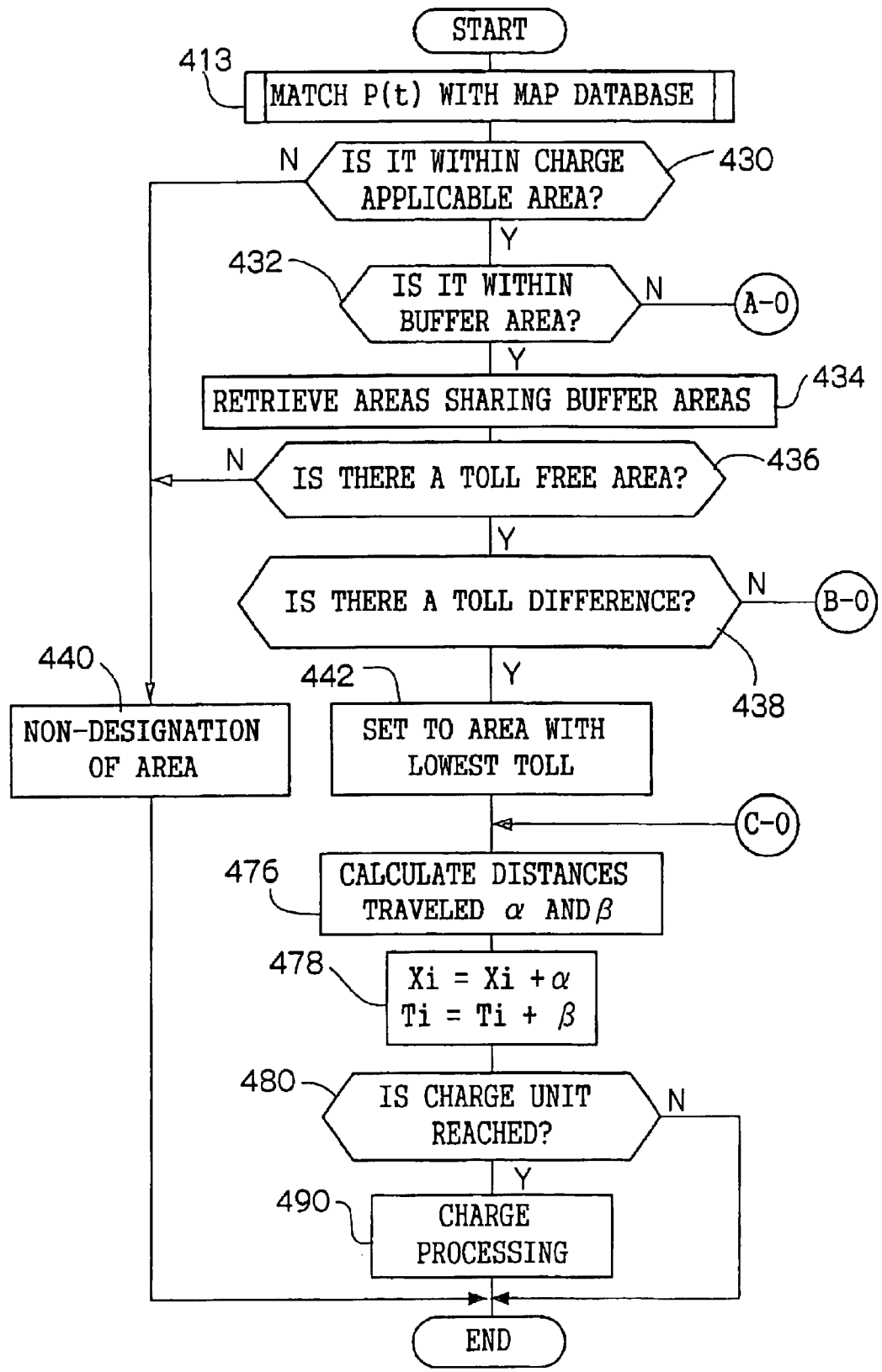
FIGS. 17A and 17B are flow charts showing the flow of processing of the fourth embodiment.
Figure 17B:
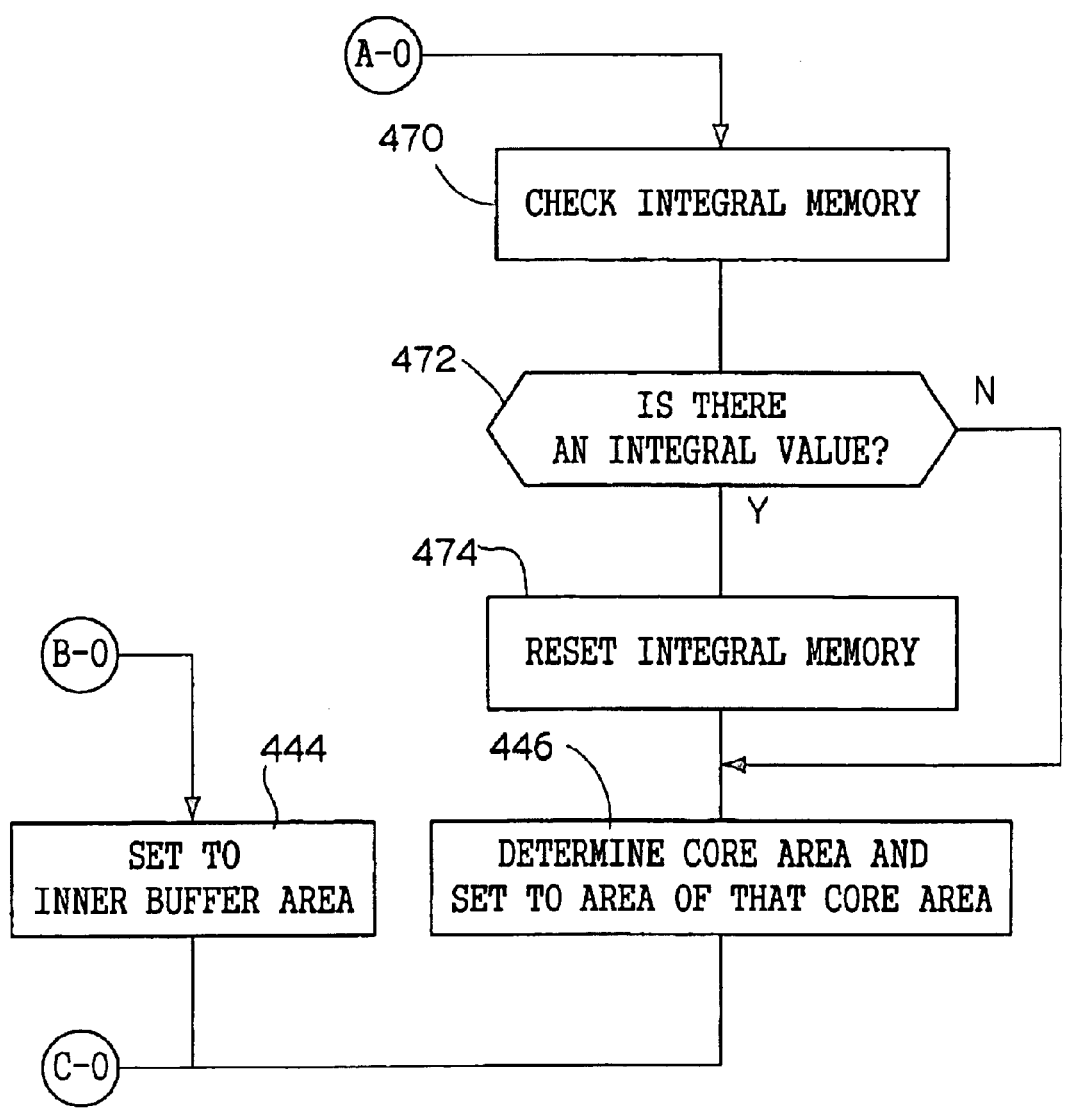

As is shown in FIGS. 17A and 17B, in step 413, when the current latitude and longitude P (t) is matched with the map database, the area in which the vehicle is located is determined in the following way. Firstly, if the current latitude and longitude P (t) is not contained in the charge applicable area Zabc (i.e. the determination in step 430 is negative), no area designation is performed (step 440) and the current routine is ended. If, however, the current latitude and longitude P (t) is contained in the charge applicable area Zabc (i.e. the determination in step 430 is affirmative), a determination is made as to whether or not the latitude and longitude P (t) is contained in one of the buffer areas, namely, a determination is made as to whether or not the latitude and longitude P (t) is contained in any of the inner buffer areas 60A, 60B, or 60C (step 432). If the determination in step 432 is negative then, in step 470, the integration memories (Xi and Ti) are checked and, in the next step 472, a determination is made as to whether or not data is stored in integration memory (Xi, Ti) other than for the relevant area. If this is not the case, the determination in step 472 is negative and the routine moves to step 446. If, however, the determination in step 472 is affirmative, then, in step 474, the integration memory (Xi, Ti) other than in the relevant area is reset and the routine moves to step 446. In step 446, the relevant core area is set as the area in which the latitude and longitude P (t) is located.

If the determination in step 432 is affirmative, as described above, the common areas are retrieved (step 434). A determination is then made as to whether or not a toll free area is contained in the areas that were obtained as a result of the retrieval (step 436). If a toll free area does exist (i.e. if the determination in step 436 is negative), area designation is not performed (step 440) and the current routine is ended.

If there is no toll free area (i.e. the determination in step 436 is affirmative), a determination is made as to whether or not there is a difference in the tolls (step 438). If only one area was retrieved or if there is no difference in the tolls (i.e. the determination in step 438 is negative), either the single area or the inner buffer area from out of the plurality of areas resulting from the retrieval is set as the area in which the latitude and longitude P (t) is located (step 444). If, however, the determination in step 438 is affirmative, the area with the lowest toll from out of the plurality of areas is set as the area in which the latitude and longitude P (t) is located (step 442).

In the next step 476, the current distance traveled a and the travel time β in the relevant area are calculated and, in the next step 478, the integration calculation of the distance traveled and travel time in the relevant area is performed and the result stored in the integration memory (Xi, Ti). Note that, the distance traveled a and the travel time β may be determined using a function of the navigation system itself or may be determined from the odometer and clock installed in the vehicle. In the next step 480, a determination is made as to whether or not the values in the stored integration memory have reached a charge unit. If they do not reach a charge unit, the current routine is ended. If they do reach a charge unit, then, in the next step 490, charge processing is performed for the toll for the charge unit.

Figure 18:
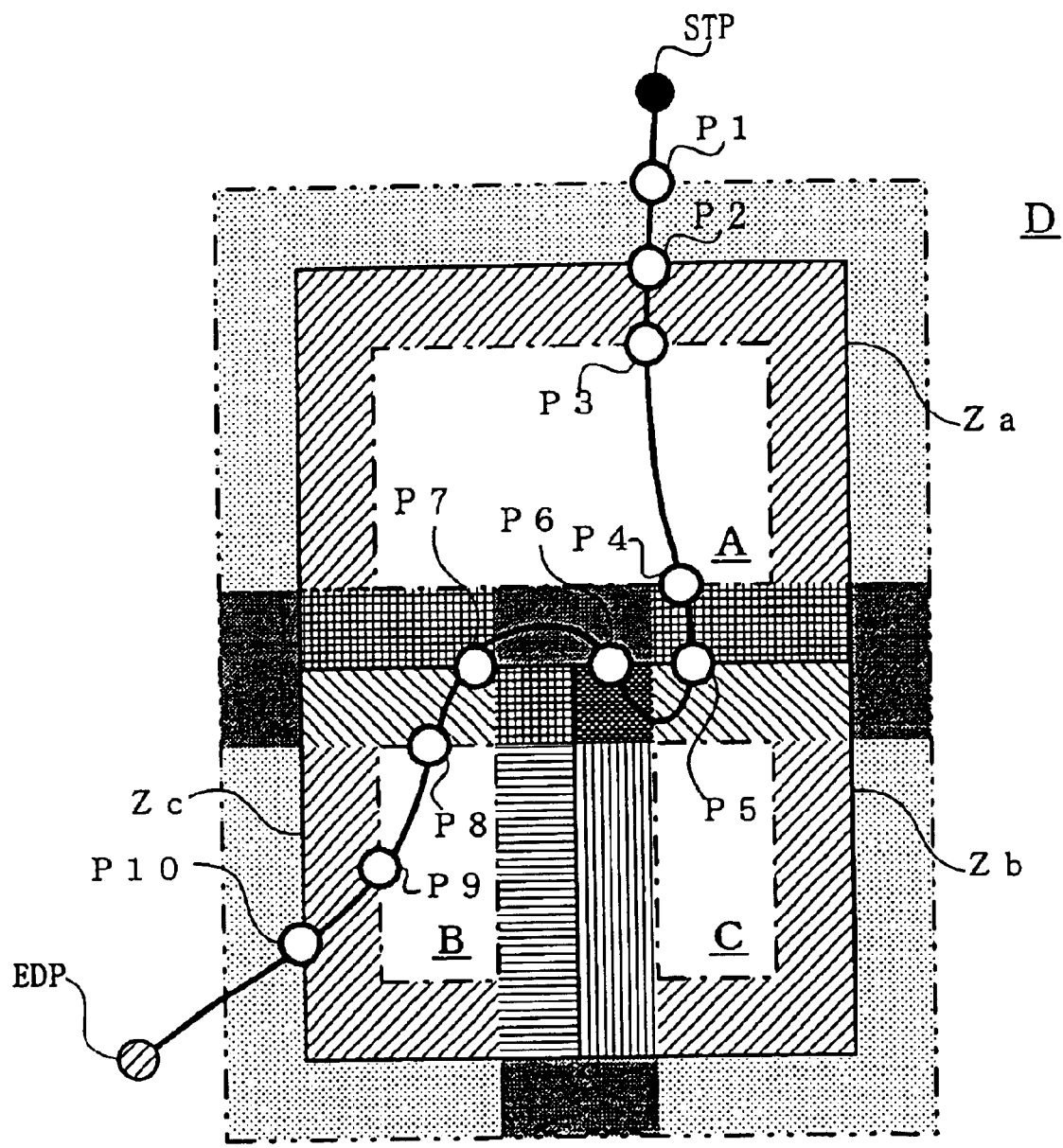
FIG. 18 is a line drawing showing the path traveled by a vehicle through the charge applicable area of the fourth embodiment.

For example, as is shown in FIG. 18, the history information is for the route from the start point STP to the end point EDP, and the points of the boundary portions between the buffer areas and the core areas that the vehicle passes through are taken as the points P1, P2, P3, P4, P5, P6, P7, P8, P9, and P10. The area between the start point STP and the point P1 is not a charge applicable area, therefore, the area is not set. Between the point P1 and the point P2 is where the vehicle travels through the outer buffer area of the charge applicable area Za, however, because the charge applicable area is not yet set, the integration memory is reset. Between the point P2 and the point P3 is where the vehicle travels through the inner buffer area of the charge applicable area Za, however, because the charge applicable area is not yet set, the integration memory is reset.

Between the point P3 and the point P4 is set as the charge applicable area Za when the vehicle has reached the point P3 (or gone past the point P3) and a charge is levied according to the distance traveled and the travel time. Between the point P4 and the point P5 is the inner buffer area of the charge applicable area Za, therefore, the integration memories ($X_A$, $T_A$) of the charge applicable area Za are integrated and the other integration memories ($X_B$, $T_B$, Xc, and $T_c$) are maintained. However, these integration memories are reset because no charge can yet be applied in the charge applicable areas Zb and Zc.

Between the point P5 and the point P6 is the inner buffer area of the charge applicable area Zc, therefore, the integration memories ($X_C$, $T_C$) of the charge applicable area Zc are intergrated and the other integration memories ($X_B$, $T_B$, $X_A$, and $T_A$) are maintained. Between the point P6 and the point P7 is the inner buffer area of the charge applicable area Za, therefore, the integration memories ($X_A$, $T_A$) of the charge applicable area Za are intergrated and the other integration memories ($X_B$, $T_B$, $X_C$, and $T_C$) are maintained. Between the point P7 and the point P8 is the inner buffer area of the charge applicable area Zb, therefore, the integration memories ($X_B$, $T_B$) of the charge applicable area Zb are intergrated and the other integration memories ($X_C$, $T_C$, $X_A$, and $T_A$) are maintained.

When the vehicle reaches or goes past the point P8, because this is the next charge processing area, the integration memories ($X_C$, $T_C$, $X_A$, and $T_A$) other than the integration memories ($X_B$, $T_B$) of the charge applicable area Zb are reset. Between the point P8 and the point P9, the integration memories ($X_B$, $T_B$) of the charge applicable area Zb are integrated and a charge is levied according to the distance traveled and the travel time. Between the point P9 and the point P10 is the inner buffer area of the charge applicable area Zb, therefore, the integration memories ($X_B$, TB) of the charge applicable area Zb are integrated and the other integration memories ($X_A$, $T_A$, $X_C$, and $T_C$) are maintained. Between the point P10 and the end point EDP is outside the charge applicable areas, therefore, the integration memory is reset.

In this way, in the present embodiment, the distance traveled and travel time of a vehicle traveling through a buffer area are integrated until they reach the unit for charging, and toll collection is then performed for that charge unit. Therefore, even if the area designation frequently changes, it is possible to collect a toll in accordance with those changes.

(Fifth Embodiment)

The structure of the fifth embodiment is the same as that of the above described first embodiment, therefore a description thereof is omitted.

The operation of the fifth embodiment will now be described. Note that portions of the operation of the present embodiment (i.e. the operation of the general center 40—see FIG. 5; and the charge processing of the in-vehicle device 30—see FIG. 7) are also the same as that of the above first embodiment, therefore a description of these identical portions is omitted.

In the above described first embodiment, a charge applicable area is formed from a core area which is essentially the area in which the charge is levied and a buffer area that is provided around the core area and corresponds to the size of any error in the position recognition when GPS is being used. In the present embodiment, however, the area peripheral to the core area 50 is defined as the peripheral area 52, and a predetermined range from the position detected as the position of the vehicle is set as a buffer area. Essentially, charge processing is performed only when the entire buffer area is contained in the area in which a charge is applied.

Moreover, in the present embodiment, the charge amount is fixed for (the core area 50 and the peripheral area 52 of) the charge applicable area.

In order to simplify the description given below, only one charge applicable area Z in which the charge amount is set only for the core area 50 as the charge applicable area (i.e. no charge amount is set for the peripheral area 52) is described.

Figure 19:
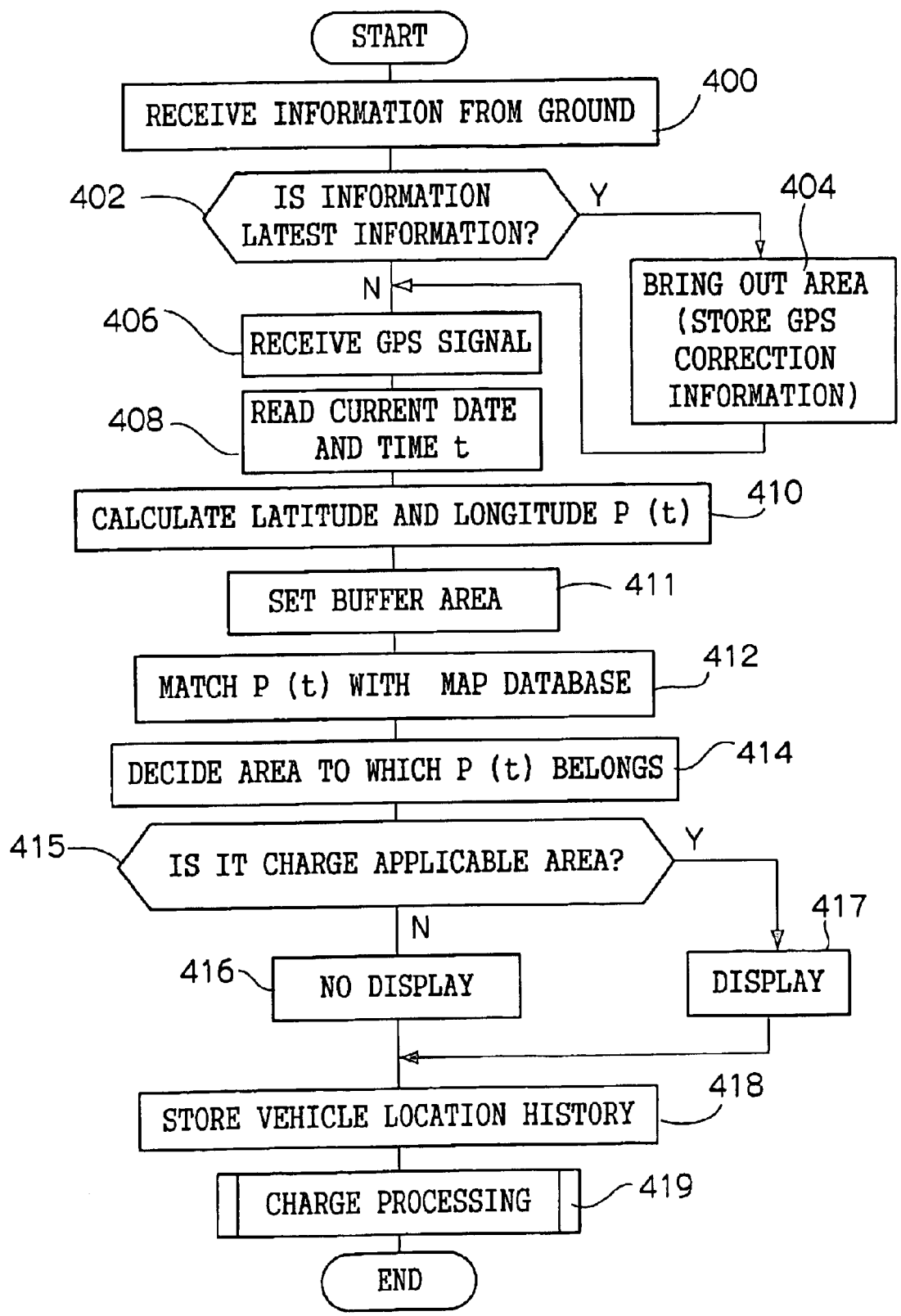
FIG. 19 is a flow chart showing the flow of processing to fix a charge applicable area executed in the in-vehicle device of the fifth embodiment.
Figure 20:
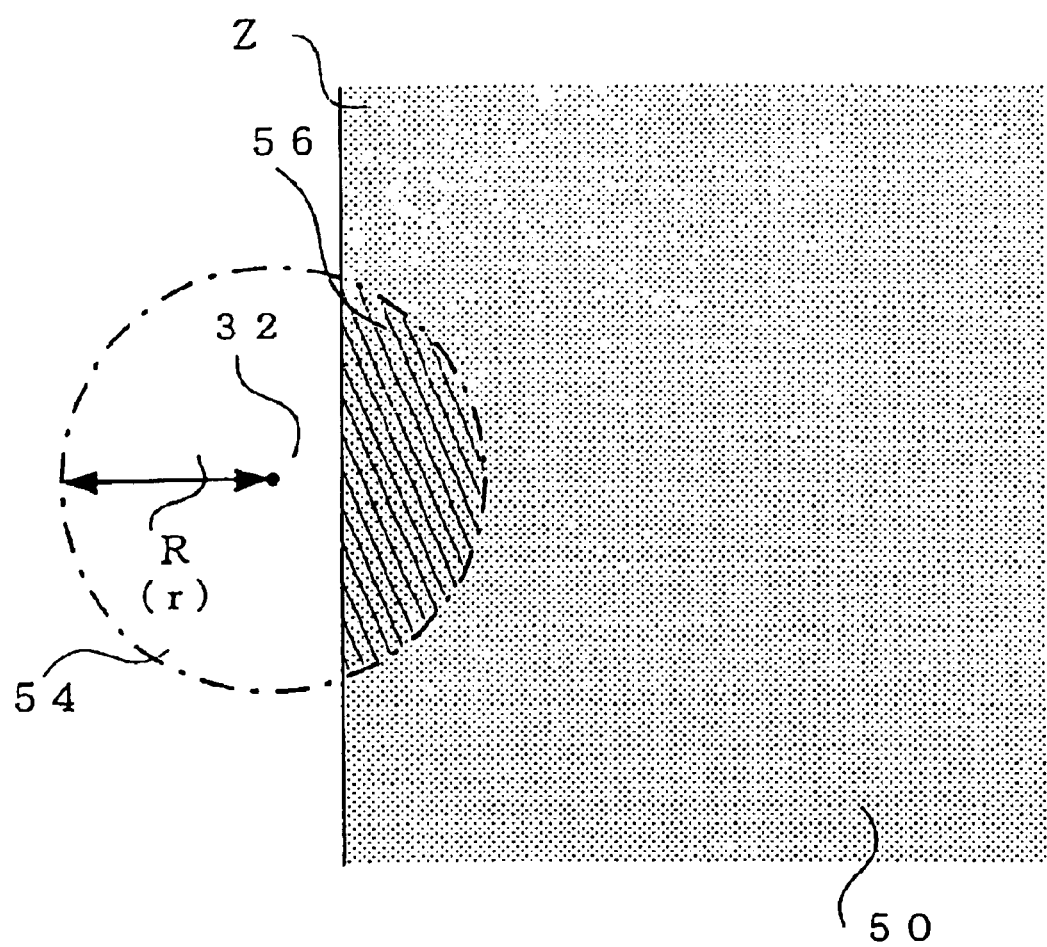
FIG. 20 is an explanatory view showing detection errors of the fifth embodiment.

Because portions of the operation of the in-vehicle device 30 are the same as the operation of the in-vehicle device 30 according to the above described first embodiment, the same descriptive symbols are given to these identical portions and a detailed description thereof is omitted. Only those portions that are different are described. As is shown in FIG. 19, in the in-vehicle device 30 according to the present embodiment, the steps 400 to 410 are performed and then, in the next step 411, the position of the in-vehicle device 30 itself as determined in the above step 410 is set as a center point. Around this center point is then set a buffer area 54 having a radius r having a predetermined length (for example 100 meters) that is determined on the basis of the amount of error in the GPS detection. There is a high probability that the host vehicle (i.e. the vehicle in which the in-vehicle device 30 is installed) is located within this buffer area 54.

In the next step 412, the determined latitude and longitude P(T) and the buffer area 54 are matched with a map database that has been stored in the in-vehicle device 30 in advance. In the next step 414, the area in which the latitude and longitude P(T) and the buffer area 54 belong is set. The area in which the host vehicle is located is set as either the peripheral area 52 (i.e. area B), the core area 50 (i.e. area A), or another area (i.e. area C) (this is described below in detail). Steps 415 to 419 are then performed. Note that it is also possible to store information relating to the above determined buffer area 54 in the vehicle location history in step 418.

A detailed description will now be given of the setting of the areas of the present embodiment. A charge applicable area is a area in which a charge may be levied on a vehicle that has entered into that area. A charge may not be applied to any vehicle when it is outside that area. As mentioned above, when GPS is used, it is understood that there will be a position recognition error of a predetermined amount. Therefore, as is shown in FIG. 10, for example, when a vehicle 32 is actually positioned outside the charge applicable area Z, the current position thereof as detected by the GPS is an undefined point within a recognized position existence probability circle 54 that has the position recognition error distance R as the radius thereof. Accordingly, if it is detected at a position within the area of overlap 56 (the area indicated by the cross net pattern in FIG. 10) between the recognized position existence probability circle 54 and the charge applicable area Z, a charge is levied regardless of the fact that the vehicle has not actually entered into the charge applicable area. Namely, the overlap area 56 becomes the erroneous charge area.

Therefore, in the present embodiment, the recognized position existence probability circle is set as the buffer area 54. Namely, a buffer area 54 is set so as to have a radius r which is longer than the position recognition error distance R (R<r). As a result of this, when the vehicle is actually outside the charge applicable area, the recognized position existence probability circle 54 at the position detected by the GPS does overlap with the core area 50, however, it is not completely contained inside the core area 50. Accordingly, when the entire buffer area 52 is recognized as not being contained within the core area 50, because it is possible that the vehicle is not within the charge applicable area, authorization to place the vehicle within the charge applicable area is denied.

Figure 21A:
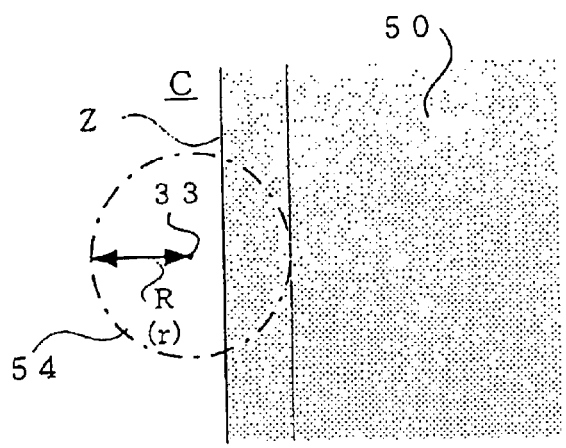
FIGS. 21A through 21D are explanatory views for explaining the area determination around a buffer area of the fifth embodiment.
Figure 21B:
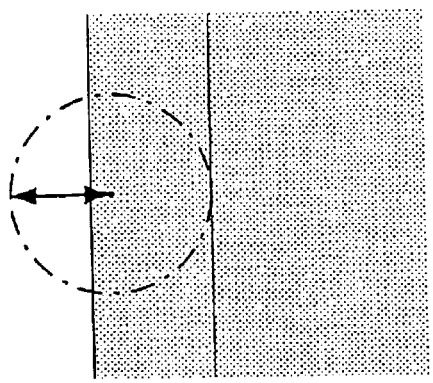
Figure 21C:
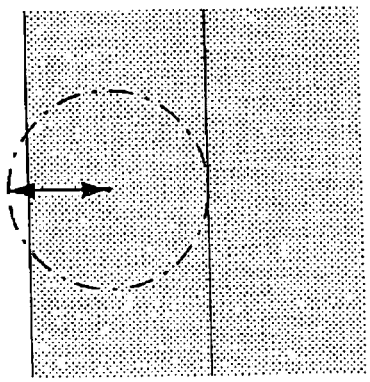
Figure 21D:
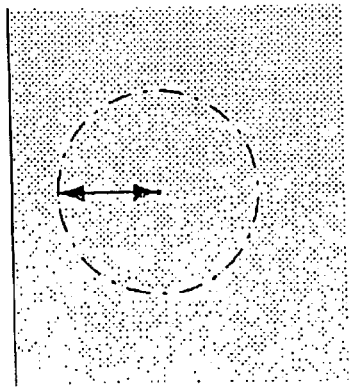

Specifically, as is shown in FIG. 21A, if the position 33 of the vehicle detected by the GPS is outside the charge applicable area Z (i.e. in area C), because it is possible that, although the actual position of the vehicle is an arbitrary point within the buffer area 54, the vehicle is not in fact inside the charge applicable area, the determination of whether or not the vehicle is within the charge applicable area is negative. As is shown in FIG. 21B, even when the detected vehicle position 33 is within the core area 50 and is moving in a direction towards the charge applicable area Z, there is still a possibility that the vehicle is not present within the charge applicable area. Moreover, as is shown in FIG. 11C, even when the detected vehicle position 33 is within the core area 50, because there is still a possibility that the vehicle is not present within the charge applicable area, the determination of whether or not the vehicle is within the charge applicable area is negative. As is shown in FIG. 21D, when the detected vehicle position 33 has moved within the core area 50, because the buffer area 54 is completely inside the charge applicable area Z, it is determined that the vehicle is now within the charge applicable area.

Accordingly, if a charge is levied only when the detected vehicle position 33 is detected inside the core area 50, there is no charge levied when the vehicle has not actually entered into the charge applicable area. Namely, there is no acknowledgement that a vehicle that is outside the charge applicable area is inside the charge applicable area. By using this setup, when a vehicle is moving in a direction approaching the core area 50, it is possible to designate with certainty that only a vehicle that has been detected inside the core area 50 is present inside the charge applicable area.

As has been described above, in the present embodiment, the position of a host vehicle is specified using GPS signals and when the vehicle has entered into a charge applicable area, this fact is notified to the vehicle occupants. Moreover, a buffer area that is based on the amount of error in the GPS is set as the position of the host vehicle and a charge is levied based on the relationship between buffer area and the core area which serves as the area in which a charge is actually levied only when the entire buffer area is contained within the core area. As a result, even if there is an error in the vehicle position recognition, a vehicle which is positioned outside the charge applicable area is never determined to be within the charge applicable area where a charge is levied. Therefore, there is no beginning of wrongful charge processing due to GPS position recognition error.

(Sixth Embodiment)

Next, the sixth embodiment will be described. Note that, because the present embodiment has substantially the same structure as the above described fifth embodiment, the same descriptive symbols are given to the same portions and a detailed description thereof is omitted. In the present embodiment, a description is given of the processing performed in locations where communication is difficult such as when the vehicle is traveling through as tunnel or the like.

In order to set the buffer area 54, it is necessary to specify the current position using GPS signals. However, in an area where communication is difficult such as when the vehicle is traveling through a tunnel or the like, the current position of the host vehicle may become unclear. Therefore, in the present embodiment, the buffer area and the like are determined on the basis of the direction in which the vehicle is traveling and the distance traveled by the vehicle.

The operation of the present embodiment will now be described. Firstly, because the operation of the general center 40 and the like is the same as in the above embodiments, only the operation of the in-vehicle device 30, which is different, will be described.

Figure 22:
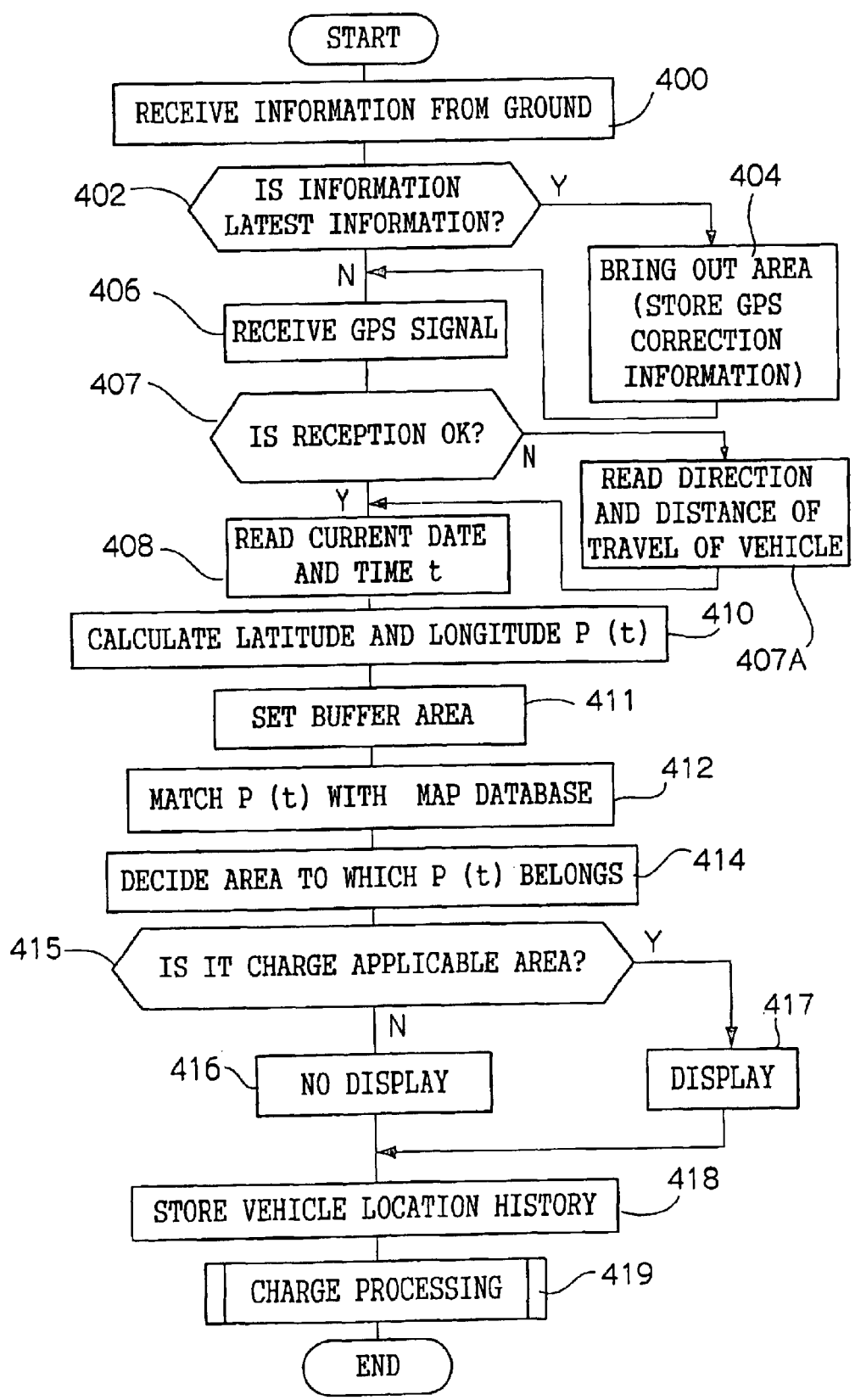
FIG. 22 is a flow chart showing the flow of charge processing executed in the in-vehicle device of the sixth embodiment.

As is shown in FIG. 22, the following interrupt processing is performed at predetermined times (for example, every 1 minute) in the in-vehicle device 30 mounted in a vehicle. Information is received from the ground side, namely, from the general center 40 (step 400). If it is not possible to receive information from the general center 40, the routine moves to step 406 without further processing (i.e. the determination in step 402 is negative).

In step 406, GPS signals from the GPS satellites 20, 22, and 24 are received. In the next step 407, a determination is made as to whether or not the signals were able to be received. If the signals were able to be received, the routine moves to step 408 without further processing. If, however, signals were not able to be received, the determination in step 407 is negative. Next, in step 407A, the direction in which the vehicle is traveling and the distance traveled are read and the routine then moves to step 408.

In step 408, the current date and time Sear, month, date, time) are read and, in step 410, the in-vehicle device's own position, namely, the position of the host vehicle 32 (latitude and longitude P (t)) is determined. When determining the latitude and longitude P (t) when GPS signals cannot be received, the current position is estimated from the previously stored vehicle position using the direction in which the vehicle is traveling and the distance traveled read in step 407A.

Next, in step 411, the determined or estimated position of the in-vehicle device 30 is set as a center point and around this center point is set a buffer area 54 having a radius r having a predetermined length (for example 100 meters) that is determined on the basis of the amount of error in the GPS detection. The determined latitude and longitude P (t) and the buffer area 54 are then matched with a map database (step 412), and the area in which the latitude and longitude P (t) and the buffer area 54 are located are then set (step 414).

In this way, in the present embodiment, even if it was not possible to receive a GPS signal, the position of the host vehicle can be estimated from the direction in which the vehicle is traveling and the distance traveled and the buffer area thus determined. Therefore, even if reception of a portion of the signals becomes difficult while the vehicle is traveling, it is possible to prevent the system from stopping and processing for toll collection can be performed continuously.

(Seventh Embodiment)

Because portions of the structure of the present embodiment are the same as the structure of the above described first embodiment, a description of these identical portions is omitted and only those portions that are different are described.

An example of a wireless communication device used in the ground wave communication device 122 of the general center 40 according to the present embodiment is one that uses FM multiplex communication or optical communication.

The in-vehicle device 30 specifies the position of the host vehicle 32 using GPS signals from the GPS satellites 20, 22, and 24 and charge processing (i.e. calculation) is performed based on information for the specified position and charge information including data such as the charge applicable area, the charge amount, and the like transmitted from the general center 40. The charge processing is performed based on the results of this processing.

An example of a wireless communication device used as the ground wave communication device 222 of the in-vehicle device 30 is one that uses FM multiplex communication.

Figure 23:
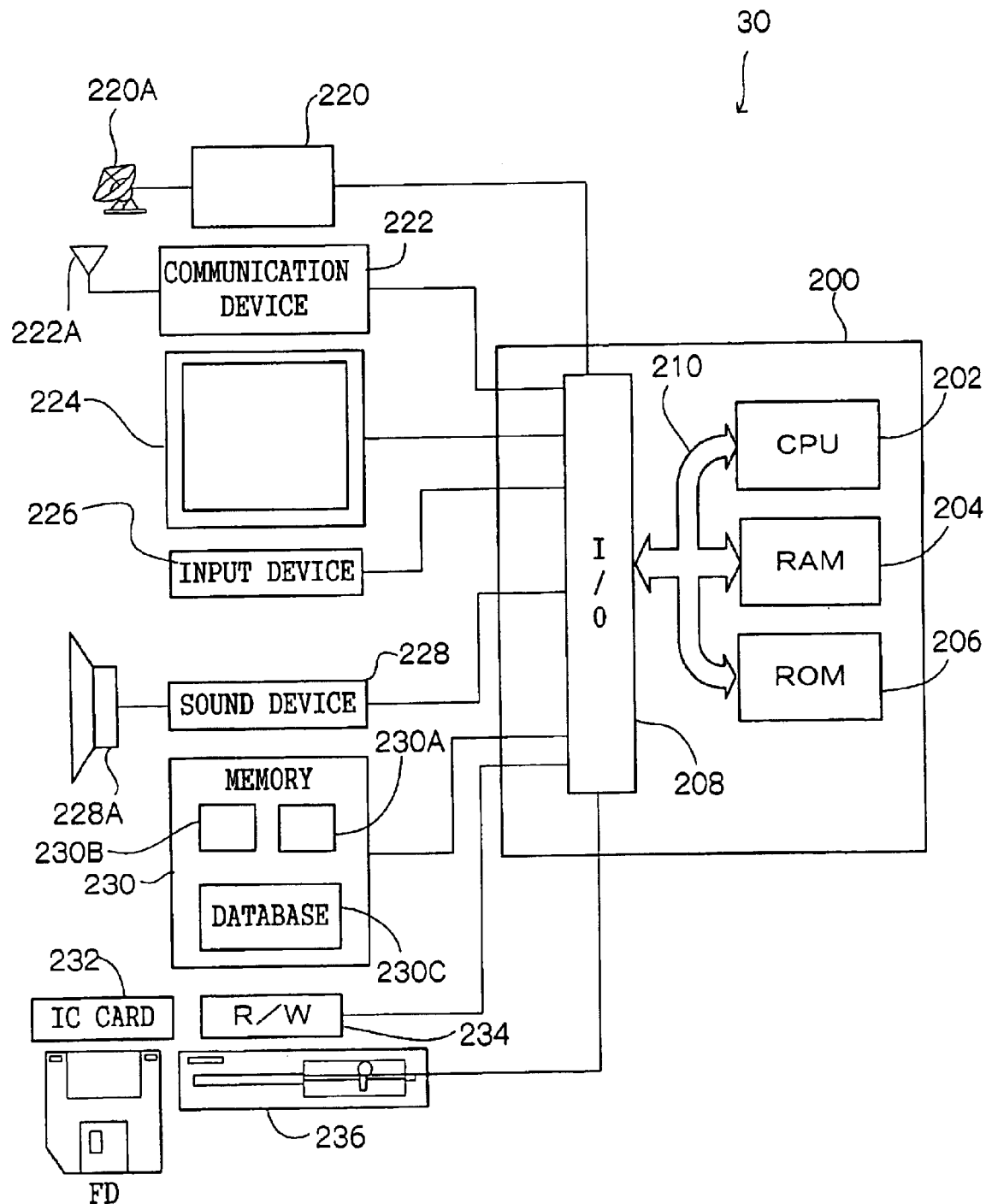
FIG. 23 is a block diagram showing the schematic structure of an in-vehicle device in the automatic charging system of the seventh embodiment.

As is shown in FIG. 23, memory 230 is connected to the input/output port 208 of the in-vehicle device 30. This memory 230 includes storage areas 230A and 230B for storing charge information transmitted from the general center 40, and a map database 230C in which map information for providing route information as images to assist the driver is stored. Note that, in the present embodiment, it is possible to omit the display 229 of the above described first embodiment.

The operation of the present embodiment will now be described.

Firstly, the operation of the ground side, namely, the general center 40 will be described in detail. In the present embodiment, the general center 40 transmits information used for charge processing to the in-vehicle device 30 installed in a vehicle 32.

Figure 24:
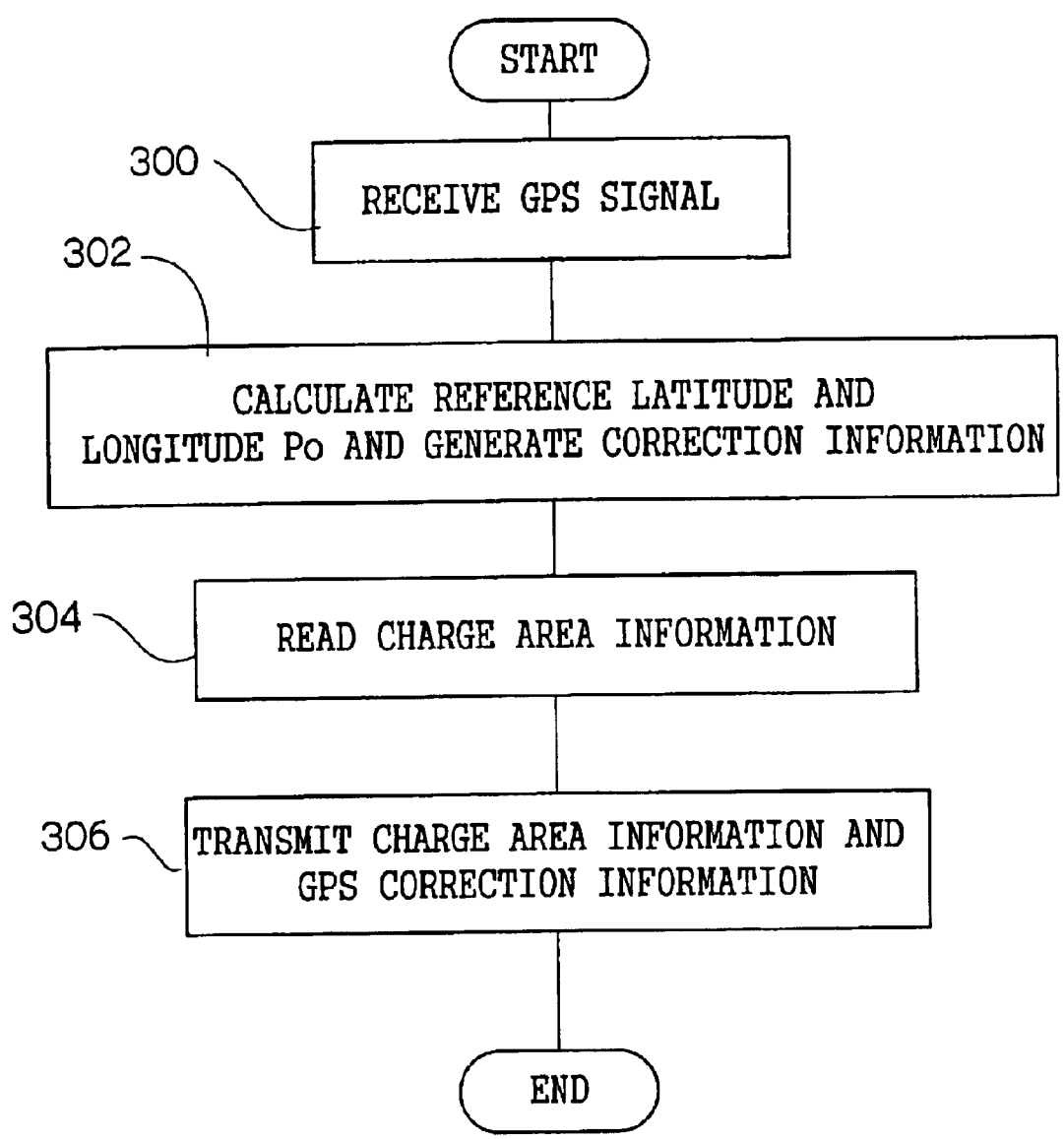
FIG. 24 is a flow chart showing the flow of information transmission processing executed in a general center.

As is shown in FIG. 24, the above described steps 300 and 302 are performed in the general center 40, then, in step 304, charge information is read from the memory 124, and GPS correction information is transmitted together with this charge information in the next step 306. This transmission may be performed using FM multiplex communication or using telephone circuitry, for example, and it is possible to transmit charge information using the same communication protocol as the GPS correction information.

Figure 25:
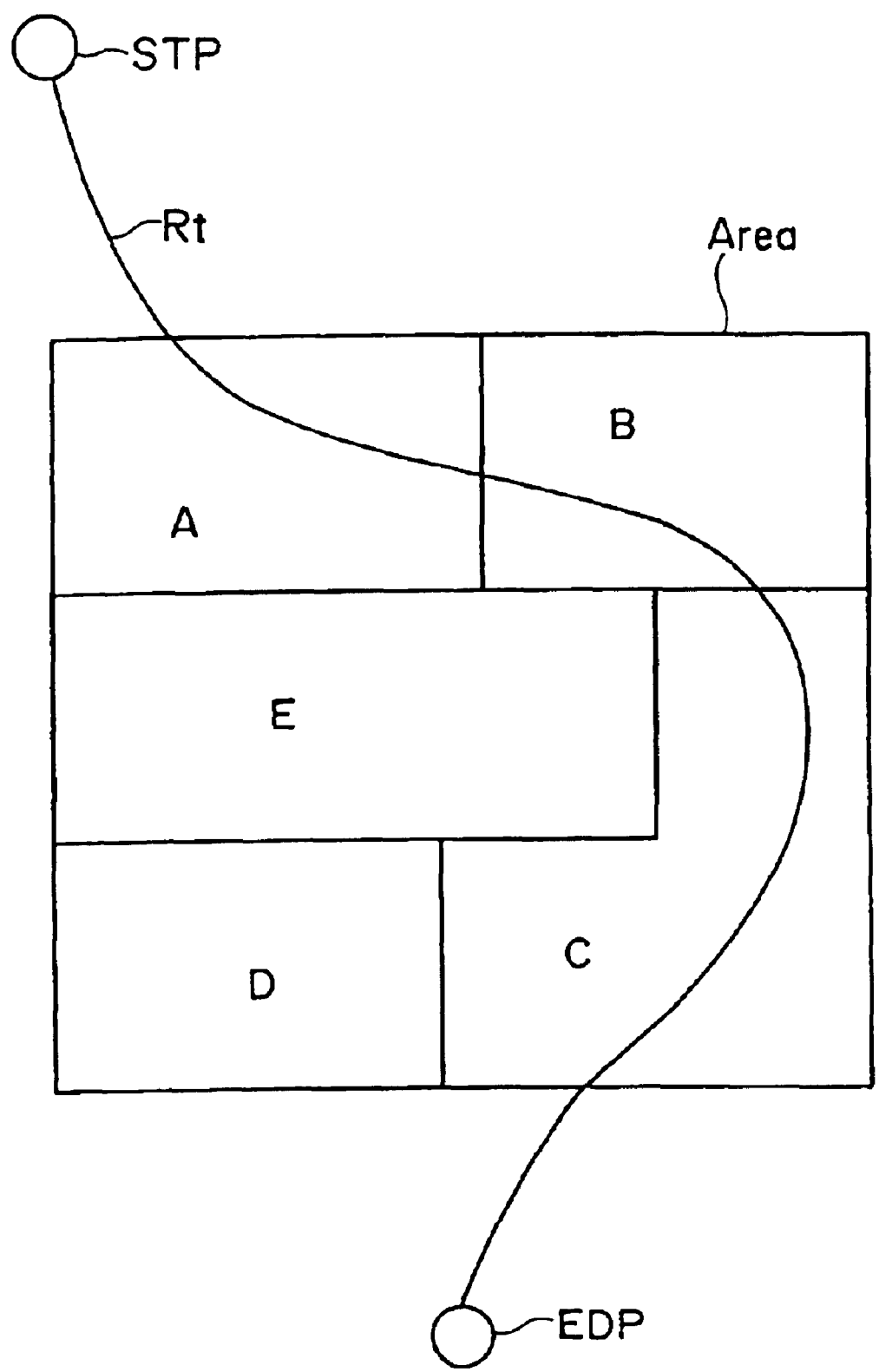
FIG. 25 is an image diagram showing a charge applicable area.

The charge information is fixed as data representing a charge area Area formed from a plurality of predetermined areas and charge amounts corresponding to this data. An example of the charge applicable area Area is shown in FIG. 25. As can be seen in FIG. 25, this area is divided into five segments, namely, a rectangular area A, an area B adjacent to the area A, an area C adjacent to the area B, and areas D and adjacent to the area C. Each of these areas can be designated by data indicating both the latitude and longitude and the shape thereof. Note also that the surface area and shape of each area can be altered if necessary.

Moreover, it is also possible to set a different charge amount for each of the charge applicable areas. For example, it is possible to increase the charge amount in accordance with the proximity to the city center, or to alter the charge amount in accordance with the number of times of use, or to alter the charge amount in accordance with the level of congestion, or to alter the charge amount in accordance with the length of time of use or with the time of day when the charge applicable area was used. In the description given below, these conditions for setting the charge amount are called calculation conditions for a charge (charge calculation conditions) used for charging. Charge calculation conditions are shown below.

The first charge calculation conditions uses the distance traveled and the number of entries into the area in accordance with the time of day shown in Table 5 below which indicates the tolls for each area.

TABLE 5

| Time of Day | Area A | | Area B | | Area C | |
| --- | --- | --- | --- | --- | --- | --- |
| | Per entry | Per 500 m | Per entry | Per 500 m | Per entry | Per 500 m |
| 1:00–5:00 | 20 | 10 | 30 | 20 | 40 | 30 | — |
| 5:00–7:00 | 40 | 20 | 50 | 30 | 60 | 40 | — |
| 7:00–9:00 | 60 | 30 | 80 | 40 | 90 | 50 | — |
| 9:00–12:00 | 40 | 20 | 50 | 30 | 60 | 60 | — |
| 12:00–13:00 | 20 | 10 | 40 | 20 | 50 | 50 | — |
| 13:00–16:00 | 40 | 20 | 50 | 30 | 60 | 60 | — |
| 16:00–18:00 | 60 | 30 | 80 | 40 | 90 | 90 | — |

If the charge conditions are set up in this way, the charge amount increases as the distance traveled (every 500 meters) and the number of entries in accordance with the time of day into the charge applicable area increases.

The second charge condition uses the length of stay in the area shown in a table representing the toll for each area. The third condition uses the level of congestion in the area shown in a table indicating the tolls for each area, while the fourth charge calculation condition uses the speed at which a vehicle travels inside an area (alternatively, the average speed within the area) shown in a table indicating the tolls for each area.

By including at least one table based on the above charge calculation conditions in the charge information, it is possible to specify both the area and the toll for the charge applicable area. Moreover, when the charge information is altered, there are cases when the charge information before the alteration and the charge information after the alteration are both sent together. Namely, there are cases in which a plurality of groups of charge information each having different contents are transmitted. Therefore, data such as version numbers and the transmission time and date and the like is included in the charge information so that old and new charge information received by the in-vehicle device 30 can be identified. In addition, an effective date which shows when the charge information is valid from is also included. Note that the above charge information may be stored in advance on the IC card 232 as may the charge information transmitted from the general center 40.

The operation of the in-vehicle device 30 will now be described.

Figure 26:
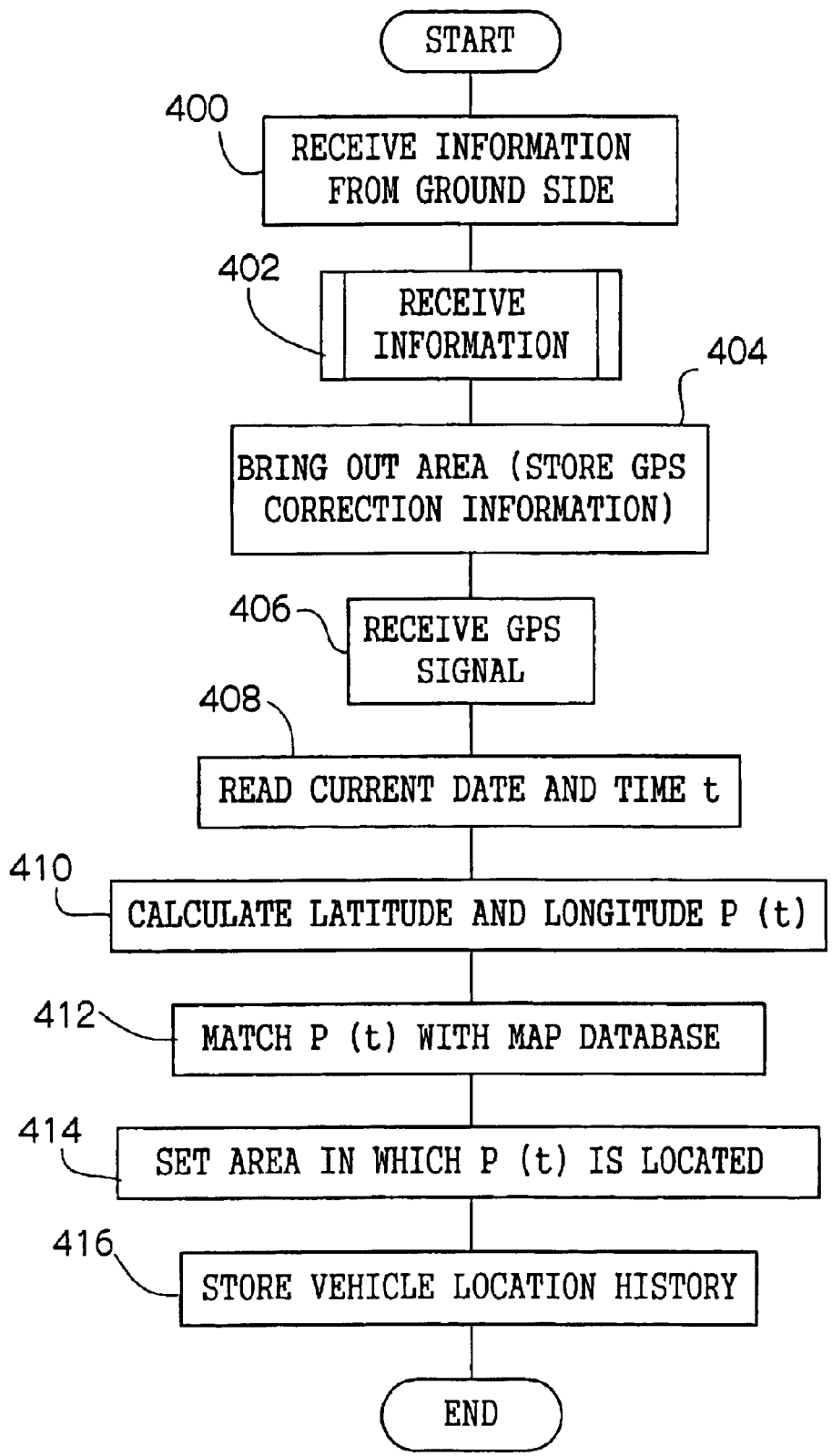
FIG. 26 is a flow chart showing the flow of processing to determine a charge applicable area executed in an in-vehicle device.
Figure 27:
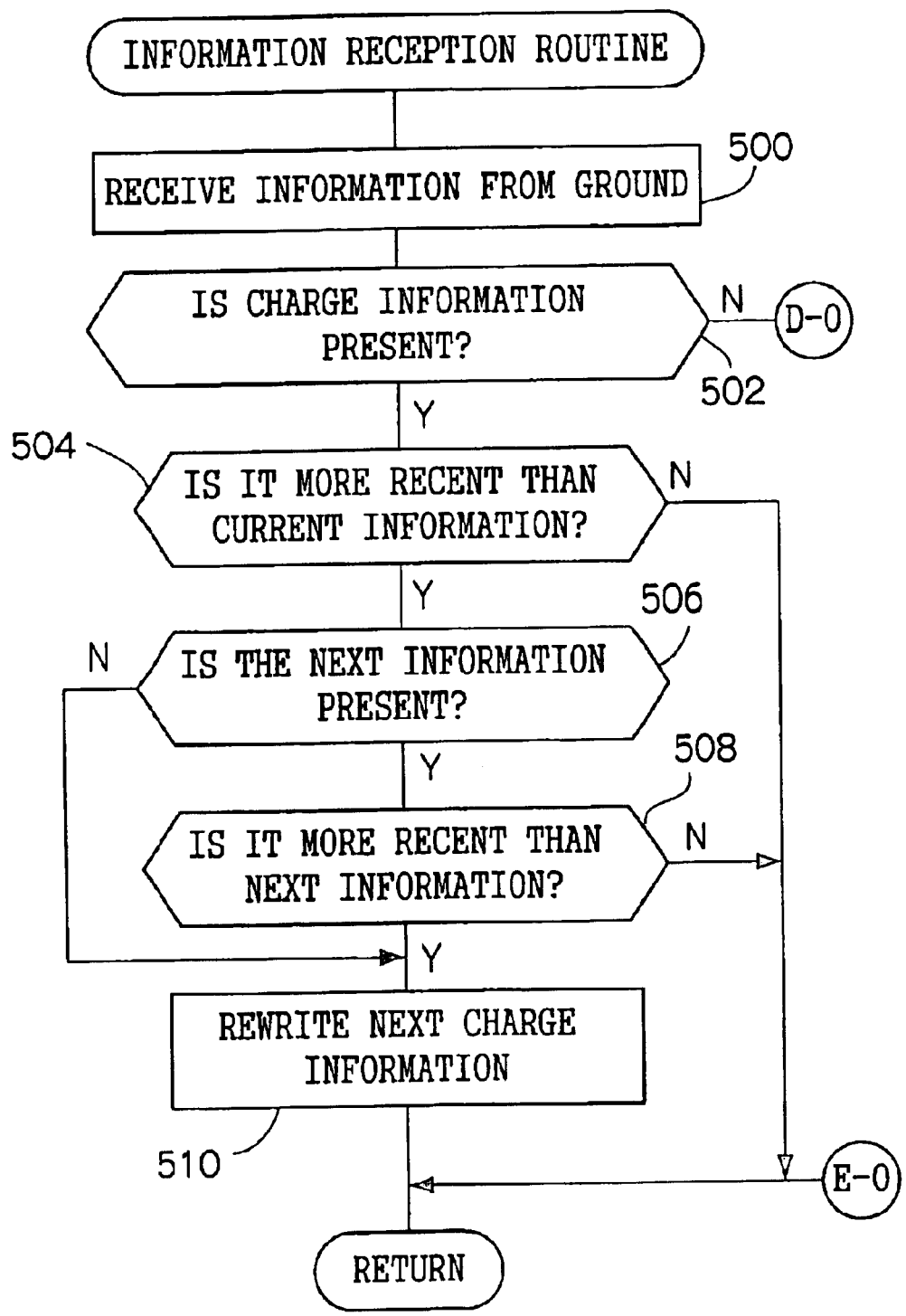
FIGS. 27A and 27B are flow charts showing the flow of information reception processing executed in an in-vehicle device.
Figure 27:
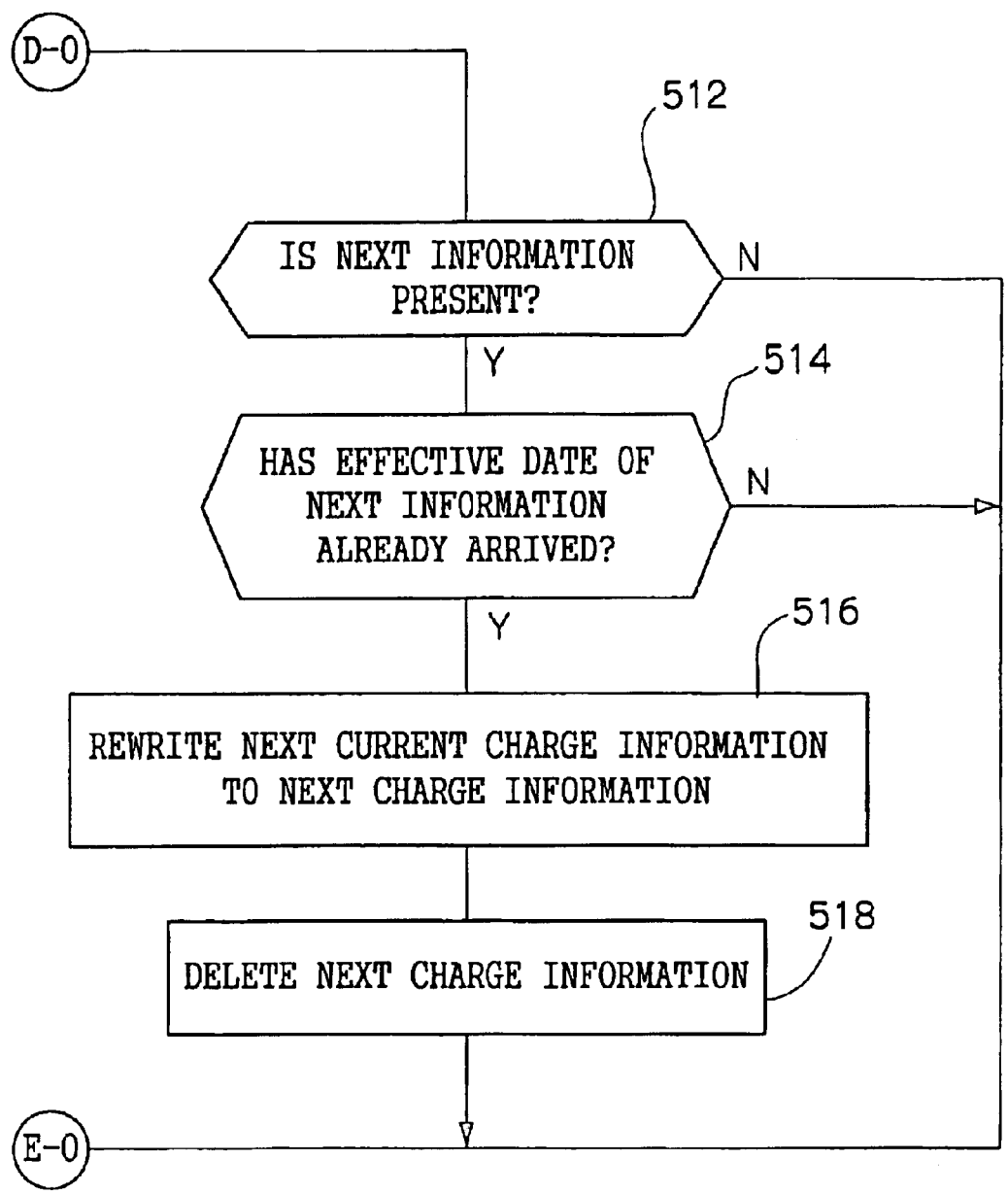

Note that, in the present embodiment, the charge information stored in advance on the IC card 232 is read and stored in advance in the memory 232A. As is shown in FIG. 26, the following interrupt processing is performed at predetermined times (for example, every 1 minute) in the in-vehicle device 30 mounted in a vehicle. Processing to receive information from the ground side, namely, from the general center 40 such as is shown in FIGS. 27A and 27B is performed in step 400. As was described above, the information from the general center 40 is charging information and GPS correction information. In step 500 shown in FIG. 27A, the information transmitted from the general center 40 is received. In step 502, a determination is made as to whether or not charging information is included therein. If charging information is included therein, the determination in step 502 is affirmative and the charging information is compared in step 504 with the charging information currently in use stored in the memory 232A and a determination is made as to whether or not the received charging information is the newer. If the received charging information is not the newer information, the determination in step 504 is negative and the routine returns. If the received charging information is the newer information, the determination in step 504 is affirmative and a determination is then made in step 506 as to whether the next charging information is present in the memory 230B. If the next charging information is not present, the determination in step 506 is negative and, in step 510, the received charging information is stored in the memory 230B and the routine returns. If the next charging information is present, the determination in step 506 is affirmative and, in step 508, the received charging information is compared with the next charging information stored in the memory 230B and a determination is made as to whether or not the received charging information is the newer. If the received charging information is not the newer information, the determination in step 508 is negative and the routine returns. If the received charging information is the newer information, in step 510, the received charging information is rewritten and stored in the memory 230B and the routine returns. Note that the determination of which information is the newer in steps 504 and 510 is performed on the basis of the transmission time and data and the version number included in the charging information. Note also that it is also possible to compare the actual contents of the charging information and determine whether or not there is a difference.

If the determination in step 502 is negative, namely, if no charging information is included, then a determination is made in step 512 as to whether or not the next charging information is present in the memory 230B. If the next charging information is not present, the determination in step 512 is negative and the routines returns. If the next charging information is present, the determination in step 512 is affirmative and, in step 514, the effective date of the next charging information is compared with the current date and a determination is made as to whether or not the current date already passes the effective date, namely, whether or not the next charging information is valid. If the current date does not already pass the effective date, the determination in step 514 is negative and the routine returns. If the current date is already past the effective date, the determination in step 514 is affirmative and the next charging information stored in the memory 230B is rewritten in the memory 230A. Thereafter, in step 518, the next charging information stored in the memory 230B is erased.

In this way, by storing the charging information that is to be effective next in a separate memory, it is possible to immediately update charging information when the effective date and time is reached. When processing to receive information is performed in the manner described above, then, in the next step 402, the charge applicable area Area is brought out from the charging information stored in the storage area 230A of the memory 230 and the received GPS correction information is stored.

In the next step 406, GPS signals from the GPS satellites 20, 22, and 24 are received. In the next step 408, the current date and time (year, month, date, time) are read and, in step 410, the in-vehicle device's own position, namely, the position of the host vehicle 32 (latitude and longitude P (t)) is determined. Note that the when determining the latitude and longitude P (t), the stored GPS correction information can be used.

In the next step 412, the determined latitude and longitude P (t) is matched with a map database stored in advance and, in the next step 414, the area to which the latitude and longitude P (t) belongs is decided. In this step 414, the charge applicable area information read from the storage area 230A of the memory 230 is used. Next, in step 416, the latitude and longitude P (t) and the date and time t and area are stored as vehicle location information. Accordingly, the area where the vehicle is located at predetermined times is stored as history together with the date and time. Table 6 below shows an example of a list of the vehicle location history.

TABLE 6

| Time t | | | | | Latitude and Longitude P (t) | | | |
|---|---|---|---|---|---|---|---|---|
| Year | Month | Date | Hour | Minute | Longitude | Latitude | Area | Charge |
| 1997 | 11 | 05 | 08 | 13 | E135-30-25 | N35-20-13 | A | * |
| 1997 | 11 | 05 | 08 | 14 | E135-30-49 | N35-19-58 | A | * |
| 1997 | 11 | 05 | 08 | 15 | E135-30-55 | N35-19-32 | B | * |
| 1997 | 11 | 05 | 08 | 16 | E135-31-01 | N35-19-25 | B | |
| — | — | — | — | — | — | — | — | |
| 1997 | 11 | 05 | 09 | 21 | E135-39-25 | N35-15-18 | C | |
| 1997 | 11 | 05 | 09 | 22 | E135-39-50 | N35-15-25 | C | |
| — | — | — | — | — | — | — | — | |

Note that the "charge" column in the above table is identification data representing whether or not the charge processing described below has been performed. The [*] symbol indicates that the charge processing has been performed.

In this way, the area in which the vehicle 32 was present every predetermined time is stored together with the date and time as history.

Next, the charge processing in the in-vehicle device 30 will be described. The charge processing is performed at predetermined times. The predetermined times when the processing may be performed include every hour, a predetermined day of every week, a predetermined date and time of every month, or a predetermined year, month, date, and time. Note that the execution of this charge processing may also be performed in response to an instruction from the general center 40.

Figure 28:
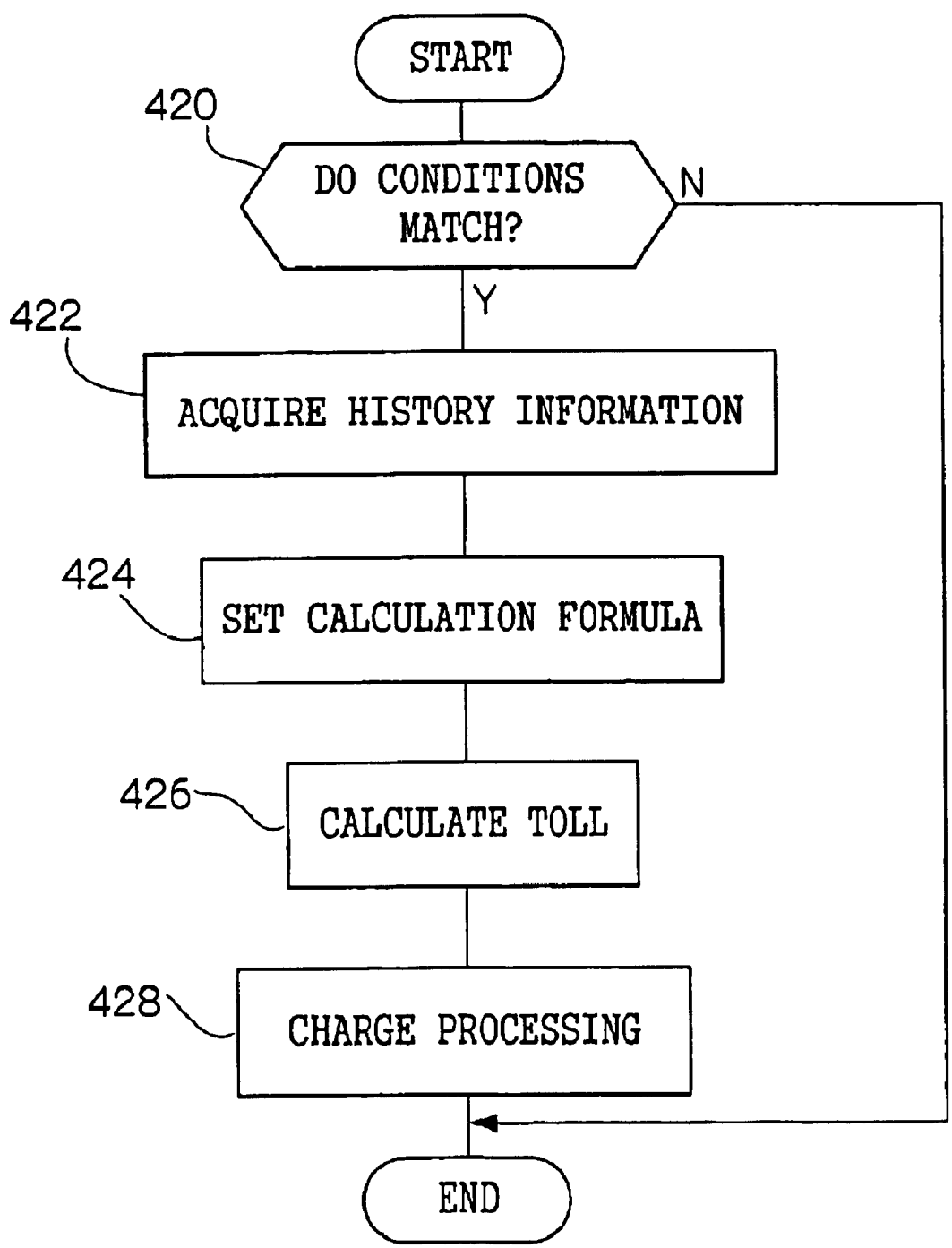
FIG. 28 is a flow chart showing the flow of charge processing executed in an in-vehicle device.

As is shown in FIG. 28, in step 420, by making a determination as to whether or not it is the above predetermined time or whether or not an instruction has been given by the general center 40, it is possible to determine whether or not the conditions are matched. If the conditions do not match, the determination in step 420 is negative, and the routine is ended.

If, however, the conditions do match, the determination in step 420 is affirmative and, in the next step 422, the history information is acquired. This history information is the vehicle location history list (Table 6) stored in step 416 in FIG. 26. In the next step 424, a calculation formula (charge calculation formula) is set. The charge calculation formula is determined by the above calculation conditions. These calculation conditions are conditions for determining a charge amount (charge calculation conditions) and may be made up of the distance traveled in an area and the number of entries into an area in accordance with the time of day and the like. The charge calculation formula is determined by the calculation conditions. In formula (3) below, a charge calculation formula is shown as a general formula considering areas.

$$\text{(charge amount)} = f(N_A, N_B, N_C, N_D, N_E, N_H, N_I, N_J, t) \quad (3)$$

wherein, $N_A, N_B, N_C, N_D, N_E$: the evaluation of the areas A–E (i.e. the number of entries and distance traveled or each area determined by the charge calculation conditions)
$N_H$: the level of congestion
$N_I$: the speed (average speed)
$N_J$: the length of stay
t: the date and time In the next step 426, the charge is calculated using the calculation formula set above and the history information. For example, in the case of the first charge condition in which the charge amount is determined in accordance with distance traveled in an area and the number of entries into an area in accordance with the time of day, because the unit price is determined for every 500 meters traveled and for the number of entries in accordance with the time of day in each area using tables read from the memory 230, it is possible to multiply the number of entries by the unit price for each entry in the table read from the memory 230, and then to calculate the amount of the toll to be charged by adding to the above multiplication value a value obtained by multiplying by the unit price for every 500 meters traveled a value obtained by dividing the distance traveled by 500. When the charge calculation is ended, the routine proceeds to step 428 where the charge processing is performed. This charge processing is processing to subtract the charge amount determined above from the balance of the IC card 232.

For example, when the only calculation condition is the number of entries into an area and the history information is the route Rt from the start point STP to the end point EDP, as shown in FIG. 25, then between 7 o'clock and 9 o'clock, if the vehicle travels for 1.5 km through area A, 1.0 km through area B, and 3.0 km through area C, then the charge amount is found according to the formula below:

charge amount for the route $Rt = 60 \times 1 + 30 \times (1500/500) + 80 \times 1 + 40 \times (1000/500) + 90 \times 1 + 50 \times (3000/500) = ¥700$ In this way, in the present embodiment, because charging information is transmitted from the general center 40 and charge processing is performed in the in-vehicle device 30 based on this charge information, it is possible not only to easily alter the charge applicable area and toll tables in the general center 40 when traffic conditions have changed due to various environmental factors or the like, but it is also possible to update the charging information immediately and in a single operation in the in-vehicle device 30.

Note that, in the present embodiment, a separate memory for storing the next charging information is provided and updated when the effective date is arrived at, however, the present embodiment is not limited to this and it is also possible to use without any special conditions attached thereto charging information transmitted from the general center 40, or to compare the effective date of the transmitted charging information with the current date and to use the transmitted charging information if the effective date has already been passed.

(Eighth Embodiment)

In the present embodiment, the present invention is applied to an automatic charge system for performing charge processing automatically for a vehicle that has entered (a vehicle that has driven into) a toll facility (i.e. a charge applicable area). Note that the automatic charge system used in the present embodiment is a system in which the position of a vehicle is detected using the in-vehicle device, and the usage toll (driving toll) is settled on the basis of the result of the detection.

Because the structure of the present embodiment is substantially the same as the structure of the above described seventh embodiment, only those portions that are different are described.

Figure 29:
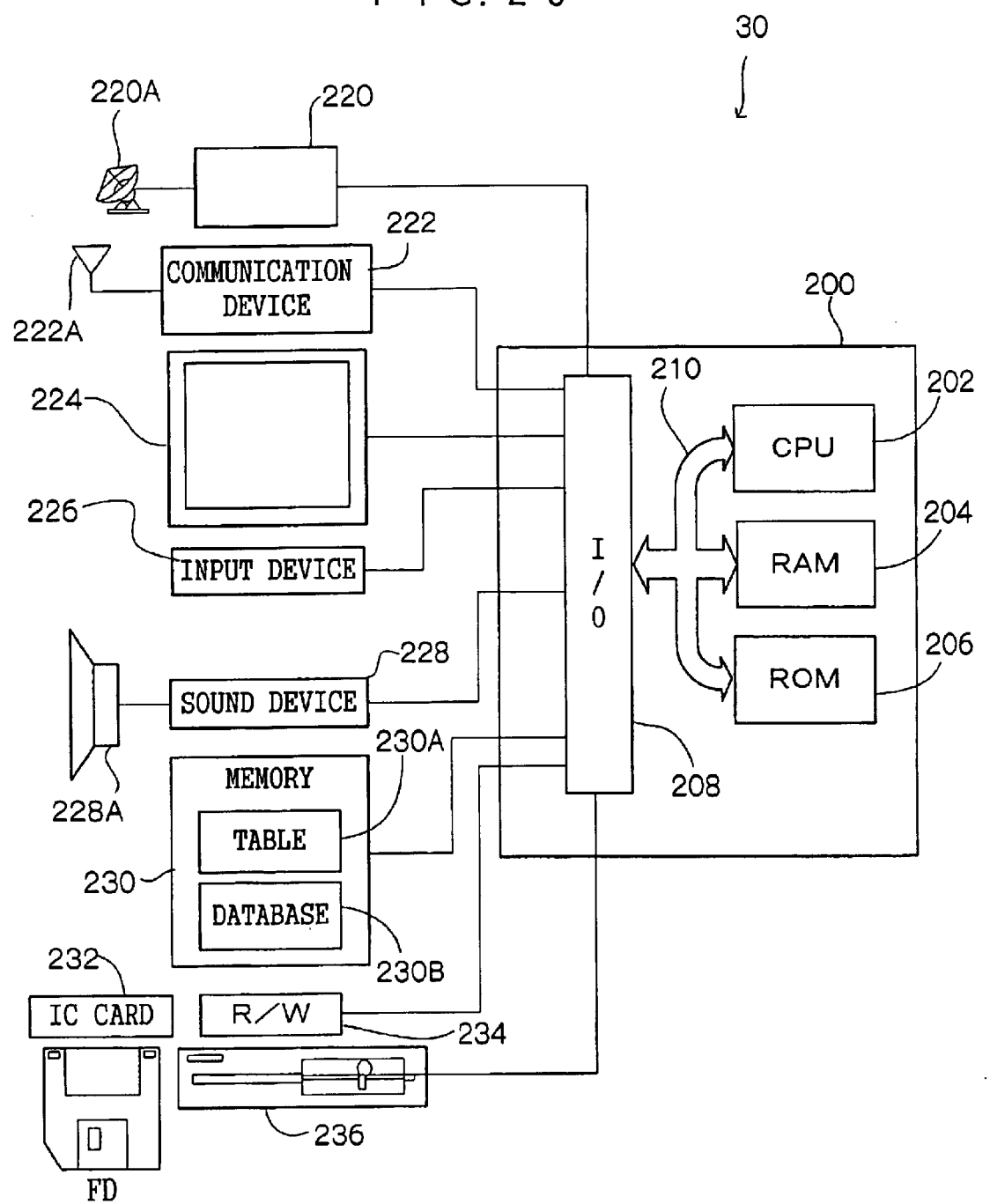
FIG. 29 is a block diagram showing the schematic structure of an in-vehicle device in the automatic charging system of the eighth embodiment.

Namely, as is shown in FIG. 29, the memory 230 connected to the input/output port 208 of the in-vehicle device 30 according to the present embodiment includes a storage area 230A for storing charging information transmitted from the general center 40, and a map database 230C in which map information for providing route information as images to assist the driver is stored.

Next, the operation of the present embodiment will be described. Note that because the operation of the present embodiment is the same as the operation of the above described seventh embodiment, only those portions that are different are described.

Figure 30:
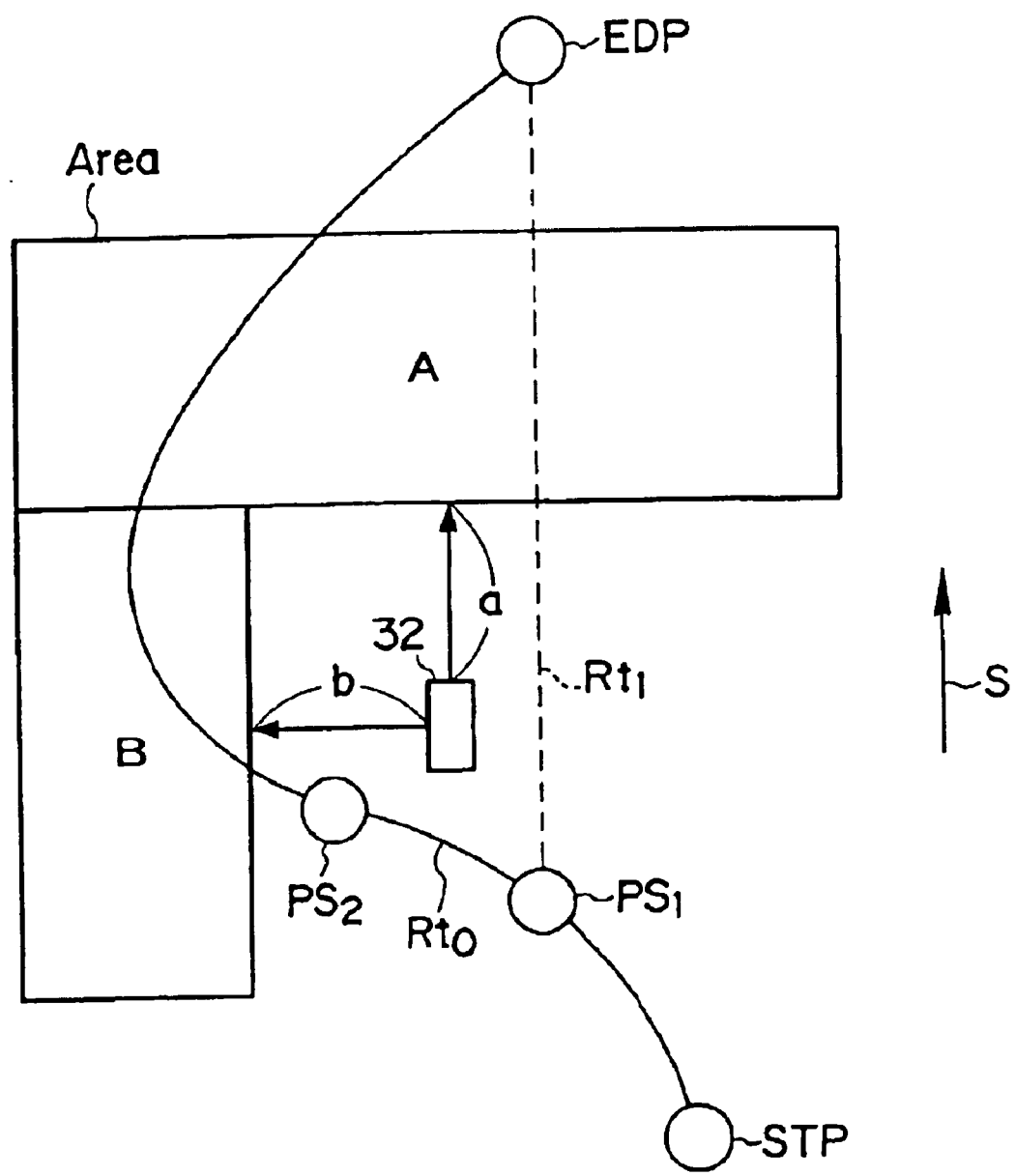
FIG. 30 is an image diagram showing a charge applicable area.

Namely, as is shown in FIG. 30, the example of the charge applicable area Area according to the present embodiment is divided into two areas and is formed from a rectangular area A and the area B adjacent to the area A.

Moreover, the first charge calculation condition according to the present embodiment is the distance traveled and the number of entries into the area in accordance with the time of day shown in Table 7 below showing the tolls for each area.

TABLE 7

|  | Area A | | Area B | | |
| --- | --- | --- | --- | --- | --- |
| Time of Day | Per entry | Per 500 m | Per entry | Per 500 m | |
| 1:00–5:00 | 20 | 10 | 30 | 20 | — |
| 5:00–7:00 | 40 | 20 | 50 | 30 | — |
| 7:00–9:00 | 60 | 30 | 80 | 40 | — |
| 9:00–12:00 | 40 | 20 | 50 | 30 | — |
| 12:00–13:00 | 20 | 10 | 40 | 20 | — |
| 13:00–16:00 | 40 | 20 | 50 | 30 | — |
| 16:00–18:00 | 60 | 30 | 80 | 40 | — |
| — | — | — | — | — | — |

Figure 31:
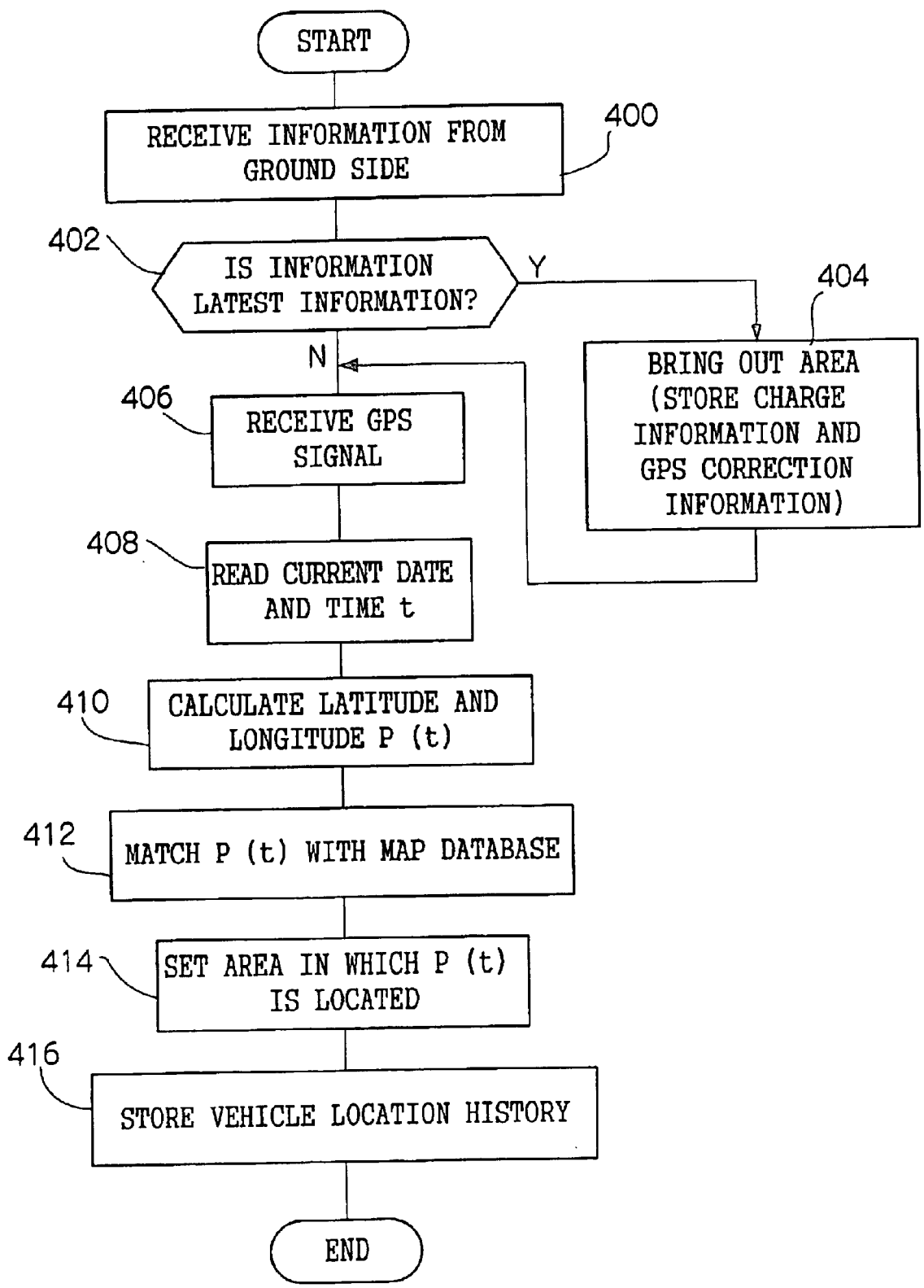
FIG. 31 is a flow chart showing the flow of processing to determine a charge applicable area executed in an in-vehicle device.

As is shown in FIG. 31, the following interrupt processing is performed at predetermined times (for example, every 1 minute) in the in-vehicle device 30 mounted in a vehicle. In step 400, information is received from the ground side, namely, from the general center 40. As was described above, the information from the general center 40 is charging information and GPS correction information, and in step 402, a determination is made as to whether or not the received information is the most recent information. If the received information is the most recent information, the determination in step 402 is affirmative and, in the next step 404, data representing the charge applicable area Area is brought out from the received charging information and the GPS correction data together with the received charging information is stored in the storage area 230A of the memory 230.

If, however, the received information is not the most recent information, the determination in step 402 is negative and steps 406 to 416 are performed. Note that, in the present embodiment, Table 8 shows an example of a list of the vehicle location history.

TABLE 8

| | Time t | | | | Latitude and Longitude P (t) | | | |
| --- | --- | --- | --- | --- | --- | --- | --- | --- |
| Year | Month | Date | Hour | Minute | Longitude | Latitude | Area | Charge |
| 1997 | 11 | 05 | 08 | 13 | E135-30-25 | N35-20-13 | A | * |
| 1997 | 11 | 05 | 08 | 14 | E135-30-49 | N35-19-58 | A | * |
| 1997 | 11 | 05 | 08 | 15 | E135-30-55 | N35-19-32 | A | * |
| 1997 | 11 | 05 | 08 | 16 | E135-31-01 | N35-19-25 | A | |
| — | — | — | — | — | — | — | — | — |
| 1997 | 11 | 05 | 08 | 21 | E135-39-25 | N35-15-18 | B | |
| 1997 | 11 | 05 | 08 | 22 | E135-39-50 | N35-15-25 | B | |
| — | — | — | — | — | — | — | — | — |

Note that the "charge" column in the above table is identification data representing whether or not the charge processing described below has been performed. The [*] symbol indicates that the charge processing has been performed.

In the charge processing in the in-vehicle device 30, when the charge condition is, for example, the number of entries into an area and the route RtO is from the start point STP to the end point EDP as is shown in FIG. 30, then between 7 o'clock and 9 o'clock, if the vehicle travels for 1.0 km through area B and 1.5 km through area A, then the charge amount is found according to the formula below:

charge amount for the route $RtO = 80 \times 1 + 40 \times (1000/500) + 60 \times 1 + 30 \times (1500/500) = ¥310$ The operation of the ground facility and the in-vehicle device while the vehicle is running will now be described further. Note that the description below is of when the toll varies in accordance with the number of entries a vehicle makes into a charge applicable area and the distance traveled (every 500 meters).

Figure 32:
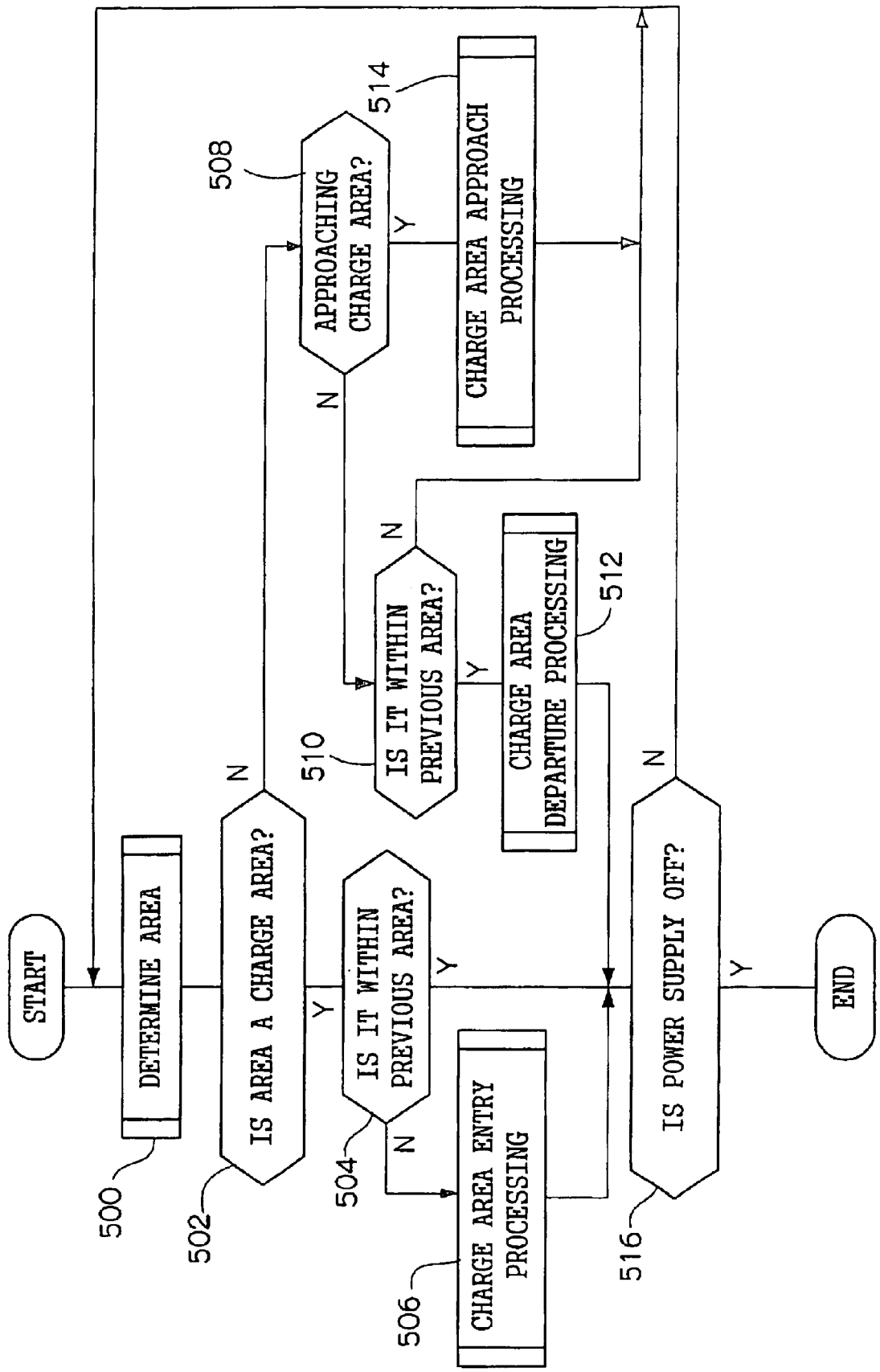
FIG. 32 is a flow chart showing the flow of the processing operation of an in-vehicle device.

As is shown in FIG. 32, when the power supply of the in-vehicle device is turned on, the routine moves to step 500 and a determination is made as to the area in which the vehicle is currently located. In this step 500, the above described area determination processing is performed (see FIG. 6). In the next step 502, a determination is made as to whether or not the area determined in step 500 is a charge applicable area. If it is a charge applicable area, the determination in step 502 is affirmative and, in the next step 504, a determination is made as to whether or not the previous area (the area determined the previous time this routine was executed) was a charge applicable area. If the previous area was not a charge applicable area, the current instance is the first time the vehicle has entered a charge applicable area, therefore, the determination in step 504 is negative. In the next step 506, charge area entry processing is executed and the routine proceeds to step 516. This charge area entry processing is processing that is performed when a vehicle enters into a charge applicable area and the fact that the vehicle has entered the charge applicable area is displayed on the display device 224. If, however, the previous area was a charge applicable area, the determination in step 504 is affirmative and the routine proceeds without change to step 516.

If the current area is not a charge applicable area and the determination in step 502 is negative, the routine proceeds to step 508 where a determination is made as to whether or not the vehicle is approaching a charge applicable area. This determination as to whether or not the vehicle is approaching a charge applicable area can be performed, as is shown in FIG. 30, for example, by measuring the distance a and the distance b to the charge applicable area in both the direction in which the vehicle is advancing (the direction indicated by the arrow S in FIG. 30) and in a transverse direction substantially orthogonal to the direction in which the vehicle is advancing, and then determining whether or not these measured distances are within a predetermined distance. As a result, it is possible to determine whether or not a charge area is present within a predetermined area. Note that the measured directions are not limited to the direction in which the vehicle is advancing and the transverse direction thereto. Alternatively, areas for determining whether or not a vehicle is within a predetermined distance may be centered on each direction with a range of 45 degrees on either side.

If the distance to the charge applicable area is within the predetermined distance, the determination is step 508 is affirmative and, in the next step 514 information indicating the fact that the vehicle is approaching a charge applicable area is displayed as an image and also provided aurally. The routine then returns to step 500. Note that it is possible to change the contents of the display and the like in accordance with the distance to the charge applicable area. For example, at the point when the distance to the charge applicable area drops to under a first predetermined distance (preferably, approximately 500 meters), the fact that the vehicle is approaching the charge applicable area is displayed as is shown in FIG. 33A. In FIG. 33A, the vehicle marker 225 showing the direction in which the vehicle 32 is advancing is displayed, and both the direction in which the vehicle marker 225 is advancing and the symbol 227 showing that the charge applicable area is located in the leftwards direction are displayed. At the point when the distance to the charge applicable area drops to under a second predetermined distance (preferably, approximately 100 meters), the fact that the vehicle is even closer to the charge applicable area is displayed as is shown in FIG. 33B. In FIG. 33B, by inverting the display of the symbol 227, the symbol can be emphasized.

If the determination in step 508 is negative, the routine moves to step 510 where a determination is made as to whether or not the previous area was a charge applicable area. If it is determined that the previous area was not a charge applicable area, the routine returns to step 500. If, however, it is determined that the previous area was a charge applicable area, the conclusion is that currently, the vehicle has exited from a charge applicable area and the determination in step 510 is affirmative. In the next step 512, the charge area exit processing is executed and the routine proceeds to step 516. This charge area exit processing is processing performed when the vehicle exits the charge applicable area and the fact that the vehicle has exited the charge applicable area is displayed on the display device 224 and the like.

In step 516, a determination is made as to whether or not the power source of the in-vehicle device has been interrupted. If the power is still on, the determination in step 516 is negative and the routine returns to step 500. If, however, the power supply has been interrupted, the determination in step 516 is affirmative and the current routine is ended.

Accordingly, in step 514, at the point PS1 on the route RtO shown in FIG. 30, the information that the vehicle is approaching the charge applicable area is provided. For example, as described above, at the point when the distance to the charge applicable area drops under the first predetermined distance, the fact that the vehicle is approaching the charge applicable area is displayed as is shown in FIG. 33A. At the partway point PS2 when the distance to the charge applicable area drops under the second predetermined distance, the fact that the vehicle is even closer to the charge applicable are is displayed as shown in FIG. 33B. Therefore, the fact that the vehicle is even closer to the charge applicable area can be easily recognized. Note that, it is possible to emphasize this fact not only by inverting the display, but also by, for example, causing the display to flash, changing the color of the display, or the like. Moreover, it is also possible to display the legend "approaching charge applicable area" on the display device 224 or to provide aural notification using the aural device 228 for a set time.

It is also possible to provide information by displaying superposed images of the charge applicable areas A and B on a navigation image using the display device 224. For example, as is shown in FIG. 34, it is possible to display the route through the charge applicable area A by changing the color or brightness thereof and to display the name of the charge applicable area, and to display the entire area of the charge applicable area B in halt tone meshing pattern and to display the name thereof. Moreover, as is also shown in FIG. 34, it is also possible to display the distance to the charge applicable area (either the distance in a straight line or the distance via the shortest route), and to display the charge amount. These displayed contents may also be provided using aural means. Note that the color, brightness, and halftone pattern may be altered in accordance with the remaining distance or with the amount of the charge.

In this way, because it is possible to easily recognize the fact that the vehicle is approaching the charge applicable area, the driver can easily select the most appropriate route. For example, as is shown in FIG. 30, if the fact that the vehicle is approaching the charge applicable areas A and B is displayed at the partway point PS1, the driver can change from the initially planned route RtO to the route Rt1 shown as a dash line in FIG. 30, thereby enabling the vehicle to reach the destination EDP by only passing through the charge applicable area A. Thus the driver can avoid having to pay unnecessary tolls.

(Ninth Embodiment)

Figure 35:
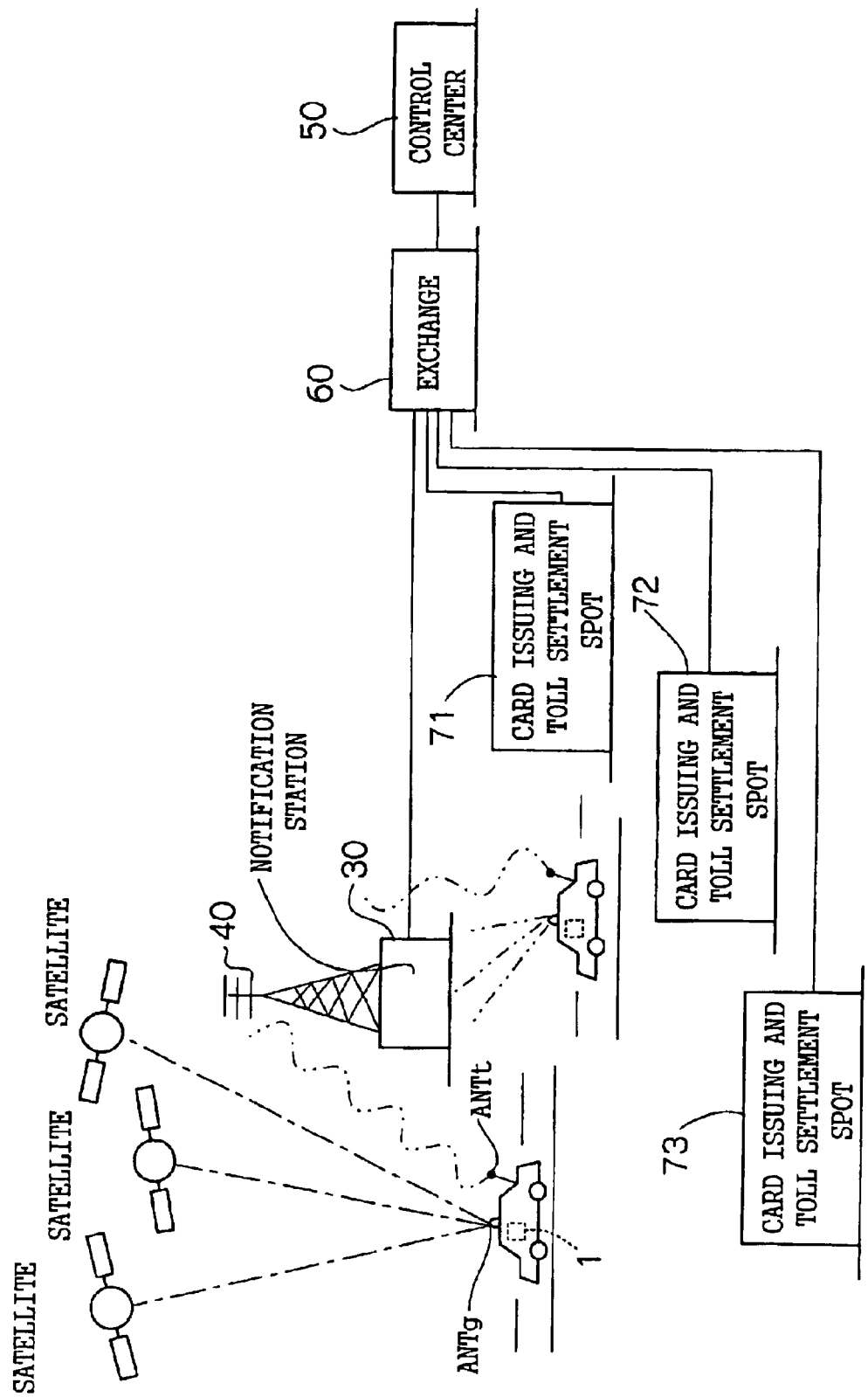
FIG. 35 is a block diagram showing an outline of the structure of the system of the ninth embodiment of the present invention.

The system structure of the ninth embodiment of the present invention is shown in FIG. 35. The in-vehicle charging device 1 mounted in a vehicle communicates with a notification station 30 via an inbuilt telephone unit 8 (described below) and an antenna ANTt thereby exchanging data. Moreover, the in-vehicle charging device 1 receives radio waves from satellites via the GPS antenna ANTg, and recognizes the position and traveling direction of the vehicle using an inbuilt GPS position measuring device (20 to 28: described below) and displays this together with a map indicating the area through which the vehicle is traveling. When there are insufficient receivable satellites or when the signals from the satellites are insufficient, the insufficient information is supplemented by vehicle position calculation by addition of the traveling speed and detection of the direction using a gyro. Alternatively, vehicle position recognition can be performed.

Figure 37:
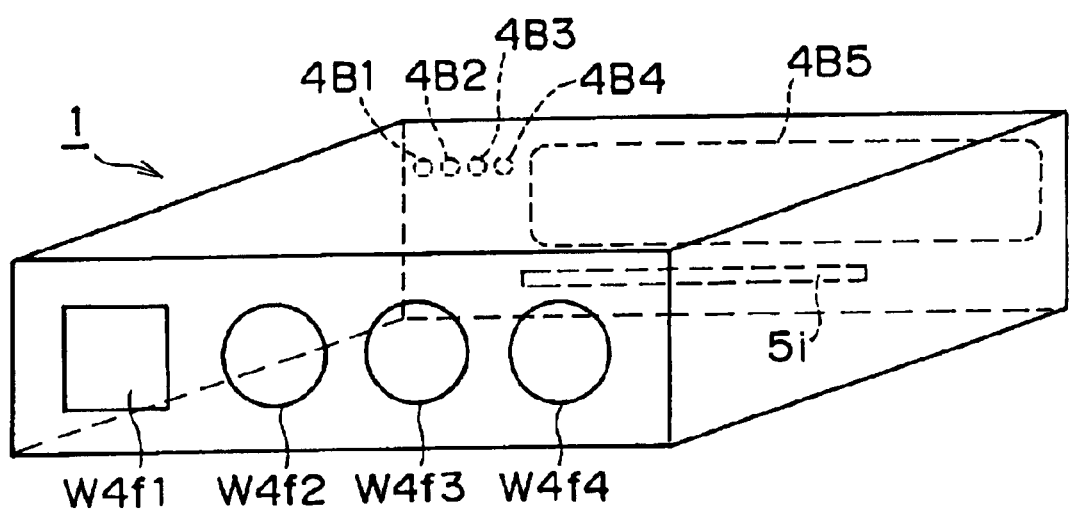
FIG. 37 is a perspective view showing the exterior of the case housing the main portions of the in-vehicle charging device 1 shown in FIG. 36.

FIG. 37 shows the structure of the in-vehicle charging device 1. As is shown in FIG. 37, direct voltage +B from the battery in the vehicle is constantly supplied to the in-vehicle charging device 1. A power supply circuit PSC supplies operating voltage to the CPUs of the GPS information processing ECU 20 and the charge control ECU 702. As a result, data is always held (saved) in the internal memory of the CPU of the charge control ECU 2 and in the internal memory of the charge control ECU 2 which is, in fact, outside of the ECU but inside the ECU 2.

When the vehicle ignition key switch IGsw is closed (i.e. when the vehicle power supply that allows the vehicle to run is turned on), the power supply circuit PSC supplies operating voltage to all circuits of the in-vehicle charging device 1. The opening of the ignition key switch IGsw (Si=L) instructs that the measurement of the length of stay in the charging area be halted (interrupted), while the closing of the ignition key switch IGsw (Si=H) instructs that the measurement of the length of stay in the charging area be continued.

The GPS position measuring device (20–28) is provided with a receiving antenna ANTg, a GPS receiver 21, a GPS demodulator 22, a display device 24, a piezoelectric vibrating gyro 25, an altitude sensor 26, a GPS information processing ECU (Electronic Control Unit) 20, an operating board 23, a map search engine 27, and a map database 28. The 1.57542 GHz radio waves transmitted from each of the GPS satellites are received by the GPS receiver 721 via the receiving antenna ANTt, and the information contained in the radio waves, namely, information such as a coefficient indicating the trajectory of the satellites and the time and the like is demodulated by the GPS demodulator 22, and input into the GPS information processing ECU 20. The GPS information processing ECU 720 is a computer system based around a microprocessor (CPU) and provided with almanac data memory and memory for a data buffer as well as an input/output interface (an electric or electronic circuit). The CPU generates information indicating the position of its host vehicle (latitude, longitude, altitude) based on the information transmitted from the GPS satellites and calculates the direction in which the vehicle is traveling and the speed of the advance based on the time series transition of this position information. In accordance with the position information generated by the CPU, the search engine 27 reads map data of a page (i.e. a screen) that includes the position from the map database 28 and displays this on the display device 24. A current position index that also shows the direction of travel is also displayed as well as the current position on the display device 24.

The basic structures of the reception antenna ANTg, the GPS receiver 21, the GPS demodulator 22, and the display device 24, as well as the basic operation of the GPS information processing ECU 20 are the same as the structural elements of known devices already available on the market.

However, in order to implement the present invention, a program is added to the operating program of the GPS information processing ECU 20 that performs the following. Namely, the current position (ground position) of the vehicle (i.e. the in-vehicle charging device 1), the direction of travel, the speed of travel, and the current date and time are transmitted to the charge control ECU 2 in response to a data transmission request from the charge control ECU 2. Moreover, The charge control ECU 2 reads the incoming charge area information transmission and stores it in internal memory. The charge area is then displayed in superposition (as a half-tone dot meshing) in the area stipulated by the charge area information, namely, the charge area on the map displayed on the display device 24.

Analog signals output by the piezoelectric vibrating gyro 25 and the altitude sensor 26 are each input into the GPS information processing ECU 20, and the CPU of the ECU 20 reads the signals after converting them into digital data via an A/D converter. Information output from the GPS demodulator 22 and information for controlling the GPS demodulator 22 is input into or output from the CPU via the I/O port of the GPS information processing ECU 20.

The GPS information processing ECU 20 calculates three-dimensional coordinates Ux, Uy, Uz of the position of its host vehicle with a "3 satellite position measuring calculation" or a "4 satellite position measuring calculation."

In the "3 satellite position measuring calculation", in a predetermined simultaneous equation three sets of data received from three satellites are each substituted as parameters, and by solving this simultaneous equation, any error in the latitude and longitude of the reception point, which are unknown numbers, as well as in the clock on the receiving side is determined. The altitude of the reception point is determined, in this example, by calculation from the signal output from the altitude sensor 26, and is substituted into the simultaneous equation as known data. In the "4 satellite position measuring calculation", in a predetermined simultaneous equation four sets of data received from four satellites are each substituted as parameters, and by solving this simultaneous equation, any error in the latitude, longitude, and altitude of the reception point, which are unknown numbers, as well as in the clock on the receiving side is determined. In addition, because any error in the clock on the receiving side can be determined by performing the position measuring calculation of any of these, the time of the internal clock can be corrected based on this error information.

When the ground position information is calculated by GPS position measurement, the GPS information processing ECU 20 calculates the direction in which the vehicle is traveling and the speed of the travel by a comparison with the previously calculated ground position. On the basis of the previously calculated ground position, map data of the one page (one screen) that includes the current position is read from the map data memory 28 and is displayed on the display device 24. A current position index that also shows direction of travel is displayed at the current position on the display. In addition, when at least a portion of the area stipulated by the charge area information, namely the charge area, received from the charge control ECU 2 and saved in the internal memory is included in the area displayed on the display device 24, the charge area is displayed in superposition (in half-tone dot meshing) over the area on the display screen. This additional display allows the driver to recognize charge applicable areas on the display screen of the display device 24.

The charge control ECU 2 is also a computer system centered around a microprocessor (CPU) and provided with an input/output interface (an electric or electronic circuit). The CPU is able to exchange transmissions of various types of information with the notification station 30 via the antenna ANTt, the telephone unit 8, and the modem 7. The extension serial input/output board 6 performs the serial input and output of data, as well as serial/parallel conversion input and output.

The voice of the driver that is input using the microphone MIC is converted into digital data indicating letters of words via a voice recognition unit 9, and is input into the CPU of the charge control ECU 2. Furthermore, the CPU notifies (aurally informs) the driver when necessary of messages (output information) using the in-vehicle speaker SP via the voice synthesizing unit 10 and the switching switch SW11. When voice data is output from the CPU, the switching switch SW11 switches the connection between the in-vehicle audio and the speakers SP to a connection between the voice synthesizing unit 10 and the speakers SP. At this time, the CPU simultaneously displays the message conveyed to the driver by voice via the vehicle speaker SP using alphabetical characters on the display device 4. As a result, the driver is able to confirm a message from the CPU both aurally and visually.

A card reader 5 (i.e. a reading and writing means) for reading and writing data on an IC card CRD (i.e. a storage means) is connected to the charge control ECU 2. When an IC card CRD is inserted into a card insertion slot and the charge control ECU 2 has requested a data transmission, the card reader 5 reads the data stored on the card CRD and transmits it to the charge control ECU 2. When the card reader 5 receives writing data from the charge control ECU 2, it overwrites (i.e. updates with this new data) this data in the IC card CRD.

The information stored on the IC card is shown in Table 9. In the example shown in Table 9, the amount for a single issue of a card is ¥10,000. The balance of the card is ¥10,000 (i.e. the card is unused) and the card ID allocated by the issuer of the card is MYCAR003. The classification of the vehicle for which the card is applied for is a light vehicle and the vehicle ID (in this example, the number displayed on the vehicle number plate) is A123B568. The data in the charge table is for the charge area which the driver requested (applied for) directly after the issue of the card, and this data is written on the card by the issuer in accordance with the driver's application. If there is no such application (i.e. a charge table data writing request), then there is no such writing.

TABLE 9

Data stored on card

| Information Category | Content of information |
|---|---|
| Card ID | MYCAR003 |
| Card balance | ¥10000 |
| Vehicle classification | Light vehicle |
| Vehicle ID | A123B568 |
| Charge table | — |

An example of the data in a charge table is shown in Table 10. This charge table is a table showing the tolls when a charge is levied for each entry, and is used to charge a toll that corresponds to the number of entries (or times used).

TABLE 10

Charge table

| Information category | Content of information | | |
|---|---|---|---|
| Charge Table No. | | | |
| Charge Area Information | [N350000, E1360000] (First point) | | |
| | [N345900, E1360100] (Second point) | | |
| Toll information/entry | Heavy vehicle | Medium vehicle | Light vehicle |
| Time spot: 7:00–9:00 | ¥500 | ¥300 | ¥200 |
| Time spot: 17:00–19:00 | ¥500 | ¥300 | ¥200 |

TABLE 10-continued

Charge table

| Time spot: other | ¥400 | ¥200 | ¥100 |
|---|---|---|---|
| Table valid period | Oct. 10–11, 1997 | | |
| Table valid area information | ... (First point) | ... (Second point) | |

Figure 55A:
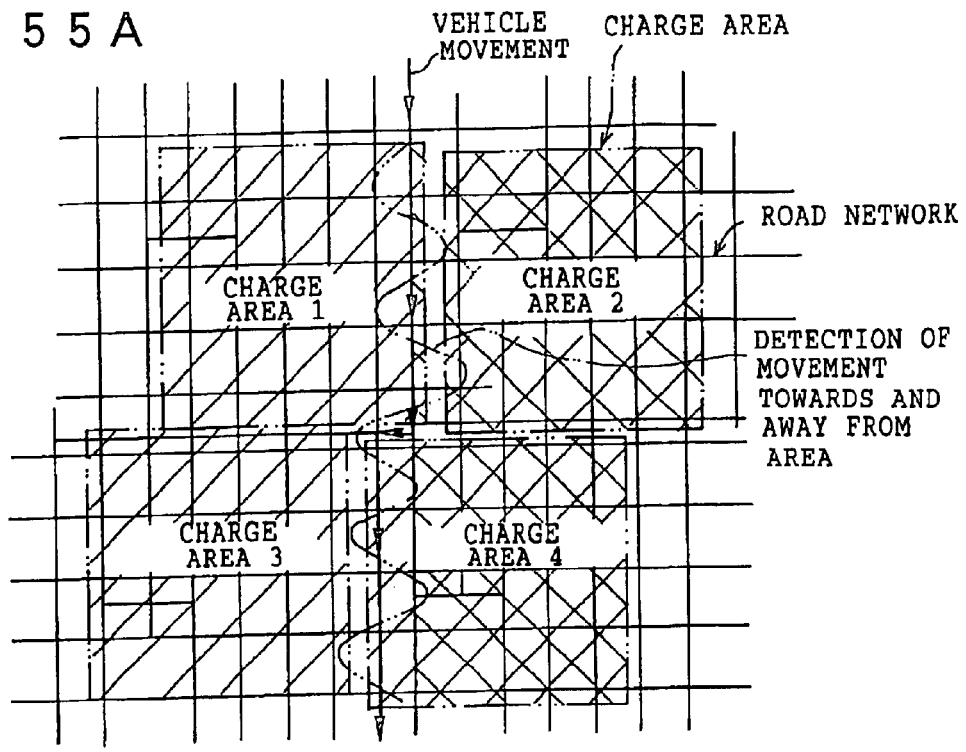
FIGS. 55A and 55B are plan views showing charge areas set in a road network.

The data of one set (one point) of the charge area information in the charge table is positional information indicating one point on an outline of the charge area. When there are only two sets of data (data of two points), each set of data means the positions of opposite corners in a rectangle (square), and the charge area is rectangular. An example thereof is shown in FIG. 55A.

When there are three sets of data, the positions (point) indicated by each group of data are joined in order of the writing of the data groups, and the polygonal area that emerges when the last point is joined with the first point indicates the charge area. Because there are two sets of position (point) data in the example shown in Table 10, the charge area is quadrangular (square). The toll information is differentiated by time slot and by type of vehicle.

The term of validity of the table indicates the term of validity of the data. The information of the area in which the table is valid shows an outline that is shaped substantially the same as the charge area extended by approximately 600 meters outside the outline of a charge area prescribed in the charge area information. When a plurality of charge areas are set, this information of the area in which the table is valid is for allowing a charge table of a charge area that is similar to be selected in the vehicle. Note that FIG. 55A shows a situation in which the four charging areas 1 to 4 are adjacent and a charge table is allocated to each charging area.

The card issuing and toll settlement spots (card issuing and toll settlement booths) 71–73 shown in FIG. 35 issue IC cards CRD. These spots (service centers) are provided in locations that provide easy access for a driver and that are as close as possible to areas where the charge areas are set, such as in the vicinity of the notification station 30, in the area under the jurisdiction of the notification station 30, outside the area under the jurisdiction of the notification station 30, or the like. For example, they may be provided in local government buildings or branches thereof in the area in which the charge area is set. In these spots, new IC cards an be issued, lost or damaged cards can be reissued, unpaid tolls (card balances in arrears) can be settled, and prepaid deposits can be increased (i.e. card balances increased) in accordance with the wishes of a driver by a service operator or by an automatic machine. When these processings are performed, the processing data is transmitted to the notification station 30 via a public phone network and an exchange 60. In accordance with the received processing data, the notification station 30 updates the data in the observation database WDB when a new card is issued, a lost or damaged card is reissued, or a prepaid deposit is increased, and updates the data in the arrears database CDB when an unpaid toll is settled.

Figure 36:
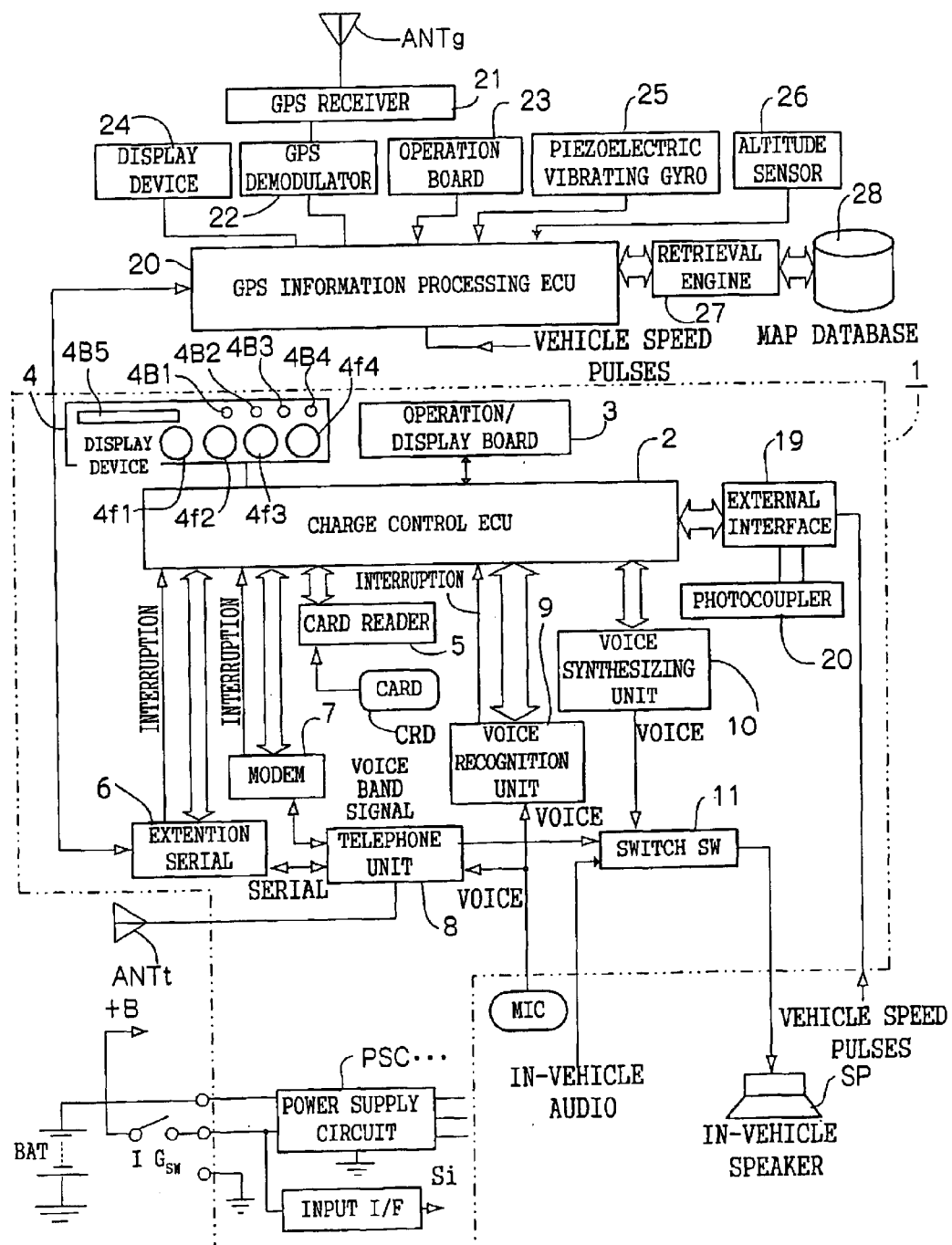
FIG. 36 is a block diagram showing the structure of the in-vehicle charging device 1 shown in FIG. 35.

FIG. 37 shows the exterior of a case housing the main portions of the in-vehicle charging device 1. The operation and display board 3 of the in-vehicle charging device 1 shown surrounded by the two-dot dash line in FIG. 36 is outside the case shown in FIG. 37 and is close to the operation board 23 of the GPS measurement device 20–28, and is connected to the charge control ECU 2 inside the case shown in FIG. 37 via an electrical cord.

The case housing the main portions of the in-vehicle charging device 1 is fixed to a position in front of the drivers seat inside the vehicle where it can be easily seen from outside the vehicle through the windscreen. Four apertures are formed in the surface of the case that forms the front surface thereof when the case is seen from the front of the vehicle. These four apertures are enclosed respectively by red transparent plates W4f1 and W4f2 each having a high level of transparency, a yellow transparent plate W4f3 having a high level of transparency, and a blue transparent plate W4f4 having a high level of transparency. A curved mirror for reflecting light is provided inside the case facing each of the window plates and high intensity lamps 4f1 to 4f4 are placed in the center of each mirror (see FIG. 37). When the high intensity lamps 4f1 to 4f4 are turned on, the transparent plates W4f1 to W4f4 placed in the front of each lamp appear shining brightly in their respective colors.

This turning on of the lights is in order to enable a charging controller (i.e. an employee of the charging system operating body or a member of the police forces with responsibility for the system) to visually confirm from a position in front of the vehicle while the charging device 1 in the vehicle is moving whether or not the charging is being performed correctly, and to enable photography by a camera for notifying the condition (i.e. for displaying the fact that the light is on). Light emitting diodes 4B1 to 4B4 are provided on the vehicle inner side (the side facing the driver) surface (the rear surface thereof when looked at from the front of the vehicle) of the charging device 1 to match the high intensity lamps 4f1 to 4f4. A character display 4B5 is also provided for displaying charge area information. Furthermore, an IC card insertion slot 5i is provided for the card reader 5.

The notification station 30 transmits data for flashing patterns (i.e. activation cycle and activation duty) for the high intensity lamp 4f1 to the charging device 1 using wireless communication. The charging device 1 repeatedly flashes the light emitting diode 4B 1 and the monitor lamp 4f1 in accordance with the activation pattern data. The monitor lamp 4f1 is used by the charging controller to perform observation from outside the vehicle, while the light emitting diode 4B1 is used by the driver of the vehicle for confirmation. When the cycle signal data included in the flashing pattern data is read, the flashing of the activation pattern is begun. Namely, the actual flashing is synchronized with the timing planned by the notification station 30.

A regulatory device installed above the road or else a portable regulatory device receives a flashing pattern transmitted from the notification station 30 when a check is being made as to whether or not the charging device 1 in the vehicle is operating correctly, and the vehicle number plate as well as the front portion of the vehicle with the window plates W4f1 to W4f4 included therein are photographed by a camera both in the period when the lights are activated and the period when the lights are not activated. This photography is performed at least twice in the light activation pattern so that at least four frame images are obtained. If the charging device 1 is operating correctly, the window plate W4f1 appears shining in the odd numbered frame images, while in the even numbered frame images, even when the high intensity lamp W4f1 of the charging device 1 is lit continuously (i.e. the charging device cannot be used), or if the charging device 1 performs a flashing operation which is not a response to the notification station 30 (i.e. if the device has been illegally modified) even though the flashing is temporarily being repeated, because the window plate W4f1, for example, appears dark in an image in which it should appear shining, or appears shining in an image in which it should appear dark, it is possible to obtain a photograph that proves the charging device 1 has been illegally used (i.e. is not being used or has been modified).

When charge processing to access the IC card CRD is not possible, such as when reading or writing of the IC card CRD is not possible (including when the IC card CRD has not been loaded, or when there is a data abnormality (i.e. a modified or forged card, or an insufficient balance), the charge control ECU 2 attaches the date and time to the "card error" data (i.e. data indicating an abnormality) and writes this in the abnormality history reading/writing area (this will be referred to below as abnormality history memory) allocated in the area 1 in non-volatile semiconductor memory in the charge control ECU 2.

The notification station 1 continuously lights the high intensity lamp 4f2 and the light emitting diode 4B2 thereby causing the window plate W4f2 to shine red. A synthesized voice also announces, "this card is abnormal—please load a correct card" using the speaker SP in the vehicle. When the GPS information processing ECU 20 to measure the position even though GPS position measurement is possible, the charge control ECU 2 attaches the time and date thereto and writes "GPS position measurement error" data in the abnormality history memory and also generates a warning notification 2.

The warning notification 2 is given by leaving the high intensity lamps 4f2 and 4f3 as well as the light emitting diodes 4B2 and 4B3 continuously lit, by causing the window plate W4f2 to shine red and the window plate W4i3 to shine yellow, and also by causing the synthesized voice to announce "GPS position measurement is abnormal—please service" using the speaker SP inside the vehicle. When there is no high speed pulse being generated in spite of the fact that a high speed pulse should be being generated, the charge control ECU 2 attaches the time and date thereto and writes "speed pulse error" data in the abnormality history memory and also generates a warning notification 3.

The warning notification 3 is given by leaving the high intensity lamps 4f2 and 4f3 as well as the light emitting diodes 4B2 and 4B3 continuously lit, by causing the window plate W4f2 to shine red and the window plate W4f3 to shine yellow, and also by causing the synthesized voice to announce "vehicle speed detection is abnormal—please service" using the speaker SP inside the vehicle.

The high intensity lamp 4f4 and the light emitting diode 4B4 are used to indicate the fact that the charging device 1 is currently in operation. The charge control ECU 2 leaves the high intensity lamp 4f4 and the light emitting diode 4B4 continuously lit when the unillustrated main power source for the charge control ECU 2 is on while the vehicle ignition key switch IGsw is on. The turning on of the high intensity lamp 4f4 causes the window plate W4f4 to shine brightly in a blue color.

Figure 38:
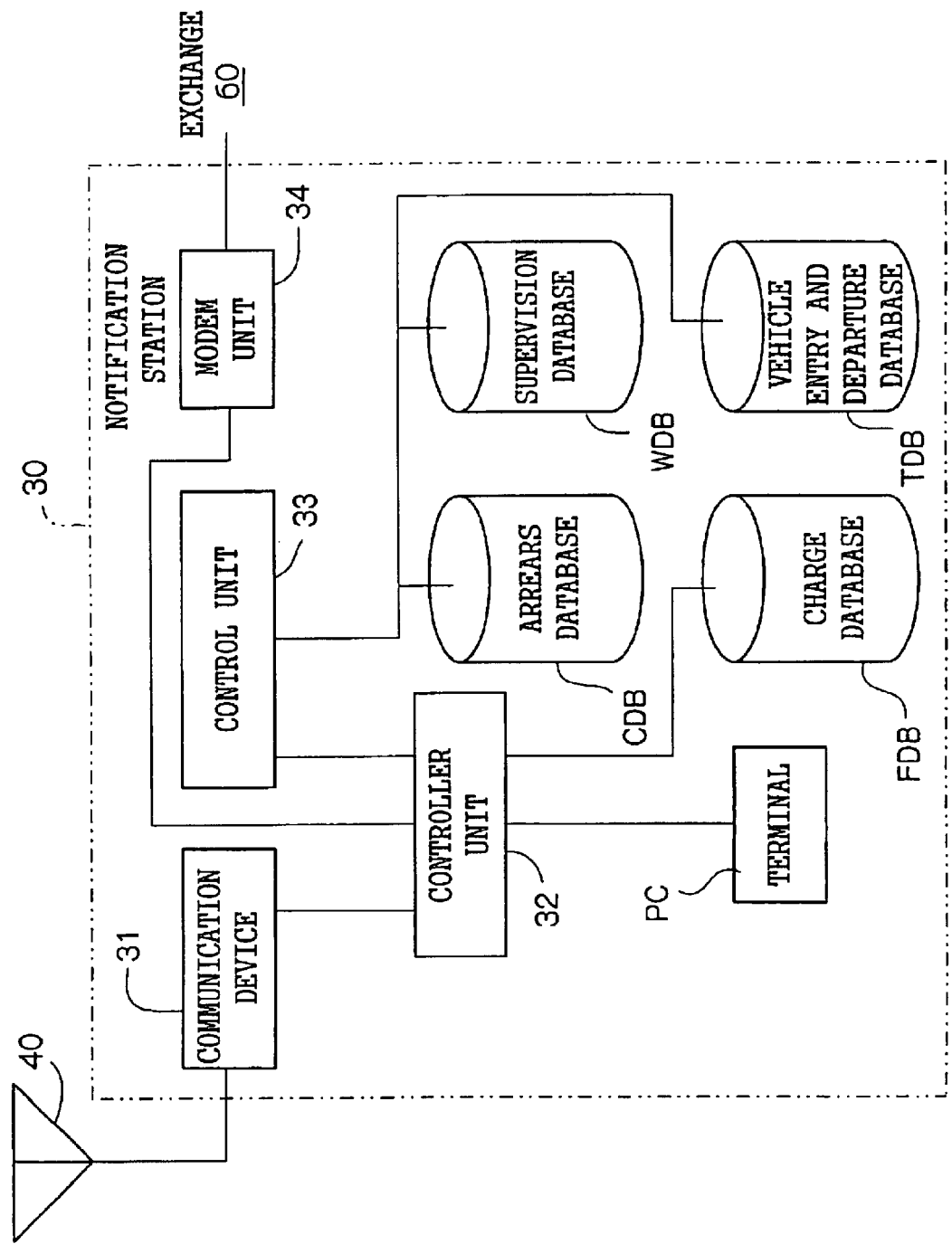
FIG. 38 is a block diagram showing the structure of the notification station 30 shown in FIG. 35.

The structure of the notification station 30 is shown in FIG. 38. In the notification station 30 there is a wireless communication device 31 that modulates transmission data from a controller 32 into radio wave signals which it sends to an antenna 40, and also receives radio waves via the antenna 40, demodulates the received data and feeds it to the controller 32. The controller 32 is a computer system that is centered around a microprocessor (MPU) and is provided with an input/output interface. A terminal PC (a complete set comprising a personal computer, display device, keyboard, mouse, printer), a charge database (memory) FDB, and an information control unit 33 are connected to the controller 32. The arrears database CDB, the observation database WDB, and the entry/exit vehicle database TDB are connected to the information control unit 33.

A modem 34 is connected to the controller 32. The controller 32 is able to perform sound and data transmission with the control center 50 (FIG. 35) via this modem and the public communication circuit exchange 60 (FIG. 35).

Figure 39A:
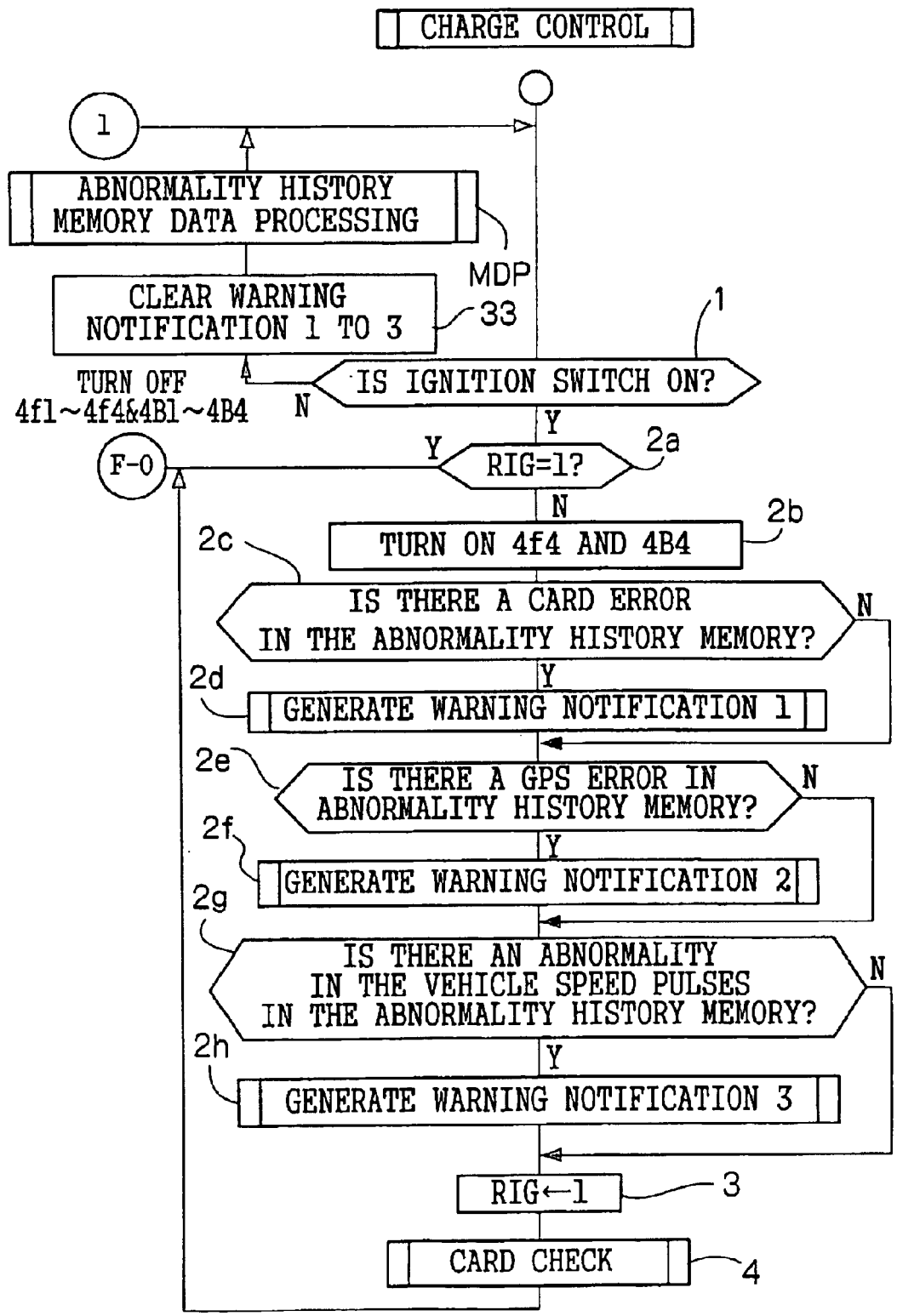
FIGS. 39A and 39B are flow charts showing a portion of the charge control operation of the charge control ECU 2 shown in FIG. 37.
Figure 39B:
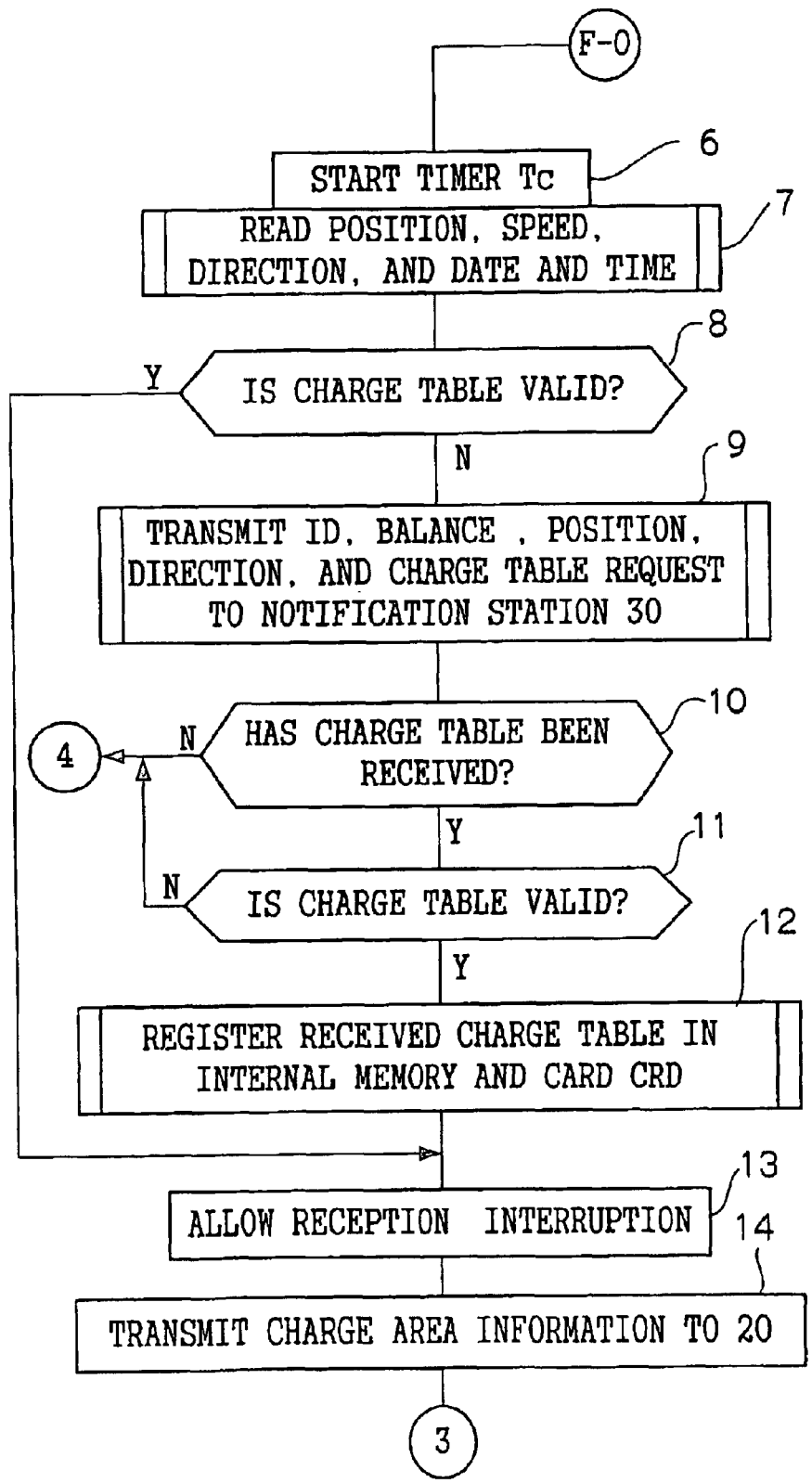
Figure 40A:
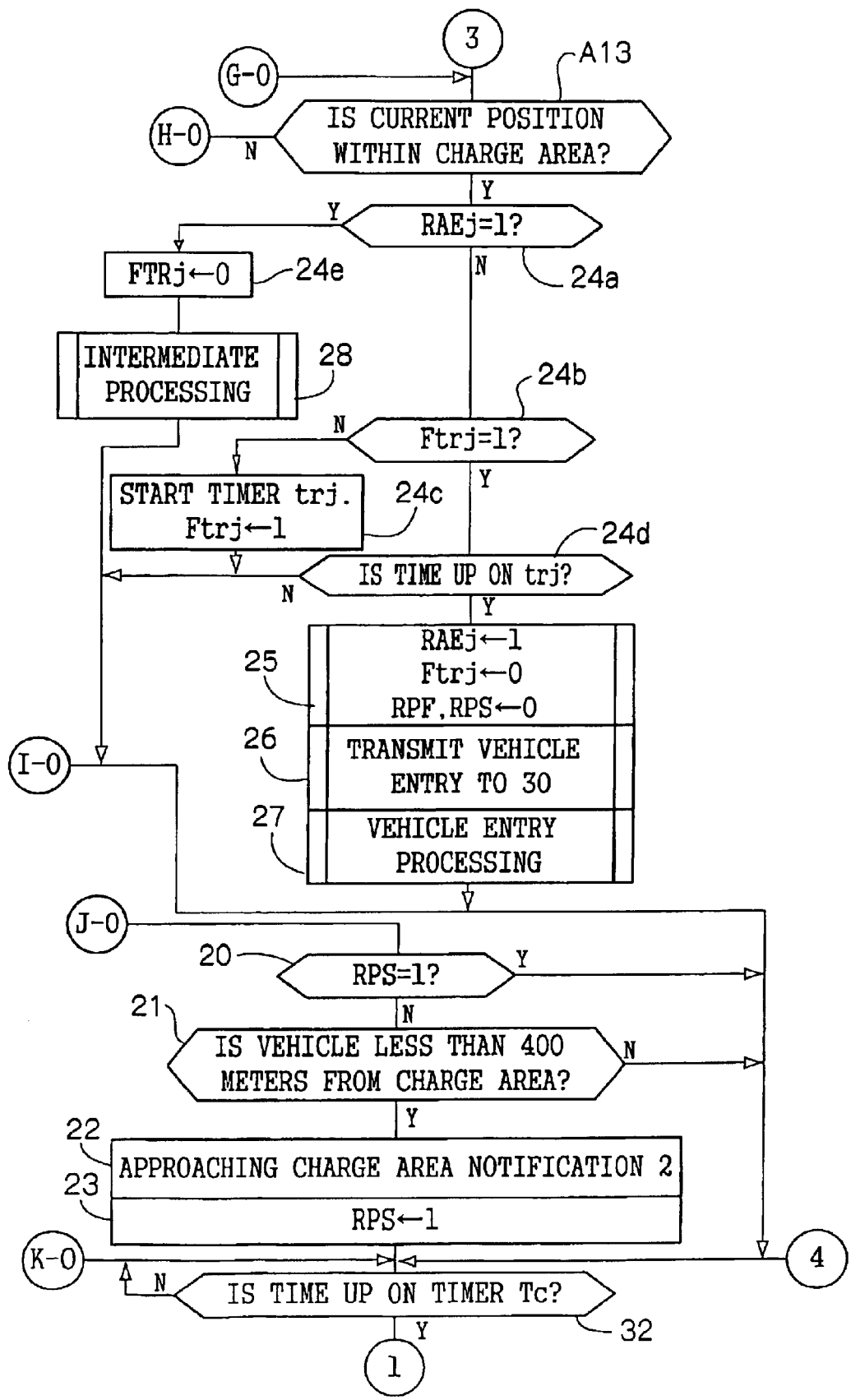
FIGS. 40A and 40B are flow charts showing the remaining portions of the charge control operation of the ECU 2 shown in FIG. 37.
Figure 40B:
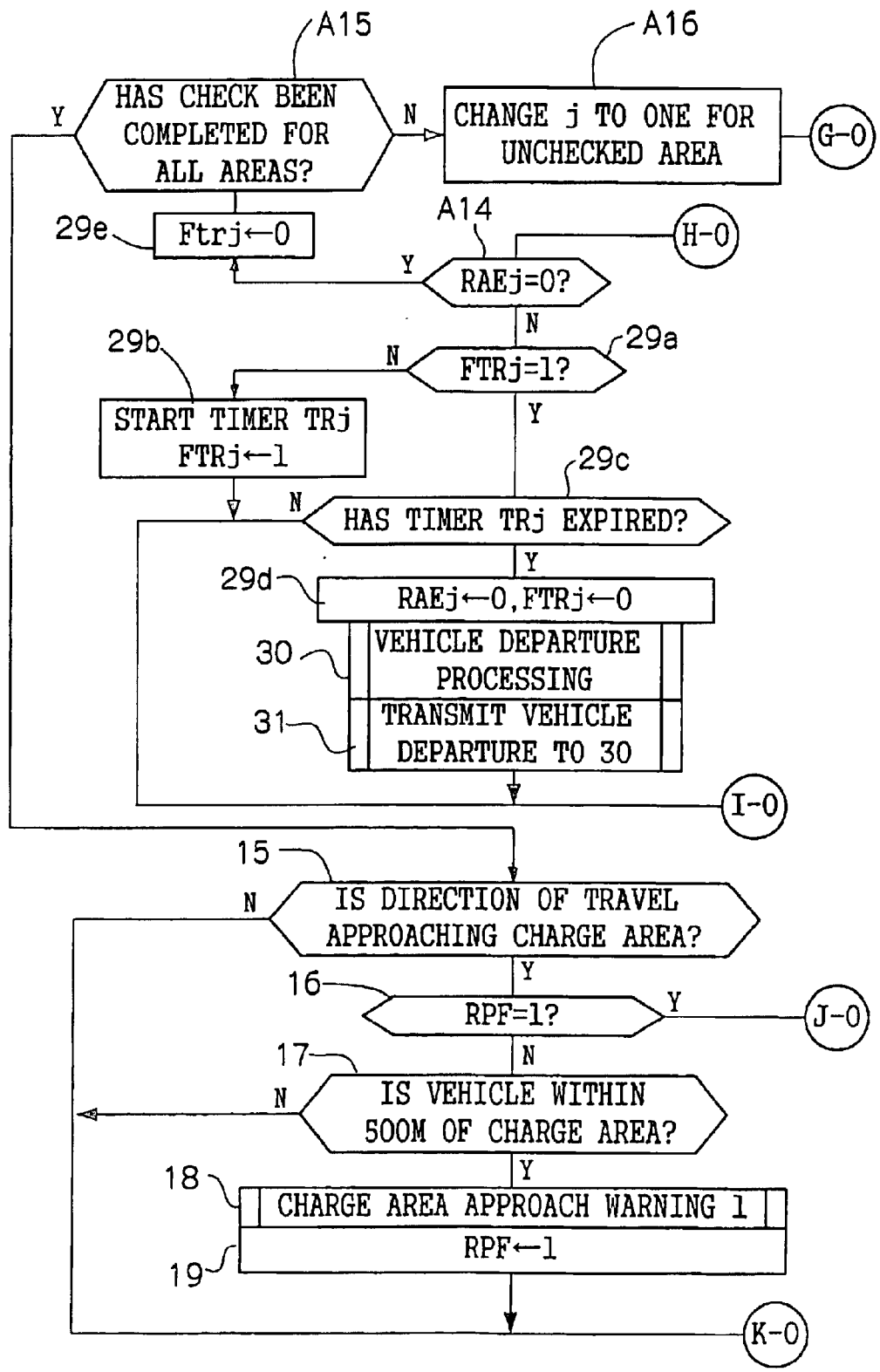

FIGS. 39A and 39B as well as FIGS. 40A and 40B show outlines of the charging control operation of the (CPU of the) charge control ECU 2. FIGS. 39A and 39B will be looked at first. The charge control ECU 2 waits for the ignition switch IGsw to be closed (Si:H), and when the ignition switch is closed, the lamp 4/4 and the light emitting diode 4B4 are lit (steps 1, 2a, and 2b). Note that in the description below, the word step is omitted and only the step number itself is given.

Next, a check is made as to whether or not there is an abnormality in the abnormality history memory, if there is "card error" data present, the above described warning notification 1 is generated (2c, 2d). If "GPS error data" is present, the above described warning notification 2 is generated, and if there is "speed pulse abnormality" data present, the above described warning notification 3 is generated.

Next, the charge control ECU 2 registers the data of the card CRD in its internal memory via the card reader 5 (3, 4). If no card CRD has been loaded, the routine waits for a card to be loaded and then registers the data of the card CRD in internal memory once it has been loaded. The card balance from among the read card data is displayed on the display 4B5 of the display device 4. The contents of the "card check" (4) will be described below with reference to FIGS. 41A and 41B.

After the "card check" (4), the charge control ECU 2 starts the timer Tc for the time limit Tc (6). A data transmission request is then made to the GPS information processing ECU 20, and data of the current position (ground position), the direction of travel, the speed of travel, and the date and time is received from the GPS information processing ECU 20 and written to internal memory (7).

Next, the charge control ECU 2 checks whether the date and time received from the GPS information processing ECU 20 are within the period in which the table is valid in the charge table registered in internal memory, or whether the current position received from the GPS information processing ECU 20 is within the area in which the table is valid shown in the information of the area in which the table is valid in the charge table registered in internal memory (8). If the date and time are outside the period in which the table is valid, or if the current position is outside the area in which the table is valid, then in this case, the charge table does not fit the current area or the current date and time. Therefore, a charge table request is transmitted via the antenna ANTt (9). At this time, the charge table request is transmitted together with the vehicle ID, balance (i.e. credit information), and card ID in the card data, and the current position (ground position) and direction of travel obtained from the GPS information processing ECU 20. When the notification station 30 receives the charge table request, it saves the card ID, the balance, the vehicle ID, the current position, and the direction of travel data in the card ID address in internal memory, and transmits the charge table (Table 2) in the charge database FDB (41–44 in FIGS. 51A to 51B).

When it receives this charge table, the charge control ECU 2 checks whether the date and time received from the GPS information processing ECU 20 are within the period in which the table is valid in the charge table, or whether the current position received from the GPS information processing ECU 20 is within the area in which the table is valid shown in the information of the area in which the table is valid (10, 11). If the date and time are within the period in which the table is valid, and if the current position is within the area in which the table is valid, the charge control means 2 registers (replaces with new data) the received charge table in internal memory and in the IC card CRD (12). Reception interruption is then allowed (13). "Reception interruption" is executed as a response when a radio signal arrives at the antenna ANTt and an unillustrated receiver of the telephone unit 8 generates an arrival signal "signal received" showing that a transmission has been made. The contents of the reception interruption processing will be explained below with reference to FIG. 48. When the reception interruption has been allowed, the charge control ECU 2 gives chare area information in the charge tables to the GPS information processing ECU 20 (14). When it receives this charge area information, the GPS information processing ECU 20 adds the charge area display (i.e. in half tone) to the area of the map displayed on the display device 24 that corresponds to the charge area represented by the charge area information.

Next, looking at FIGS. 40A and 40B, the charge control ECU 2 checks at the time cycle Tc whether the current position is within a charge area indicated by the charge area information in the charge table or outside the charge areas (A13 to 32-1 to 11–13A). If it is outside a charge area, and if the direction of travel is one that is approaching a charge area, then when the position is within 500 meters from the charge area, "charge area 500 meters ahead" is displayed on the display device 24 along with charge table information (however, the charge area information and the information of the area in which the table is valid are excluded). At the same time, notification such as "charge area is 500 meters ahead" is made by voice synthesis via the voice synthesizing unit 10 and the speaker SP (A13–19).

Moreover, when the current position is within 400 meters from the charge area, the display "charge area 500 meters ahead" on the display device 24 is altered to "charge area 400 meters ahead", and a notification of "charge area is 400 meters ahead" is also made (13A to 16–20 to 23).

Note that the charge area is displayed in superposition on the map displayed on the display device 24 in the step 14 that is repeated at the cycle Tc. Moreover, because the current position of the vehicle is shown on the displayed map as a direction attached index, the driver can recognize the position and the direction of travel of the vehicle relative to the charge area from the display on the display device 24.

When the vehicle enters a charge area j (A13, 24a), in order to avoid instability in the entry determination when the results of the detection of the vehicle while the vehicle is traveling swing over a short distance between inside the boundary of the charge area j and outside the boundary of the charge area j (i.e. when the detection results repeatedly first say the vehicle is inside the charge area j and then is outside the charge area j), a timer trj having a time limit trj of a few seconds (for example, 2 seconds) is started. When this time limit has ended, namely, when the set time trj has passed after the measurement of the passing time was begun, "1" is registered in the register RAEj to show that the vehicle has entered into the charge area j. The "1" of the register rtfj which shows that the above measurement of the predetermined time is being performed is then cleared, and information showing that the vehicle outside the charge area has come to within 500 meters and 400 meters of the charge area (i.e. the data of the registers RPF and RPS) is cleared (24a to 24d, 25). If the current position is detected to be outside the charge area j between the starting of the timer trj and the point when the time limit is ended, at that point the clock is cancelled (29e) and the timer tij is set once again after the vehicle is again detected within the charge area j. Therefore, even if the detection results swing between inside and outside the charge area j in an interval less than the set time tij, "1" which shows the vehicle entry is not registered in the vehicle register RAEj. If the detection results are continuously within the charge area j over the set time trj, "1", which shows the vehicle has entered the charge area j is registered in the vehicle register RAEj.

When this entry data processing is performed, the charge control ECU 2 notifies the notification station 30 that the vehicle has entered the charge area j with the message "vehicle entry" (26). At this time, the vehicle ID, balance, and the card ID in the card data, as well as the various data indicating the time and date, current position and direction of travel obtained from the GPS information processing ECU 20 are added to the vehicle entry notification and these are transmitted to the notification station 30. When the notification station 30 receives this vehicle entry notification, the time and date, the card ID, the vehicle ID, the position, the direction, and the balance are saved in the internal memory, and a movement history table for the control station is prepared and registered at the relevant card address in the vehicle entry and exit database TDB.

Figure 42:
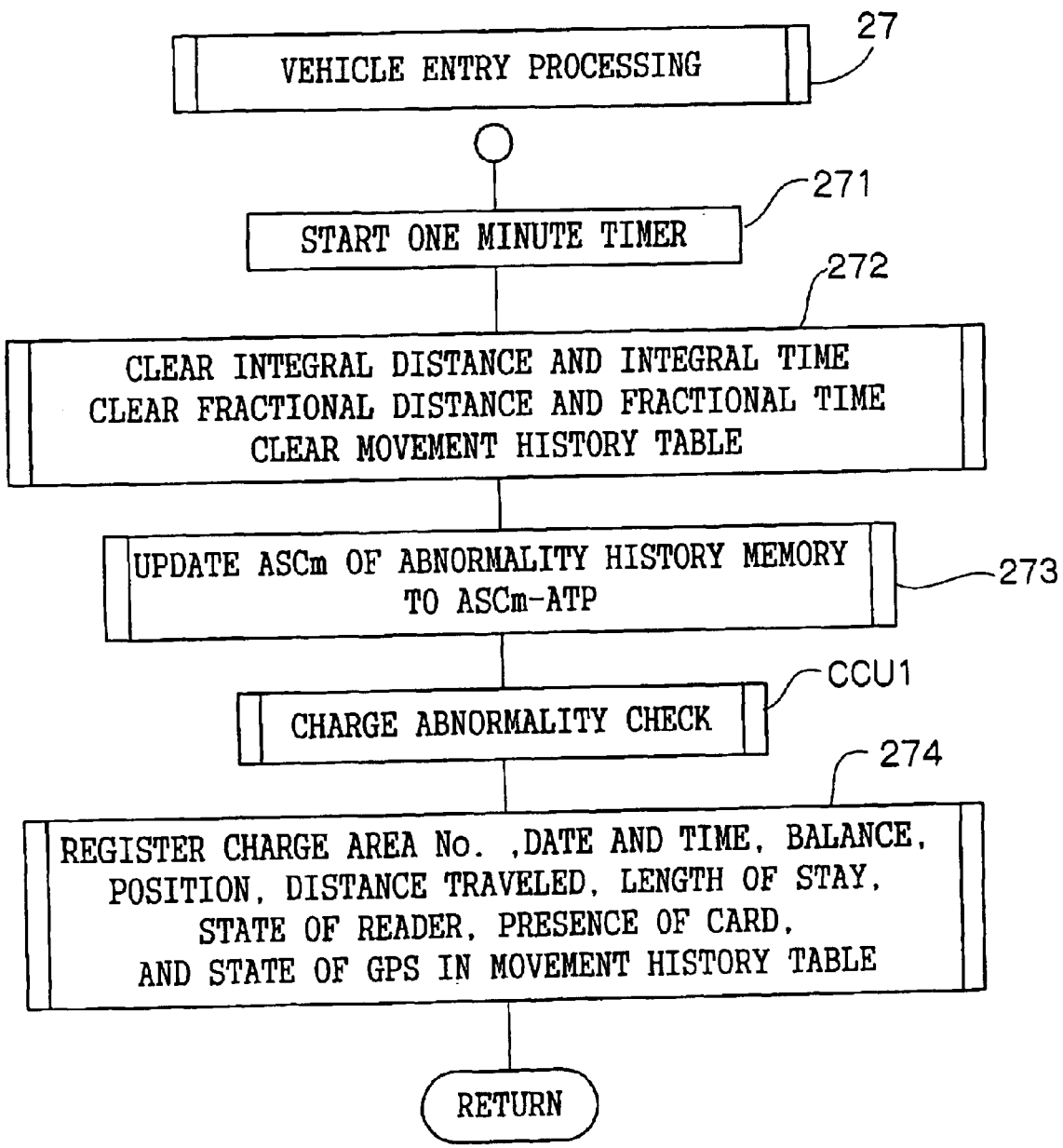
FIG. 42 is a flow chart showing the content of the "vehicle entry processing" 27 shown in FIGS. 40A and 40B.

The charge control ECU 2 next performs "vehicle entry processing" (27). The contents of this processing are shown in FIG. 42. Firstly, a one minute timer for setting the sampling cycle of the movement history data is started (271). Next, the integral distance register, the fractional distance register, the integral time register, the fractional time register, and the movement history table are cleared (272).

Thereafter, data processing, namely, charge processing (273+CCU1) for paying the charge amount for a single entry into the charge area j is performed and the card balance is updated. The contents of this (273+CCU1) will be described below with reference to FIGS. 43 to 45.

Next, the charge area No., time and date, balance, position, distance traveled (the data in the integral distance register and fractional distance register), the length of stay (the data in the integral time register and fractional time register), the state of the card reader 5 (i.e. ready, normal, not ready, abnormal), the existence or otherwise of a card CRD loaded in the card reader 5, and the state of the GPS (i.e. whether or not position data has been generated) are written in the movement history table (274). Note that, as is described below, after the first writing, this writing is performed in cycles of one minute while the vehicle is in the charge area. An example of the contents of a movement history table is shown in Table 11.

TABLE 11

| | | | | | | | |
|---|---|---|---|---|---|---|---|
| | | | Movement history table | | | | |
| Date and time | Balance | Position | Distance traveled | Length of stay | Card | Card | GPS |
| Jan. 1, 1998 10:10 | 09750 | N350000, E1370000 | XX | XX | Normal | Present | Normal |
| Jan. 1, 1998 10:11 | 09750 | N350000, E1370001 | XX | XX | Normal | Present | Normal |
| Jan. 1, 1998 10:12 | 09750 | N350000, E1370002 | XX | XX | Normal | Present | Normal |

FIGS. 40A and 40B will now be referred to again. After a vehicle has entered a charge area and notification of a "vehicle entry" is transmitted to the notification station 30, the charge control ECU 2 repeatedly performs the "intermediate processing" (28) at the cycle Tc while the vehicle is inside the charge area. The contents of this "intermediate processing" (27) are shown in FIG. 46.

When the routine advances to the "intermediate processing" (27) shown in FIG. 46, the charge control ECU 2 firstly updates the data of the fractional time register (fractional values) to a value larger by the amount of the lapsed time Tc (281). It then checks whether the updated fractional value is now greater than one minute (282). If it is greater than one minute, the data in the integral time register is incremented by one, and the data of the fractional time register is updated to a value that is smaller by one minute (283). Next, the distance traveled during the time Tc, namely, $$Dc = Tc(\text{seconds}) \times \text{speed}(Km/h)/3600)(Km)$$

is calculated (285). The data of the fractional distance register (fractional value) is then updated to a value larger by the amount of the distance traveled Dc during the time Tc (285). A check is then made as to whether the updated fractional value is now greater than one kilometer (286). If it is greater than one kilometer, the data in the integral distance register is incremented by one, and the data of the fractional distance register is updated to a value that is smaller by one kilometer (287).

A check is next made as to whether the timing of a one minute timer has elapsed (P88). If the time has elapsed, the one minute timer is restarted (289), and the charge area No., time, balance, position, distance traveled (the data in the integral distance register and fractional distance register), the length of stay (the data in the integral time register and fractional time register), the state of the reader (i.e. ready, normal, not ready, abnormal), the existence or otherwise of a card (i.e. loaded or not loaded), and the state of the GPS (i.e. whether or not position data has been generated) at that instant are registered (290). By repeating this intermediate processing 28, and by writing data to the movement history table at one minute cycles, data indicating the state at one minute intervals is stored in the movement history table, as is shown in Table 3.

FIGS. 40A and 40B will now be looked at once again. When the (current position of the) vehicle departs from the charge area j, the charge control ECU 2 goes through steps A13 and A14, starts the timer with a time limit value of TRj (for example, 5 seconds), and then, when the time limit has ended, namely, when the set time TRj has passed after the measurement of the elapsed time was begun, the data of the register RAEj is updated to "1" to show that the vehicle is outside the charge area j. The "1" of the register FTRj which shows that the above measurement of the predetermined time is being performed is then cleared (29a to 29d). If the current position is detected to be inside the charge area j between the starting of the timer trj and the point when the time limit is ended, at that point the clock is cancelled (24e) and the timer TRj is set once again after the vehicle is again detected outside the charge area j. Therefore, even if the detection results swing between inside and outside the charge area j in an interval less than the set time TRj, "1" which shows the vehicle entry is not deleted from the vehicle register RAEj. If the detection results are continuously within the charge area j over the set time TRj, the data of the vehicle register RAEj is updated to "0" which shows the vehicle has entered the charge area j.

When the data of the reguister RAEj is updated to "0", the charge control ECU 2 performs "vehicle departure processing" (30). The contents of the "vehicle departure processing" (30) are shown in FIG. 47. In the same way as the above "intermediate processing" (28), the "vehicle departure processing" (30) adds the timing values of the elapsed time during the period Tc (301 to 303) and adds the traveling distances of the distance traveled during the time Tc (305 to 307), performs the "charge abnormality check" CCU2, and lastly registers the final history inside the area in the movement history table (308).

Note that, power is supplied to the charge control ECU 2 for it to maintain minimum data retention functions not only when the ignition key switch IGsw is on, but also while it is off. As a result, because the register RAEj is allocated to the memory capable of keeping data even while the ignition key switch IGsw is off, the "1" in the data of the register RAEJ is not deleted even when the ignition key switch IGsw is turned off. Accordingly, when a vehicle parks inside the charge area j and the ignition key switch IGsw is turned off, and then turned on again when the vehicle begins moving again, there is no problem such as another charge having to be paid for the charge area j. Note that the register RAEj may also be allocated to non-volatile memory which retains data when any of the external power sources for the charge control ECU 2 is cut off.

The "charging abnormality check" CCU2 should be considered with regard to the fact that it is executed in the " " 30 when a vehicle leaves the charge area j. The contents of this processing are the same as the contents of the "charging abnormality check" CCU1, shown in FIGS. 43 to 45. Namely, the "charging abnormality checks" CCU1 and CCU2 are performed when a vehicle enters a charge area and exits a charge area.

Referring again to FIGS. 40A and 40B, when the above "vehicle departure processing" (30) has ended, the charge control ECU 2 transmits "vehicle departed", which means that the vehicle has left the charge area, to the notification station 30 (31). At this time, the vehicle ID, the balance and the card ID in the card data, as well as the data in the movement history table are also transmitted to the notification station 730. The notification station 730 adds the received history data to the control history table of the vehicle entry database TDB, which table was allocated to the card ID at the time of the "vehicle entry". These contents are described below.

When the (current position) of the vehicle leaves the first charge area j and enters the area where the table for the second area is valid, the charge control ECU 2 registers a second charge table transmitted from an unillustrated second notification station in internal memory and in the IC card CRD and charge control is performed in the manner described above in accordance with the data therein. Moreover, when there are a plurality of adjacent or overlapping charge areas, "1" may be retained in a plurality of registers RAEj simultaneously and the respective charges for the plurality of areas may each be paid. For example, when a vehicle is traveling through the middle of charge area 1 towards charge area 4, when the determination by GPS measurement as to whether or not the vehicle is within the area is swinging in the manner shown by the bold double dot dash line, the vehicle travels through charge area 1 and charge area 2 and the charge amounts addressed to both areas are paid.

Note that, when a vehicle reaches a point 500 meters before a charge area, that fact is notified to the driver via the display unit 4 and the speaker SP, and information on the charge area is displayed on the display unit 4. In addition, a notification is again made when the vehicle reaches a point 400 meters before the charge area. Therefore, the driver has plenty of leeway to decide whether or not to enter a charge area, and has enough time to choose a detour route.

Figure 41B:
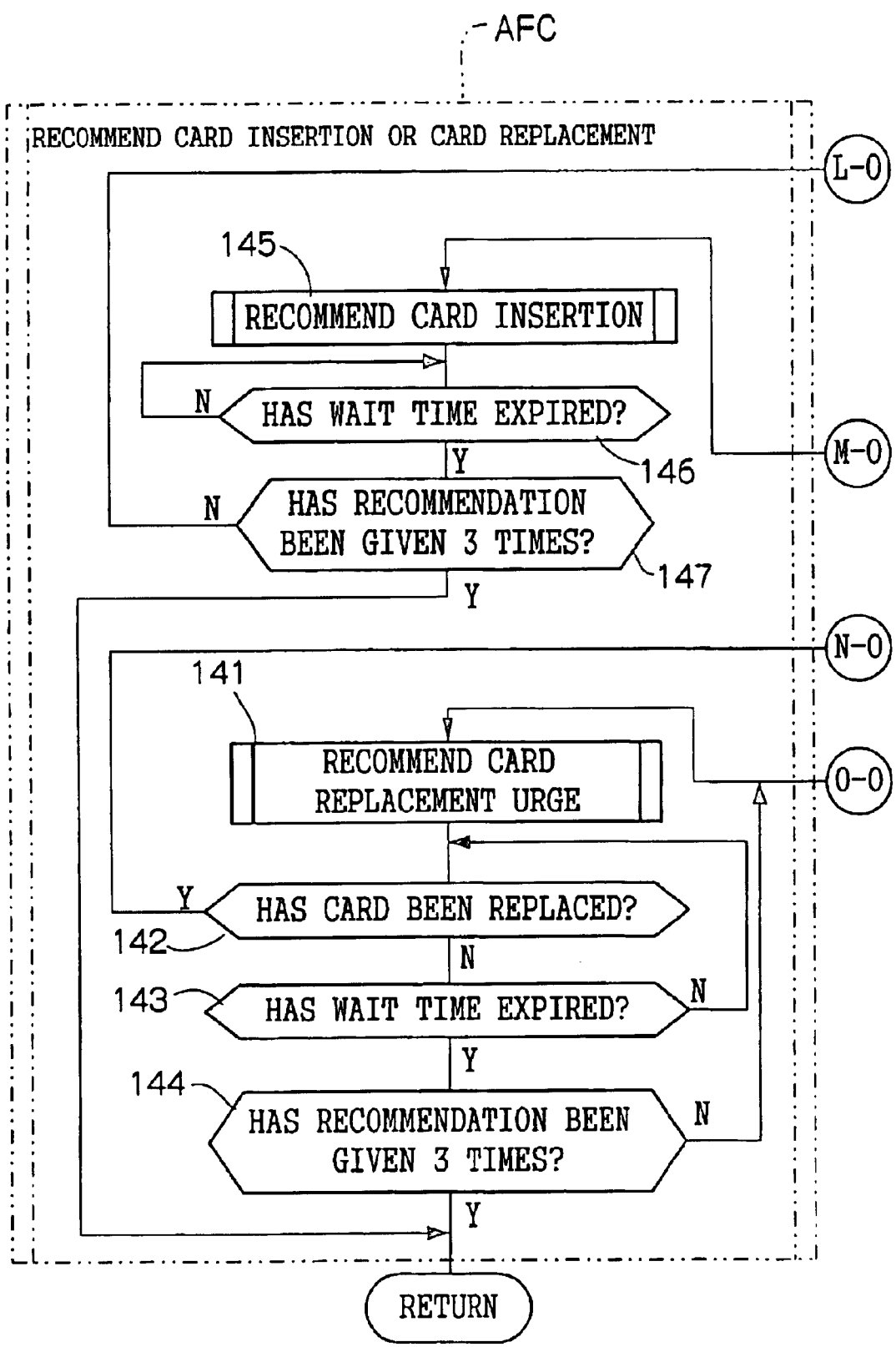

Here, the contents of the "card check" 4 mentioned in FIGS. 39A and 39B will be described with reference to FIGS. 41A and 41B. When this "card check" 4 is begun, the (CPU of the) charge control ECU 2 checks a condition signal from a card loading condition sensor in the card reader 5 thereby checking whether or not an IC card CRD is loaded (131). If an IC card CRD is loaded, the data thereon is read (132, 133) and, if data reading has been possible, the balance AOC on the card is displayed on the display unit 4B5 (134). If the balance AOC here is a positive value, any unpaid charges (unpaid amount due: negative value data) ASCm in the abnormality history memory are read and added to the balance AOC. The sum of both of these (AOC–unpaid amount due) is set as the balance and this is written as the latest update in the card CRD (135, 136). If this updated balance is a positive value, this means that the payment has been correctly performed. Therefore, the unpaid amount due ASCm in the abnormality history memory is cleared (137, 138), card errors (abnormality information) in the abnormality history memory are cleared, and the warning notification 1 is terminated (139). If the updated card balance is a negative value, this means that this amount is unpaid. Therefore, the unpaid amount due ASCm in the abnormality history memory is updated to a new balance (137, 140). The above description is the contents of the "card reading processing" CDP.

If the card balance AOC read in the earlier card reading (133) is a negative value (unpaid amount due), a notification to replace the card is displayed on the display unit 4B4 and a notification announcement is made using the synthesized voice (141). The wait time timer is then started and the device waits for the wait time to expire (143). If the card is replaced, the card is read once again (133). If the card is not replaced, when the wait time has expired, a further notification announcement is made. This notification announcement is made three times if the card is not replaced. This is a single "card replacement notification". If the card is still not useable after three notification announcements, the "card check" 4 ends there. Note that, when the above "card reading processing" CDP is begun, if there is an abnormality in the card loading or data, notification to insert a card is displayed on the display unit 4B5 and an announcement is made using the synthesized voice (145), the wait time timer is then started and the device waits for the wait time to expire (146). When the wait time has expired, the card is checked once again (131, 132). If the card is still not useable, notification urging that a card be inserted is made. If the card is still not useable after three notification announcements, the "card check" 4 ends there. The above refers to the contents of a single "card insertion/replacement notification" AFC.

Note that the above "card check" 4 is executed immediately after the ignition key switch IGsw is turned on, namely, immediately after the engine is started. Because, generally, at this time, the vehicle is stopped and the charge processing is not being performed, there is no problem if no card has been loaded or if the balance is a negative value. Accordingly, a warning notification 1 corresponding to an announcement of a charging irregularity to the outside of the vehicle is not made, and the registering of abnormality history in the abnormality history memory is not performed. This "card check" 4 is performed so that the driver does not have to hurriedly insert or replace a card when the vehicle enters a charge area and serves to get the drivers attention.

The contents of the charge processing (273+CCU1) will now be described. It should be noted that this is performed in the "vehicle entry processing" 27 already described and shown in FIG. 42. In this charge processing (273+CCU1), firstly, the charge amount ATP (a positive value) in the charge table at the charge area j address is read and added to the unpaid amount due (a negative value) in the abnormality history memory. The unpaid amount due in the abnormality history memory is then updated (rewritten) to this new value (a negative value) ASCm−ATP (273). The routine then moves to the "charging abnormality check"CCU1 where card balance payment processing is performed.

Figure 43:
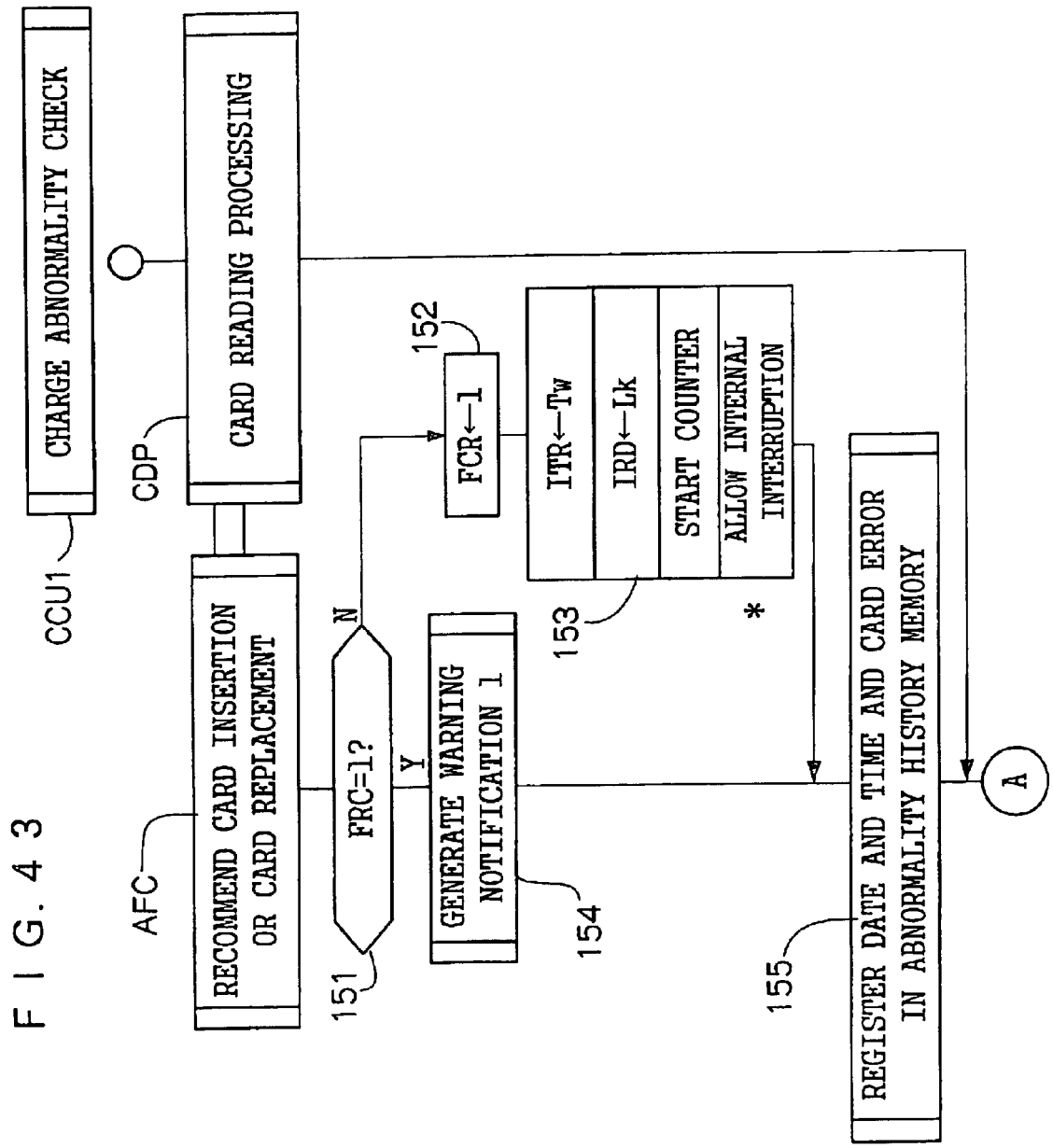
FIG. 43 is a flow chart showing a portion of the content of the "charge abnormality check" CCU1 shown in FIG. 42.

The contents of the "charging abnormality check"CCU1 will now be described with reference to FIGS. 43 to 45. FIG. 43 will be looked at first. When this "charging abnormality check"CCU1 is begun, the (CPU of the) charge control ECU 2 performs processing whose contents are the same as in the card reading processing of the above "card check" 4. In this processing (steps 136 to 138 of FIG. 41A), the unpaid amount due ASCm that was rewritten as described above of the abnormality history memory is subtracted from the card balance. If the balance is sufficient for the transaction to be completed, the unpaid amount due ASCm in the abnormality history memory is cleared and the balance on the card CRD is updated to a new value minus the subtracted amount.

If, however, there is no card loaded or if the balance resulting from the above card processing is a negative value, processing whose contents are the same as the above "card insertion/replacement notification" AFC in the "card check" 4 is performed from the card reading processing CDP. Here, if there is no card CRD loaded in the card reader 5 or if one is inserted but there is a data reading abnormality or if the balance is a negative value, the above notification is repeated three times at predetermined intervals with the notification comprising "card insertion notification" or "card replacement notification". As a result, when a positive value card balance is read, the routine moves to the next check of whether or not there is a GPS measurement error shown in FIG. 44.

However, as is shown in FIG. 43, if there is an "inadequate card" in which, even if a single "card insertion notification" or "card replacement notification" is made by the "card insertion/replacement notification" AFC, the card reading does not become possible and payment of past unpaid tolls is not completed and the card balance does not become a positive value, a check is made as to whether or not the data of the condition register FCR is set as "1". This "1" means that the "inadequate card" recognition is performed more than once (the recognition of the inadequate card in the "card check" 4 is not included in this number, however) and this time is the second time or more.

A "0" in the condition register FCR means that the present "inadequate card" recognition is the first time (excluding the recognition of the inadequate card in the "card check" 4). At this time, the generation of the abnormality notification "warning notification 1" to the outside of the vehicle is held back and "1" is registered in the condition register FRC (152). A wait time value (a set value or a fixed value) Tw which provides sufficient leeway to give the driver plenty of time to load a new card in the card reader 5 is registered in the timer register ITR. A vehicle travel distance value (a set value or a fixed value) Lk which provides sufficient leeway to give the driver plenty of time to load a new card in the card reader 5 is registered in the distance measuring register IRD. The program timer for the time value of the register ITR is then started and the program counter for counting the number of speed pulses for the distance value of the register IRD is also started. Internal interruption (timer interruption) for responding to the expiry of the timing by the timer and internal interruption (counter interruption) for responding to the end of counting by the counter are then permitted (153).

These internal interruptions lead to the card reading processing CDP and the internal processing that was generated first also prohibits the other internal processing. Accordingly, at the time when one of the lapse of the set time value Tw or the completion of the set distance Lk has occurred after the first "inadequate card" recognition, the card reading processing CDP is executed. If there is another "inadequate card" recognition at this point and this inadequate card condition is not terminated even when the "card insertion/card replacement notification" AFC is given for the second or more time, the charge control ECU 2 generates a "warning notification 1" (154) and registers the date and time as well as abnormality information showing the card error in the abnormality history memory (155).

Figure 44:
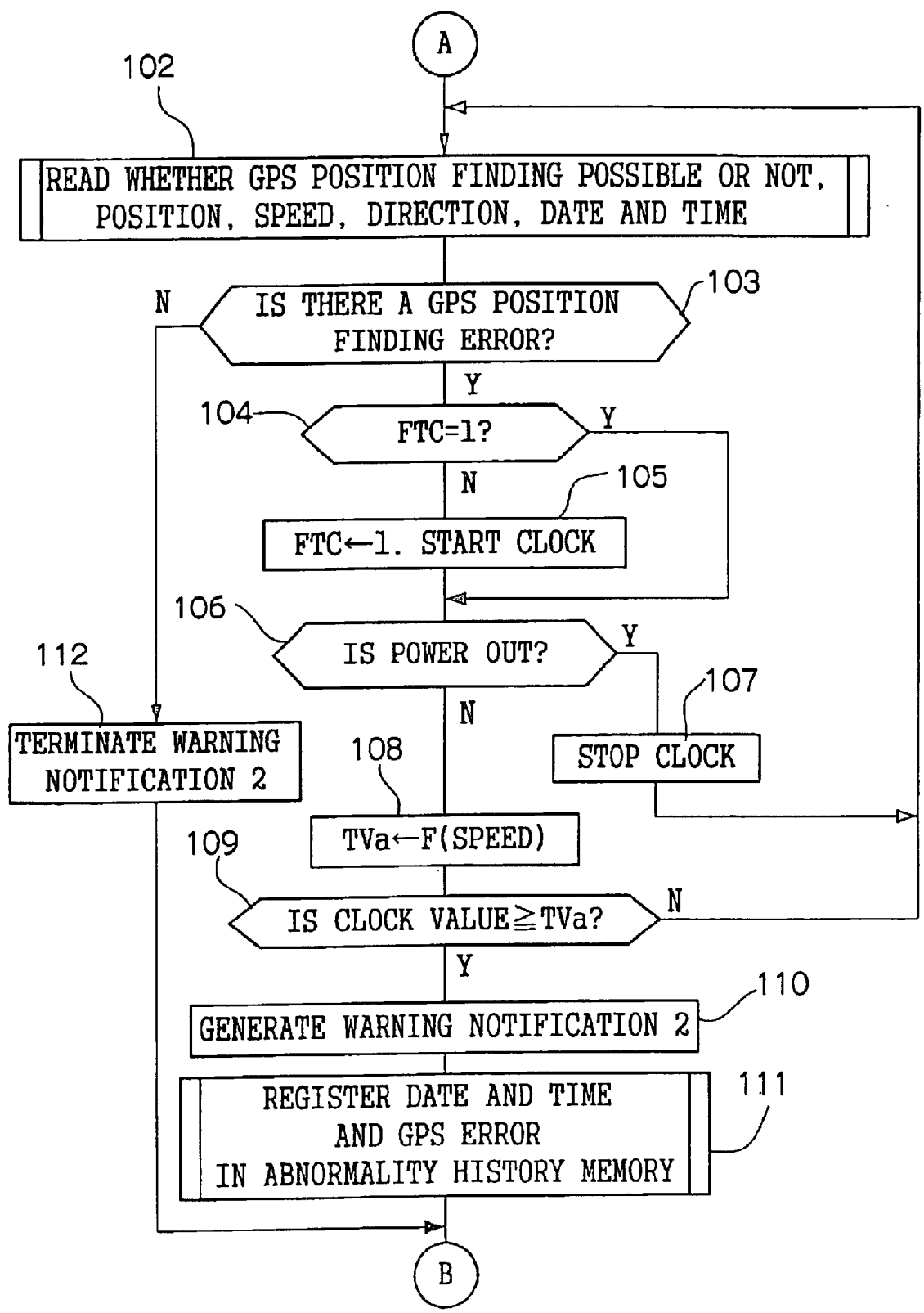
FIG. 44 is a flow chart showing another portion of the content of the "charge abnormality check" CCU1 shown in FIG. 42.

Looking now at FIG. 44, once the above card error check is completed, the charge control ECU 2 requests a data transmission from the GPS information processing ECU 20. The charge control ECU then receives data concerning whether or not GPS position measurement is possible, current position (ground position), direction of travel, speed of travel, and date and time (102) from the GPS information processing ECU 20. It then checks the data on whether or not GPS position measurement is possible (103) and if the data indicates that GPS position measurement is possible, the lamps 4f2, 4f3, and the light emitting diodes 4B2 and 4B3 are extinguished (112).

If GPS position measurement is not possible, a clock (for measuring the passage of time) is started (104, 105). This time measurement is stopped while the vehicle is stopped (i.e. while the vehicle gear shift lever is in the neutral position N or in the park position P) (106, 107), and is started again when the vehicle begins to move again. The time value Tva that is in inverse proportion to the vehicle calculated on the basis of the speed pulses is then calculated, and whether or not the measured time value is equal to or more than the time value Tva is checked. If the maximum value of the travel distance when GPS radio reception becomes impossible in the nearest charge area to the vehicle is taken as Ls (m), and if the vehicle speed is taken as Vv (km/h), the time TLs (sec) taken to travel the distance Ls is:

$$TLs = Ls/(Vv \times 1000/3600) = 3.6 Ls/Vv,$$

and TVa is set at Tva=TLs+α. In the present embodiment, α is set at approximately 10 seconds. If there is no defect in the GPS position finder, then even if the GPS position measurement becomes impossible, if the vehicle travels after that point for the time Tva at the speed Vv, GPS position measurement can definitely be performed. If GPS position measurement is still not possible at this point, then the only conclusion is that there is a defect in the GPS position finder such as, for example, the GPS antenna Atg being cut off from signal reception. At that time, the charge control ECU 2 performs steps 108 and 109, generates warning notification 2 (110), and registers "GPS error" and the date and time in the abnormality history memory (111).

Figure 45:
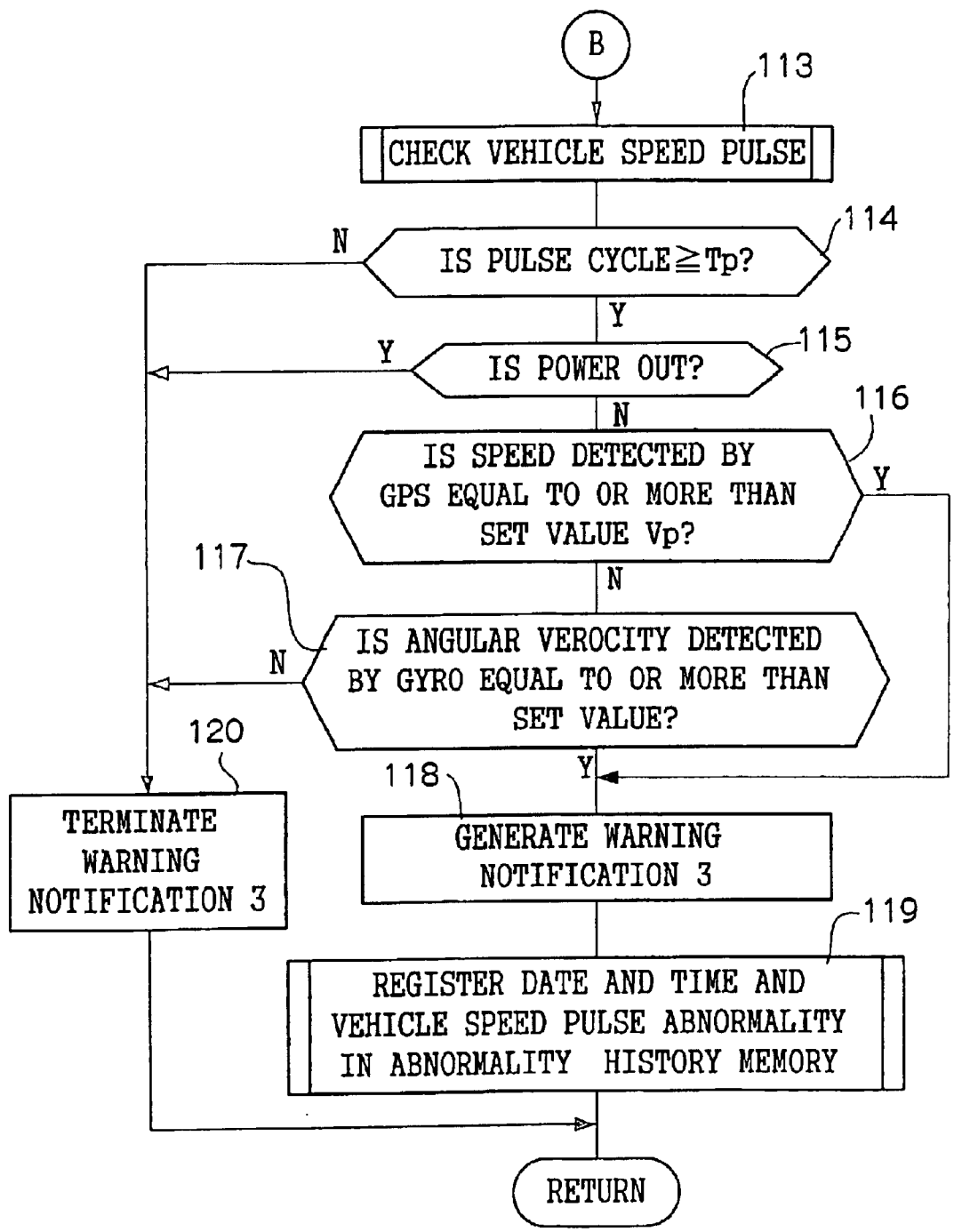
FIG. 45 is a flow chart showing the remaining portions of the content of the "charge abnormality check" CCU1 shown in FIG. 42.

Looking now at FIG. 45, when the above GPS error check has been performed, the charge control ECU 2 begins observation of electrical signals of a pulse signal line of a vehicle speed pulse generator for generating one electrical speed pulse each time the vehicle wheel rotates for a predetermined minute angle, in other words, for generating a speed pulse. The charge control ECU 2 also starts the time period value Tp timer. The time period value Tp is a value that equals a pulse cycle corresponding to an extremely low vehicle speed at which the angular velocity sensor of the gyro 25 is not able to practically detect the angular velocity of a turning vehicle. If a vehicle speed pulse appears before the time limit of the timer has expired, measurement of the pulse cycle (i.e. measurement of elapsed time) is begun. If a vehicle speed pulse does not appear within the time period value Tp, or if a vehicle speed pulse does appear once but there is no further appearance of the vehicle speed pulse within the time period value Tp, a check is made as to whether or not the vehicle is stopped (i.e. by checking whether or not the vehicle gear shift lever is in the neutral position N or the park position P). If the vehicle is stopped, the lamps 4f2 and 4f3 as well as the light emitting diodes 4B2 and 4B3 are extinguished (120).

When the vehicle is not stopped and yet the vehicle speed pulse does not appear at a short cycle less than Tp, the possibility exists that there is an vehicle speed pulse abnormality in which the vehicle speed pulses are not being generated correctly even though the vehicle is running. Therefore, a check is made as to whether or not the value of the vehicle speed calculated on the basis of the GPS position measurement is equal to or above a set value Vp above which there are no doubts about the reliability of the vehicle speed value (116). If this is the case, the conclusion is that there is an abnormality in the vehicle speed pulse generation (or signal line) and a warning notification 3 is generated (118). The vehicle speed pulse abnormality as well as the time and date are then registered in the abnormality history memory (119). If the value of the vehicle speed calculated on the basis of the GPS position measurement is less than the set value Vp, then the reliability of the value calculated for the vehicle speed is low. Therefore, whether or not the gyro 25 is detecting the angular velocity above a set value is checked. Angular velocity is not generated unless the vehicle is both moving and turning (i.e. changing course while advancing), therefore, the fact that the gyro 25 is generating angular velocity means that the vehicle is in fact moving. If this angular velocity is above a set value that shows the vehicle is moving, warning notification 3 is generated (118) and the time and date as well as the vehicle speed pulse abnormality are registered in the abnormality history memory (119).

The charge control ECU 2 performs a "charging abnormality check" CCU2 whose contents are the same as the above "charging abnormality check" CCU1 when a vehicle departs from a charge applicable area as well.

When a charge table request is received from the charging device 1, the notification station 30 transmits "charge tables" of the addresses of each charge area around the current position of the charging device 1 to the ID address of the charging device 1. Furthermore, in a fixed cycle of approximately several minutes, it transmits a "charge request" to all vehicle addresses. It then issues a "movement history request" either in a fixed cycle of approximately several minutes or in an irregular cycle to each ID address in sequence, and collects the data of the movement history tables from each ID. Moreover, when a "vehicle departure" notification is received, when there is uncharged traveling distance or staying time, a charge request is issued to the ID address of the charge device ID that supplied the "vehicle departure" notification. Furthermore, a check for errors in the charge processing is made when the "vehicle departure" notification is received and, if charge errors are discovered, these are pointed out and message data urging measures to deal with them is transmitted to the relevant ID address.

Figure 48:
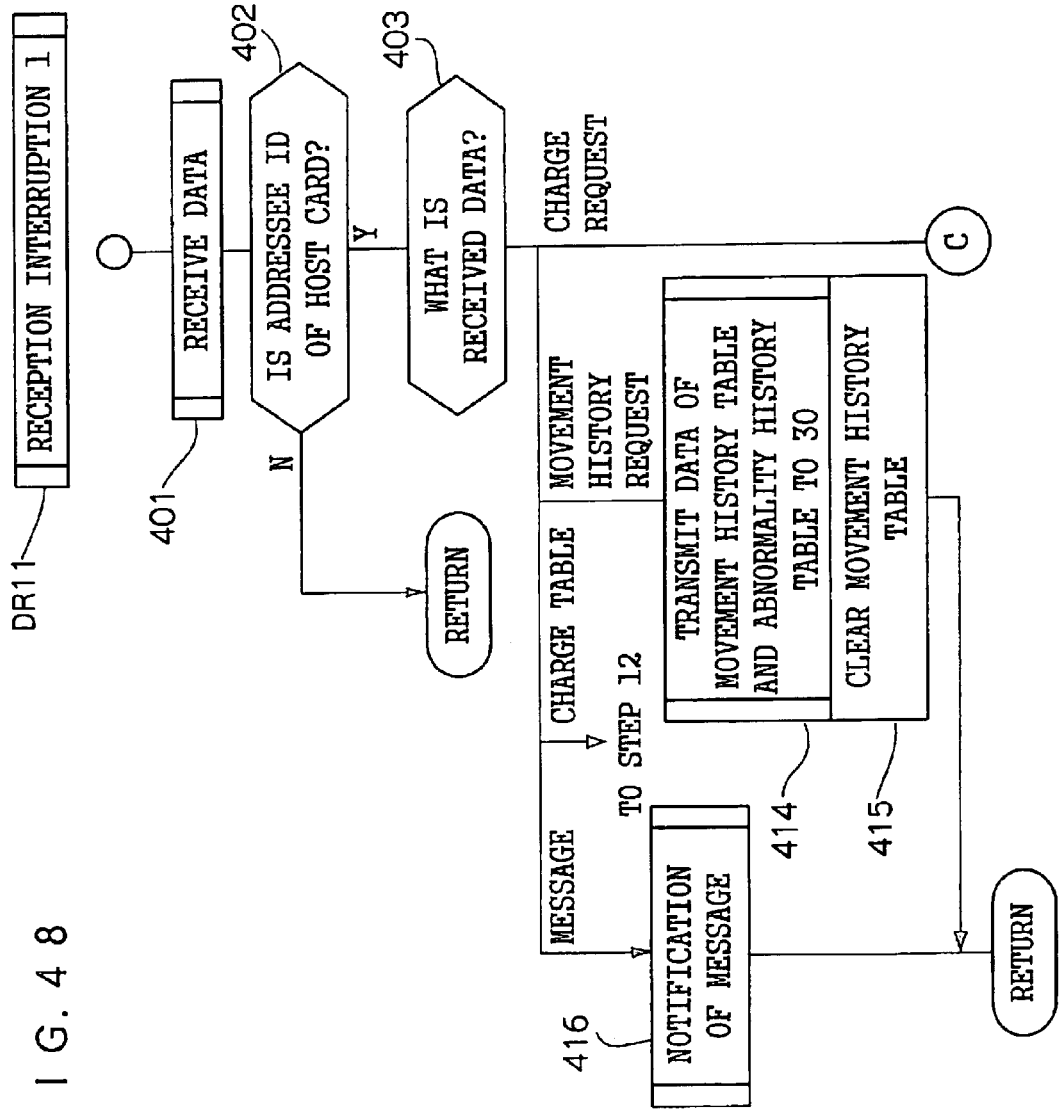
FIG. 48 is a flow chart showing a portion of the interrupt processing 1 DRI1 by the charge control ECU 2 shown in FIG. 37 in response to the reception of a radio signal.

FIG. 48 shows the contents of "reception interruption 1" DRI1 executed by the charge control ECU 2 as a response when a radio wave signal arrives in the antenna ANTTt, and an unillustrated receiver in the telephone unit 8 generates a transmission arrival signal showing that a transmission has arrived (i.e. that it has received a signal). When the charge control ECU 2 proceeds to the reception interruption DRI1, it checks whether the address belongs to the host card ID (including when all vehicles are specified) (402). If this is the case, a determination is made as to whether the received data is a charge request, a movement history request, a charge table, or a message (403).

Figure 49:
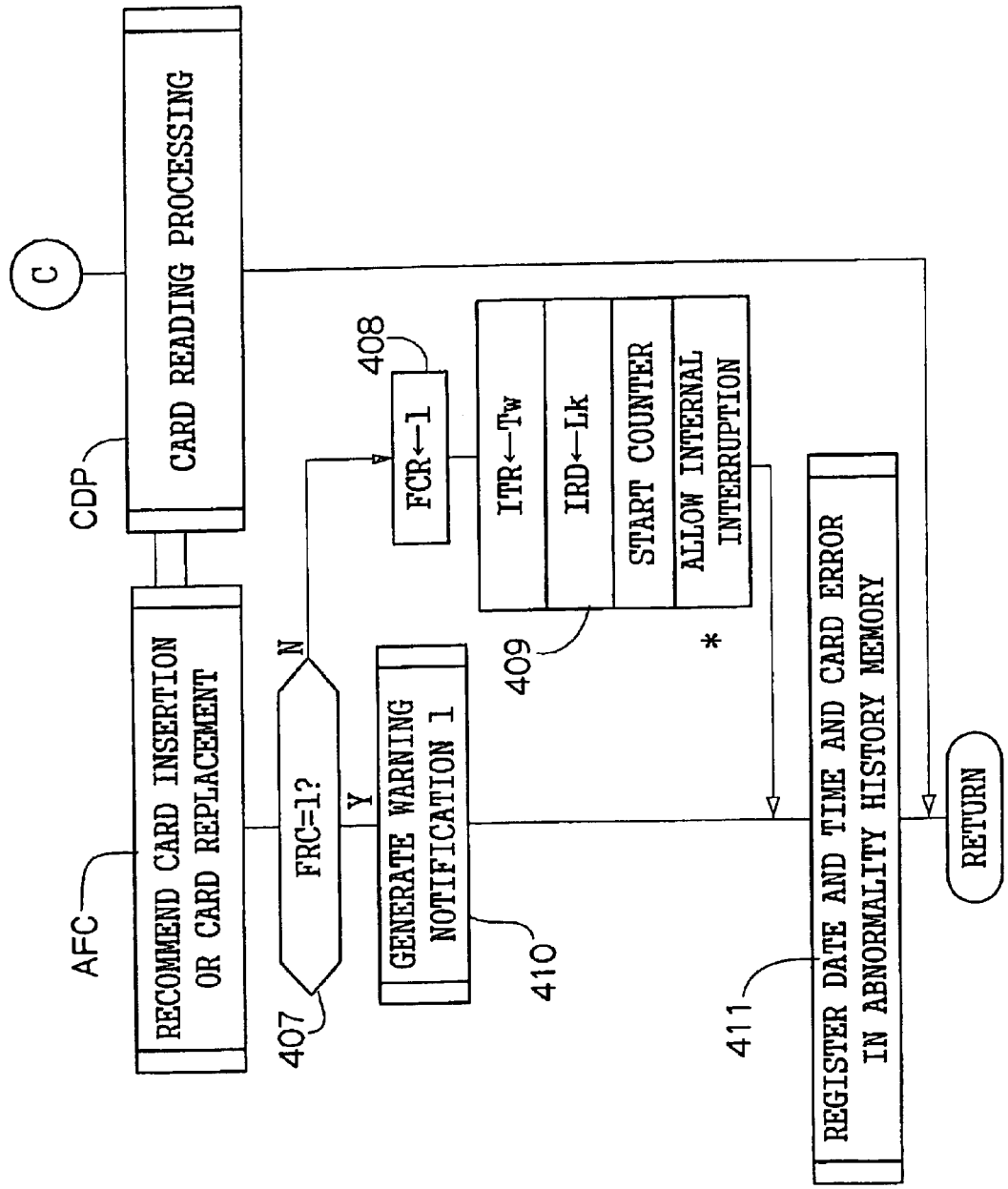
FIG. 49 is a flow chart showing the remaining portions of the interrupt processing 1 DRI1 by the charge control ECU 2 shown in FIG. 37 in response to the reception of a radio signal.

If the received data is a "charge request", the charge control ECU 2 moves to the "card reading processing CDP of FIG. 49. The contents of the "card reading processing" CDP and the "card insertion/card replacement notification" AFC of FIG. 49 as well as the contents of the processing of steps 161 to 165 are the same as those already shown in FIG. 43. At this point as check is made as to whether or not there is a card error. For example, if the above described prior charge processing (273+CCU1) has ended with no card being inserted or with th e card balance being negative, the possibility exists that thereafter a proper card with a sufficient balance will be correctly installed in the card reader S. In that case, the current "charge request" serves to cause the unpaid amount due ASCm stored until th a t point in the abnormality history memory to be paid. Alternatively, if there is still no card loaded or if the card balance is still negative at this point, the card insertion/card replacement notification AFC is activated and the driver is given a warning. Moreover, warning notification 1 which notifies the outside of the vehicle that there is an abnormality is activated by the steps 407 to 411 of FIG. 49 being performed. Accordingly, the "charge request" here is a payment request for any unpaid amounts that are due.

When the received data is a "movement history request", the charge control ECU 2 transmits the data in the abnormality history memory as well as the data in the movement history table to the notification station 30 (414), and the movement history table is cleared (415). When the received data is a "charge table", the routine advances to the updating of the card data explained in step 12 above (FIG. 39B). If the received data is a "message", that message is displayed on a display unit and reported by voice synthesis.

If the received data is a message, then if the message index data shows flashing pattern data, the charge control ECU 2 calculates the flashing cycle and flashing time from the flashing pattern data (flashing cycle and on duty) and updates these in the output latch to the lamp controller that controls the flashing of the lamp 4f1. When this data is updated, the lamp controller turns on the lamp 4/1 and the light emitting diode 4B 1, and also starts the cycle timer and the on time timer which set time period values for the flashing cycle and the on time respectively. When the time limit for the on time timer expires, the lamp 4/1 and the light emitting diode 4B1 are extinguished. When the time limit of the cycle timer expires, the lamp 4/1 and the light emitting diode 4B1 are turned on again and the cycle timer and the on time timer which set time period values for the flashing cycle and the on time respectively are started again. This sequence is repeated thereafter.

Because the turning on of the above flashing is started when the flash pattern data is received from the notification station 30, the plurality of charging devices that have received the same transmission information at the same point in time repeat the flashing of the lamp 4/1 in the same phase and in the same pattern. The notification station 30 transmits updated flash pattern data when necessary or at set intervals.

When the received data is a general public message from the notification station 30 or is an individual message for a particular vehicle driver, the charge control ECU 2 displays the message on the display 4B5 and makes an announcement by synthesized voice over the speakers SP (416).

Figure 51A:
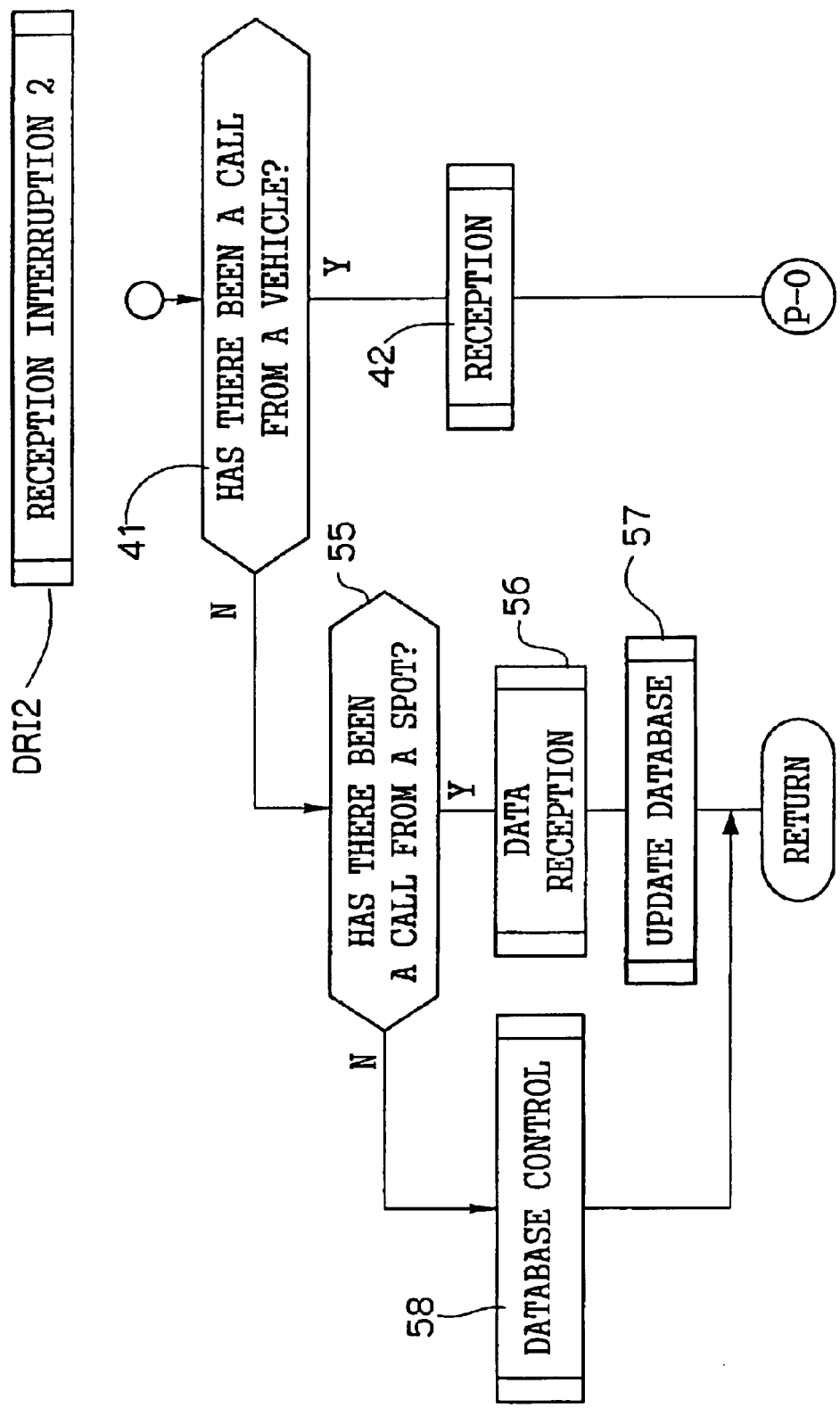
FIGS. 51A and 51B are flow charts showing the content of interrupt processing 2 DRI2 by the controller unit 32 shown in FIG. 38 in response to the arrival of a signal from the energizing device 31 or the modem unit 34.
Figure 51B:
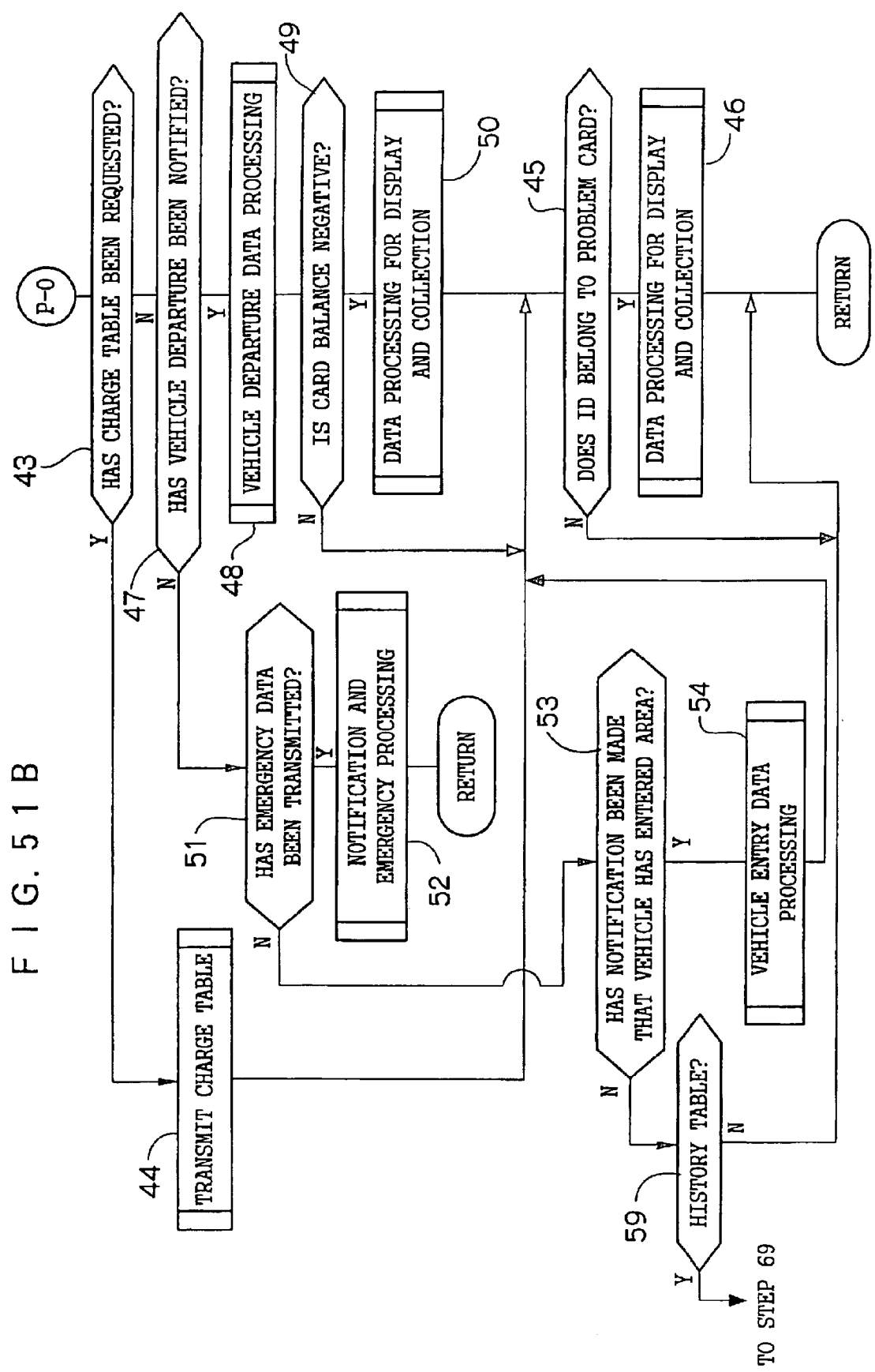

FIGS. 51A and 51B show the contents of interrupt processing of the controller unit 32 of the notification station 30. This interrupt processing DRI2 is executed in response to the arrival of a message in the modem unit 34 or the detection of the arrival a radio wave signal (message arrival) in the antenna 40 in the communication device 31. When the incoming message is received, if the message is from the charge control ECU 2 of the in-vehicle charge device 1 of a vehicle, the unit 32 receives the message (42), and, if it is a charge table request, saves the data indicating the date and time, the card ID, the balance, the vehicle ID, the position, and the direction that is attached to the message in internal memory, and, in response to the request, transmits the charge tables in the database FDB via the antenna 40 (41 to 44). A search is then made (45) via the control unit 33 as to whether or not the received card ID or vehicle ID is the ID of a vehicle that has been in a collision, or has been stolen, or whether the card is a problem card (i.e. lost or damaged, stolen, annulled through reissue, or illegally copied) stored in the observation database WDB. If the card ID or vehicle ID is one of the above, the card ID, the vehicle ID=vehicle No. . . . , the contents of the problem, the current position (reception data), and the current time are displayed on the terminal PC display unit and printed out as an observation data set, and are also transmitted to the control center 50 and card issuing and toll settlement booths 71 to 73. These establishments are able to perform data registration or take action in accordance with the content of the problem.

The charge control ECU 2 of the in-vehicle charge device 1 transmits vehicle departure notification data showing that a vehicle has departed from a charge area. When the controller 32 of the notification station 30 receives this, the controller 32 saves the date and time, the card ID, the vehicle ID, the current position, the distance traveled (the portion that has not been charge processed), the length of stay (the portion that has not been charge processed), the direction, and the card balance in internal memory. A check is then made as to whether or not there is any usage error information for the charge device in the history table on the control side at the relevant ID address in the vehicle entry and departure database TDB, or whether or not the card balance is negative (minus). If there is no usage error information and if the card balance is positive, the history table on the control side at the relevant ID address is erased. Note that the usage error information is written in the control history tables in the "Toll collection and movement history collection" CRC (FIG. 52) described below, based on the history data in the control history table when that shows a usage error. Next, a departure road (area entry/exit) is specified based on the position data, and the number of departed vehicles at the relevant departure road address in the vehicle entry and departure database TDB is incremented by one (48).

If the card balance is negative (–), this data (card ID, vehicle ID, current position, direction, and card balance) is supplied to the terminal PC and displayed on the display unit and printed out. A check is then made via the control unit 33 as to whether the card ID or vehicle ID are in the arrears database CDB. If they are in the arrears database, the card balance of the relevant item in the arrears database CDB is updated to the new value. If they are not in the arrears database, this newly acquired data (card ID, vehicle ID, current position, direction, and card balance) is registered for the first time in the arrears database CDB (49, 50). The ID check and the like described above (45, 46) are then performed.

An emergency notification switch is formed in an operation/display board 3 connected to the charge control ECU 2 of the in-vehicle charge device 1. When the driver operates this switch, the charge control ECU transmits in a predetermined cycle emergency data that includes the vehicle ID, the current position, and the direction via the antenna ANTt. When it receives this, the notification station 30 displays the fact that an emergency has occurred, the vehicle ID, the current position, and the direction on the terminal PC and prints out this information. It also transmits the emergency data to the control center 50 (51, 52).

The charge control ECU 2 of the in-vehicle charge device 1 transmits vehicle entry notification data showing that a vehicle has entered a charge area. When the controller 32 of the notification station 30 receives this (53), the controller 32 generates the control movement history table addressed at the card ID of the in-vehicle charge device 1 in the vehicle entry/departure database TDB, and writes therein the received date and time, the balance, the position, the distance traveled (0), the length of stay (0), the state of the reader, the existence or otherwise of a card, and the state of the GPS. It then specifies the entry road (the entrance/exit to the area) based on the position data, and increments by one the number of vehicles that have entered at this entry road address in the entry and departure vehicle database TDB (54). The ID check and the like described above (45, 46) are then performed.

When the transmitted settlement data (card ID, vehicle ID, and card balance) arrives from the card issuing and toll settlement spots 71 to 73, if the received card balance is positive, the controller 32 erases the data of the relevant ID in the arrears database CDB (erases the arrears register). If the card balance is still negative (minus), the card balance of the relevant ID is updated to the received card balance (41, 55 to 57).

The data of the databases CDB, FDB, WDB, and TDB can be controlled (i.e. read, transferred, output, written, and erased) by the terminal PC and the control center 50. When the terminal PC or control center 50 accesses the controller 32, the controller 32 performs data processing (i.e. reading, transferring, outputting, writing, and erasure) in accordance with the instruction thereof (58). The control center 50 is intended to carry out traffic control and charge collection control inside and outside the charge area, as well as observation and tracking of problem cards and vehicles. In order to carry out traffic control, the control center 50 regularly, and also when appropriate, refers to the data in the vehicle entry and departure database TDB, and calculates the number of vehicles present within the charge area (the sum of the number of vehicles that have entered each charge area minus the number of vehicles that have exited each charge area) and differential values thereof (congestion trends, easing trends) for predetermined time spots so as to ascertain the trends in the traffic volume. The control center 50 publicly reports traffic information over short time periods, and over long time periods corrects or abolishes the charge tables. In the toll collection control, the task of collecting an unpaid toll from (the owner of) the vehicle for which the absolute value of the negative value of the card balance in the arrears database CDB is the largest is performed. Data of the observation database WDB is used for finding vehicles and problem cards.

Figure 52:
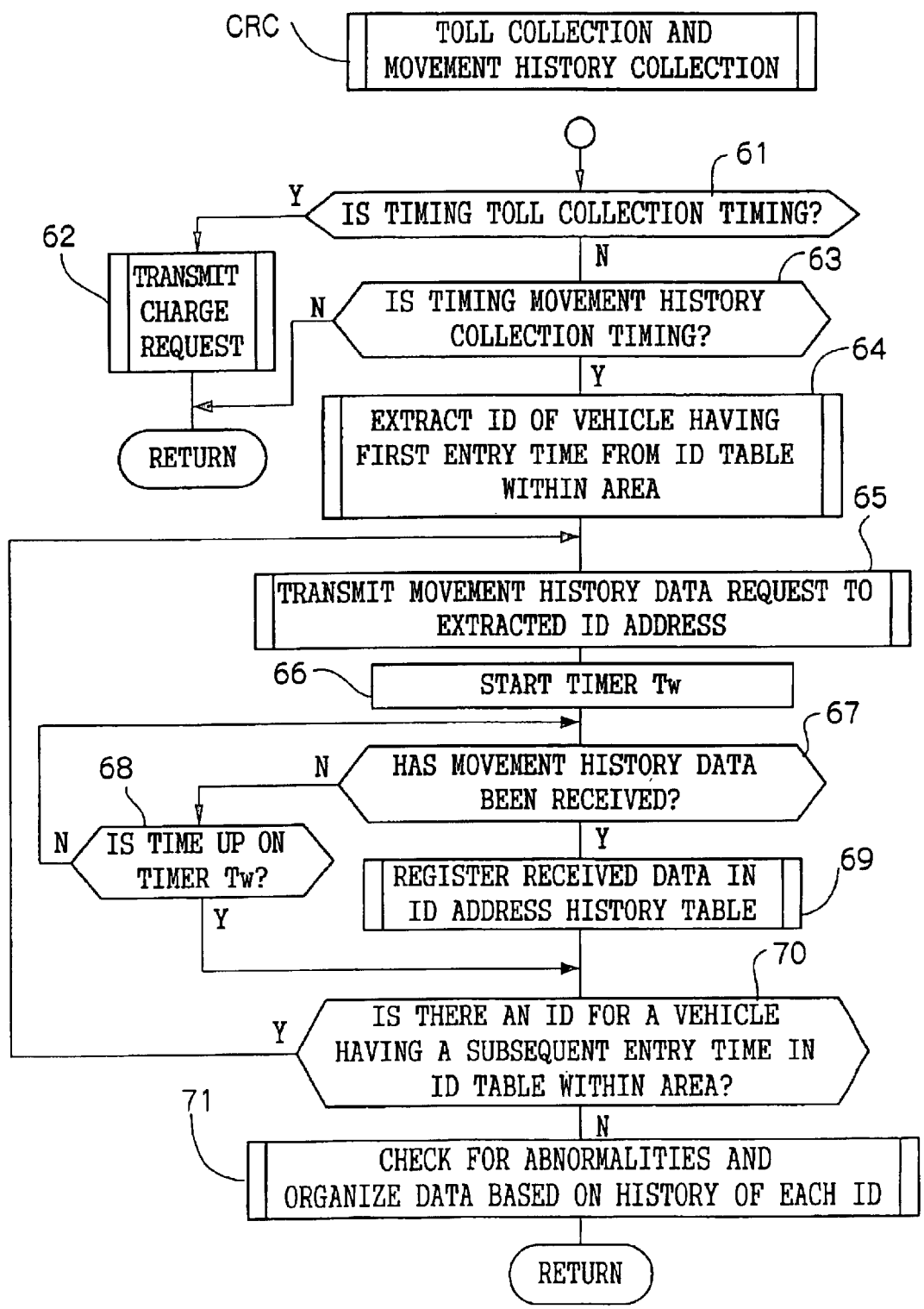
FIG. 52 is a flow chart showing the content of "toll collection & movement history collection" CRC performed repeatedly by the controller unit 32 shown in FIG. 38.

The controller unit 32 of the notification station 30 executes the "Toll collection and movement history collection" CRC shown in FIG. 52 in a fixed cycle when the reception interruption 2 (DRI2) fails to start up. When the routine advances to this processing, the unit 32 transmits charge requests via the communication device 31 and the antenna 40 at a toll collection timing that is set either in a fixed cycle (of approximately several minutes) or in a cycle that is not fixed but does have a pitch of approximately several minutes in order to make it more difficult for a fraudulent user to avoid a charge (61, 62). Furthermore, at a movement history collection timing that is set either in a fixed cycle or in a non-fixed cycle, in the same way as above, movement history data requests are transmitted in sequence to each ID address where a control movement history table is generated in the vehicle entry/departure database TDB. The movement history data of each ID is received in sequence and registered in the movement history table on the control side at each ID address (64 to 70). Namely, control side movement history tables of each ID address are generated in "vehicle entry" date and time sequence in the vehicle entry and departure database TDB. The movement history data request is transmitted to the ID address having the earliest date and time (64, 65), and the timer Tw is started (66). A reply (i.e. the history table on the movement side) is then awaited from the ID (67, 68) until the time on the timer is up. If a reply is received, it is added to the movement history table on the control side in the ID address (69). Once this is completed, or if time is up on the timer without a reply being received, a movement history data request is transmitted to the ID address having the next earliest writing date and time. (70, 65). In this way, when data requests and reception (namely, polling) has been completed for all IDs in which control side movement history tables are generated in the vehicle entry and departure database TDB, a check is made as to whether or not there are any charge device usage errors in each ID (card ID) (71), based on the data of the control side movement history tables at each ID address in the vehicle entry and departure database TDB.

Namely, for example, immediately after an ID (charge device 1) has made a "vehicle entry" into a charge area, data (date and time, balance, position and direction) at the time when "vehicle entry" is entered in (the first column of the control side movement history table of the ID address, namely, data that has been transmitted to the notification station 30 in step 26 in FIG. 40A, is present until the first movement history collection is performed. Moreover, in the first movement history collection, when the history data shown in Table 3, for example, is collected, that history data is written in the (second column and thereafter of the) control side movement history table. If the balance is negative, the card reader not operating normally, there is no card present, or the GPS is not operating normally, that usage error information is registered in the control side movement history table. Moreover, a check is made as to whether there are any changes or any lack of changes not seen in normal charge processing by a comparative calculation of the change in data of identical items with the data of other items in the order in which they appear (column No.) in the movement history table on the control side. If there are none of these usage errors, the data of the history table on the movement side just read is left as it is, and the data recorded before that is erased from the movement history table on the control side. If there is usage error information present, it is accumulated by being recorded in the control movement history table each time it is collected without a data erasure such as that above being performed. When the relevant vehicle (card ID) changes to a "vehicle departure", the control movement history table at the ID address is transferred to the observation database WDB and is removed from the vehicle entry/departure database. TDB.

The data processing for toll collection by the controller unit 32 of the notification station 30 through the execution of the "toll collection and movement history collection" CRC described above requires the charging device 1 in the vehicle to be proper and to be operating properly as a prerequisite. If the power supply to the charging device 1 has been cut off, or if either of the antennas ANTt or ANTg have been cut off, or if the card reader 5 or IC card have been made to function imperfectly in order to avoid having to pay the charge, the data processing for collecting a toll is not performed by the notification station 30.

In order to more easily expose such illegal acts, in the present embodiment, the lamps 4f1 to 4f4 and the abnormality history memory have been added, and each of the functions of the notification to the vehicle (steps 2b to 2h in FIG. 39A) and the charging abnormality check"CCU1 and CCU2 in the vehicle for abnormalities which are mainly related to charge dodging are provided in the charge control ECU 2 of the charging device 1. The abnormality history memory is allocated to one area of the non-volatile reading and writing memory in the charge control ECU 2 and generally, the reading and writing of the data thereof cannot be performed by a user. However, it is preferable if a controller, who needs to expose improper use, is able to access the data in the memory. Moreover, if a user corrects an impropriety and pays an unpaid toll, it is necessary to erase the abnormality data in the abnormality history memory.

In order to achieve this, as is shown in FIG. 36, a two way (i.e. for both transmitting and receiving) photocoupler 20 for data conversion which uses an infrared laser as a medium via an interface 19 is connected to the charge control ECU 2. Moreover, as is shown in FIGS. 39A and 39B, "abnormality history memory data processing" MDP is added to the charge control ECU 2. The controller possesses a regulatory device. This regulatory device is provided with a two way photocoupler for data conversion which uses an infrared laser as a medium and forms a pair with the photocoupler 20, a transmission and reception communication controller, high volume data memory, a character display for displaying data, a printer, and an input/output operations board. The regulatory device is able to exchange data with the charge control ECU 2. Here, it can be imagined that a traffic enforcement official with the power of the charging authority holds the regulatory device and observes passing vehicles while stationed near the side of a road.

As has already been described above, when an abnormality which renders charge processing impossible has been detected, the warning notifications 1, 2, or 3 are generated and the lamps 4f2 and 4f3 as well as the light emitting diodes 4B2 and 4B3 are turned on. These stay lit until the abnormality disappears. When the abnormality does not disappear, then when the ignition key switch IGsw is returned to the open (i.e. off) position, namely, when the vehicle is stopped and the engine is no longer running, the lamps and diodes are extinguished (step 33).

If the lamps 4f2 and 4f3 are lit while the vehicle is running, the enforcement official is able to order the vehicle to stop. When the vehicle is stopped and the engine turned off (i.e. when the ignition key switch IGsw is turned off), an instruction is given to the photocoupler of the regulatory device to output data to the photocoupler 20 of the charging device 1 installed in the vehicle.

In response to the turning off of the ignition key switch IGsw, the charge control ECU 2 of the charging device 1 in the vehicle stops the light emission from the abnormality display element (step 33) and the routine moves to the "abnormality history memory data processing" MDP.

Figure 50:
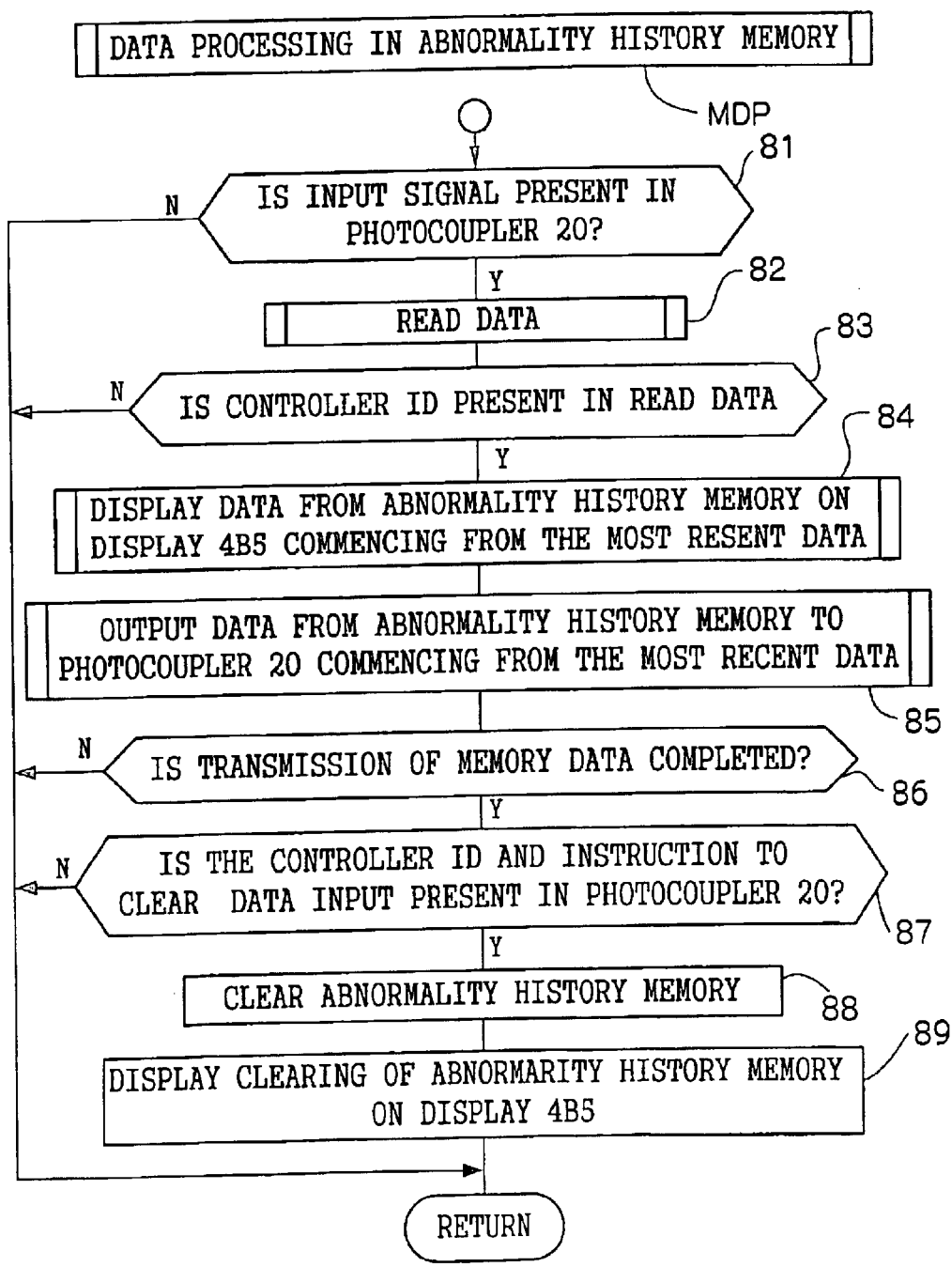
FIG. 50 is a flow chart showing the content of the "abnormality history memory data processing" MDP shown in FIGS. 39A and 39B.

The contents of the "abnormality history memory data processing" MDP are shown in FIG. 50. Here, a check is made as to whether or not a signal has been input (i.e. whether or not an infrared laser beam of a predetermined wavelength has arrived) into the photocoupler 20 (81). If the signal has been input, data reading is carried out (82) and a check is made as to whether or not data coinciding with a first controller ID registered in the "abnormality history memory data processing" MDP is present in the read data (83). If the ID is present, the abnormality history memory data is read starting from the most recent data and is displayed on the display 4B5. The abnormality history memory data and the ID of the first charge device 1 are then transmitted to the photocoupler 20 (84 to 86). The regulatory device registers the data received by the photocoupler 20 in data memory and the data is printed out by the printer. The traffic enforcement official then acts according to the contents of the printout and if the official's actions are satisfactorily concluded, an instruction to clear the memory data is given to the charge control CPU 2 via the regulatory device and the photocoupler 20. At this time, a second controller ID is automatically simultaneously given to the charge control CPU 2 from the regulatory device. If the input ID matches the second controller ID in the "abnormality history memory data processing" program, and if the input data matches the clearing instruction data on the program, the charge control CPU 2 clears the abnormality history memory (87, 88) and the fact that the abnormality history data has been cleared is displayed on the display 4B5. Note that the display 4B5 is then turned off after a set time period.

If the data transfer (i.e. the protocol exchange for the data transfer and the memory data transmission) to an exterior device via the photocoupler 20 is not completed as described above, the memory data is not cleared, therefore, even if a clearing instruction is given without the exterior device being coupled for communication with the photocoupler 20 or with a communication device that does not match the data communication algorithms of the communication device of the regulatory device is coupled with the photocoupler 20, the abnormality history memory data is not erased.

Note that the traffic enforcement official is also able to access data using the regulatory device for vehicle whose lamps 4F1 to 4f4 are not lit.

(Tenth Embodiment)

Figure 53A:
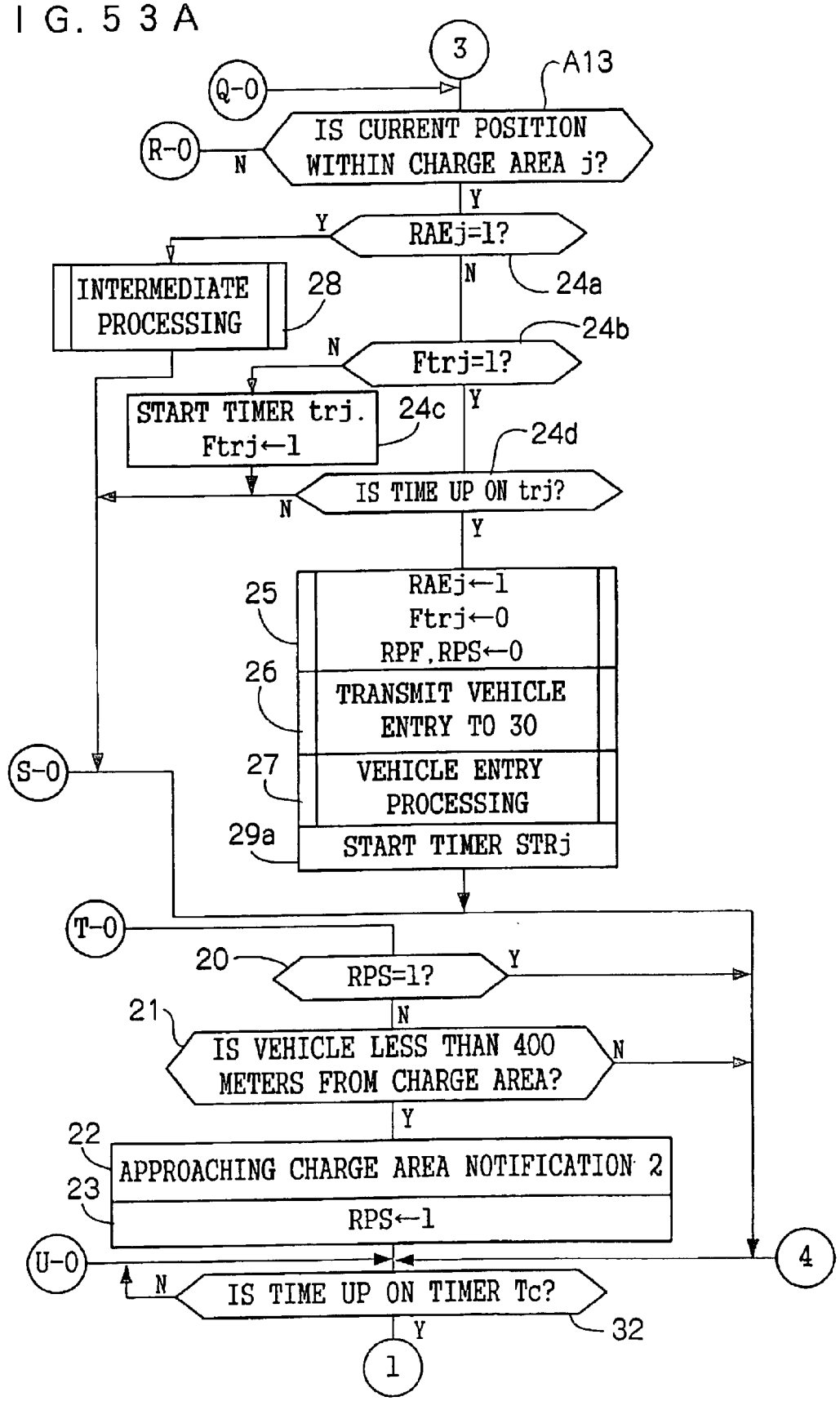
FIGS. 53A and 53B are flow charts showing a portion of the charge control operation of the charge control ECU 2 of the tenth embodiment.
Figure 53B:
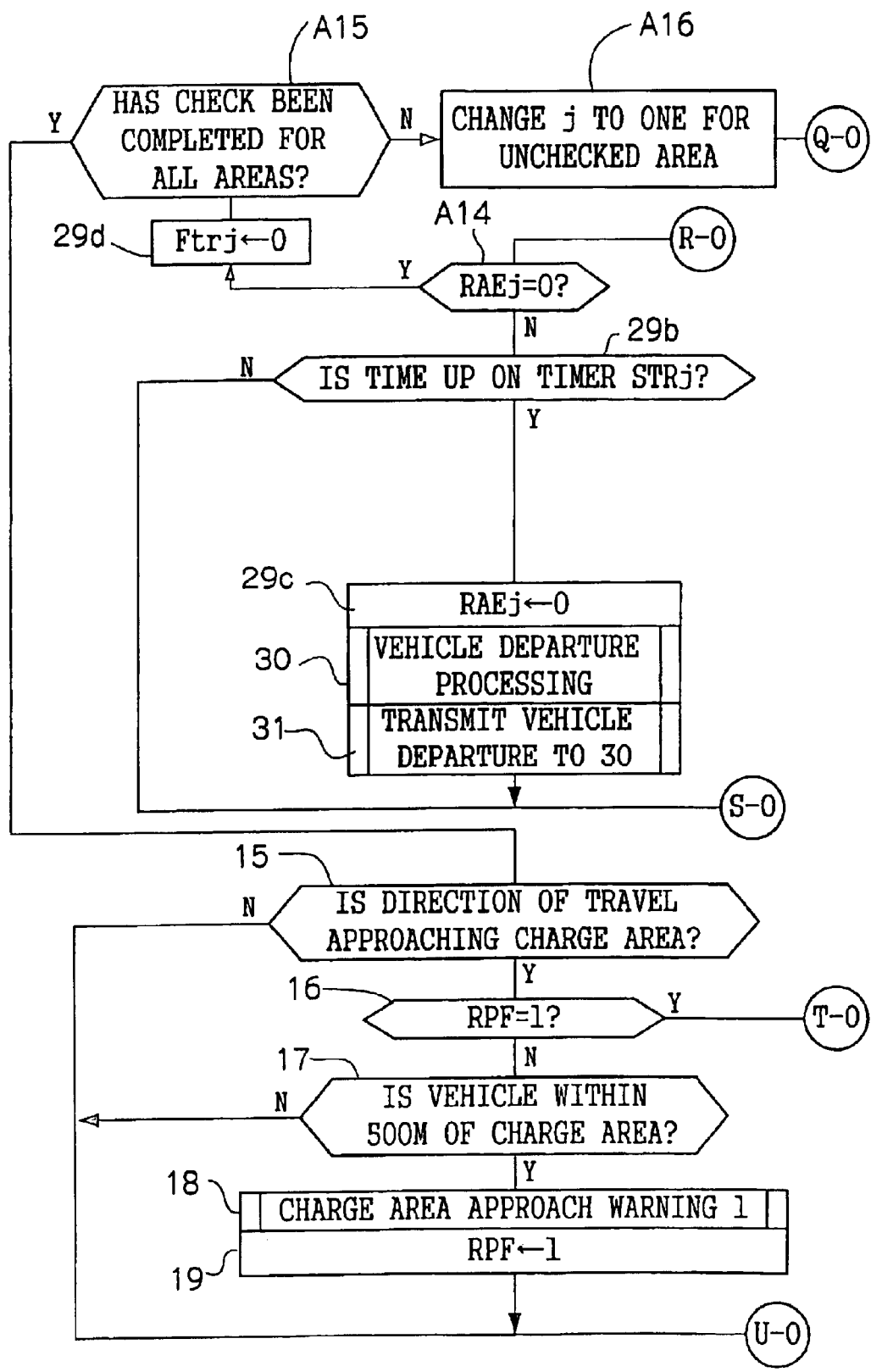

The structure of the hardware of the tenth embodiment and the majority of the data processing of the charge control ECU 2 are identical to those of the above described first embodiment, however, as is shown in FIGS. 53A and 53B, the data processing of the register RAEj indicating entries into and departures from charge areas by the charge control ECU 2 of the second embodiment is different in several corresponding places to that of the first embodiment (FIGS. 40A and 40B). Namely, when the "vehicle entry processing" 27 is ended, the charge control ECU 2 of the second embodiment starts a timer STRj whose time period value is STRj (29a). This time period value STRj can be set from various perspectives, however, here it is set at a sufficient time for a single journey through the charge area j. When the timing of the timer STRj is up, namely, when the length of time that has passed since the measuring of the passing of time was started when a vehicle entered the charge area j is equal to or more than the set value STRj, if the vehicle is outside the charge area j, or when the vehicle changes to be outside the charge area j, at that time the "1" of the register RAEj is deleted. Namely, it is replaced with "0" (29b, 29c). Other than this register RAEj data processing, the remaining functions are the same as those in the ninth embodiment.

(Eleventh Embodiment)

Figure 54A:
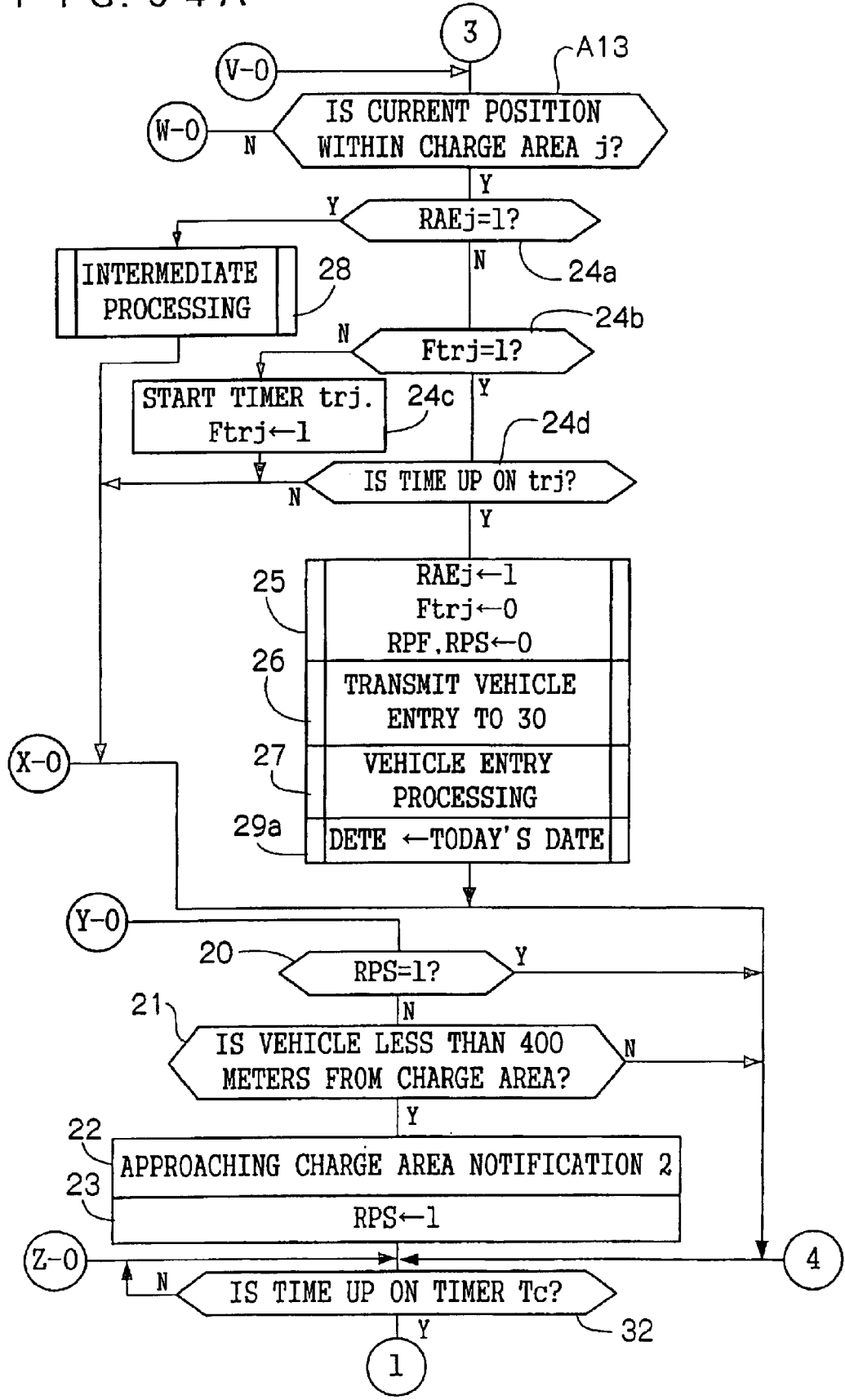
FIGS. 54A and 54B are flow charts showing a portion of the charge control operation of the charge control ECU 2 of the eleventh embodiment.
Figure 54B:
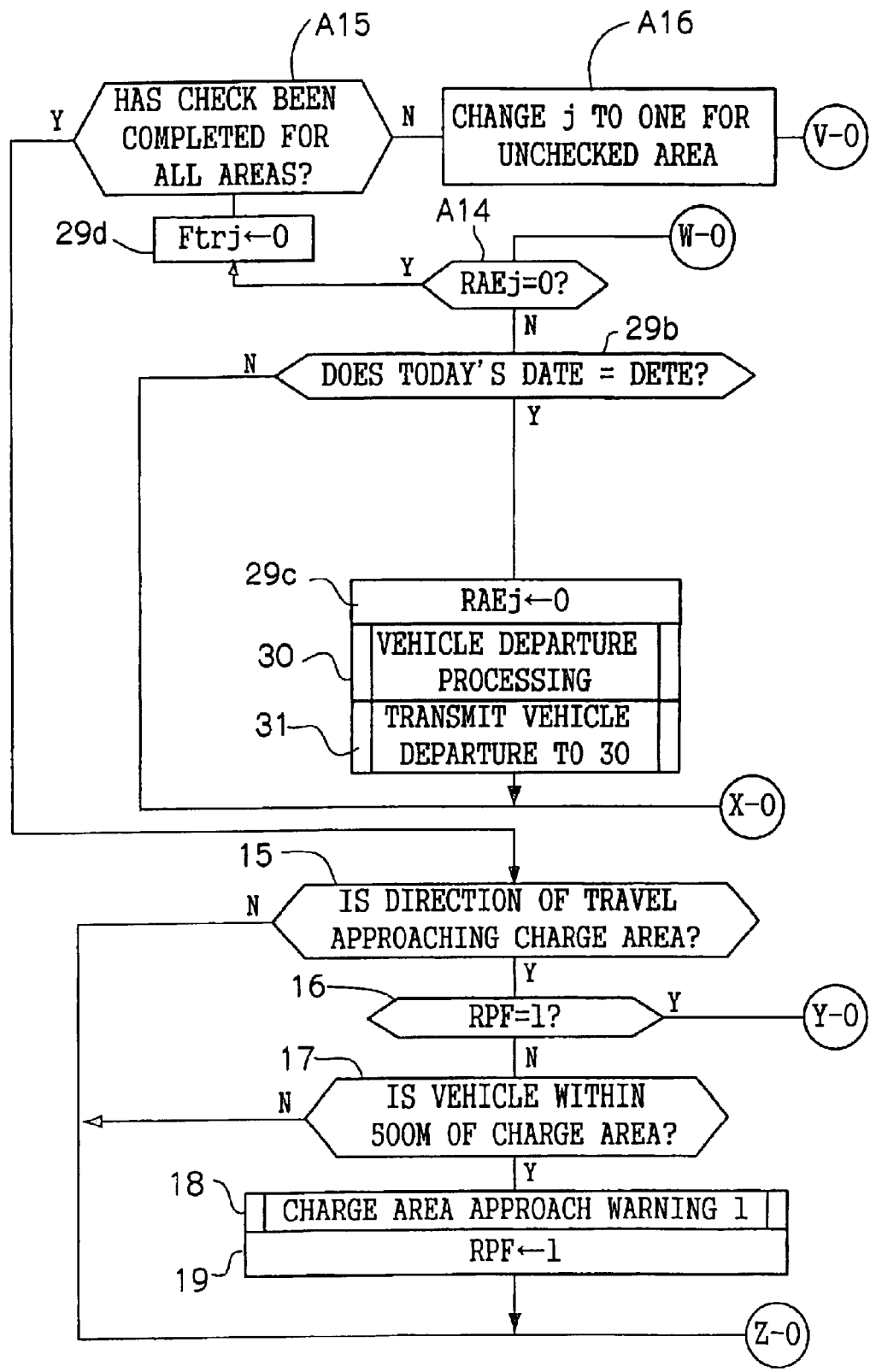

The structure of the hardware of the eleventh embodiment and the majority of the data processing of the charge control ECU 2 are identical to those of the above described ninth embodiment, however, as is shown in FIGS. 54A and 54B, the data processing of the register RAEj indicating entries into and departures from charge areas by the charge control ECU 2 of the eleventh embodiment is different in several corresponding places to that of the first embodiment (FIGS. 40A and 40B). Namely, when the "vehicle entry processing" 27 is ended, the charge control ECU 2 of the third embodiment saves the date data of the calendar IC (i.e. the date of the current day) in the register DATE (29a). In the same way as with the register RAEj, this register DATE is addressed in memory which holds data even when the ignition key switch IGsw is turned off. It may also be addressed in non-volatile memory.

When the date data of the calendar IC changes to show the next day, or when the vehicle leaves the charge area j after the date data has changed, or when the vehicle changes to be outside the charge area j, at that time the "1" of the register RAEj is deleted. Namely, it is replaced with "0" (29b, 29c). Other than this register RAEj data processing, the remaining functions are the same as those in the ninth embodiment.

In this eleventh embodiment, regardless of how many times a vehicle has entered and exited the same charge area within the same calendar day, only one charge is made. If the "1", of the register RAEj is deleted after a specific day has been switched to, then a single charge is made for one week. If the "1" of the register RAEj is deleted after a specific month (or even year) has been switched to, then a single charge is made for one month (or year).

(Twelfth Embodiment)

The twelfth embodiment of the present invention will now be described. Because the structure and operation of the twelfth embodiment are substantially the same as those of the ninth embodiment, only those portions that are different win be described.

In the present embodiment, when the timing of the timer trj is up in FIGS. 40A and 40B of the above ninth embodiment (see FIGS. 56A and 56B), namely, when a set time trj has passed since the measuring of the passing of time was started, a check is made as to whether or not the time limit of the timer TRk that started time period operation when the vehicle left the charge area k in which it was located until that time has expired (24e). If the time limit has expired, "1"

showing that the vehicle has entered the charge area j is registered in the register RAEj. In addition, the "1" of the register FTRk showing that the time period operation of the timer TRk has started is cleared, and the "1" of the register Ftrj showing that the above measuring of the passing of time is being carried out is cleared. Moreover, the information (i.e. the data of the registers RPF and RPS) showing that the vehicle is within 500 meters and within 400 meters of the charge area is cleared (24a to 24e, 25a, 25b). The register RAEk addressed at the charge area k in which the vehicle was located until that time is also cleared (25b).

After the timer trj has been started, if it is detected before the time is up on the timer trj that the current position is outside the charge area j, the time measurement is cancelled at that moment (29c), and the timer trj is only started when it is once again detected that the current position is again within the charge area j. Therefore, even if results of detection show the current position swinging between the inside and the outside of the charge area j at intervals less than the set time trj, "1" showing a vehicle entry is not registered in the register RAEj. When the set time TRk has passed since the vehicle has left the charge area k through which it passed previously, and when it is continuously detected within the charge area j for more than the set time trj, the "1" of the register RAEk showing that it was within the charge area k is cleared (25b) and "1" is registered in the register RAEj to show the vehicle has entered the charge area j (25a).

When data processing is performed to shown that the area through which the vehicle is traveling has changed, the charge control ECU 2 notifies the notification station 30 that the vehicle has entered the charge area j, namely, that there has been a "vehicle entry" into a new area (26). At this time, when the vehicle entry notification is transmitted to the notification station 30, the vehicle ID, card ID, and balance from among the card data as well as data indicating the direction of movement, the current position, and the date and time obtained from the GPS information processing ECU 20 are attached thereto and also transmitted. When it receives the vehicle entry notification, the notification station 30 saves the date and time, the card ID, the vehicle ID, the position, and the direction in internal memory, and creates a movement history table for the control station at the address of the card ID in the vehicle entry and departure database TDB. It then registers the above received information in this movement history table.

Note that, when the (current position of the) vehicle departs from the charge area j, the charge control ECU 2 goes through steps A13 and A14 and starts the timer with a time limit value of TRj (for example, 5 seconds). Because this timer is thereafter cancelled when it is detected that the vehicle has again entered the charge area j, the timer TRj continues for the duration of the time period value TRj and ends when the position is again detected outside the charge area j.

Exactly the same data processing as that of the register RAEj described above relating to the charge area j showing whether or not a vehicle has entered into the charge area j is performed in the same way for all the other charge areas. As a result, when a vehicle moves from the charge area k to the charge area j, then when the two conditions of the set time TRk passing since the vehicle left the charge area k and the vehicle entering the charge area j are met at the same time, the "1" in the register RAFk is cleared and replaced with "0" and "1" is registered in the register RAEj. Then, when the vehicle leaves the charge area j and moves to another charge area L, then when the two conditions of the set time TRj passing since the vehicle left the charge area j and the vehicle entering the charge area L are met at the same time, the "1" in the register RAEj is cleared and replaced with "0" and "1" is registered in the register RAE L. Moreover, this "vehicle entry" is notified to the notification station 30 and charge processing is performed according to the "vehicle entry processing" (26, 27).

Note that, power is supplied to the charge control ECU 2 for it to maintain minimum data retention functions not only when the ignition key switch IGsw is on, but also while it is off. As a result, because the registers RAEj, k, and L are allocated to the memory capable of keeping data even while the ignition key switch IGsw is off, the "1" in the data of the registers RAEj, k, and L is not deleted even when the ignition key switch IGsw is turned off. Accordingly, when a vehicle parks inside the charge area j, for example, and the ignition key switch IGsw is turned off, and then turned on again when the vehicle begins moving again, there is no problem such as another charge having to be paid for the charge area j. Note that the register RAEj may also be allocated to non-volatile memory which retains data when any of the external power sources for the charge control ECU 2 is cut off.

Figure 57A:
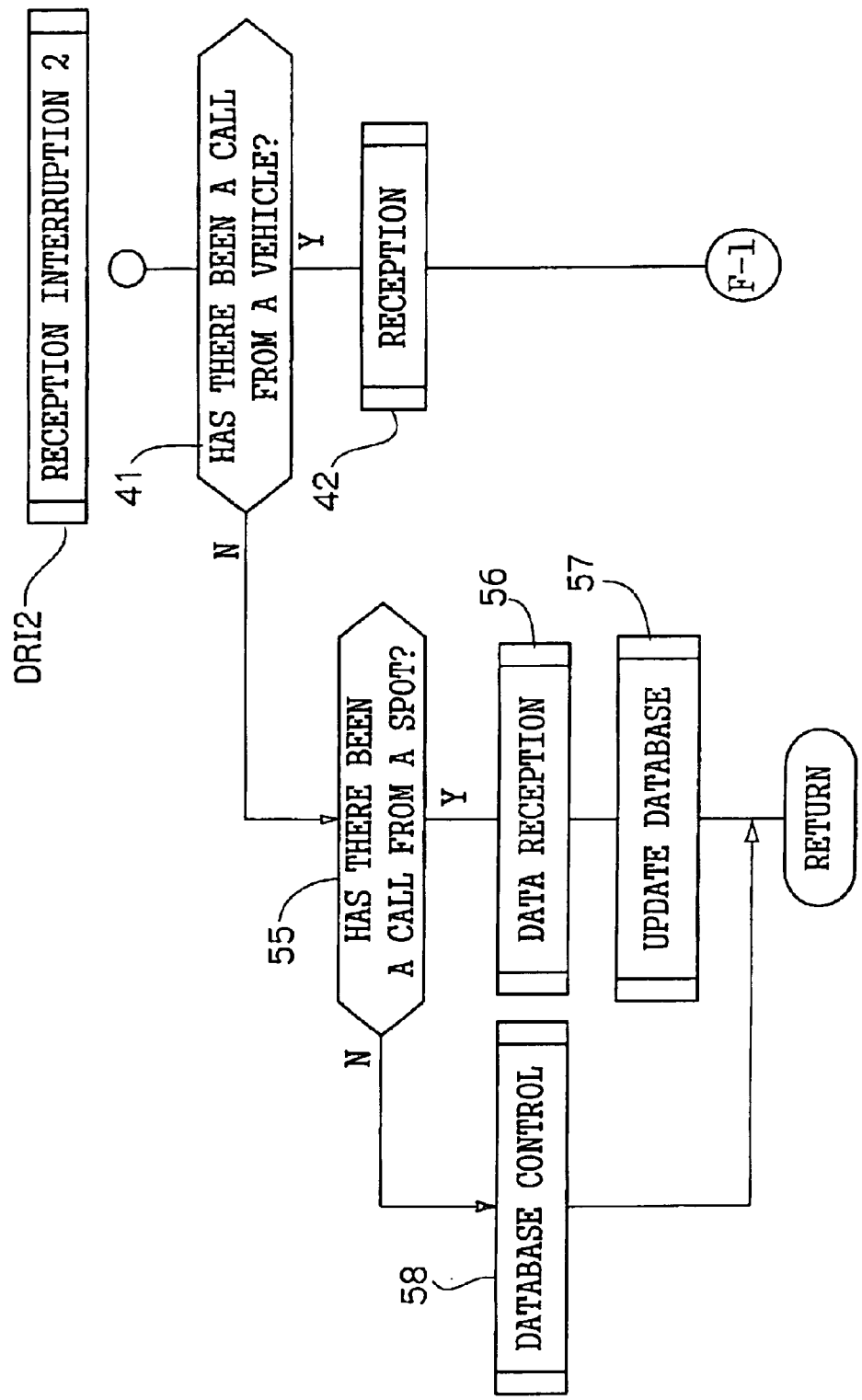
FIGS. 57A and 57B are flow charts showing the content of interrupt processing 2 DRI2 by the controller unit 32 in response to the arrival of a signal from the energizing device 31 or the modem unit 34.
Figure 57B:
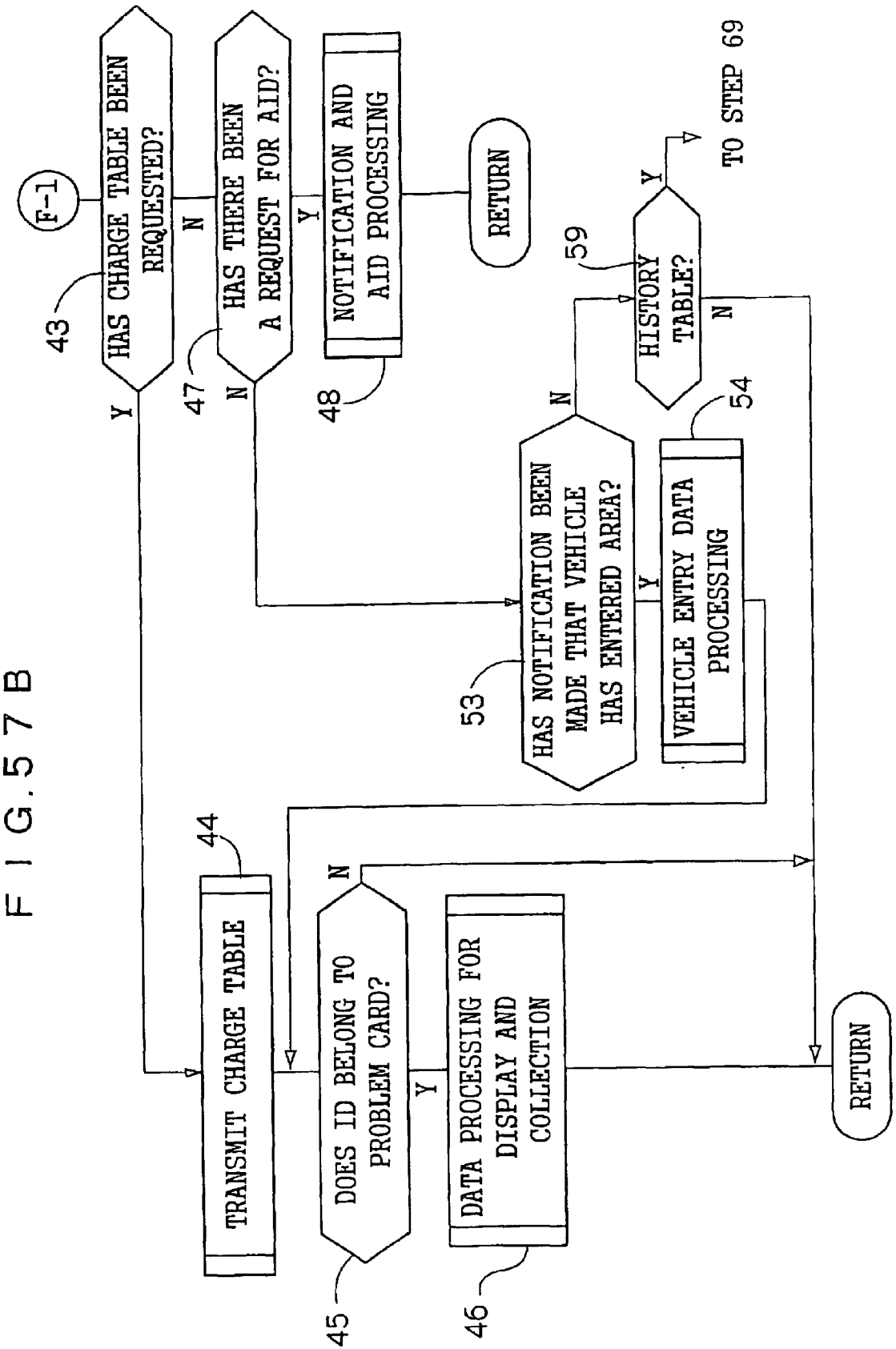

Moreover, in the present embodiment, as is shown in FIGS. 57A and 57B, instead of step 47 in the processing shown in FIGS. 51A and 51B of the above described ninth embodiment, a determination is made as to whether or not the communication is a request for aid (47). If the determination is negative, the routine moves to step 53, while if the determination is affirmative, then, in place of steps 48 to 50 in the processing shown in FIGS. 51A and 51B, notification and aid request processing (48) is performed.

(Thirteenth Embodiment)

Figure 55B:
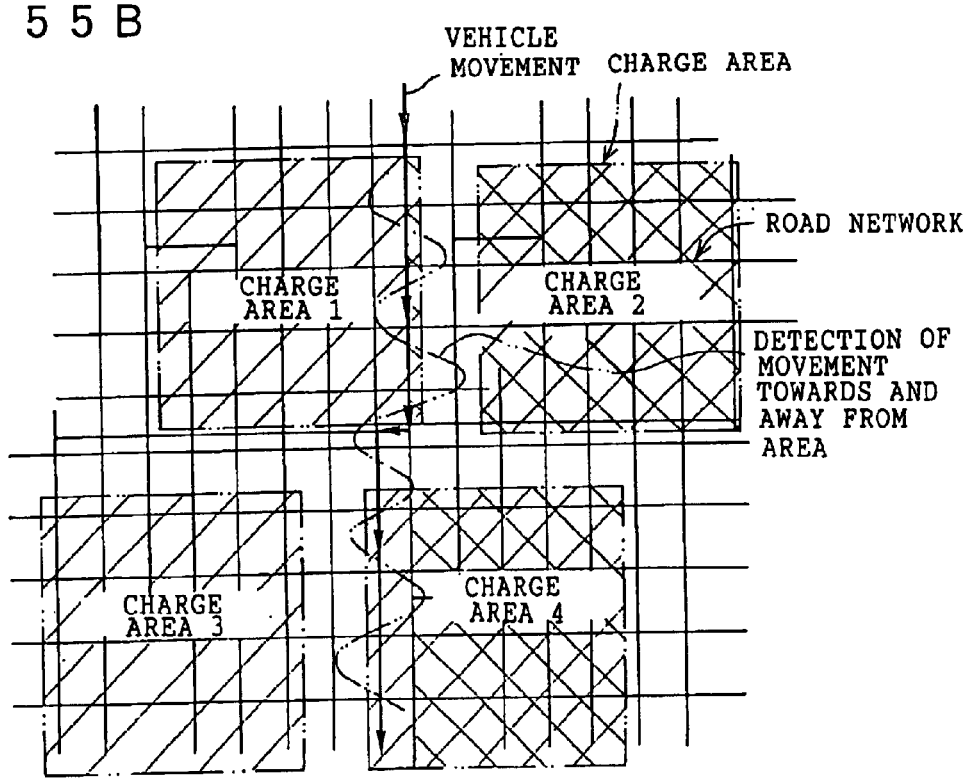
Figure 56A:
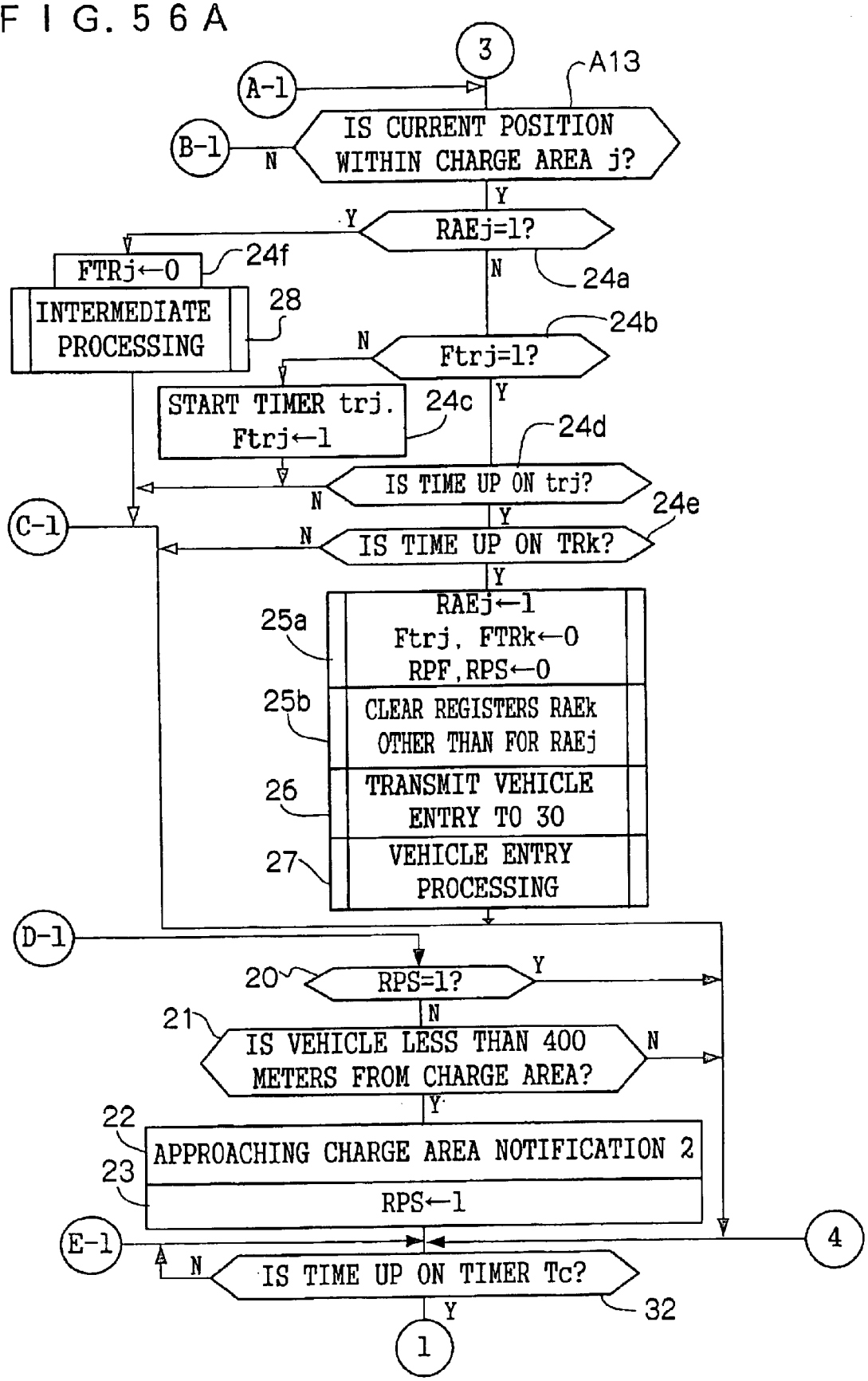
FIGS. 56A and 56B are flow charts showing the remaining portions of the charge control operation of the charge control ECU 2 in the twelfth embodiment.
Figure 56B:
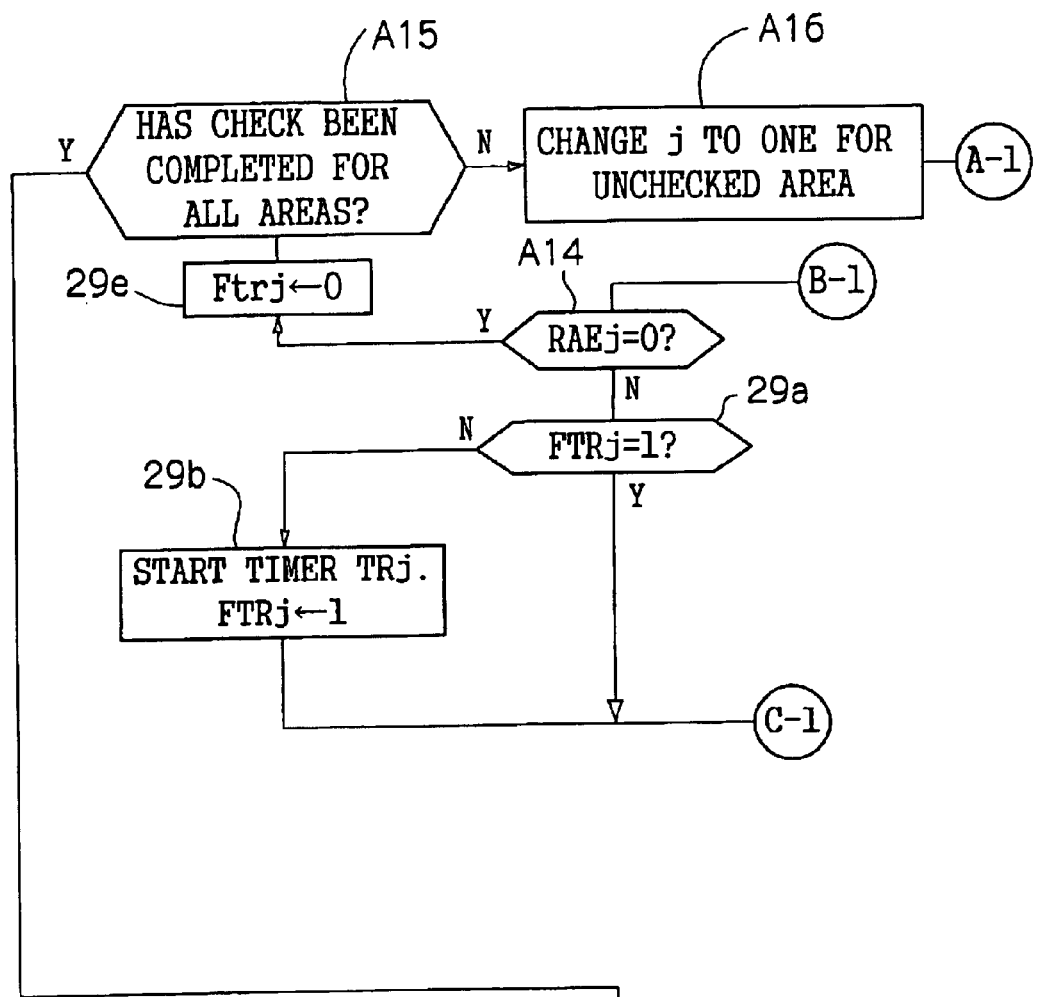
Figure 58A:
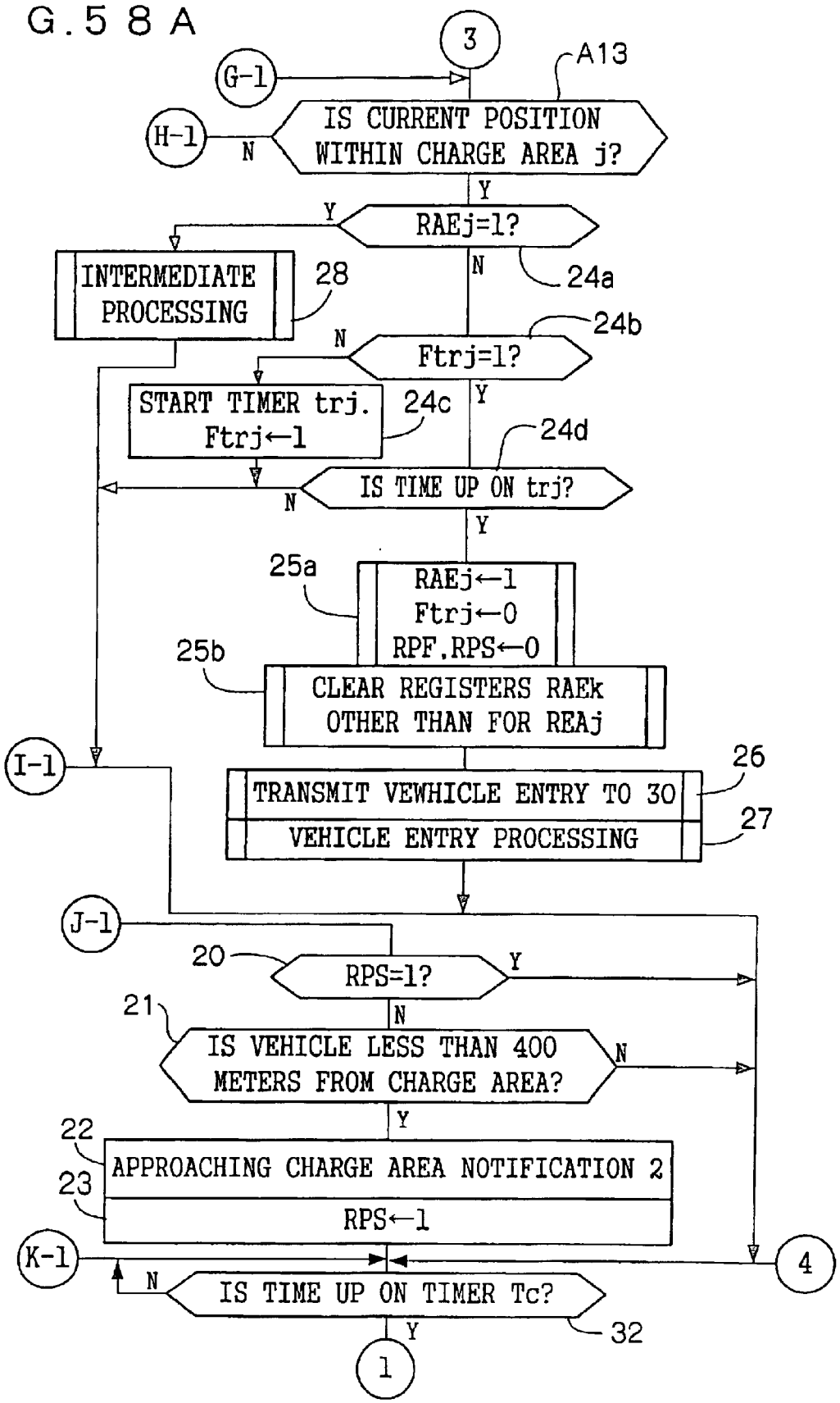

The structure of the hardware of the thirteenth embodiment and the majority of the data processing of the charge control ECU 2 are identical to those of the above described twelfth embodiment, however, as is shown in FIGS. 58A and 58B, the data processing of the register RAEj indicating entries into and departures from charge areas by the charge control ECU 2 of the thirteenth embodiment is different in several corresponding places to that of the first example (FIGS. 56A and 560B). Namely, when a vehicle leaves the charge area k and enters the charge area j, the charge control ECU 2 clears the register RAEk and registers "1" in the register RAEj (24a to 24d, 25a, 25b). When the vehicle leaves the charge area j and enters the charge area L, the charge control ECU 2 clears the register RAEj and registers "1" in the register RAE L. Because the timers TRk, j, and L of the first example are omitted, when the charge areas are close to each other or partially overlap each other, as shown in FIG. 55A, the data of the register RAEJ does change to say that the vehicle passes several times through areas 1 and 2 while making a single journey through area 1, however, as is shown in FIG. 55B, this problem does not occur when a wide gap is placed between areas so that there is no error detection to say that the vehicle has passed through another area while it was traveling through one area. The remaining functions of the thirteenth example are the same as those in the ninth example.

(Fourteenth Embodiment)

The fourteenth embodiment of the present invention will now be described. Because the structure and operation of the fourteenth embodiment are substantially the same as those of the ninth embodiment, only those portions that are different will be described.

In the present embodiment, instead of the charge table (Table 10) of the above described ninth embodiment, the charge table shown in Table 12 is used. This charge table commonly allocates charge items and charge unit prices valid for each of a charge system that charges per day for entry, a charge system that charges for distance traveled, a charge system that charges for length of time traveled, and a charge system that charges for traveling time in rush hour to all of the charge areas 1 to 4 of a regional group of charge areas.

TABLE 12

Time unit charge table

| Charge Area | Area Information | Charge Per Entry $A_1$ (/entry) | Distance Charge $A_2$ (/km) | Time Charge $A_3$ (/min) | Congestion Charge $A_4$ (/min) |
|---|---|---|---|---|---|
| 1 | [N350000, E1360000] (First point) [N345900, E1360100] (Second point) | ¥70 | ¥50 | 0 | 0 |
| 2 | | ¥150 | 0 | 0 | ¥50 |
| 3 | | 0 | ¥20 | 0 | 0 |
| 4 | | ¥80 | 0 | ¥10 | 0 |
| Table valid period | Oct. 10–11, 1997 | | | | |
| Table valid area information | ... (First point) ... (Second point) | | | | |

Note that the term of validity of the table indicates the term of validity of the data. The information of the area in which the table is valid shows an outline that is shaped substantially the same as the charge area group extended by approximately 600 meters outside the outline of a charge area group prescribed in the charge area information.

Figure 59A:
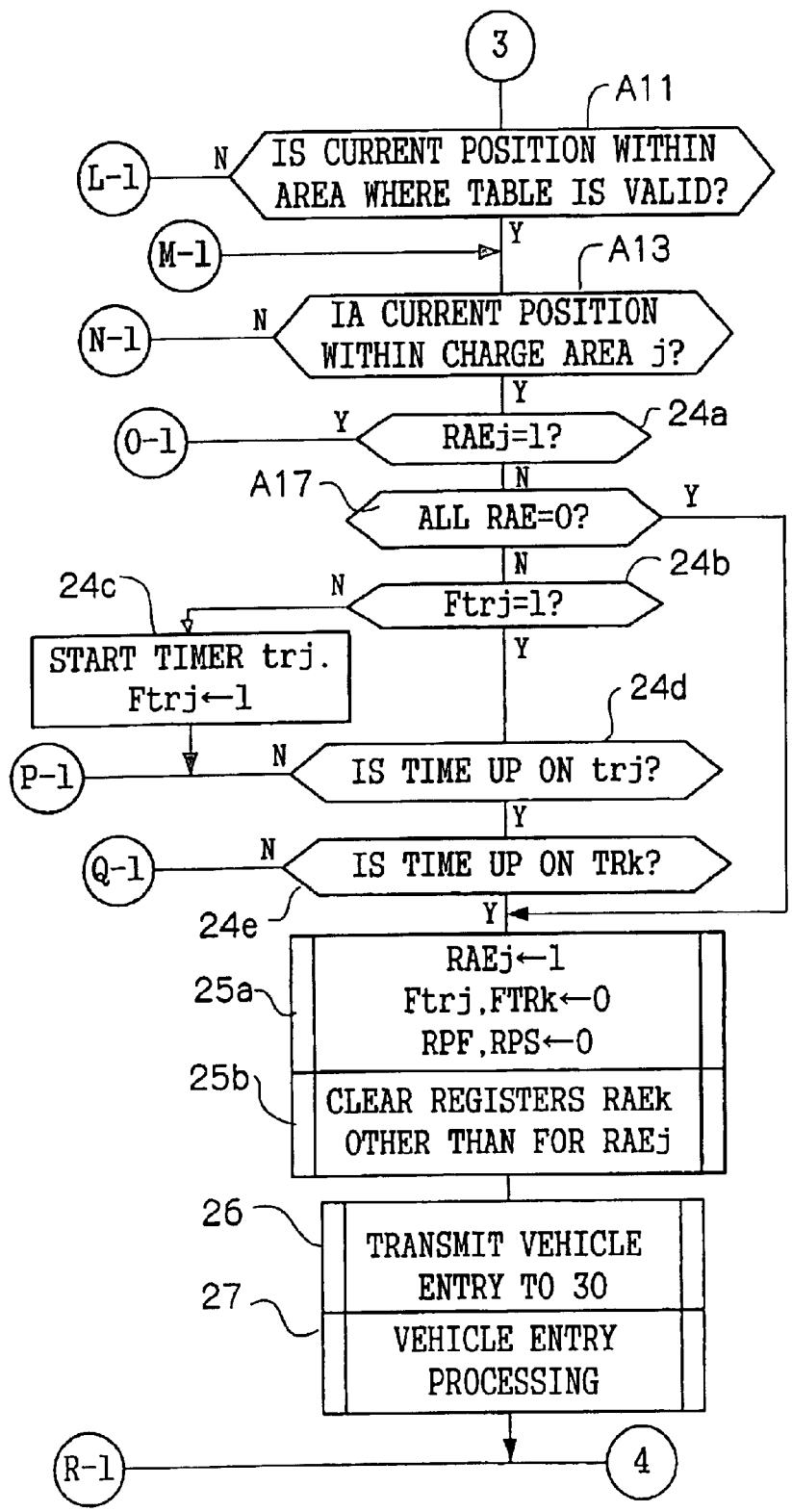
FIGS. 59A and 59B are flow charts showing the remaining portions of the charge control operation of the charge control ECU 2 of the fourteenth embodiment.
Figure 59B:
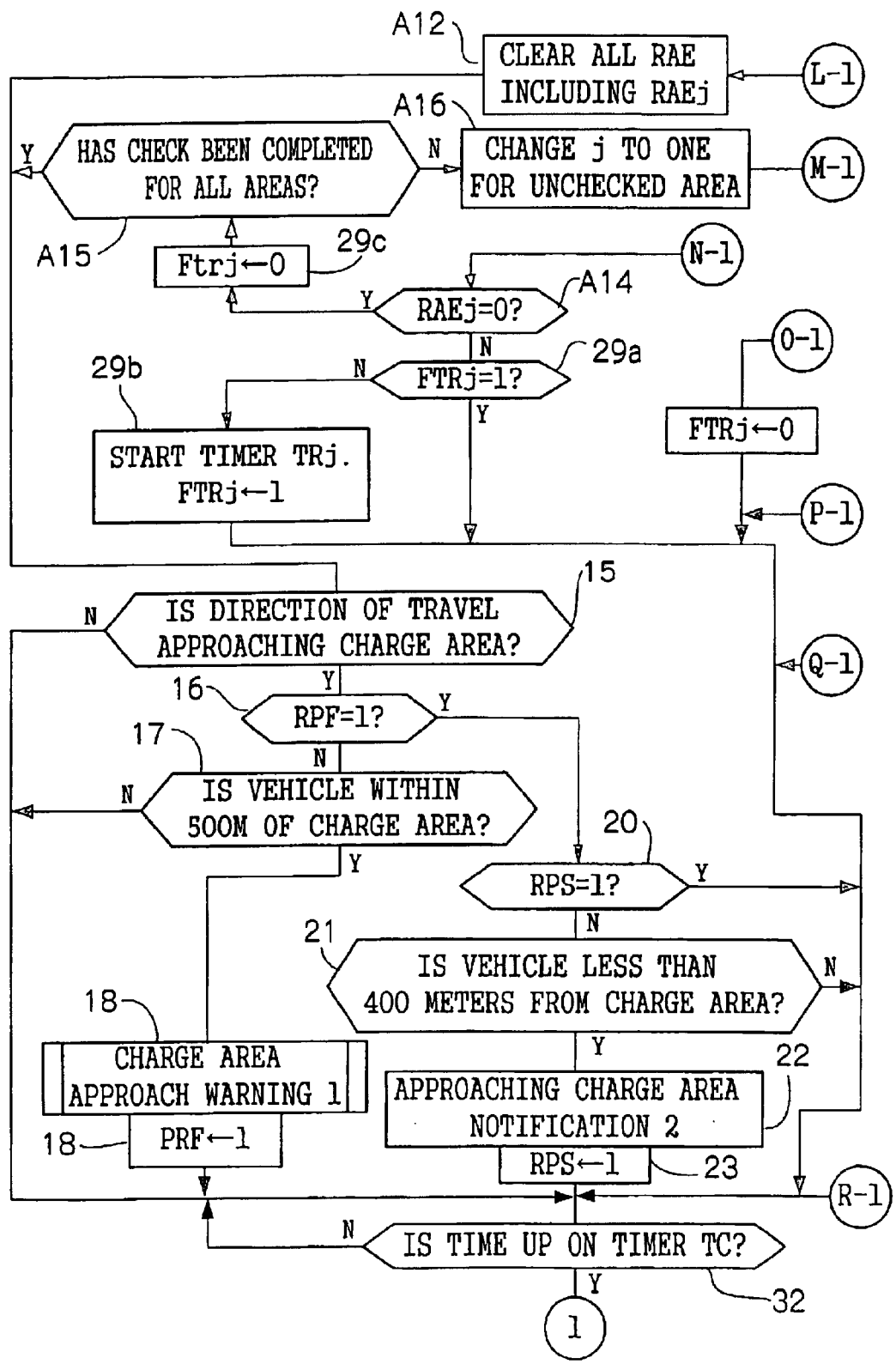

Moreover, in the present embodiment, instead of the processing of FIGS. 40A and 40B of the above described ninth embodiment, the processing of FIGS. 59A and 59B is performed. Namely, the charge control ECU 2 checks at the cycle Tc whether the current position is within the area for which the table is valid (i.e. the area prescribed by the information for the area for which the table is valid in Table 2), and if this is the case, whether the current position is inside or outside each of the charge areas 1 to 4 (A11 to 32-1 to 11–A11).

When the time period value trj is expired, namely, when the set time trj has ended after the measuring of the passing time was begun, a check is made as to whether or not the time limit of the timer TRk that started time period operation when the vehicle left the charge area k in which it was located until that time has expired (24e). If the time limit has expired, "1" showing that the vehicle has entered the charge area j is registered in the register RAEJ. In addition, the "1" of the register FTRk showing that the time period operation of the timer TRk has started is cleared, and the "1" of the register Ftrj showing that the above measuring of the passing of time is being carried out is cleared. Moreover, the information (i.e. the data of the registers RPF and RPS) showing that the vehicle is within 500 meters and within 400 meters of the charge area is cleared (24a to 24e, 25a, 25b). The register RAEk addressed at the charge area k in which the vehicle was located until that time is also cleared (25b). Note that, the route from step A17 directly to step 25a is used when the vehicle has entered any one charge area from a state in which the vehicle was not in any of the charge area group (i.e. charge areas 1 to 4) (in other words, when the vehicle enters a charge area for the first time). At this time, the data of each of the registers RAE 1 to 3 allocated to each of the charge areas 1 to 4 is set at "0".

After the timer trj has been started, if it is detected before the time is up on the timer trj that the current position is outside the charge area j, the time measurement is cancelled at that moment (29c), and the timer tij is only started when it is once again detected that the current position is again within the charge area j. Therefore, even if results of detection show the current position swinging between the inside and the outside of the charge area j at intervals less than the set time trj, "1" showing a vehicle entry is not registered in the register RAEj. When the set time TRk has passed since the vehicle has left the charge area k through which it passed previously, and when it is continuously detected within the charge area j for more than the set time trj, the "1" of the register RAEk showing that it was within the charge area k is cleared (25b) and a "1" is registered in the register RAEj to show the vehicle has entered the charge area j (25a).

Figure 62:
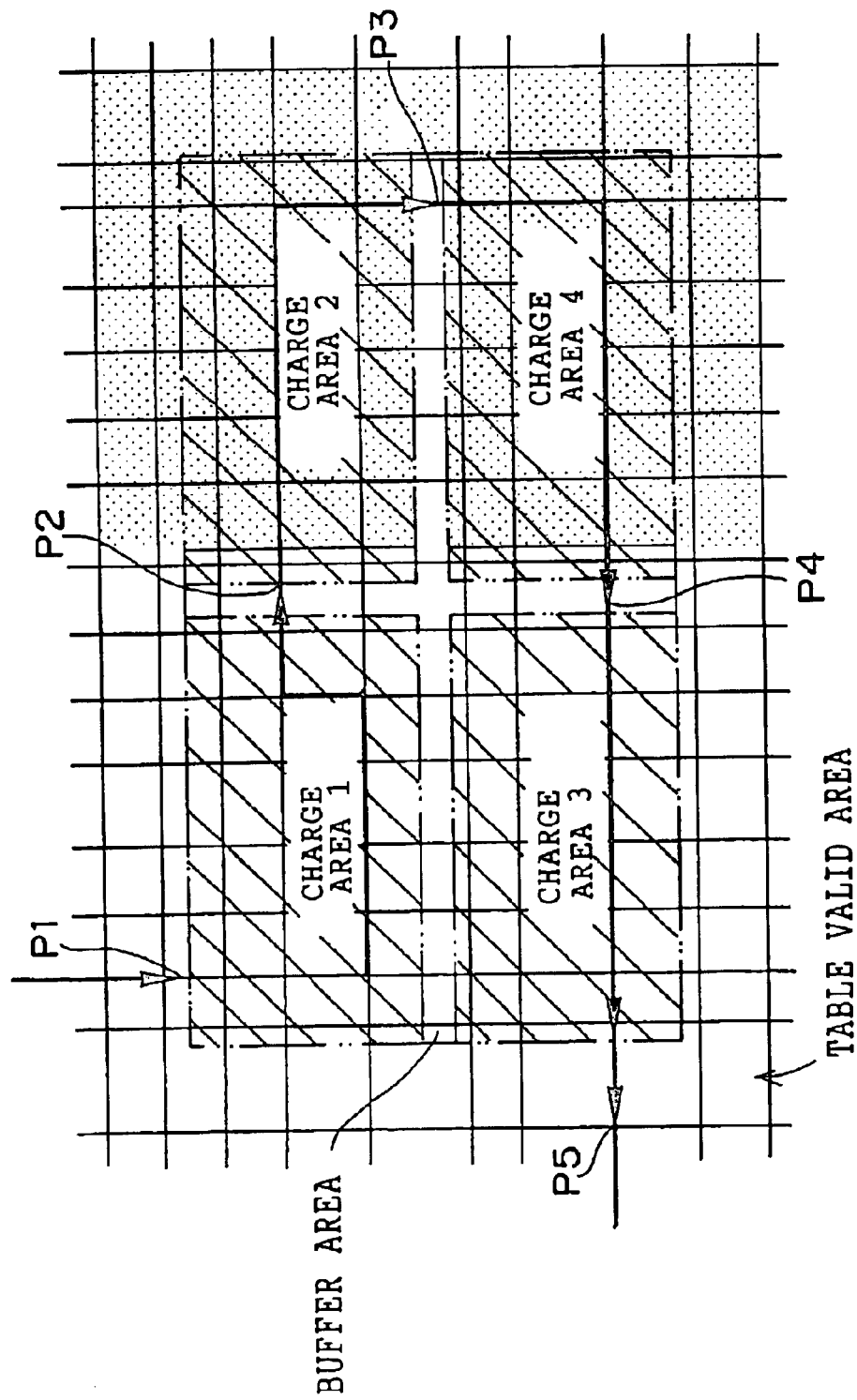
FIG. 62 is a plan view showing charge areas set in a road network.

Moreover, instead of the processing of FIG. 42 of the ninth embodiment, the charge control ECU 2 of the present embodiment performs the processing shown in FIG. 60 as the "vehicle entry processing" (27). When the area distribution is such as is shown in FIG. 62, this vehicle entry processing (271 is performed at the position P1 where the vehicle first enters charge area 1, at the position P2 where the vehicle enters charge area 2, at the position P3 where the vehicle enters charge area 3, at the position P4 where the vehicle enters charge area 4, and at the position P5 where the vehicle exits the table valid area. In the present embodiment, processing to organize the data for charging for a trip through charge area 1 is begun at the position P1. A charge amount Y for the trip through charge area 1 is calculated at the position P2, and processing is performed to update the balance of the card CRD to a value decreased by that amount. In addition, processing to organize the data for charging for a trip through charge area 2 is begun at the position P2. A charge amount Y for the trip through charge area 2 is calculated at the position P3, and processing is performed to update the balance of the card CRD to a value decreased by that amount. In addition, processing to organize the data for charging for a trip through charge area 3 is begun at the position P3. A charge amount Y for the trip through charge area 3 is calculated at the position P4, and processing is performed to update the balance of the card CRD to a value decreased by that amount. In addition, processing to organize the data for charging for a trip through charge area 4 is begun at the position P4. A charge amount Y for the trip through charge area 4 is calculated at the position P5, and processing is performed to update the balance of the card CRD to a value decreased by that amount. The payment processing at the position P5 is performed in A12, however, the contents of the processing are the same as in the "vehicle entry processing" (27) described next. The above is described further below.

Looking now at FIG. 62, when the routine moves to the "vehicle entry processing" (27), the charge unit prices $A_1$ to $A_4$ for the charge areas just passed through by the vehicle are read from the charge table and registered in an accumulator register (271). The charge amount for the areas just passed through is then calculated as shown below (272).

$$Y = A_1 \times Z + A_2 \times D + A_3 \times T + A_4 \times C \qquad (3)$$

Z is the value of the data of the register Z where the number of entries into an area is registered. D is the value of the data of the register D where the distance traveled inside an area is registered. T is the value of the register T where the length of time in an area is registered. C is the value of the register C where the length of time of congested travel within an area is registered. Note that, when this calculation is performed at the point P1, there is no charge area that the vehicle has just passed through, therefore, $A_1$ to $A_4$, Z, D, T, and C are all set to 0, resulting in the calculated value Y also being 0. However, at the position P2, the charge amount Y is calculated by the sum of products calculation of (3) above of the charge unit prices of the charge area 1 in Table 2 and the number of entries Z into charge area 1 (=1), the distance traveled D (a measured value), and with T=0 and C=0 (these clocks are not being used).

Next, the charge control ECU 2 registers the charge amount Y in the charge amount register ATP (273), clears the registers Z, D, T, and C for registering measurement values (274), and increments the data of the register Z by 1 (275). A check is then made as to whether or not the travel distance charge unit price $A_2$ for the charge area just entered is greater than the 0 showing that there is a travel distance charge (276). If it is a value exceeding 0, the measuring of the distance D is begun (277). Furthermore, if the travel time charge unit price $A_3$ is a value exceeding 0, the measuring of the length of time T spent in the area is begun (278, 279). If the congested travel time C charge unit price $A_4$ is a value exceeding 0, the measuring of the length of time C spent in the area at which the vehicle speed is less than 20 Km/h is begun (280, 281).

Next, data processing for the payment of the charge amount for the portion of the travel through the charge area through which the vehicle just passed, namely, the charge processing (282+CCU1) is performed and the card balance is updated. The contents of this charge processing (282+CCU1) are the same as described above (FIGS. 43 to 45). Subsequently, the charge area No., the date and time, the balance, the position, the distance traveled (the data in the integral distance register and fractional distance register), the length of stay (the data in the integral time register and fractional time register), the state of the card reader 5 (i.e. ready, normal, not ready, abnormal), the existence or otherwise of a card CRD loaded in the card reader 5, and the state of the GPS (i.e. whether or not position data has been generated) are written in the movement history table (283).

FIGS. 59A and 59B will now be looked at once again. When the (current position of the) vehicle departs from the charge area j, the charge control ECU 2 goes through steps A13 and A14 and starts the timer with a time limit value of TRj (for example, 5 seconds). Because this timer is thereafter cancelled when it is detected that the vehicle has again entered the charge area j, the timer TRj continues for the duration of the time period value TRj and ends when the position is again detected outside the charge area j.

Exactly the same data processing as that of the register RAEj described above relating to the charge area j showing whether or not a vehicle has entered into the charge area j is performed in the same way for all the other charge areas. As a result, when a vehicle moves from the charge area k to the charge area j, then when the two conditions of the set time TRk passing since the vehicle left the charge area k and the vehicle entering the charge area j are met at the same time, the "1" in the register RAEk is cleared and replaced with "0" and "1" is registered in the register RAEj. Then, when the vehicle leaves the charge area j and moves to another charge area L, then when the two conditions of the set time TRj passing since the vehicle left the charge area j and the vehicle entering the charge area L are met at the same time, the "1" in the register RAEj is cleared and replaced with "0" and "1" is registered in the register RAE L. Moreover, this "vehicle entry" is notified to the notification station 30 and charge processing is performed according to the "vehicle entry processing" (26, 27).

Note that, power is supplied to the charge control ECU 2 for it to maintain minimum data retention functions not only when the ignition key switch IGsw is on, but also while it is off. As a result, because the registers RAEj, k, and L are allocated to the memory capable of keeping data even while the ignition key switch IGsw is off, the "1" in the data of the registers RAEj, k, and L is not deleted even when the ignition key switch IGsw is turned off. Accordingly, when a vehicle parks inside the charge area j, for example, and the ignition key switch IGsw is turned off, and then turned on again when the vehicle begins moving again, there is no problem such as another charge having to be paid for the charge area j. Note that the register RAEj may also be allocated to non-volatile memory which retains data when any of the external power sources for the charge control ECU 2 is cut off.

The contents of the charge processing (282+CCU1) will now be described. It should be noted that this charge processing is performed in the "vehicle entry processing" 27 already described in FIG. 60. In the charge processing (282+CCU1), firstly, the data ATP (a positive value) of the charge amount register ATP in which the charge amount Y has been registered is added to the unpaid amount due (a negative value) in the abnormality history memory. The unpaid amount due in the abnormality history memory is then updated (rewritten) to this new value (a negative value) ASCm–ATP and the charge amount register ATP is cleared (282). The routine then moves to the "charging abnormality check" CCU1 where card balance payment processing is performed.

Figure 61A:
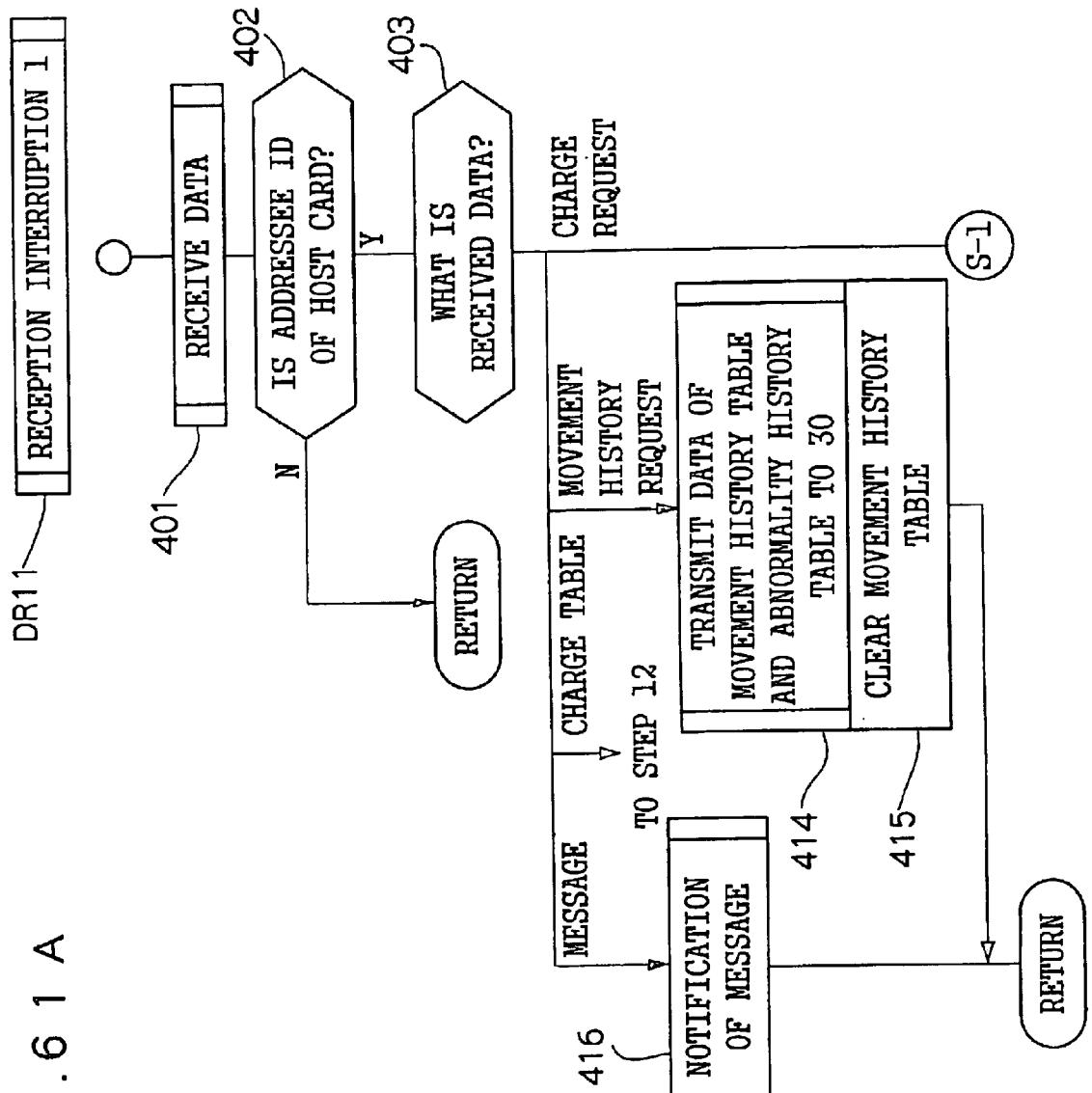
FIGS. 61A and 61B are flow charts showing a portion of the interrupt processing 1 DRI1 by the charge control ECU 2 of the fourteenth embodiment in response to the reception of a radio signal.
Figure 61B:
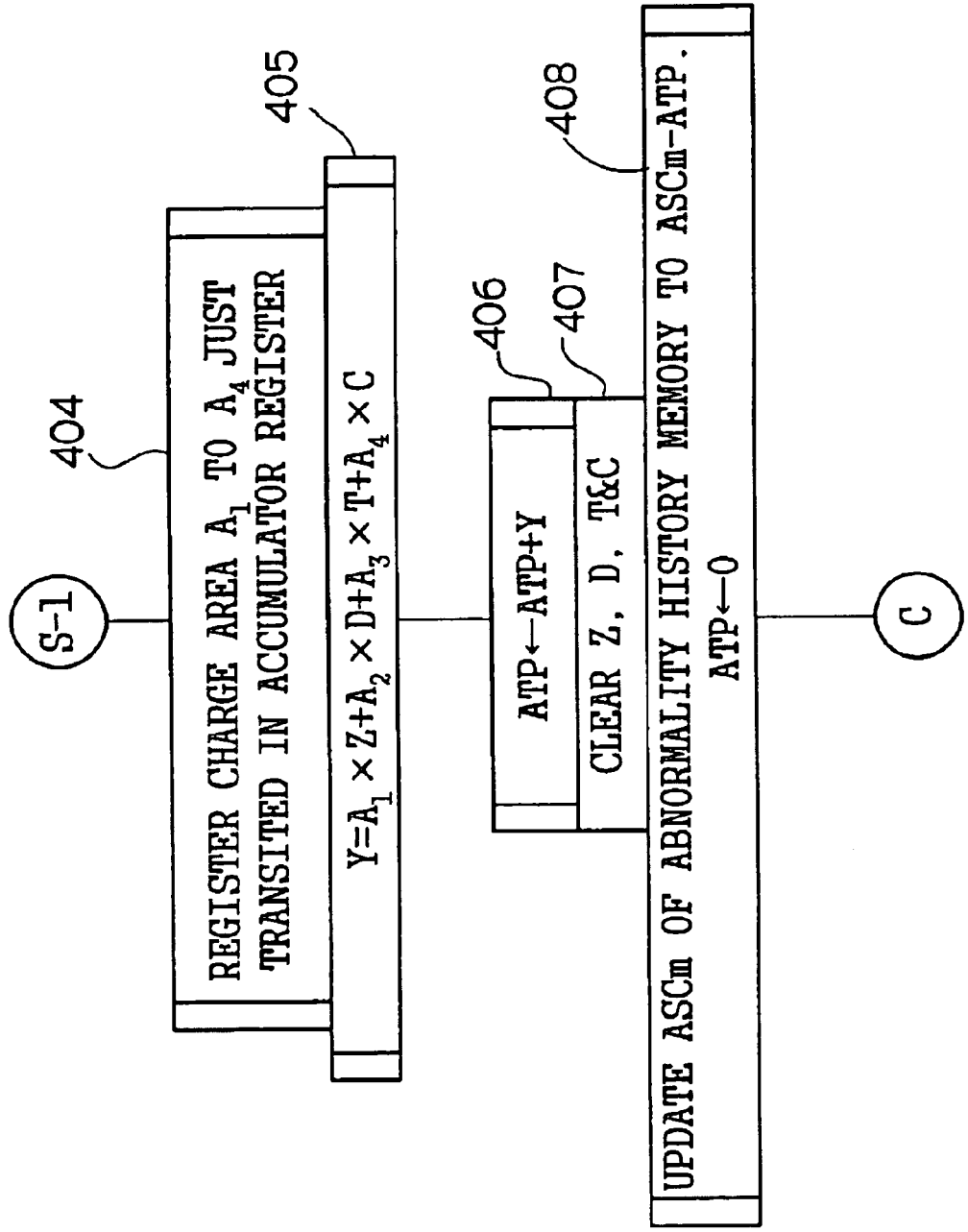

The "reception interruption 1" DRI1 executed by the charge control ECU 2 will now be described with reference to FIGS. 61A and 61B. When the charge control ECU 2 proceeds to the reception interruption DRI1, it checks whether the address belongs to the host card ID (including when all vehicles are specified) (402). If this is the case, a determination is made as to whether the received data is a charge request, a movement history request, a charge table, or a message (403).

If the received data is a "charge request", the charge control ECU 2 reads the charge unit prices $A_1$ to $A_4$ of the charge area the vehicle is currently traveling through and registers them in an accumulator register (404). The charge amount for the areas just passed through is then calculated as shown below (405).

$$Y = A_1 \times Z + A_2 \times D + A_3 \times T + A_4 \times C \qquad (3)$$

Z is the value of the data of the register Z where the number of entries into an area is registered. D is the value of the data of the register D where the distance traveled inside an area is registered. T is the value of the register T where the length of time in an area is registered. C is the value of the register C where the length of time of congested travel within an area is registered. Note that, when the relevant measurement has not yet begun, the values of these sets of data are all set to zero. Next, the charge control ECU 2 registers the charge amount Y registers the charge amount Y in the charge amount register ATP (406) and clears the registers Z, D, T, and C for registering measurement values (407). As a result, the measured value of the variable being measured is returned here to zero, and from this point the variable is again counted up (i.e. measured again) beginning from zero.

Next, the data ATP (a positive value) of the charge amount register ATP in which the charge amount Y has been registered is added to the unpaid amount due (a negative value) in the abnormality history memory. The unpaid amount due in the abnormality history memory is then updated (rewritten) to this new value (a negative value) ASCm−ATP and the charge amount register ATP is cleared (408).

The routine then moves to the "card reading processing" CDP shown in FIG. 49. The contents of the "card reading processing" CDP and the "card insertion/card replacement notification" AFC of FIG. 49 as well as the contents of the processing of steps 161 to 165 are the same as those already described. Note that, for example, when the prior charge processing (282+CCU1) that is described above ends because there is no card loaded or because the card balance is negative, the possibility exists that thereafter a proper card with a sufficient balance will be correctly installed in the card reader 5. In that case, the current "charge request" serves to cause the unpaid amount due ASCm stored until that point in the abnormality history memory to be paid. Alternatively, if there is still no card loaded or if the card balance is still negative at this point, the card insertion/card replacement notification AFC is activated. Moreover, warning notification 1 which notifies the outside of the vehicle that there is an abnormality is activated by the steps 407 to 411 of FIG. 49 being performed.

The controller unit 32 of the notification station 30 executes this interrupt processing DRI2 in response to the arrival of a message in the modem unit 34 or the detection of the arrival a radio wave signal (message arrival) in the antenna 40 in the communication device 31. When the incoming message is received, if the message is from the charge control ECU 2 of the in-vehicle charge device 1 of a vehicle, the unit 32 receives the message, and, if it is a charge table request, saves the data indicating the date and time, the card ID, the balance, the vehicle ID, the position, and the direction that is attached to the message in internal memory, and, in response to the request, transmits the charge tables in the database FDB via the antenna 40. A search is then made via the control unit 33 as to whether or not the received card ID or vehicle ID is the ID of a vehicle that has been in a collision, or has been stolen, or whether the card is a problem card (i.e. lost or damaged, stolen, annulled through reissue, or illegally copied) stored in the observation database WDB. If the card ID or vehicle ID is one of the above, the card ID, the vehicle ID vehicle No . . . , the contents of the problem, the current position (reception data), and the current time are displayed on the terminal PC display unit and printed out as an observation data set, and are also transmitted to the control center 50 and card issuing and toll settlement booths 71 to 73. These establishments are able to perform data registration or take action in accordance with the content of the problem.

Next, the contents of the charge processing in the above described embodiments when a vehicle travels through charge areas 1 to 4 (the charge unit price is shown in Table 12) in the manner shown by the thick line in FIG. 62 will be described specifically. Firstly, with position recognition being carried out, when the vehicle enters charge area 1 at the position P1, then in order to calculate the charge for the charge area 1, Z is set at 1 and the measuring of the distance D traveled in the area 1 is started. Because the measuring of the times T and C is not started, T and C remain at 0 even as time passes.

When the vehicle travels into charge area 2 at the position P2, the charge amount Y for the charge area 1 is calculated using Formula (3). Z is then set at 1 and the measuring of the travel time in congested traffic C within the charge area 2 is begun in order to calculate the charge for charge area 2. Because the measuring of the distance D and the time T is not started, T and D remain at 0 even as time passes. The charge amount Y for charge area 1 is paid using the card CRD (282+CCU1).

When the vehicle travels next into charge area 3 at the position P3, the charge amount Y for the charge area 2 is calculated using Formula (3). Z is then set at 1 and the measuring of the distance traveled D within the charge area 3 is begun in order to calculate the charge for charge area 3. Because the number of times Z is not counted and the measuring of the times T and C is not started, Z, T, and C remain at 0 even as time passes. The charge amount Y for charge area 2 is paid using the card CRD (282+CCU1).

When the vehicle this time travels next into charge area 4 at the position P4, the charge amount Y for the charge area 3 is calculated using Formula (3). Z is then set at 1 and the measuring of the travel time T within the charge area 4 is begun in order to calculate the charge for charge area 4. Because the measuring of the distance traveled D and the time C is not started, D and C remain at 0 even as time passes. The charge amount Y for charge area 3 is paid using the card CRD (282+CCU1). A little later, because the vehicle departs the area where the table is valid at the position P5, the charge amount Y for the charge area 4 is calculated using Formula (3). The charge amount Y for charge area 4 is paid using the card CRD (282+CCU1).

Note that, in the above embodiment, the measuring of those categories whose unit price for the charge area entered by the vehicle is zero (i.e. the variables Z, D, T, C) is not started, however, by setting the charge unit price for categories not requiring any charge to an invalid value (0), as is shown in Table 2, the counting of all categories can be started and the charge amount Y calculated using Formula (3).

Moreover, in the above embodiment, each time the vehicle leaves the charge area, the charge amount for the charge area through which the vehicle has just traveled is calculated and payment made using the card, however, it is also possible to sequentially record itemized charge information on either the card or the internal memory of the ECU 2 of the charge device, and when predetermined conditions have been met, payment can be made from the card by calculating the total amount of the charge recorded in the internal memory. Alternatively, it is possible for a card on which itemized charge information has been sequentially recorded to be brought to a payment center or, using communication, for the information on the card to be transmitted to a control station and for the payment to be made in cash or by withdrawal from a bank account at the payment center or control station.

In an aspect in which the itemized charge information is sequentially recorded, the following recording is left:

Firstly, a charge log is recorded using the calculation below based on a single entry into charge area 1 at the position P1;

1. $Y=Y_A=70 \times 1+50 \times 0+0 \times 0+0 \times 0=¥70$

Next, when 1 km is traveled (traveling time: 1 min 30 secs, congested traveling time: 10 secs), 2. $Y=Y_A=70 \times 1+50 \times 1+0 \times 1+0 \times 0=¥20$ When 1 further km is traveled (total: 2 km, traveling time: 3 mins, congested traveling time: 10 secs), 3. $Y=Y_A=70 \times 1+50 \times 2+0 \times 3+0 \times 0=¥170$ When the vehicle travels on and reaches the position P2, it enters charge area 2. Therefore, charge calculation for charge area 2 is begun. Namely, in the same way (i.e. as for one entry into charge area 1), 4. $Y=Y_A+Y_B=170+(150\times1+0\times0+0\times0+50\times0)=¥320$ Next, when the time the vehicle is traveling in congested conditions reaches 1 minute (distance traveled: 1.7 km, travel time: 3 mins 20 secs), 5. $Y=Y_A+Y_B=170+(150\times1+0\times1+0\times3+50\times1)=¥¥370$ When the time the vehicle is traveling in congested conditions lengthens to another 1 minute (distance traveled: 2.7 km, travel time: 5 mins 20 secs, congested traveling time: 2 mins), 6. $Y=Y_A+Y_B=170+(150\times+0\times2+0\times5+50\times2)=¥420$ When the vehicle travels on and enters charge area 3 at the position P3, it does make one vehicle entry, however, because the unit price $A_1$ charged for a vehicle entry is zero, there is no change in the charge amount and no charge log is left. However, it is possible to leave a separate log as the travel route log. In the sequence below, the charge now becomes for a single entry into charge area 3, distance traveled: 1 km, travel time: 1 min 12 secs, congested travel time: 5 secs, 7. $Y=(Y_A+Y_B)+Y_C=420+(0\times1+20\times1+0\times1+0\times0)=¥440$ For a single entry into charge area 3, distance traveled: 2 km, travel time: 2 min 30 secs, congested travel time: 5 secs, 8. $Y=(Y_A+Y_B)+Y_C=420+(0\times1+20\times2+0\times2+0\times0)=¥460$ Next, for a single entry into charge area 4, distance traveled: 0 km, travel time: 0 mins, congested travel time: 0 secs, 9. $Y=(Y_A+Y_B+Y_C)+Y_D=460+(80\times1+0\times0+10\times0+0\times0)=¥540$ For a single entry into charge area 4, distance traveled: 1 km, travel time: 1 min, congested travel time: 10 secs, 10. $Y=(Y_A+Y_B+Y_C)+Y_D=460+(80\times1+0\times1+10\times1+0\times0)=¥550$ For a single entry into charge area 4, distance traveled: 2.5 km, travel time: 2 mins, congested travel time: 10 secs, 11. $Y=(Y_A+Y_B+Y_C)+Y_D=460+(80\times1+0\times2+10\times2+0\times0)=¥560$ For a single entry into charge area 4, distance traveled: 4 km, travel time: 3 mins, congested travel time: 10 secs, 12. $Y=(Y_A+Y_B+Y_C)+Y_D=460+(80\times1+0\times4+10\times3+0\times0)=¥570$ Thereafter, when the vehicle leaves the area in which the table is valid, a total of 12 charge logs are recorded for the travel that has just ended along the route R1 and a payment of ¥570 is required. When processing of the medium such as the IC card or the like on which the log is recorded is performed in a payment processing device or the like, the actual charging is ended.

When an IC card or magnetic card of a prepaid type such as a telephone card is used for the charge processing, the amount of the balance is recorded in the above charge log. For example, if the amount of the balance is ¥850, then the charge log changes as shown below.

0. ¥850
1. ¥70, charge area 1, balance: ¥780
2. ¥50, charge area 1, balance: ¥730
3. ¥50, charge area 1, balance: ¥680
4. ¥150, charge area 2, balance: ¥530
5. ¥50, charge area 2, balance: ¥480
6. ¥50, charge area 2, balance: ¥430
7. ¥20, charge area 3, balance: ¥410
8. ¥20, charge area 3, balance: ¥390
9. ¥80, charge area 4, balance: ¥310
10. ¥10, charge area 4, balance: ¥300
11. ¥10, charge area 4, balance: ¥290
12. ¥10, charge area 4, balance: ¥280

As has been described above, because it is possible in the charge calculation and charge processing routines to read from the determining and storage areas (except for RAM) without causing any overloading, the load on the CPU is small and high speed calculation processing is possible. In addition, the advantages in the charge calculation are that the number of addition processings and multiplication processings are constant and there is little unevenness in the processing load. Moreover, because the charge calculation can be performed in a single calculation processing, the way in which the charge system is implemented can be easily understood simply by looking at the charge coefficients as shown in Table 2. For example, it is possible to see at a glance that, for charge area 1, a combination of charging for distance and charging for each entry is used. For charge area 2, a combination of charging for congested traffic and charging for each entry is used. For charge area 3, a distance charge only is made, while for charge area 4, a combination of charging for travel time and charging for each entry is used. Note that, in the above example, the charge areas were set at four (charge area 1 to charge area 4) and four types of charging category were set (number of entries, distance traveled, travel time, and congested travel time), however, the present embodiment is not limited to these numbers.

(Fifteenth Embodiment)

The fifteenth embodiment of the present invention will now be described. Because the structure and operation of the fifteenth embodiment are substantially the same as those of the ninth embodiment, only those portions that are different will be described.

In the present embodiment, in addition to the charge table (Table 10) of the above described ninth embodiment, the charge tables 13 and 14 are also used. Namely, charge table 13 which is based on distance units is used for charging a toll corresponding to the distance traveled within a charge area. Charge table 14 which is based on number of entries is used to charge a toll corresponding to the number of times a vehicle enters (i.e. uses) a charge area.

TABLE 13

Time unit charge table

| Information Category | Information Content | |
|---|---|---|
| Charge area information | [N350000, E1360000] (First point) | [N345900, E1360100] (Second point) |

| | Heavy vehicle | | Medium vehicle | | Light vehicle | |
|---|---|---|---|---|---|---|
| Toll information/ 1 hour | First hour | After first hour | First hour | After first hour | First hour | After first hour |
| Time spot: 7:00–9:00 | ¥500 | ¥450 | ¥300 | ¥250 | ¥200 | ¥150 |
| Time spot: 17:00–19:00 | ¥500 | ¥450 | ¥300 | ¥250 | ¥200 | ¥150 |
| Time spot: other | ¥400 | ¥350 | ¥200 | ¥150 | ¥100 | ¥50 |
| Table valid period | Oct. 10–11, 1997 | | | | | |
| Table valid area information | . . . (First point) | | . . . (Second point) | | | |

TABLE 14

| Information Category | Information Content | | | | | |
|---|---|---|---|---|---|---|
| Charge area information | [N350000, E1360000]<br>(First point) | | | [N345900, E1360100]<br>(Second point) | | |
| | Heavy vehicle | | Medium vehicle | | Light vehicle | |
| Toll information/1 km | First kilometer | After first kilometer | First kilometer | After first kilometer | First kilometer | After first kilometer |
| Time spot: 7:00–9:00 | ¥500 | ¥450 | ¥300 | ¥250 | ¥200 | ¥150 |
| Time spot: 17:00–19:00 | ¥500 | ¥450 | ¥300 | ¥250 | ¥200 | ¥150 |
| Time spot: other | ¥400 | ¥350 | ¥200 | ¥150 | ¥100 | ¥50 |
| Table valid period | | | Oct. 10–11, 1997 | | | |
| Table valid area information | | ... (First point) | | ... (Second point) | | |

Figure 63B:
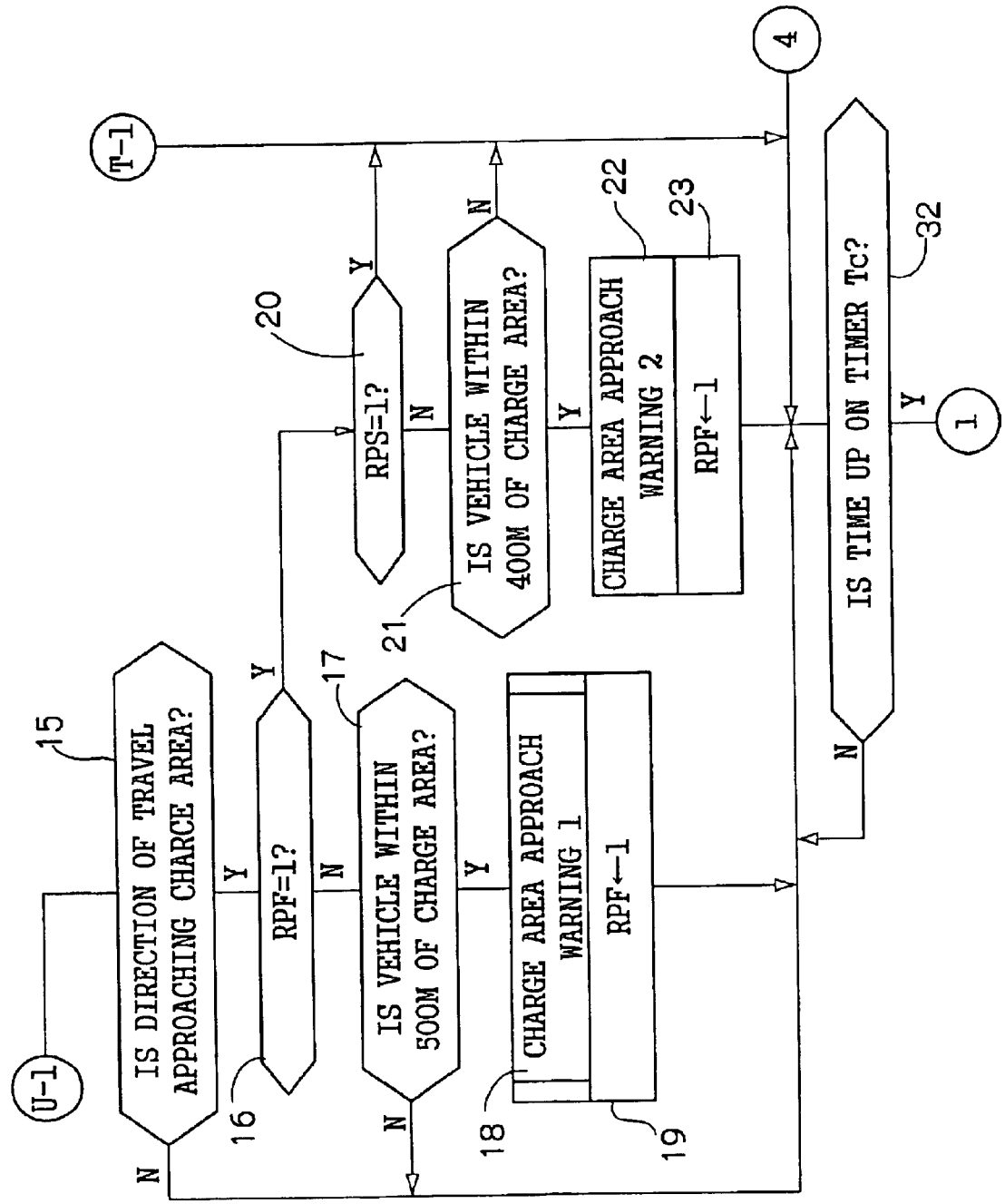

The charge control operation of (the CPU of the charge control ECU 2 in the present embodiment performs the processing shown in FIGS. 63A and 63B instead of the processing of FIGS. 40A and 40B. Namely, when a vehicle enters a charge area, the charge control ECU 2 writes "1" in a single register (internal memory) so as to show that the vehicle has entered the charge applicable area (RFE=1), and clears the information showing that the vehicle is within 500 meters of the charge area, and is within 400 meters of the charge area (i.e. the data in the registers RPF and RPS) (A13, 24, 25), and notifies the notification station 30 that a vehicle has entered the charge area (i.e. sends the message "vehicle entry") (26).

Figure 65:
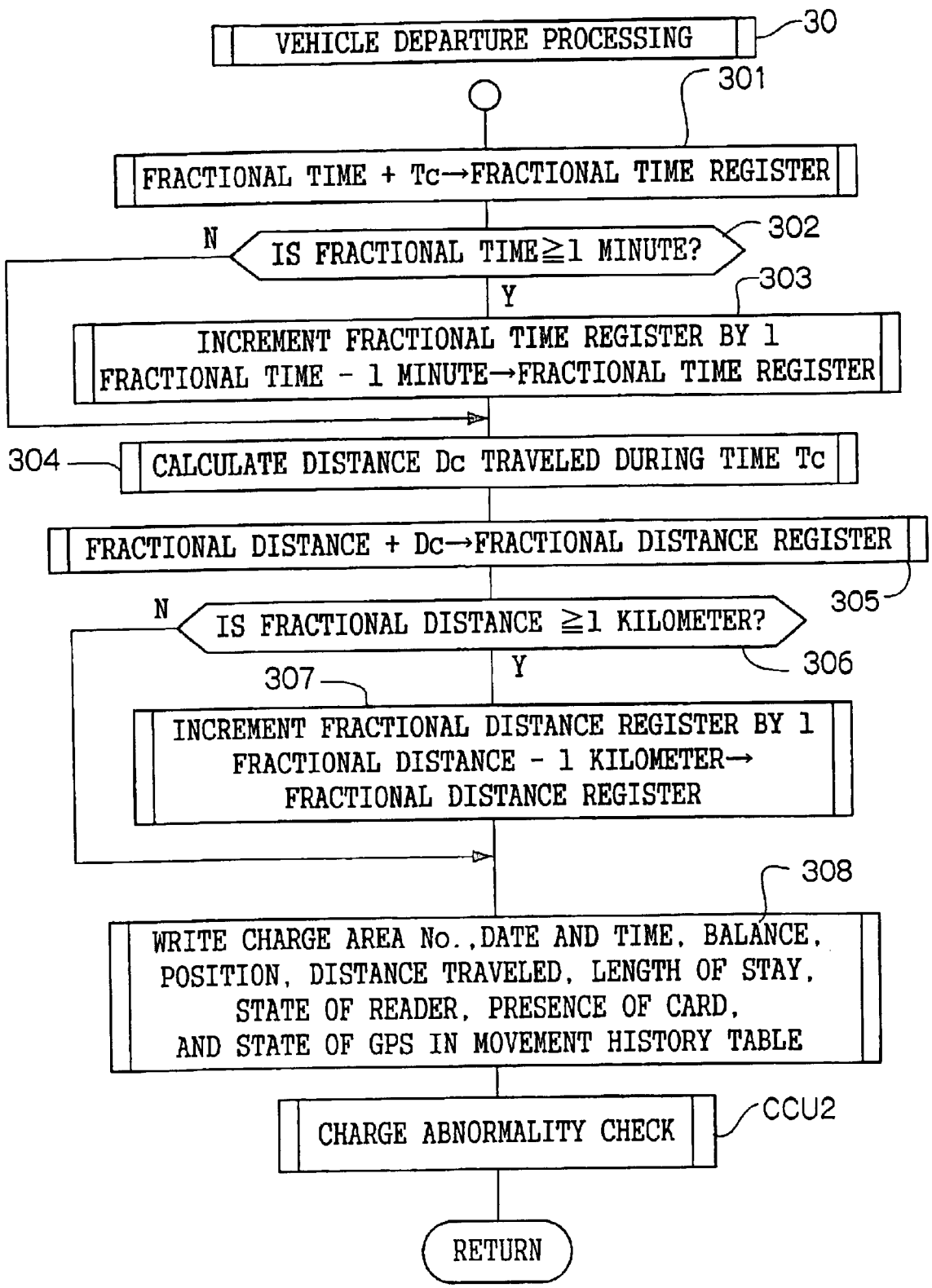
FIG. 65 is a flow chart showing the content of the "vehicle exit processing" 30 shown in FIGS. 63A and 63B.

FIGS. 63A and 63B will now be referred to again. If the (current position of the) vehicle departs from the charge area, the charge control ECU 2 advances from steps A13 and A14 to step 29. In step 29, the data in the register RAE is altered to "0" which indicates that the vehicle has left the charge area, and the "vehicle departure processing" (30) is performed. The contents of the "vehicle departure processing" (30) are shown in FIG. 65. In the same way as the above "intermediate processing" (28), the "vehicle departure processing" (30) adds the timing values of the elapsed time during the period Tc (301 to 303) and adds the traveling distances of the distance traveled during the time Tc (305 to 307), and registers the final history data inside the area in the movement history table (308).

When a vehicle is passing through one charge area (the first charge area), as described above, and travels towards another charge area (the second charge area), when the (current position of the) vehicle leaves the area in which the table is valid that is indicated by the table valid area information of the first charge table representing the first charge area, the charge control ECU 2 moves from step 8 to 9 and transmits a charge table request. This transmission wave is received by a first notification station (30) addressed in the first charge area, and the first notification station transmits the first charge table. When the charge control ECU 2 receives the first charge table, the charge table received in step 10 is determined to be invalid. As a result, even if the charge control ECU 2 receives the first charge table after the vehicle has left the area in which the table is valid that is indicated by the table valid area information of the first charge table representing the first charge area, this is not written on the IC card CRD or the internal memory.

When the (current position of the) vehicle enters the area where the table of the second charge area is valid, the charge control ECU 2 writes the second charge table transmitted by an unillustrated second notification station in internal memory and on the IC card CRD, and notification control is performed in the manner described above according to the data.

Figure 64:
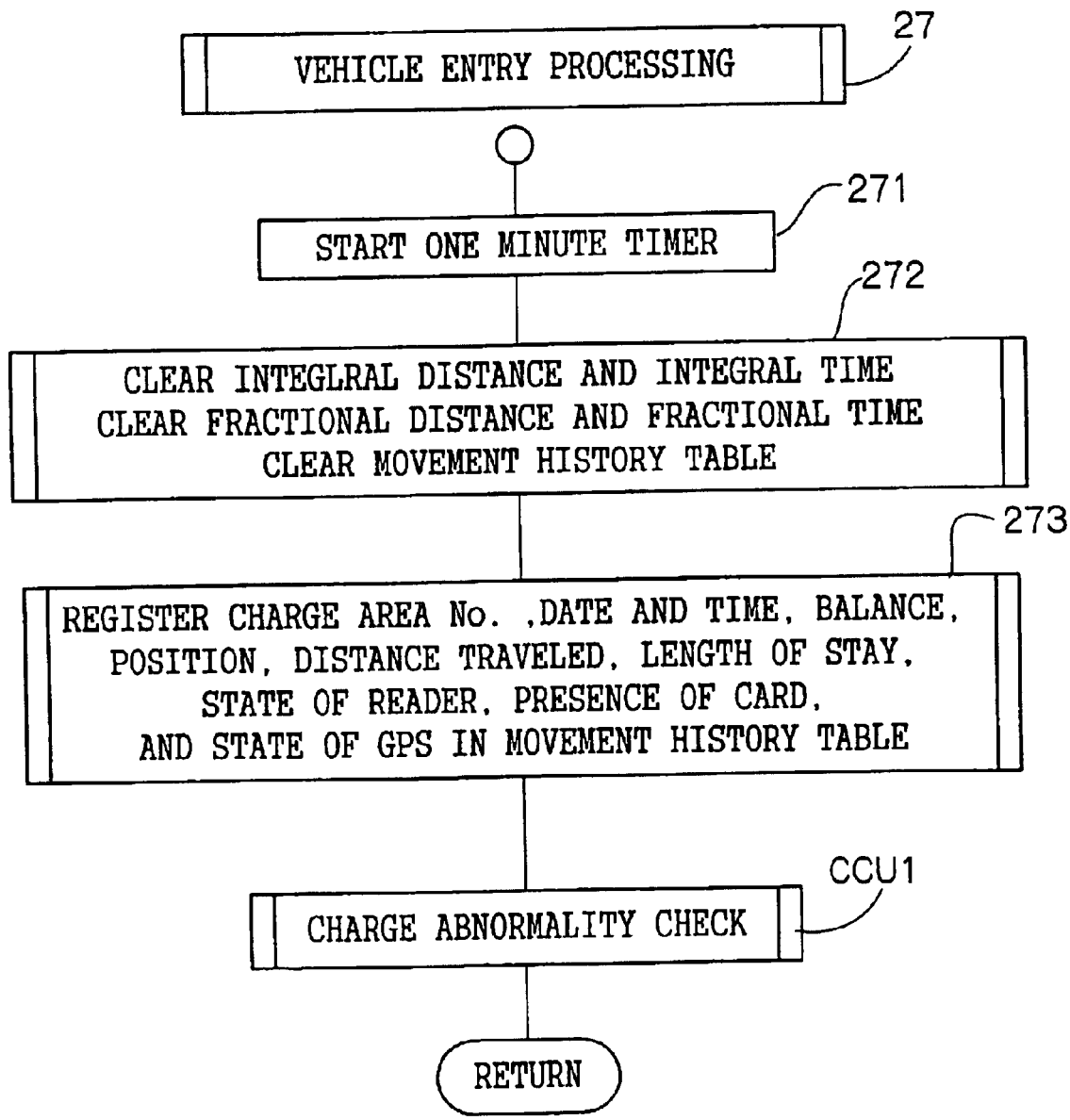
FIG. 64 is a flow chart showing the content of the "vehicle entry processing" 27 shown in FIGS. 63A and 63B.

It should be noted that the "charge abnormality check" CCU1 is performed in the "vehicle entry processing" 27 shown in FIG. 64 that is performed when a vehicle enters a charge applicable area. Because one of the toll deduction processings using a card is performed when the vehicle enters the charge area, it is necessary that the card is capable of being used for charge processing.

Firstly, FIG. 64 will be referred to. When the routine moves to this "charge abnormality check" CCU1, the (CPU of the) charge control ECU2 firstly performs processing whose contents are the same as that of the card reading processing CDP in the above described "card check" 4. If there is no card loaded or if the balance is a negative value, processing whose contents are the same as the above "card insertion/replacement notification" AFC in the "card checks 4 is performed from the card reading processing CDP. Here, if there is no card CRD loaded in the card reader 5 or if one is inserted but there is a data reading abnormality or if the balance is a negative value, the above notification is repeated three times at predetermined intervals with the notification comprising "card insertion notification" or "card replacement notification". As a result, when a positive value card balance is read, the routine moves to the next check of whether or not there is a GPS measurement error shown in FIG. 10.

The check in step 1 as to whether or not the ignition key switch IGsw is closed (Si=H) is intended to determine whether or not the vehicle is parked. When the vehicle enters a charge area in which a time toll charge table (Table 2) is applied, then when the ignition key switch IGsw is open (Si=L: an interrupt instruction to interrupt the timing for the charging), the charge control ECU 2 waits for the ignition key switch IGsw to be closed (Si=H: an instruction for the timing for the charging), and does not perform the "intermediate charge processing" of step 27 while waiting. Therefore, the time the vehicle is parked inside the charge area does not fall within the length of time a vehicle has to stay inside the charge area for a charge amount for a time toll to be calculated.

When the notification station 30 receives a request for a charge table from the charge device 1, a "charge table" is transmitted to the ID address thereof. Moreover, the "charge request" is transmitted to all vehicle addresses at a fixed cycle of a few minutes and at either the fixed cycle of a few minutes or in an irregular cycle, a "movement history request" is sent sequentially to each ID address and the data of the movement history tables sent from each ID is collected. Further, when notification of a "vehicle departure" is received, when there is an unpaid distance traveled or an unpaid travel time in the charge device ID (i.e. the card ID)

which sent the notification, a charge request is transmitted to that ID address. In addition, when notification of a "vehicle departure" is received, a check is made as to the correctness of the charge processing is checked and, if a charging error is discovered, it is pointed out and a message urging a means of dealing with the error is transmitted to the relevant ID address.

Figure 66A:
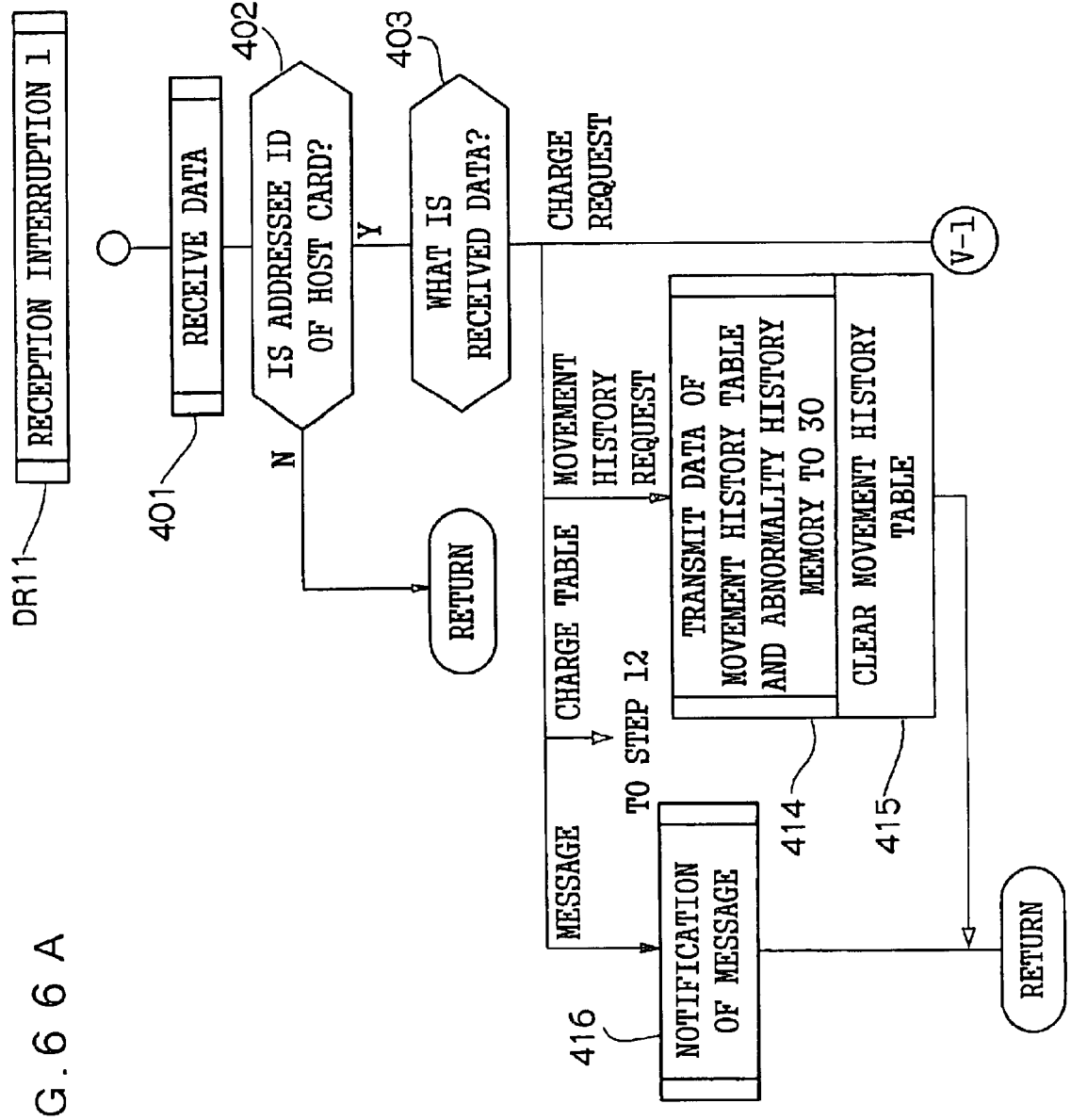
FIGS. 66A and 66B are flow charts showing a portion of the interrupt processing 1 DRI1 by the charge control ECU 2 of the fifteenth embodiment in response to the reception of a radio signal.
Figure 66B:
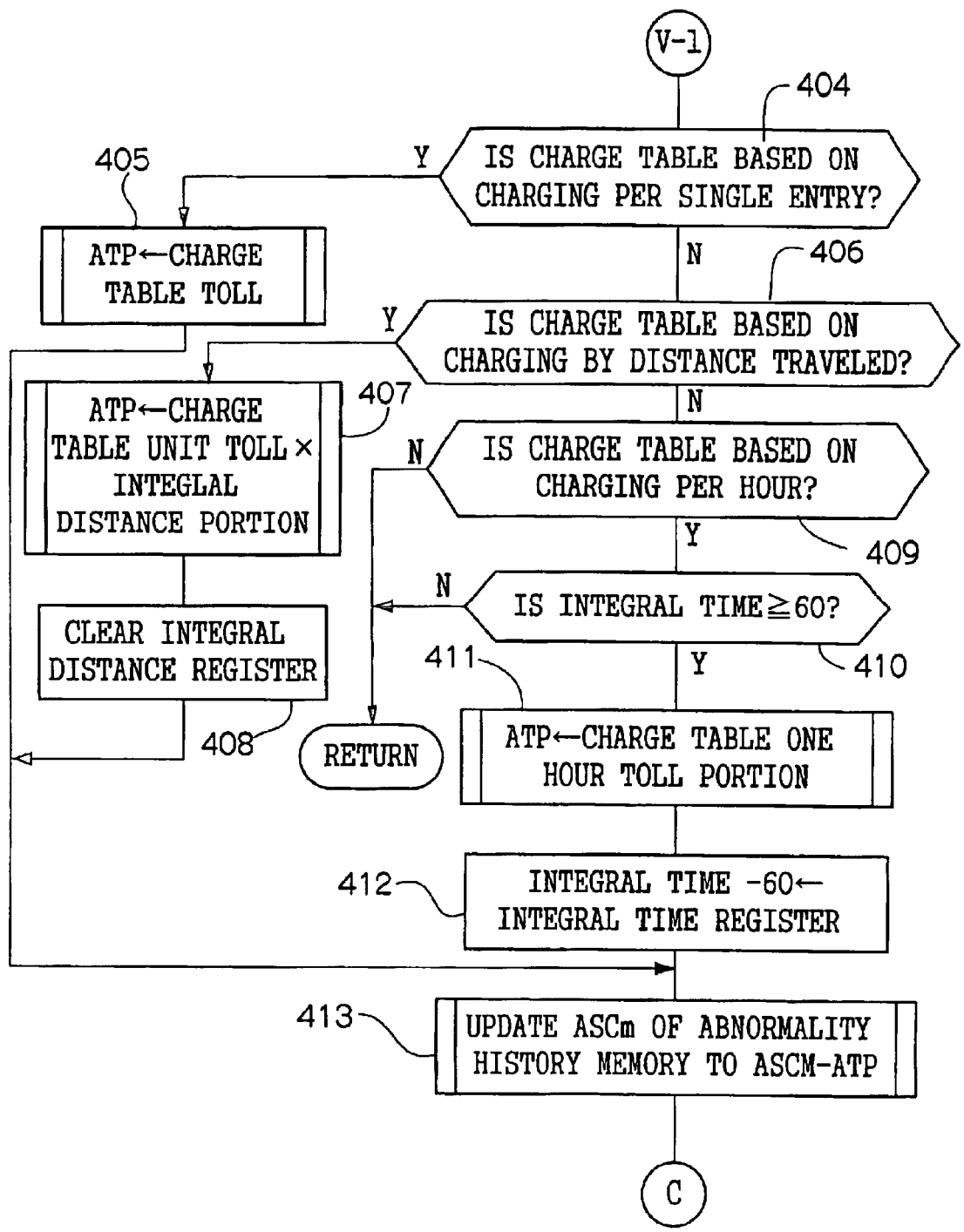

FIGS. 66A and 66B show the contents of "reception interruption 1" DRI1 executed by the charge control ECU 2 as a response when a radio wave signal arrives in the antenna ANTt, and an unillustrated receiver in the telephone unit 8 generates a transmission arrival signal showing that a transmission has arrived (i.e. that it has received a signal). When the charge control ECU 2 proceeds to the reception interruption DRI1, it checks whether the address belongs to the host card ID (including when all vehicles are specified) (402). If this is the case, a determination is made as to whether the received data is a charge request, a movement history request, a charge table, or a message (403).

If the received data is a "charge request", then if the charge table of the card CRD is one based on charging for each entry (Table 4), the charge control ECU 2 extracts the toll (a positive value) from the table corresponding to the vehicle classification in the card data and registers this in the payment amount register ATP (404, 405). This register ATP value is then added as a negative value to the required payment amount (a negative value) ASCm in the abnormality history memory and the overall amount to be paid ASCm−ATP is calculated for the current time. The required payment amount in the abnormality history memory is then updated to this value (413). The routine then moves to the "card reading processing" CDP shown in FIG. 15. The contents of the "card reading processing" CDP and the "card insertion/card replacement notification" AFC of FIG. 15 as well as the contents of the processing of steps 161 to 165 are the same as those already shown in the above described FIG. 9. Here, the required payment amount ATP generated this time is added to the past required payment amount ASCm in the abnormality history memory and the overall required payment amount thus obtained is set as the required payment amount ASCm in the abnormality history memory (413). Therefore, the calculation processing in step 136 (FIG. 7) in the "card reading processing" CDP to add the required payment amount ASCm (a negative value) in the abnormality history memory to the card balance ends up as processing to pay the above overall required payment amount.

If the charge table is one based on charging for distance traveled (Table 3), the toll is extracted from the table for each kilometer corresponding to the vehicle classification in the card data and is multiplied by the value in the integral distance register. The product thus obtained is then registered in the payment amount register ATP (406, 407) and the integral distance register is cleared (408). Thereafter, the processing is the same as has been described above (i.e. step 413 and after).

If the charge table is one based on charging for length of stay (Table 2), a check is made as to whether or not the value of the data in the integral time register is equal to more than 60 (i.e. one hour) (410), if this is the case, the toil is extracted from the table for time units corresponding to the vehicle classification in the card data and registered in the payment amount register ATP (411). The contents of the integral time register are then updated to a value smaller by the amount of 60 (412). Thereafter, the processing is the same as has been described above (i.e. step 413 and after).

If the received data is a movement history request, the charge control ECU 2 transmits the data from the movement history table and the data from the abnormality history memory to the notification station 30 (414) and the movement history table is cleared (415). If the received data is a "charge table", the routine moves to the updating of the card data of step 12 (FIG. 5) described above. If the received data is a message, then the message is displayed on the display unit and notification is given by synthesized sound.

If the charge table is one based on charging for per day entry, then when a charge request has been transmitted, the notification station 30 registers a charge completion in the control station movement history tables generated at each card ID address in the vehicle entry and exit database TDB when a "vehicle entry" notification was received. Thereafter, charge requests are transmitted only to ID addresses for which a charge completion has not been registered and does not send a charge request to the ID which has completed the charging. If the charge table is one based on charging for distance traveled, the notification station 30 repeatedly transmits a charge request to all IDs either in a fixed cycle of approximately several minutes or in an irregular cycle. The charge devices that receive this perform charge processing, when the value of their integral distance register is equal to or more than 1 (kilometer), of this value multiplied by the toll for one kilometer and then clear the integral distance register. Therefore, each time the notification station 30 issues a charge request, the charge device only performs charge processing for the integral value portion (representing kilometer units) of the distance traveled between when the previous charge request was received until the present charge request was received. The fractional distances are carried over for the next time. In the same way, when the charge table is one based on charging for the length of time spent in a charge area, the notification station 30 repeatedly transmits a charge request to all IDs either in a fixed cycle of approximately several minutes or in an irregular cycle. The charge devices that receive this perform charge processing, when the value of their integral time register is equal to or more than 60 (i.e. 1 hour), of the toll for one hour and then update the data of the integral time register to a value that is smaller by the amount of 60 minutes. Therefore, each time the notification station 30 issues a charge request, the charge device only performs charge processing for the integral time portion of the length of time between when the previous charge request was received until the present charge request was received. The fractional times are carried over for the next time.

In the case of a "vehicle departure", because the timing thereof and the timing of the charge request do not match, then even if the charge table is one based on charging in distance units or in time units, it is possible that there might be a "vehicle departure" when there is an integral distance or an integral time that should be charged for. When the notification station 30 receives a "vehicle departure notification", it checks the integral distance data and the integral time data and, if the data is equal to or more than 1 (km) or 60 (1 hour) respectively, a charge request is transmitted to the ID address that gave the "vehicle departure notification".

The charge control ECU 2 of the charge device 1 transmits vehicle departure information showing that the vehicle has left the charge area to the notification station 30. When the controller 32 of the notification station 30 receives this, it saves the time and date, the card ID, the vehicle ID, the current position, the distance traveled (the portion that has not undergone charge processing), the length of stay (the portion that has not undergone charge processing), the direction and the card balance in internal memory.

Thereafter, if the charge table is one which charges based on the distance traveled, a check is made as to whether or not the distance traveled is equal to or more than 1 kilometer and if this is the case, a charge request is transmitted to the card ID address. If the charge table is one which charges based on the length of stay in a charge area, a check is made as to whether or not the length of stay is equal to or more than 60 minutes and if this is the case, a charge request is transmitted to the card ID address. A check is then made as to whether or not there is any usage error information for the charge device in the history table on the control side at the relevant ID address in the vehicle entry and departure database TDB, or whether or not the card balance is negative (minus). If there is no usage error information and if the card balance is positive, the history table on the control side at the relevant ID address is erased. Note that the usage error information is written in the control history tables in the "Toll collection and movement history collection" CRC (FIG. 16) described below, based on the history data in the control history table when that shows a usage error. Next, a departure road (area entry/exit) is specified based on the position data, and the number of departed vehicles at the relevant departure road address in the vehicle entry and departure database TDB is incremented by one (48).

Note that the traffic enforcement official is also able to access data using the regulatory device for vehicle whose lamps 4F1 to 4f4 are not lit.

(Sixteenth Embodiment)

The sixteenth embodiment of the present invention will now be described. Because the structure and operation of the present embodiment are substantially the same as those of the above described fifteenth embodiment, only those portions that are different are described.

Figure 68A:
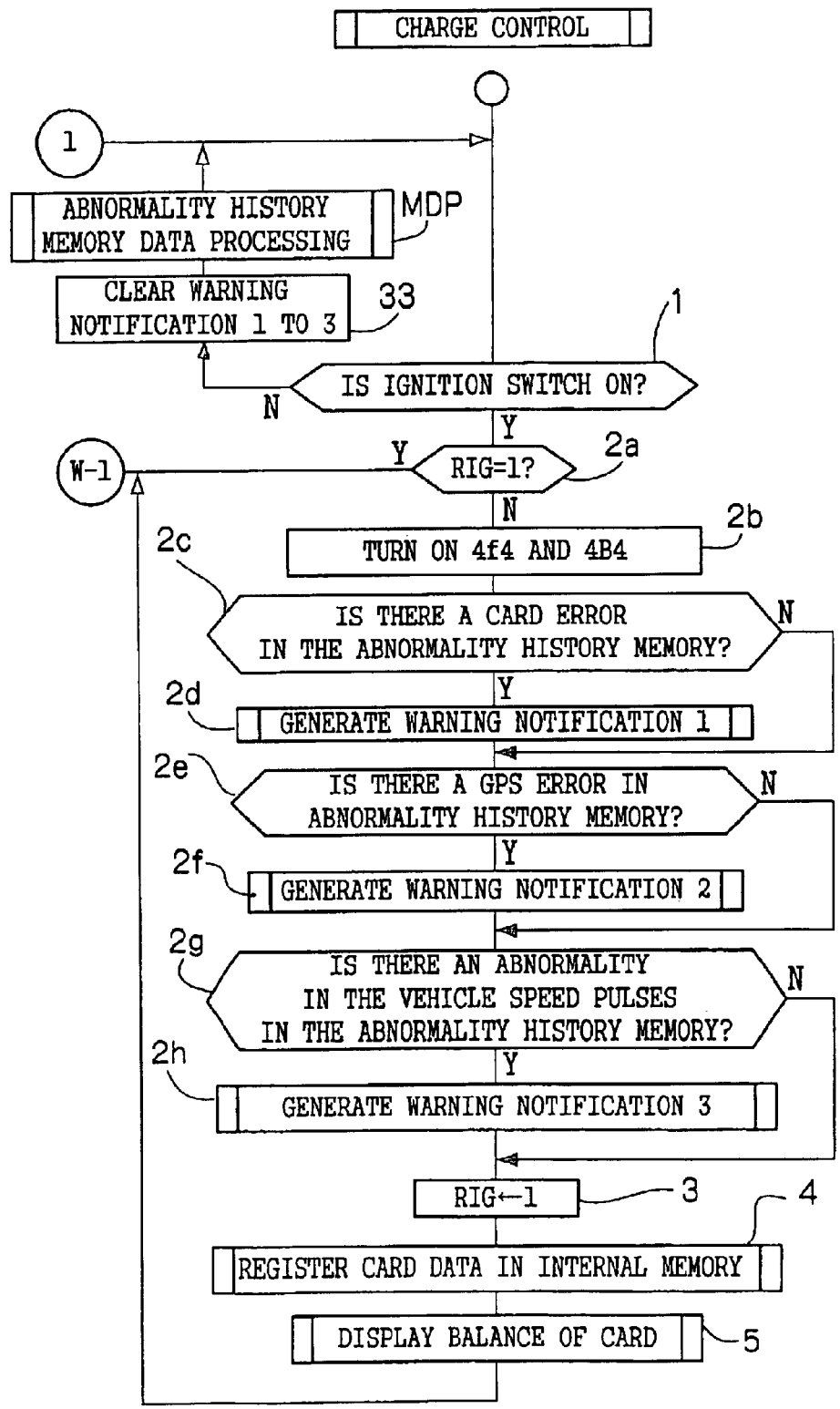
FIGS. 68A and 68B are flow charts showing a portion of the charge control operation of the charge control ECU 2 of the sixteenth embodiment.
Figure 68B:
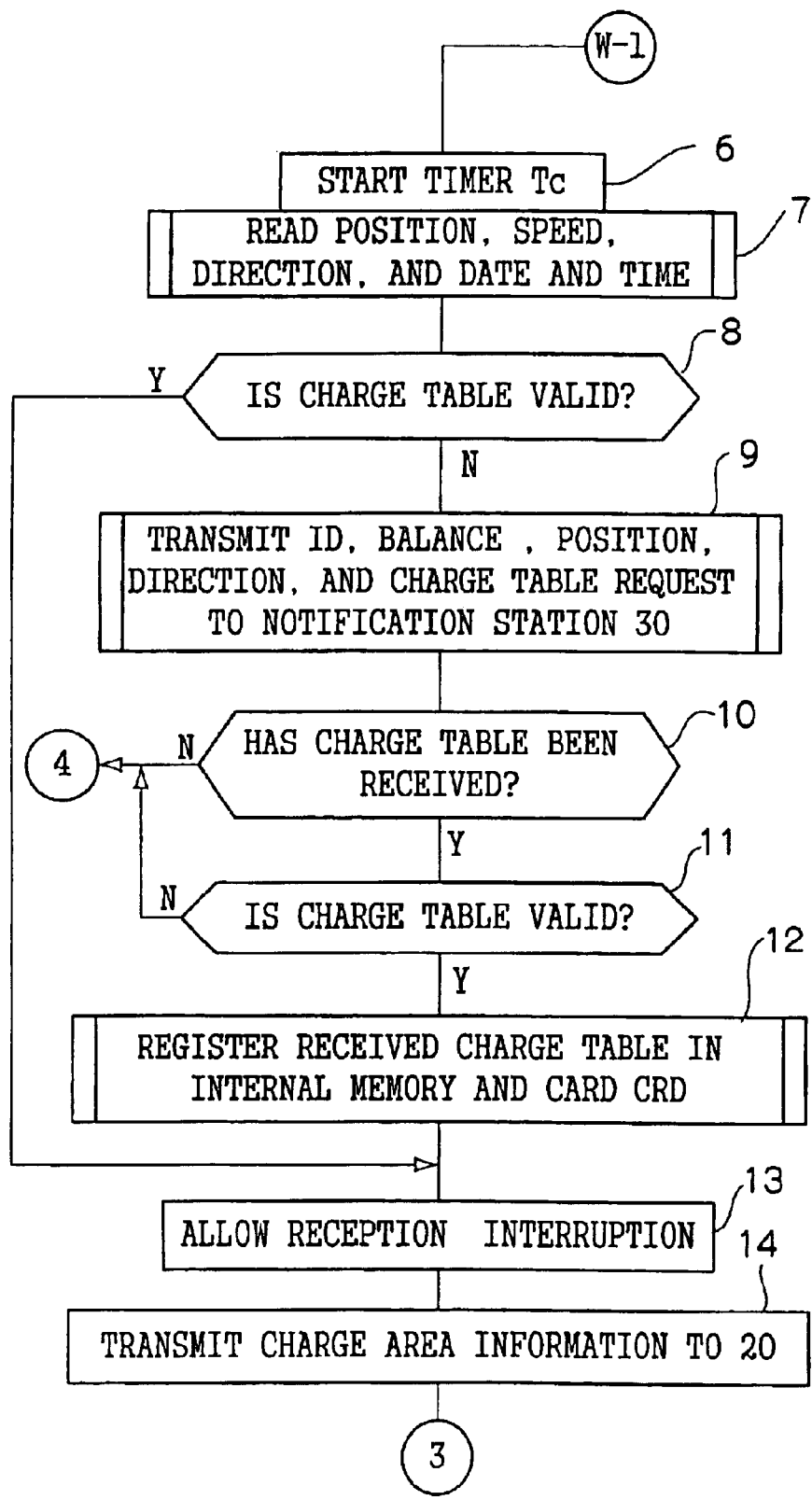

In the charge control operation of the (CPU of the) charge control ECU 2 in the present embodiment, instead of the card check (i.e. step 4) in the above described fifteenth embodiment, as is shown in FIG. 68A and FIG. 68B, a check is made as to whether or not data representing an abnormality is present in the abnormality history memory. If a card error" data is present, the above described warning notification 1 is generated (2c, 2d). If "GPS error" is present, then the above described warning notification 2 is generated and if "GPS error" is present, then the above described warning notification 3 is generated (2e to 2h).

Next, the data of the card CRD is registered in internal memory via the card reader 5 (3, 4). If no card CRD has been loaded, the charge control ECU 2 waits for one to be loaded and when one is loaded, the data of the card CRD is registered in internal memory.

The card balance of the card data that is read next is displayed on the display device 4 (5). Next, the charge control ECU 2 starts the Tc time period timer Tc (6). Next, it requests the GPS information processing ECU 20 to transmit data and when it receives the data for the current position (ground position, the direction of travel, the speed of travel, and the date and time, it registers these in the internal memory (7).

Figure 69A:
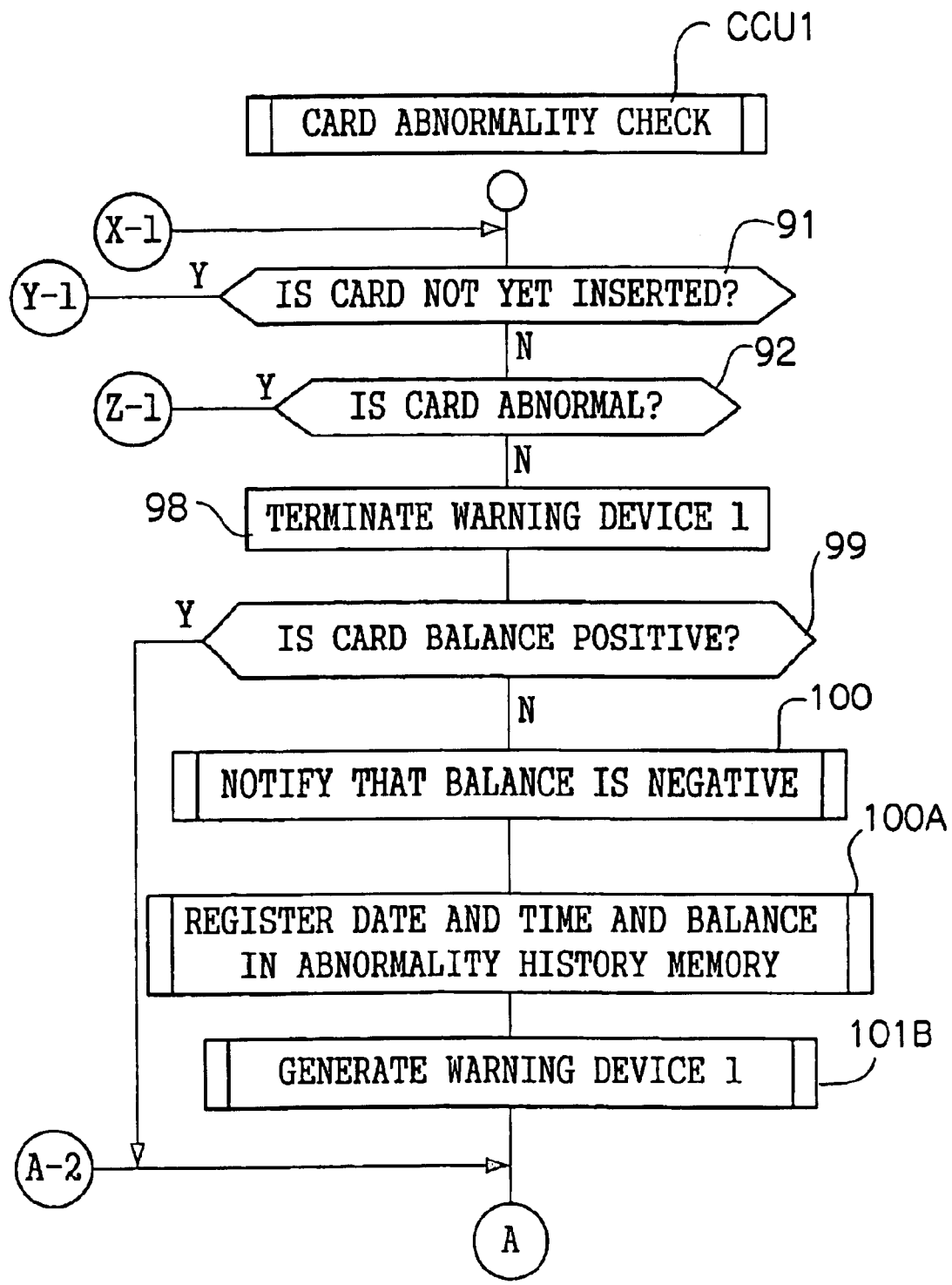
FIGS. 69A and 69B are flow charts showing a portion of the content of the "charge abnormality check" CCU1 of the sixteenth embodiment.
Figure 69B:
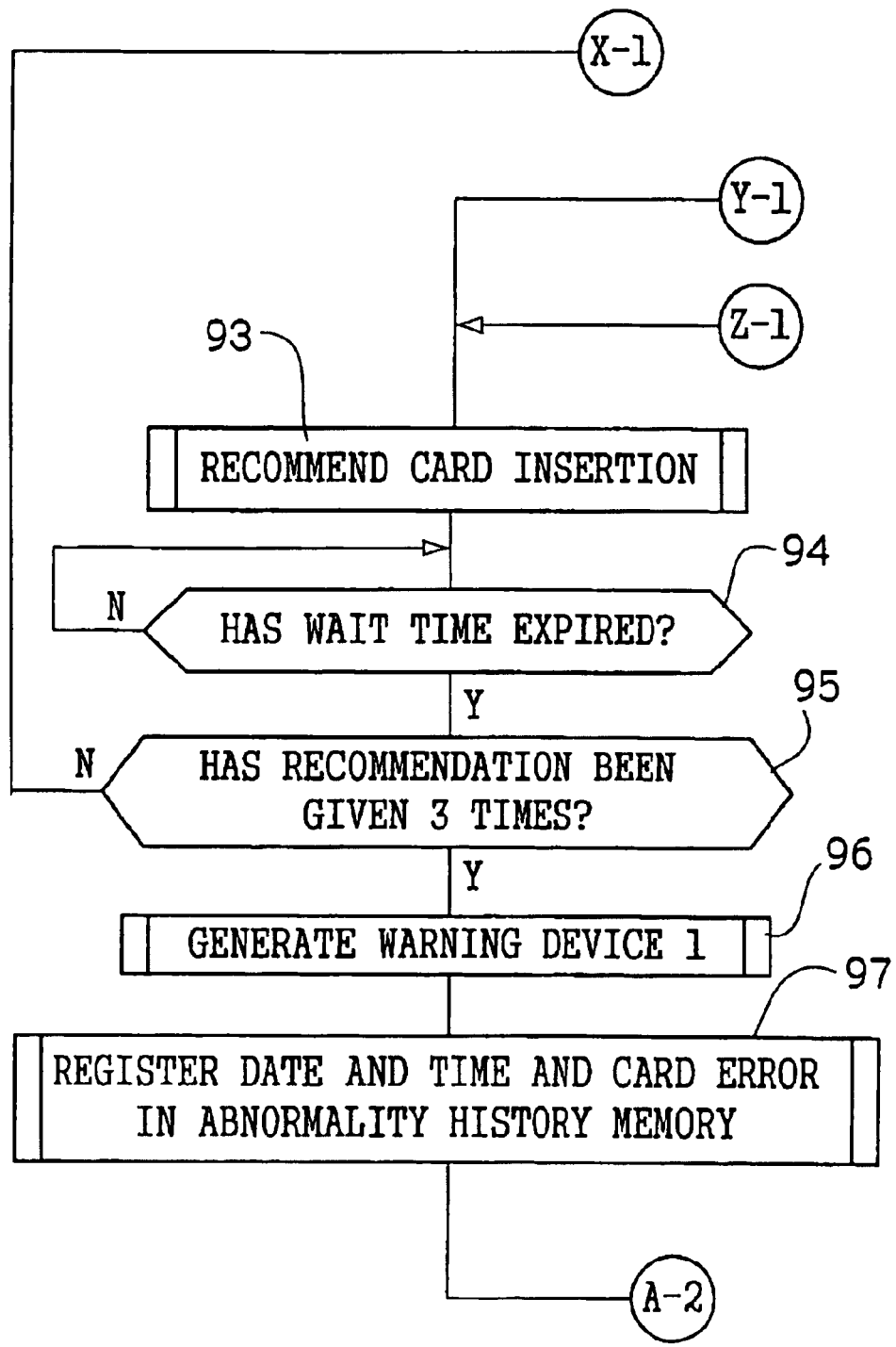

The "charge abnormality check" CCU1 in the present embodiment performs the processing shown in FIGS. 69A and 69B instead of the processing in the above described fifteenth embodiment (which equates to FIG. 43). Namely, (the CPU of) the charge control ECU 2 checks the condition signal of a card loading condition sensor of the card reader 5 and checks whether an IC card CRD is loaded (91). If a card is loaded, an attempt is made at data reading and if the data reading is successful, a check is made of the read data (92). If all the data is correct, the light emitting diodes 4f2 and 4B2 are extinguished (98). If the card balance is a negative value (i.e. is insufficient for payment), the fact that the balance is insufficient is notified by synthesized voice (99, 100). "Card error" and the balance (a negative value) is registered together with the date and time in the abnormality history memory (101A), and warning notification 1 is generated (101B).

If there is an abnormality in the data or in the card loading, a notification announcement urging that a card be inserted is made using the synthesized voice (93). The wait time timer is then started and the device waits for the wait time to expire (94). When the wait time has expired, the card is checked again (91, 92). If the abnormality is still present, an announcement is made urging that a card be inserted. This announcement is made three times if the card is not replaced. If the card is still not useable after three notification announcements, warning notification 1 is generated and "card error" is registered together with the date and time in the abnormality history memory (97).

Figure 70A:
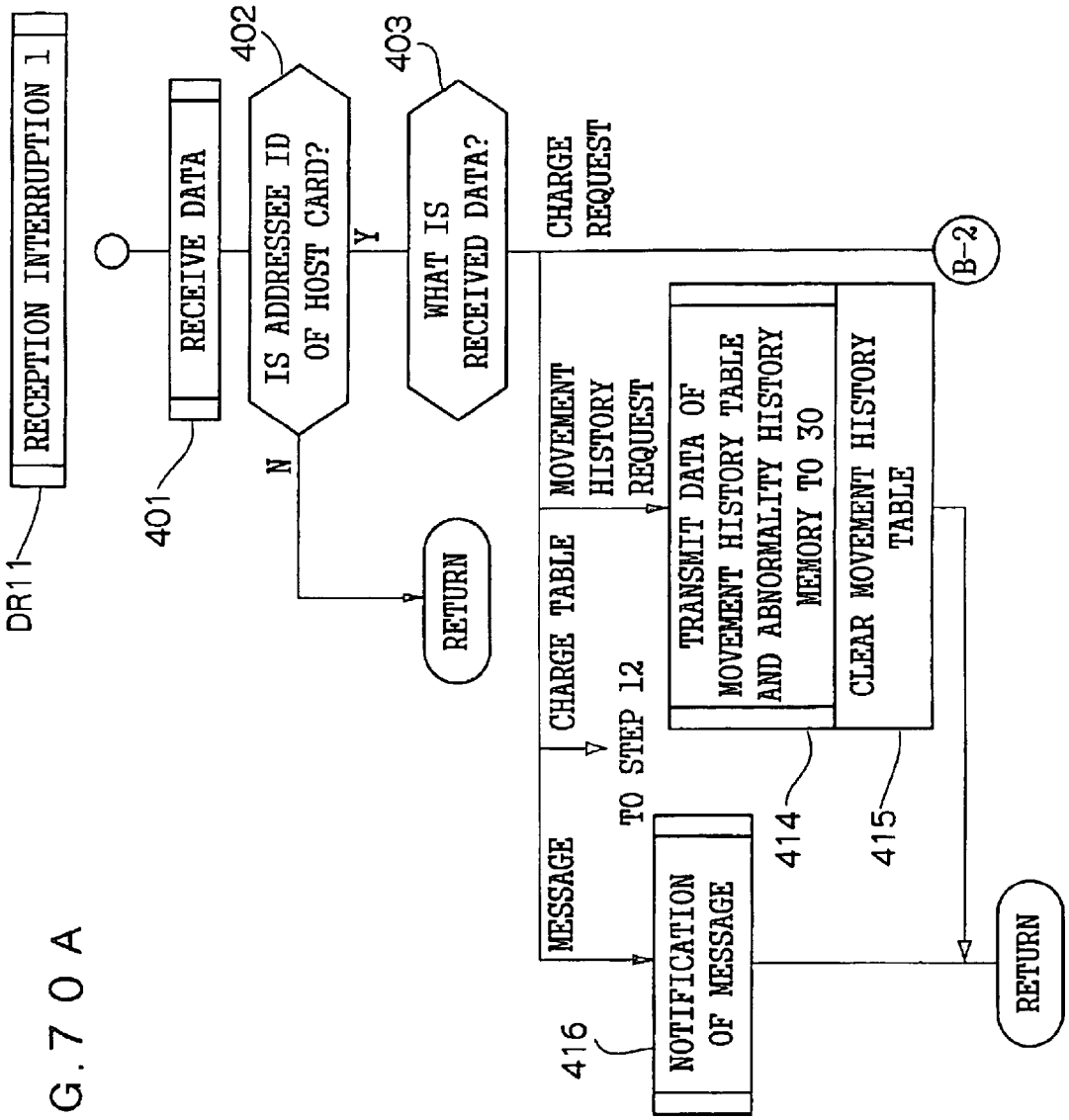
FIGS. 70A and 70B are flow charts showing the content of the interrupt processing 1 DRI1 by the charge control ECU 2 of the sixteenth embodiment in response to the reception of a radio signal.
Figure 70B:
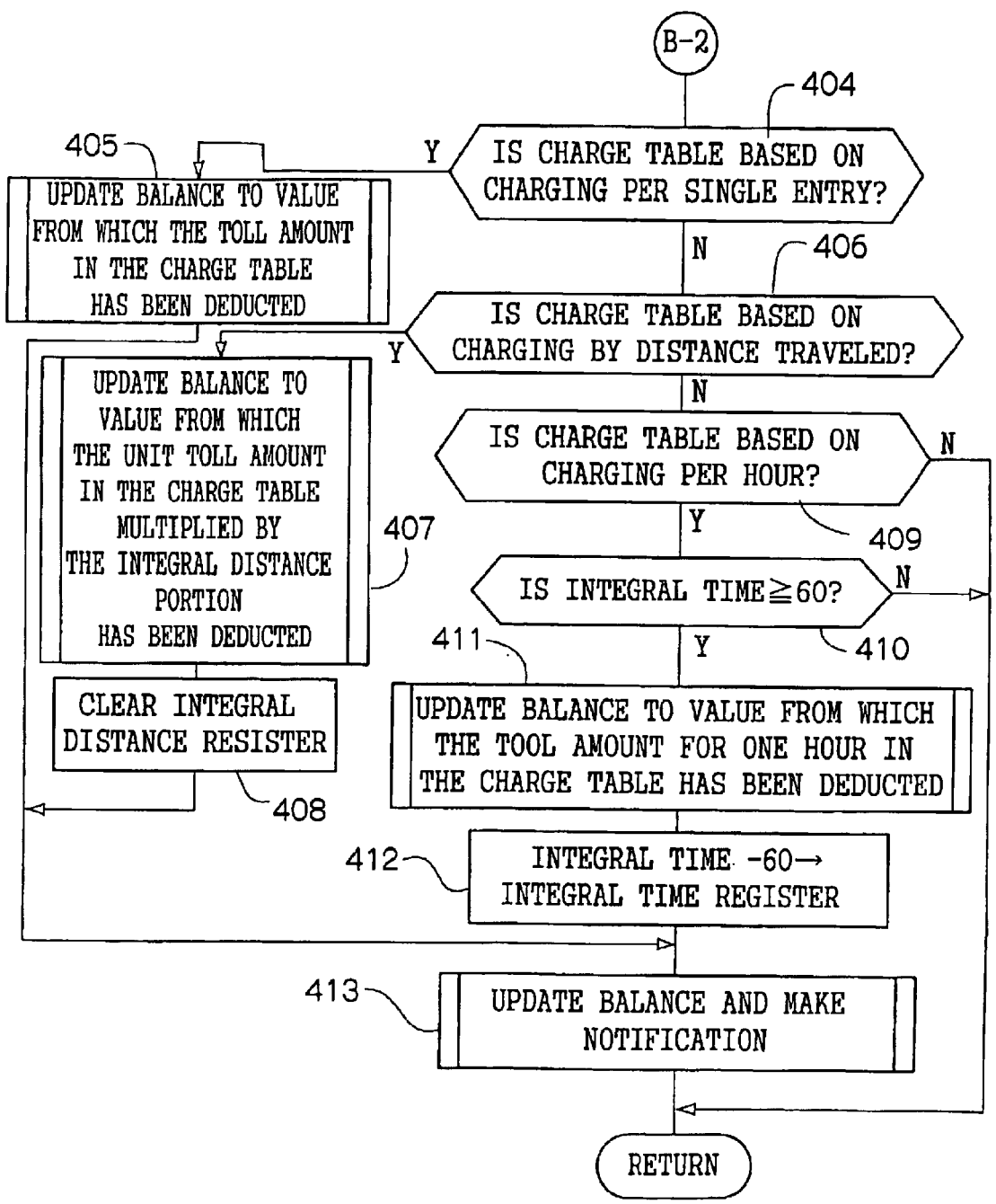

As is shown in FIG. 70A and FIG. 70B, in the "reception interruption 1" DRI1 in the present embodiment, when the result of the determination in step 403 is "charge request", then if the charge table of the card CRD is one based on charging for each entry (Table 10), the charge control ECU 2 extracts the toll (a positive value) from the table corresponding to the vehicle classification in the card data and updates the card balance in the card data in internal memory to a value from which the toll amount has been deducted (404, 405). In the same way, the data of the IC card CRD is also updated and the new balance is displayed on the display. A check is then made as to whether the card balance is a negative value (i.e. insufficient for toll payment) and if this is the case, "payment insufficient—settlement required" is displayed on the display device 4. Moreover, "card balance is insufficient. Please settle toll" is notified using synthesized voice via the voice synthesizing unit 10 and the speaker SP (413). If the charge table is one which charges on the basis of distance traveled (Table 14), the toll is extracted from the table for each kilometer corresponding to the vehicle classification in the card data and is multiplied by the value in the integral distance register. The card balance in the card data in the internal memory is then updated to the product thus obtained (406, 407) and the integral distance register is cleared (408). Thereafter, the data of the IC card CRD is updated in the same way and the updated balance is also displayed (413).

If the charge table is one based on charging for length of stay (Table 13), a check is made as to whether or not the value of the data in the integral time register is equal to more than 60 (i.e. one hour) (410), if this is the case, the toll is extracted from the table for time units corresponding to the vehicle classification in the card data and the card balance in the card data in the internal memory is then updated to a value from which the toll has been deducted (409 to 411). The contents of the integral time register are then updated to a value that is smaller by the amount of 60 (412). Thereafter, the data of the IC card CRD is updated in the same way and the updated balance is also/displayed (413).

What is claimed is:

1. A charging device which charges based on map information without local infrastructure, the charging device comprising:

detecting means for detecting position information specifying the position of a moving body;

deciding means for determining a charge applicable area in predetermined map information and for determining a buffer area, which is defined by a first boundary line of a charge applicable area and a second boundary line around the first boundary line, located adjacent to the charge applicable area and an area other than the charge applicable area, and matching the map information with the position information, and deciding an entry state indicating whether or not the moving body has at least entered into one of the charge applicable area or the buffer area; and generating means for generating charging information for the moving body based on a result of a decision by the deciding means, wherein, when a history of the entry state is one in which the moving body moves from the charge applicable area to the buffer area and then back to the same charge applicable area again, generating of charge information relating to an entry into the charge applicable area is prohibited in the generating means.

2. The charging device according to claim 1, wherein the generating means is provided with storage means in which toll data that is determined in advance and corresponds to the entry state is stored in advance, and the charge information is generated using toll data of the storage means.

3. The charging device according to claim 1 or 2, wherein the buffer area is located between the toll area and the non-toll area.

4. The charging device according to claim 1, wherein the charge applicable area is formed from at least a plurality of toll areas, and the buffer area is set between adjacent toll areas.

5. The charging device according to claim 4, wherein the plurality of toll areas contain toll areas that have different toll systems.

6. The charging device according to claim 5, wherein the buffer area is provided for each plurality of toll areas.

7. The charging device according to claim 1, wherein a toll for the buffer area is set based on a toll of one of adjacent areas.

8. The charging device according to claim 7, wherein a toll for the buffer area is set based on a toll of an area selected from a plurality of areas surrounding the buffer area.

9. The charging device according to claim 1, wherein the generating means generates charge information relating to tolls determined based on a distance traveled in the charge applicable area.

10. The charging device according to claim 1, wherein the generating means is provided with storage means for storing a distance traveled in the charge applicable area when the distance traveled bridges a boundary between adjacent areas, and charge information is generated based on the stored distance traveled.

11. A charging device which charges based on map information without local infrastructure, the charging device comprising:

detecting means for detecting position information specifying the position of a moving body;

deciding means for determining a charge applicable area in predetermined map information and for determining a buffer area, which is defined by a first boundary line of a charge applicable area and a second boundary line around the first boundary line, located adjacent to the charge applicable area and an area other than the charge applicable area, and matching the map information with the position information, and deciding an entry state indicating whether or not the moving body has at least entered into one of the charge applicable area or the buffer area; and generating means for generating charging information for the moving body based on a result of a decision by the deciding means, wherein, when a history of the entry state is one in which the moving body moves from the charge applicable area to the buffer area and then back to the same charge applicable area again, generating of charge information relating to an entry into the charge applicable area is prevented so as to prohibit double charging.

* * * * *

UNITED STATES PATENT AND TRADEMARK OFFICE
CERTIFICATE OF CORRECTION

PATENT NO. : 6,959,282 B2
APPLICATION NO. : 09/819827
DATED : October 25, 2002
INVENTOR(S) : Kakihara et al.

It is certified that error appears in the above-identified patent and that said Letters Patent is hereby corrected as shown below:

On the cover page, insert the following item:

--(62)  Related U.S. Application Data

Continuation of PCT/JP99/05580, filed October 8, 1999--

In item (30) Foreign Application Priority Data, delete:
"Oct. 8, 1999    (JP)…………………….....PCT/JP99/05580"

On page 2, in the FOREIGN PATENT DOCUMENTS item (second column), change: "411185073" to --11-185073--

Signed and Sealed this

First Day of August, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,959,282 B2 | Page 1 of 1 |
| APPLICATION NO. | : 09/819827 | |
| DATED | : October 25, 2005 | |
| INVENTOR(S) | : Kakihara et al. | |

It is certified that error appears in the above-identified patent and that said Letters Patent is hereby corrected as shown below:

On the cover page, insert the following item:

--(62) Related U.S. Application Data

Continuation of PCT/JP99/05580, filed October 8, 1999--

In item (30) Foreign Application Priority Data, delete:
"Oct. 8, 1999    (JP)……………………....PCT/JP99/05580"

On page 2, in the FOREIGN PATENT DOCUMENTS item (second column), change: "411185073" to --11-185073--

This certificate supersedes Certificate of Correction issued August 1, 2006.

Signed and Sealed this

Twelfth Day of September, 2006

JON W. DUDAS
*Director of the United States Patent and Trademark Office*